DOCUMENT PROCESSING AND SORTING APPARATUS
Filed Aug. 30, 1960 63 Sheets-Sheet 1
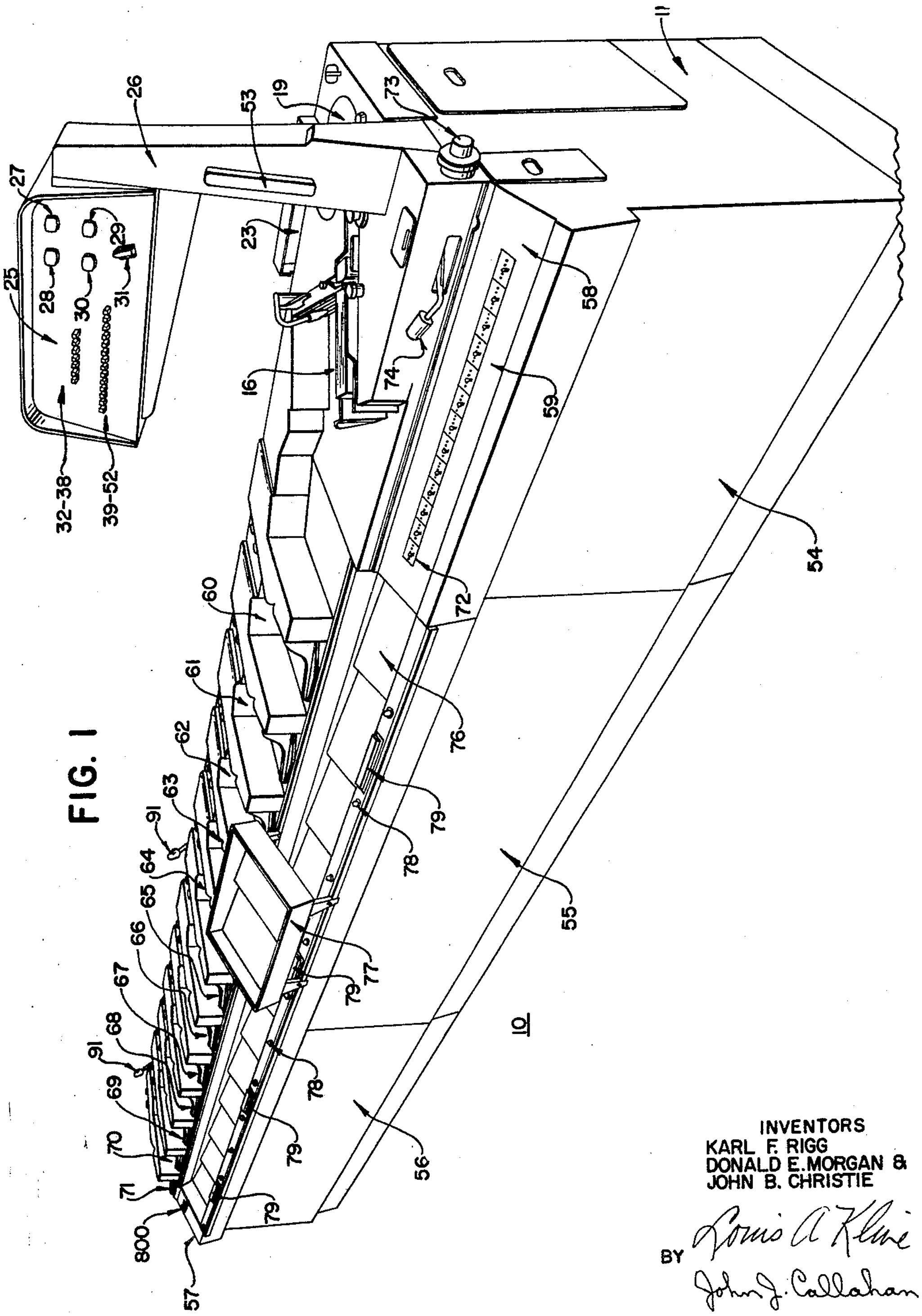
FIG. I
INVENTORS
KARL F. RIGG
DONALD E. MORGAN &
JOHN B. CHRISTIE
BY Louis A. Kline
John J. Callahan
THEIR ATTORNEYS

DOCUMENT PROCESSING AND SORTING APPARATUS

Filed Aug. 30, 1960 63 Sheets-Sheet 2

INVENTORS
KARL F. RIGG
DONALD E. MORGAN &
JOHN B. CHRISTIE
BY Louis A. Kline
John J. Callahan
THEIR ATTORNEYS

DOCUMENT PROCESSING AND SORTING APPARATUS

Filed Aug. 30, 1960 63 Sheets-Sheet 3

INVENTORS
KARL F. RIGG
DONALD E. MORGAN &
JOHN B. CHRISTIE
BY Louis A. Kline
John J. Callahan
THEIR ATTORNEYS

DOCUMENT PROCESSING AND SORTING APPARATUS

Filed Aug. 30, 1960

INVENTORS
KARL F. RIGG
DONALD E. MORGAN &
JOHN B. CHRISTIE

BY Louis A. Kline
John J. Callahan

THEIR ATTORNEYS

DOCUMENT PROCESSING AND SORTING APPARATUS

Filed Aug. 30, 1960 63 Sheets-Sheet 5

INVENTORS
KARL F. RIGG
DONALD E. MORGAN &
JOHN B. CHRISTIE
BY Louis A Kline
John J. Callahan
THEIR ATTORNEYS

DOCUMENT PROCESSING AND SORTING APPARATUS

Filed Aug. 30, 1960 63 Sheets-Sheet 6

INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A Kline
John J. Callahan
THEIR ATTORNEYS

DOCUMENT PROCESSING AND SORTING APPARATUS

Filed Aug. 30, 1960 63 Sheets-Sheet 12

INVENTORS
KARL F. RIGG
DONALD E. MORGAN &
JOHN B. CHRISTIE

BY Louis A. Kline
John J. Callahan
THEIR ATTORNEYS

FIG. 13 FIELD SELECTOR CIRCUIT 104

INVENTORS
KARL F. RIGG
DONALD E. MORGAN &
JOHN B. CHRISTIE
BY Louis A Kline
John J. Callahan
THEIR ATTORNEYS INVENTORS
KARL F. RIGG
DONALD E. MORGAN &
JOHN B. CHRISTIE
BY Louis A Kline
John J. Callahan
THEIR ATTORNEYS

INVENTORS
KARL F. RIGG
DONALD E. MORGAN &
JOHN B. CHRISTIE

BY Louis A Kline
John J. Callahan

THEIR ATTORNEYS

INVENTORS
KARL F. RIGG
DONALD E. MORGAN &
JOHN B. CHRISTIE

BY Louis A. Kline
John J. Callahan
THEIR ATTORNEYS

OUTPUT MEMORY 110 (FIG. 6)

496-499 TO ELECTRONIC MEMORY (FIG. 52)

480-483 TO ELECTRONIC MEMORY (FIG. 52) & TO ASSOC. EQ. 14

INVENTORS
KARL F. RIGG
DONALD E. MORGAN &
JOHN B. CHRISTIE

BY Louis A. Kline
John J. Callahan
THEIR ATTORNEYS

FIG. 19 REJECT CIRCUIT 108

INVENTORS
KARL F. RIGG
DONALD E. MORGAN &
JOHN B. CHRISTIE
BY Louis A. Kline
John J. Callahan
THEIR ATTORNEYS

OUTPUT DECODER III

INVENTORS
KARL F. RIGG
DONALD E. MORGAN &
JOHN B. CHRISTIE
BY Louis A. Kline
John J. Callahan
THEIR ATTORNEYS

GENERAL TIMING

INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A Kline
John J. Callahan
THEIR ATTORNEYS Dec. 11, 1962 K. F. RIGG ET AL 3,067,874

DOCUMENT PROCESSING AND SORTING APPARATUS

Filed Aug. 30, 1960 63 Sheets-Sheet 23

INVENTORS
KARL F. RIGG
DONALD E. MORGAN
JOHN B. CHRISTIE

BY Louis A Kline
John J. Callahan

THEIR ATTORNEYS

INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS

INVENTORS
KARL F. RIGG
DONALD E. MORGAN &
JOHN B. CHRISTIE

BY Louis A. Kline
John J. Callahan

THEIR ATTORNEYS

AMPLIFIER CIRCUITS 100(FIG. 4)

AMPLIFIER CIRCUITS 100(FIG. 4)

ONE-SHOT CIRCUIT 177(FIG. 7)

INVENTORS
KARL F. RIGG
DONALD E. MORGAN &
JOHN B. CHRISTIE

BY Louis A. Kline
John J. Callahan

THEIR ATTORNEYS

INVENTORS
KARL F. RIGG
DONALD E. MORGAN &
JOHN B. CHRISTIE

BY Louis A. Kline
John J. Callahan

THEIR ATTORNEYS

DOCUMENT PROCESSING AND SORTING APPARATUS

Filed Aug. 30, 1960 63 Sheets-Sheet 30

INVENTORS
KARL F. RIGG
DONALD E. MORGAN &
JOHN B. CHRISTIE

BY Louis A Kline
John J. Callahan
THEIR ATTORNEYS

DOCUMENT PROCESSING AND SORTING APPARATUS

Filed Aug. 30, 1960 63 Sheets-Sheet 31

SYNCHRONIZATION SIGNAL GENERATOR 102 (FIG. 4)

INVENTORS
KARL F. RIGG
DONALD E. MORGAN &
JOHN B. CHRISTIE

BY Louis A. Kline
John J. Callahan

THEIR ATTORNEYS

INVENTORS
KARL F. RIGG
DONALD E. MORGAN &
JOHN B. CHRISTIE

BY Louis A Kline
John J. Callahan
THEIR ATTORNEYS

Dec. 11, 1962 K. F. RIGG ET AL 3,067,874

DOCUMENT PROCESSING AND SORTING APPARATUS

Filed Aug. 30, 1960 63 Sheets-Sheet 33

SYNCHRONIZATION SIGNAL GENERATOR 102(FIG. 4)

INVENTORS
KARL F. RIGG
DONALD E. MORGAN &
JOHN B. CHRISTIE

BY Louis A. Kline
John J. Callahan
THEIR ATTORNEYS

INVENTORS
KARL F. RIGG
DONALD E. MORGAN &
JOHN B. CHRISTIE
BY Louis A Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS

FEED SYSTEM 101(FIG.4)

INVENTORS
KARL F. RIGG
DONALD E. MORGAN &
JOHN B. CHRISTIE
BY Louis A. Kline
John J. Callahan
THEIR ATTORNEYS

DOCUMENT PROCESSING AND SORTING APPARATUS

Filed Aug. 30, 1960 63 Sheets-Sheet 38

INVENTORS
KARL F. RIGG
DONALD E. MORGAN &
JOHN B. CHRISTIE

BY Louis A. Kline
John J. Callahan

THEIR ATTORNEYS

DOCUMENT PROCESSING AND SORTING APPARATUS

Filed Aug. 30, 1960 63 Sheets-Sheet 39

INVENTORS
KARL F. RIGG
DONALD E. MORGAN &
JOHN B. CHRISTIE
BY Louis A. Kline
John J. Callahan
THEIR ATTORNEYS

INVENTORS
KARL F. RIGG
DONALD E. MORGAN &
JOHN B. CHRISTIE

BY Louis A Kline
John J. Callahan

THEIR ATTORNEYS

INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A Kline
John J. Callahan
THEIR ATTORNEYS

INVENTORS
KARL F. RIGG
DONALD E. MORGAN &
JOHN B. CHRISTIE

BY Louis A Kline
John J. Callahan

THEIR ATTORNEYS

ALL DIODES S479G UNLESS OTHERWISE SHOWN.
ALL TRANSISTORS 2N525.

INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS Dec. 11, 1962 K. F. RIGG ET AL 3,067,874

DOCUMENT PROCESSING AND SORTING APPARATUS

Filed Aug. 30, 1960 63 Sheets-Sheet 47

ELECTRONIC MEMORY 113(FIG. 6)

INVENTORS
KARL F. RIGG
DONALD E. MORGAN &
JOHN B. CHRISTIE

BY Louis A. Kline
John J. Callahan

THEIR ATTORNEYS

INVENTORS
KARL F. RIGG
DONALD E. MORGAN &
JOHN B. CHRISTIE
BY Louis A. Kline
John J. Callahan
THEIR ATTORNEYS

FIG. 54 ELECTRONIC MEMORY 113(FIG. 6)

INVENTORS
KARL F. RIGG
DONALD E. MORGAN &
JOHN B. CHRISTIE
BY Louis A. Kline
John J. Callahan
THEIR ATTORNEYS Dec. 11, 1962 K. F. RIGG ET AL 3,067,874

DOCUMENT PROCESSING AND SORTING APPARATUS

Filed Aug. 30, 1960 63 Sheets-Sheet 50

INVENTORS
KARL F. RIGG
DONALD E. MORGAN &
JOHN B. CHRISTIE

BY Louis A. Kline
John J. Callahan

THEIR ATTORNEYS

ELECTRONIC MEMORY 110 (FIGS. 52-54)

ALL DIODES S479G
UNLESS OTHERWISE SHOWN.

INVENTORS
KARL F. RIGG
DONALD E. MORGAN &
JOHN B. CHRISTIE
BY Louis A. Kline
John J. Callahan
THEIR ATTORNEYS

ALL DIODES S479G.

INVENTORS
KARL F. RIGG
DONALD E. MORGAN &
JOHN B. CHRISTIE
BY Louis A. Kline
John J. Callahan
THEIR ATTORNEYS Dec. 11, 1962 K. F. RIGG ET AL 3,067,874

DOCUMENT PROCESSING AND SORTING APPARATUS

Filed Aug. 30, 1960 63 Sheets-Sheet 53

ALL DIODES S479G
UNLESS OTHERWISE SHOWN.

INVENTORS
KARL F. RIGG
DONALD E. MORGAN &
JOHN B. CHRISTIE

BY Louis A Kline
John J. Callahan

THEIR ATTORNEYS

ALL DIODES S479G.

INVENTORS
KARL F. RIGG
DONALD E. MORGAN
JOHN B. CHRISTIE
BY Louis A Kline
John J. Callahan
THEIR ATTORNEYS

ELECTRONIC MEMORY 113(FIGS. 52-54)

INVENTORS
KARL F. RIGG
DONALD E. MORGAN &
JOHN B. CHRISTIE
BY Louis A. Kline
John J. Callahan
THEIR ATTORNEYS

FLIP-FLOPS 750-780
(FIGS. 52-59).

INVENTORS
KARL F. RIGG
DONALD E. MORGAN &
JOHN B. CHRISTIE
BY Louis A. Kline
John J. Callahan
THEIR ATTORNEYS

NORMAL TYPE FLIP-FLOP

DOMINANT RESET TYPE FLIP-FLOP

INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS

ONE-SHOT CIRCUIT (FOUR TRANSISTOR STAGE)

INVENTORS
KARL F. RIGG
DONALD E. MORGAN &
JOHN B. CHRISTIE
BY Louis A. Kline
John J. Callahan
THEIR ATTORNEYS

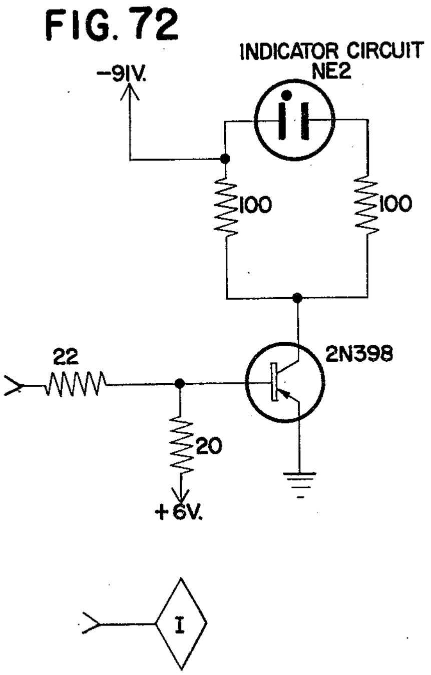
FIG. 72
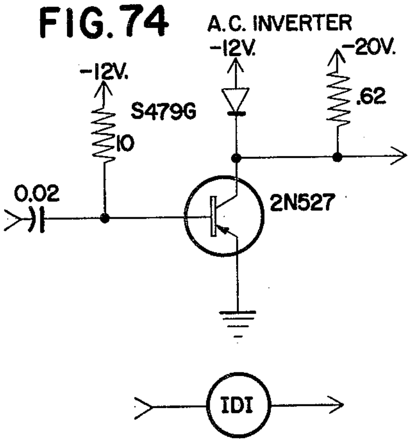
FIG. 74 A.C. INVERTER
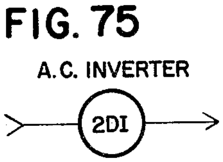
FIG. 75 A.C. INVERTER
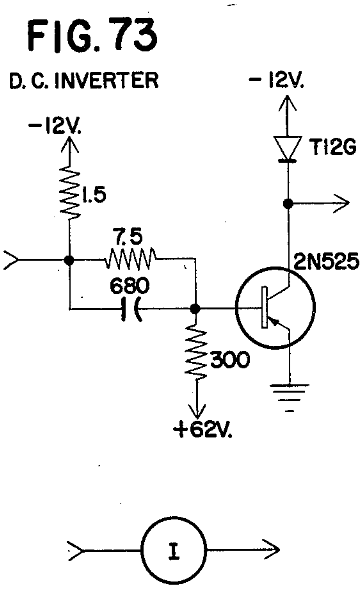
FIG. 73 D.C. INVERTER
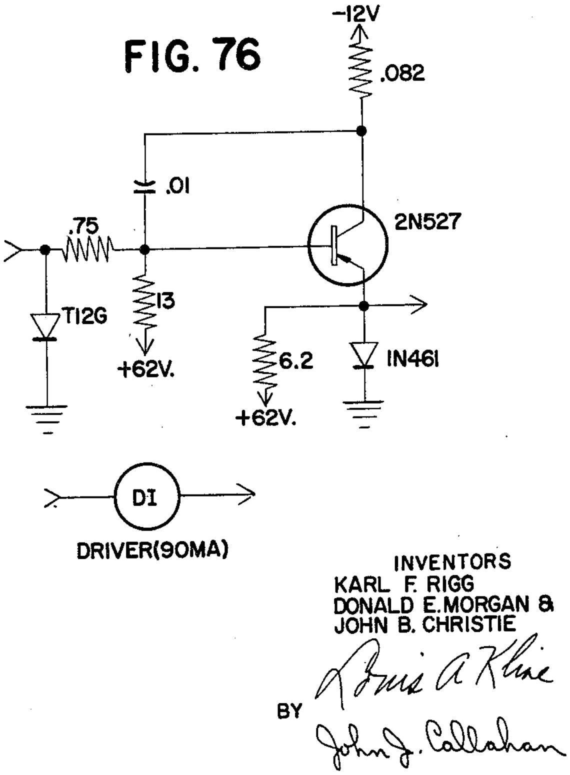
FIG. 76
INVENTORS
KARL F. RIGG
DONALD E. MORGAN &
JOHN B. CHRISTIE
BY Louis A. Kline
John J. Callahan
THEIR ATTORNEYS FIG. 77 DRIVER(60MA)
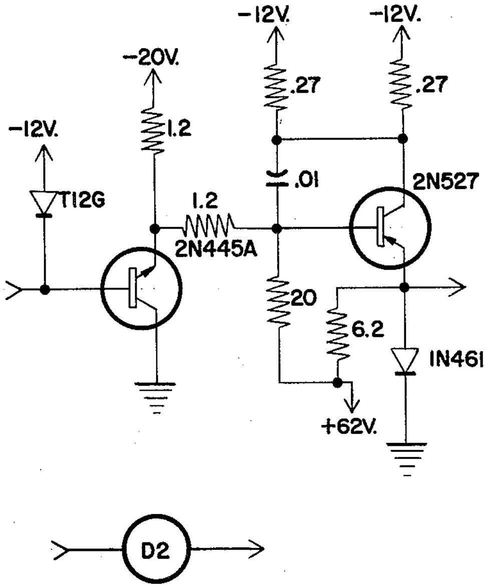
FIG. 78
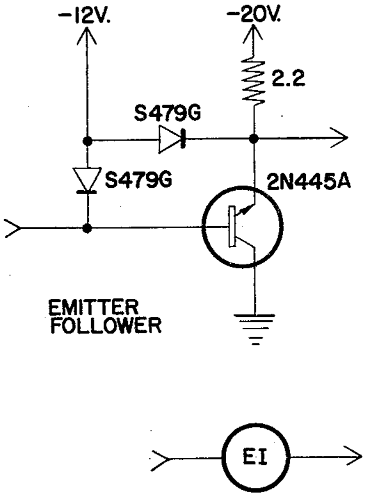
FIG. 79
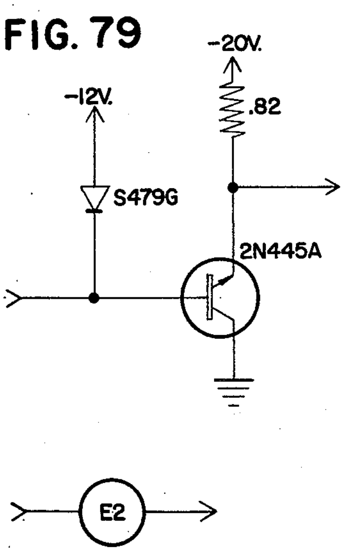
EMITTER FOLLOWER
FIG. 80
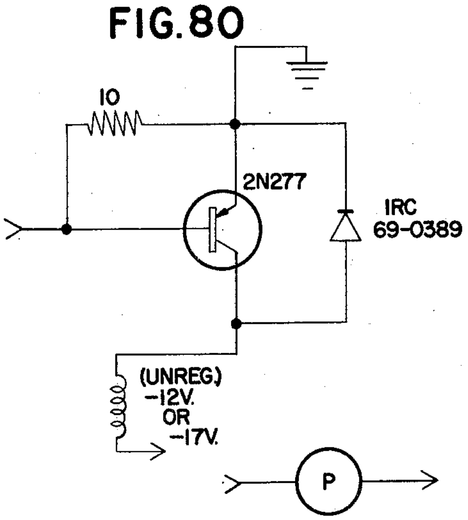
POWER AMPLIFIER
FIG. 81
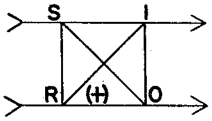
INVENTORS
KARL F. RIGG
DONALD E. MORGAN &
JOHN B. CHRISTIE
BY Boris A. Kline
John J. Callahan
THEIR ATTORNEYS INVENTORS
KARL F. RIGG
DONALD E. MORGAN &
JOHN B. CHRISTIE
BY Louis A. Kline
John J. Callahan
THEIR ATTORNEYS United States Patent Office 3,067,874
Patented Dec. 11, 1962

3,067,874

DOCUMENT PROCESSING AND SORTING APPARATUS

Karl F. Rigg, Dayton, Donald E. Morgan, Xenia, and John B. Christie, Dayton, Ohio, assignors to The National Cash Register Company, Dayton, Ohio, a corporation of Maryland Filed Aug. 30, 1960, Ser. No. 52,877
24 Claims. (Cl. 209—111.5)

This invention relates generally to document processing and sorting apparatus and more particularly relates to novel and useful control arrangements therefor.

In greater particularity, the invention relates to a control arrangement, which is to be used with a document processing and sorting apparatus, for storing or holding information concerning the sorting of documents and for releasing the information at predetermined times, whereby gating operations may be controlled so that the documents will be distributed to stackers in accordance with the data read therefrom. The invention also relates to control arrangements for developing and utilizing control or synchronizing signals required by the document processing and sorting apparatus during the feeding of the documents, the reading of data thereon, and the conveying of the documents to the stackers. The invention further relates to a control arrangement employing photosensitive devices for detecting improperly timed or spaced documents conveyed in the document processing and sorting apparatus, and for controlling the feeding and the conveying of the documents when this condition occurs.

A United States patent application filed by Allen W. Daubendick on April 28, 1958, Serial No. 731,405, now United States Patent No. 2,994,428, issued August 1, 1961, for a Sorting Apparatus, which application is assigned to the same assignee as the instant invention, describes and claims an apparatus for sorting documents upon which control data is recorded, wherein a sorting control signal is developed for each of the documents to be sorted. The sorting control signals are utilized by the sorting portion of the sorting apparatus in a manner to cause the documents to be sorted according to the significance of the control data recorded on them. In United States Patent No. 2,994,428, it is disclosed that the sorting portion of the sorting apparatus is provided with a plurality of sorting pockets, or stackers, and that a gating device is provided for each of the sorting pockets. The gating device is operated or opened in response to a sorting control signal. When the gating device is operated, it directs a document to its associated sorting pocket. In United States Patent No. 2,994,428, it is disclosed that the control effect of a sorting control signal is delayed so that the operation of a particular gating device will not occur until the applicable document arrives at a predetermined position in relation to that gating device, an electromechanical delay means or mechanical memory being disclosed in the application for assuring that a particular gating device will operate in response to a sorting control signal at the time required for the particular document to enter its respective sorting pocket. The present invention is concerned with providing an improved delay system or electronic memory for this purpose.

In the United States Patent No. 2,994,428, previously referred to, there is disclosed and claimed a sorting apparatus in which certain control or synchronizing signals are developed and utilized to synchronize operation of different parts of the sorting apparatus. The present invention is concerned with the provision of novel arrangements for developing and utilizing control or synchronizing signals required by the document processing and sorting apparatus during the feeding of documents, the reading of data thereon, and the conveying of the documents to the stackers.

A United States patent application filed on November 7, 1958, by Walter Klein, Serial No. 772,624, now United States Patent No. 2,963,293, issued December 6, 1960, for a Control Circuit, which application is assigned to the same assignee as the instant invention, describes and claims a photosensitive type of control arrangement which may be used with a document processing and sorting apparatus to detect improperly timed or spaced documents conveyed in the sorting apparatus, and for controlling the feeding and conveying of documents when this condition occurs. The present invention is concerned with the provision of an improved photosensitive type of control circuit for accomplishing this purpose.

In its broadest aspect, this invention comprises a delay means having a plurality of input and output circuits. The input circuits are provided for receiving any one of the groups of input electrical signals representative of input data expressed in accordance with a predetermined code. Each one of the output circuits is coupled to a different one of a plurality of gating circuit means in accordance with a preselected code pattern whereby a different one of the gating circuit means will be conditioned for subsequent operation in response to a different one of the groups of input electrical signals. A control means is also provided for developing a gating signal at predetermined times and for applying the gating signals to all of the gating circuit means whereby a gating circuit means previously conditioned for operation is rendered operative, and an output means is coupled to each of the gating circuit means for providing an output signal upon its associated gating circuit means being rendered operative.

This invention also comprises a timing signal generating means for developing an electrical timing signal each time one of the documents to be processed or sorted by the sorting apparatus is fed to the conveying means of the sorting apparatus. The sorting apparatus is provided with a first storage means for storing sorting control signals developed for each of the documents read by a reading device of the sorting apparatus. The sorting apparatus is also provided with a second storage means for storing the sorting control signals read out of the first storage means. The sorting apparatus is further provided with a transfer means operable to read sorting control signals out of the first storage means into the second storage means. A means is provided for developing a first synchronization signal occurring prior to the reading of each of the documents by the reading device. A means is provided for applying each of the first synchronization signals to the first storage means to clear it of sorting control signals developed for the next preceding one of the documents read, with the transfer means having previously been operated to cause the sorting control signals developed for the next preceding one of the documents to be read out of the first storage means to the second storage means. A means is provided for developing a second synchronization signal occurring just prior to termination of the reading of the documents. A means is provided for developing a third synchronization signal occurring just subsequently to each of the second synchronization signals. A means is provided for applying each of the second synchronization signals to the second storage means to clear it of sorting control signals developed for the next preceding one of the documents read. A transfer signal generating means is provided which is responsive to each of the third synchronization signals for developing a transfer signal for the sorting control signals stored in the first storage means, and the transfer means is responsive to each of the transfer signals to cause sorting control signals stored in the first storage means to be read out to the second storage means.

This invention further comprises a timing means which is associated with the feeding means of the sorting apparatus. The timing means develops a timing signal each time one of the documents is fed to the conveying means of the sorting apparatus. A control means is provided for developing a control output to effect control of the feeding means when a document is improperly located along its path of travel during the occurrence of one of the timing signals. The control means comprises a control circuit including a plurality of photosensitive devices, each positioned at a predetermined point adjacent to the path of travel for the documents, means for applying light to each of the photosensitive devices, a source of oscillatory potential, means coupled to the source of oscillatory potential and controlled by the output of the control circuit for developing an output signal, and a gating circuit means for receiving the timing signals and the output signal. The control circuit functions to develop an output when a document is adjacent to one of the photosensitive devices and prevents light from being applied thereto. The gating circuit means is operable when one of the timing signals and the output signal are received simultaneously to develop a control output to effect control of the feeding means.

It is, accordingly, an object of the present invention to provide a control arrangement for delaying each of a plurality of groups of input electrical signals representative of input data expressed in accordance with a predetermined code, and for providing an output signal for each of the groups of input electrical signals a time interval after each of the groups is first received, wherein the time interval is determined by the particular relation of the coded input data.

It is another object of the present invention to provide a control arrangement for developing and utilizing control or synchronizing signals in conjunction with a document processing or sorting apparatus.

It is a further object of the present invention to provide a control arrangement employing photosensitive devices for detecting improperly timed or spaced documents conveyed in the sorting apparatus, and for controlling the feeding and the conveying of the documents when this condition occurs.

The novel features that are considered characteristic of this invention are set forth with particularity in the appended claims. The invention itself, however, as to both its organization and its method of operation, as well as additional objects and advantages thereof, will best be understood from the following description when it is read in connection with the accompanying drawings, in which:

FIGURE 1 is a perspective view of the sorter-reader embodying the present invention;

Figure 4:
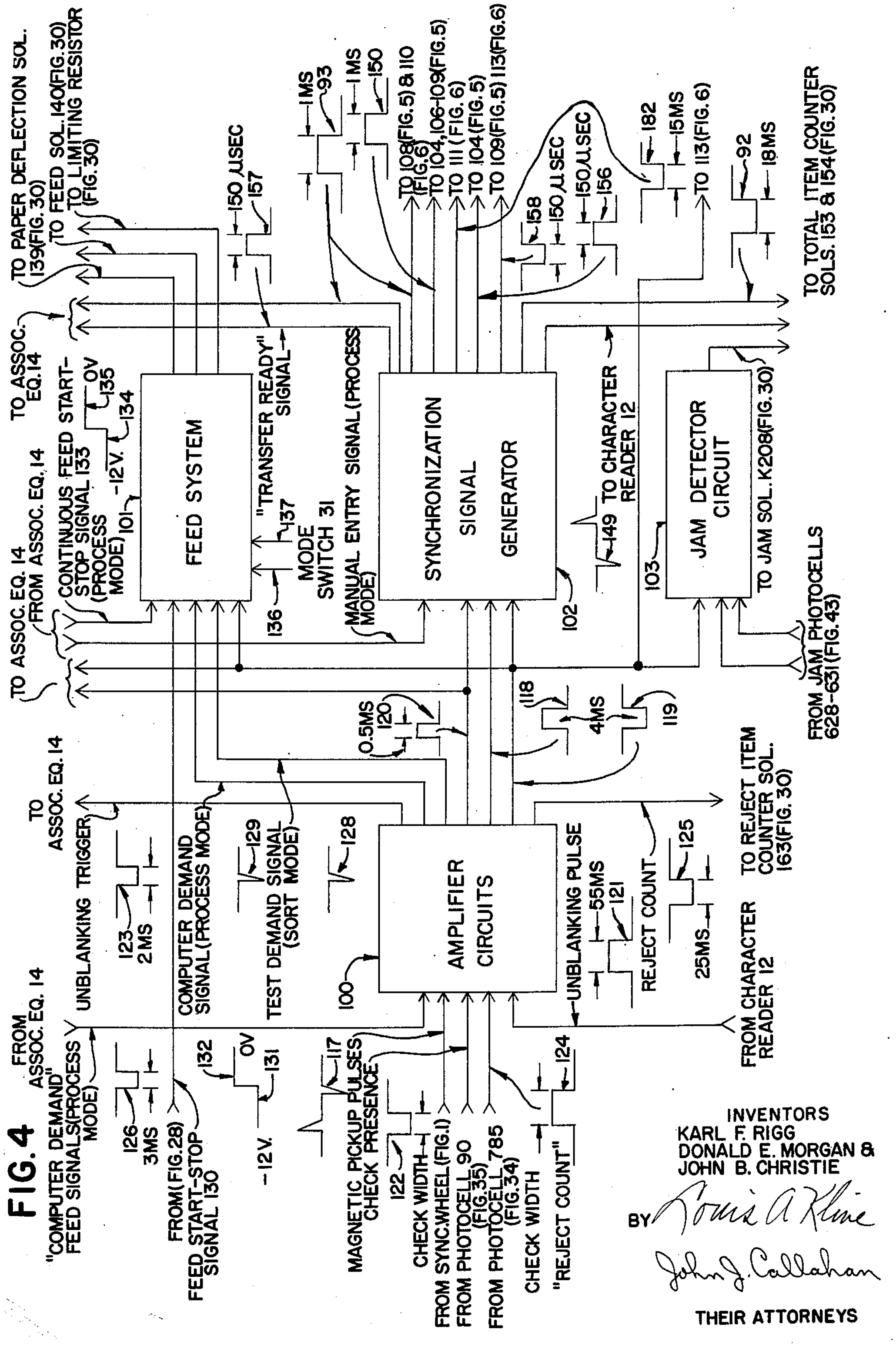
Figure 5:
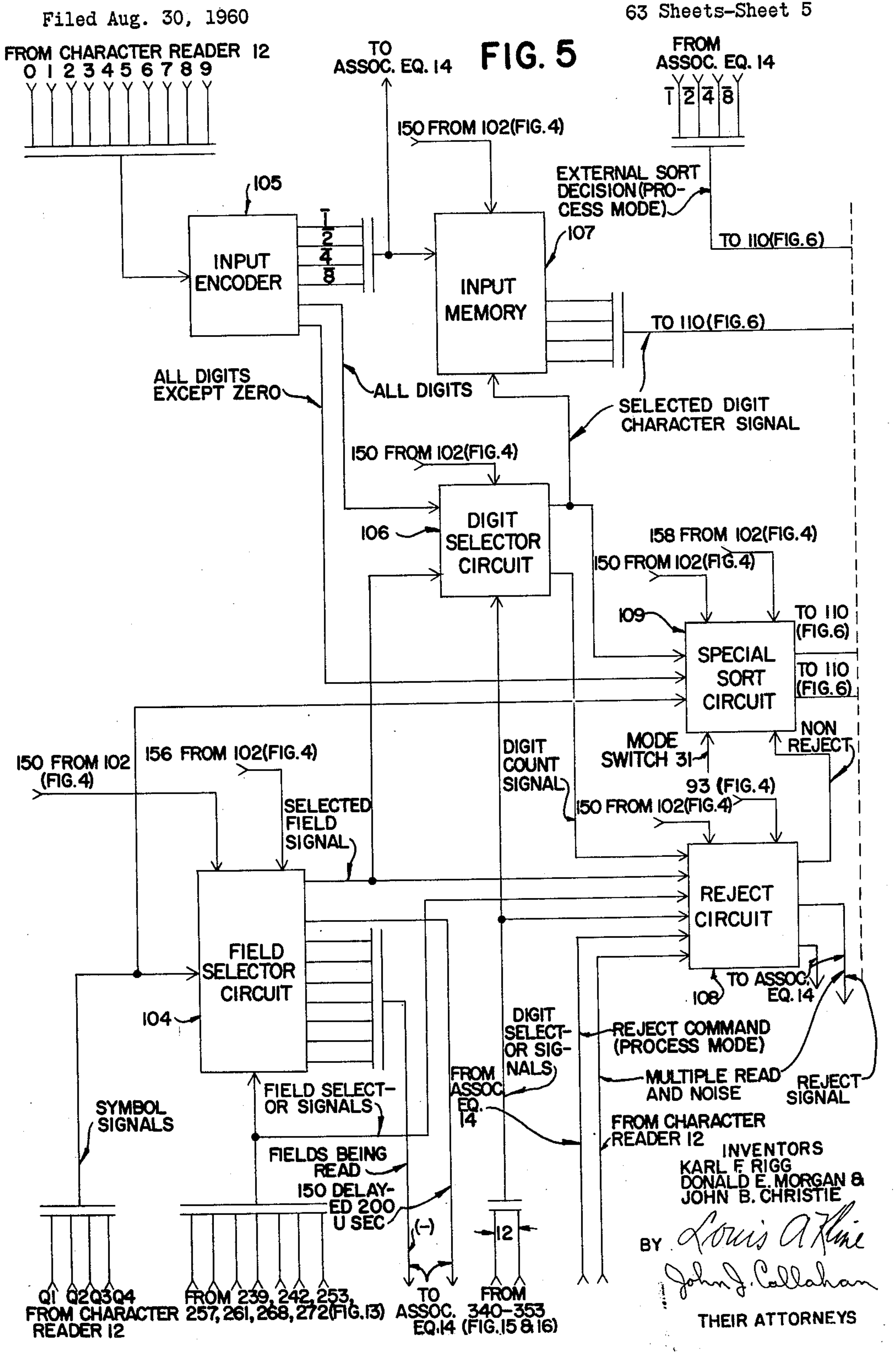
Figure 6:
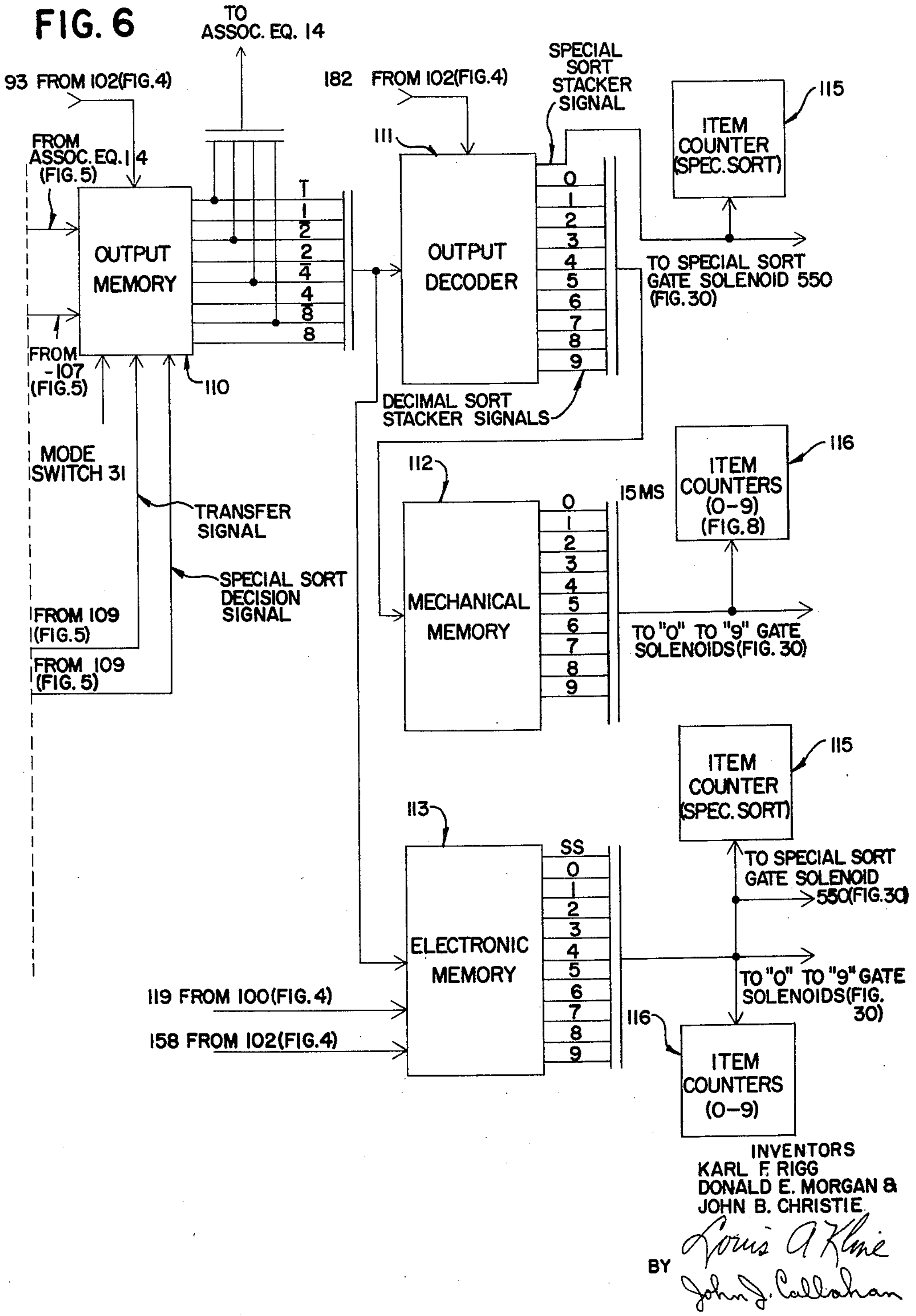
Figure 7:
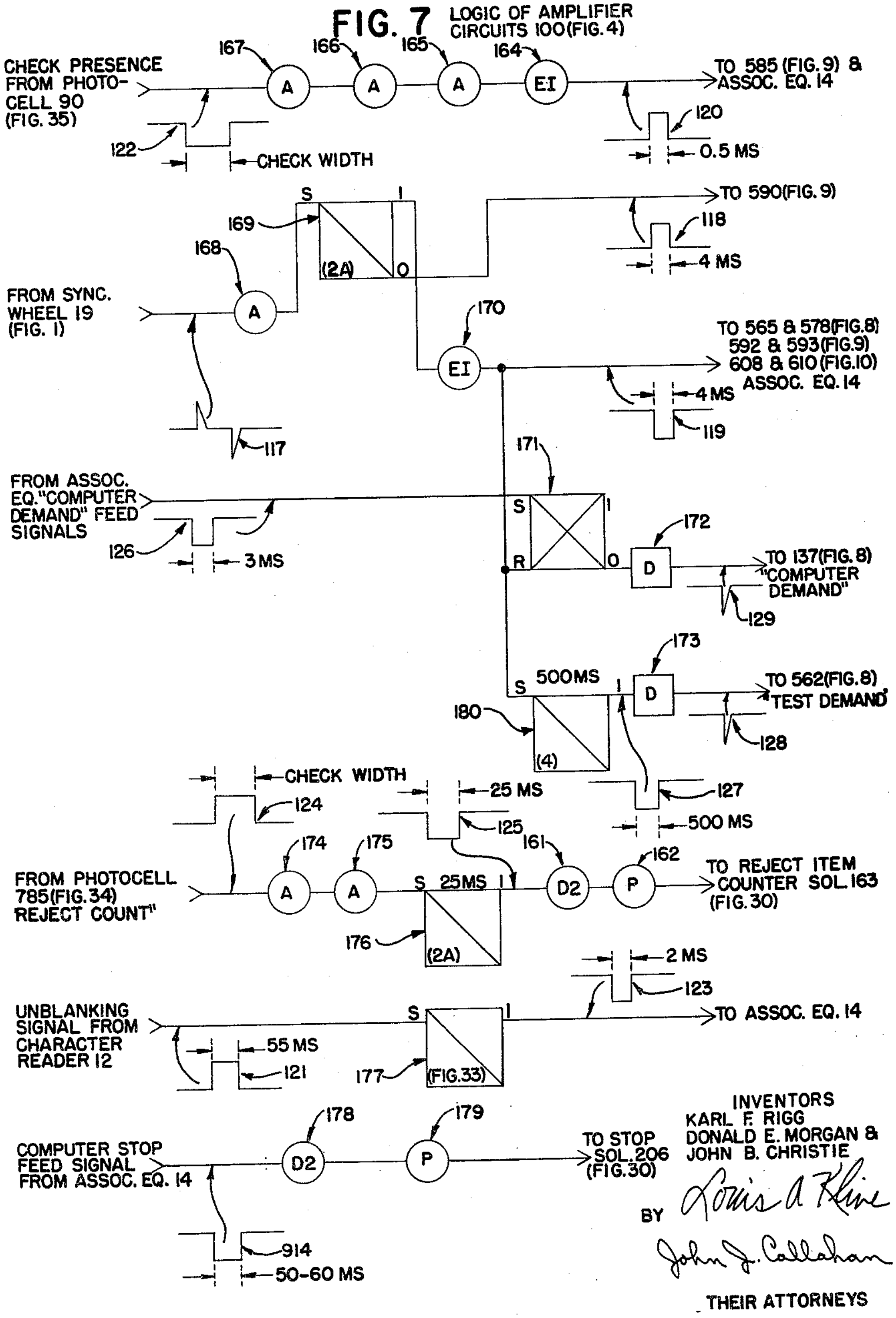
Figure 8:
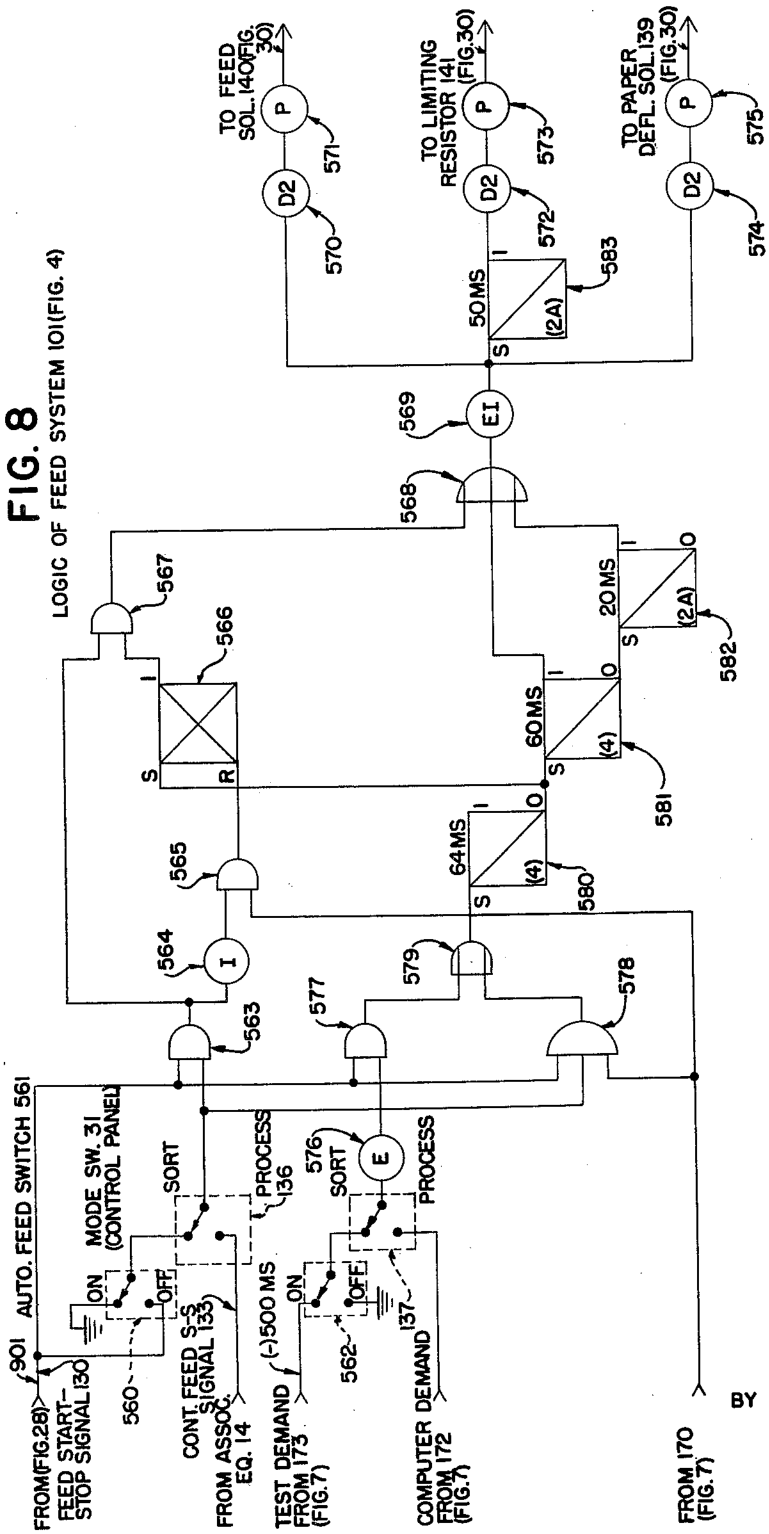
Figure 9:
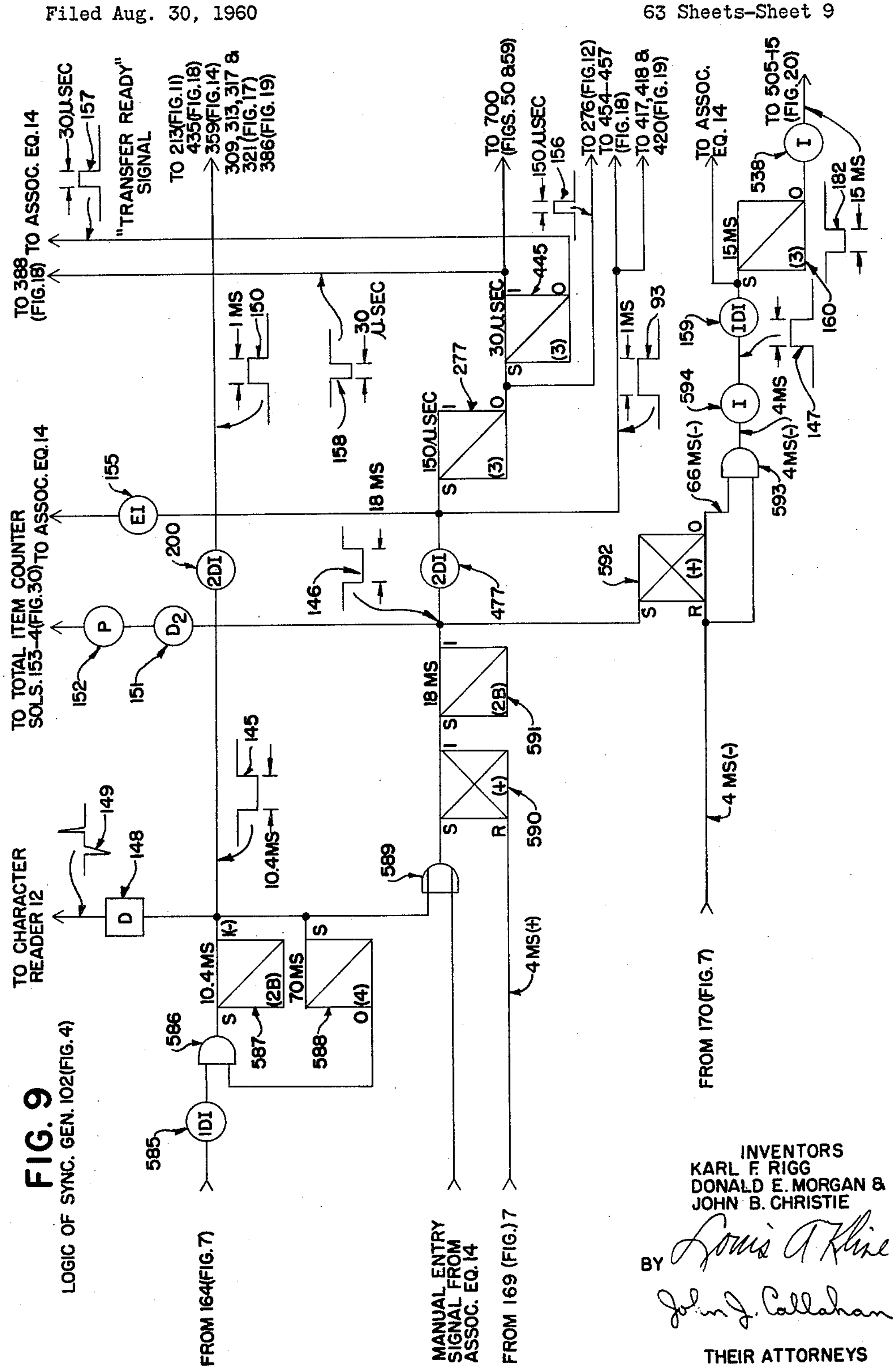
Figure 10:
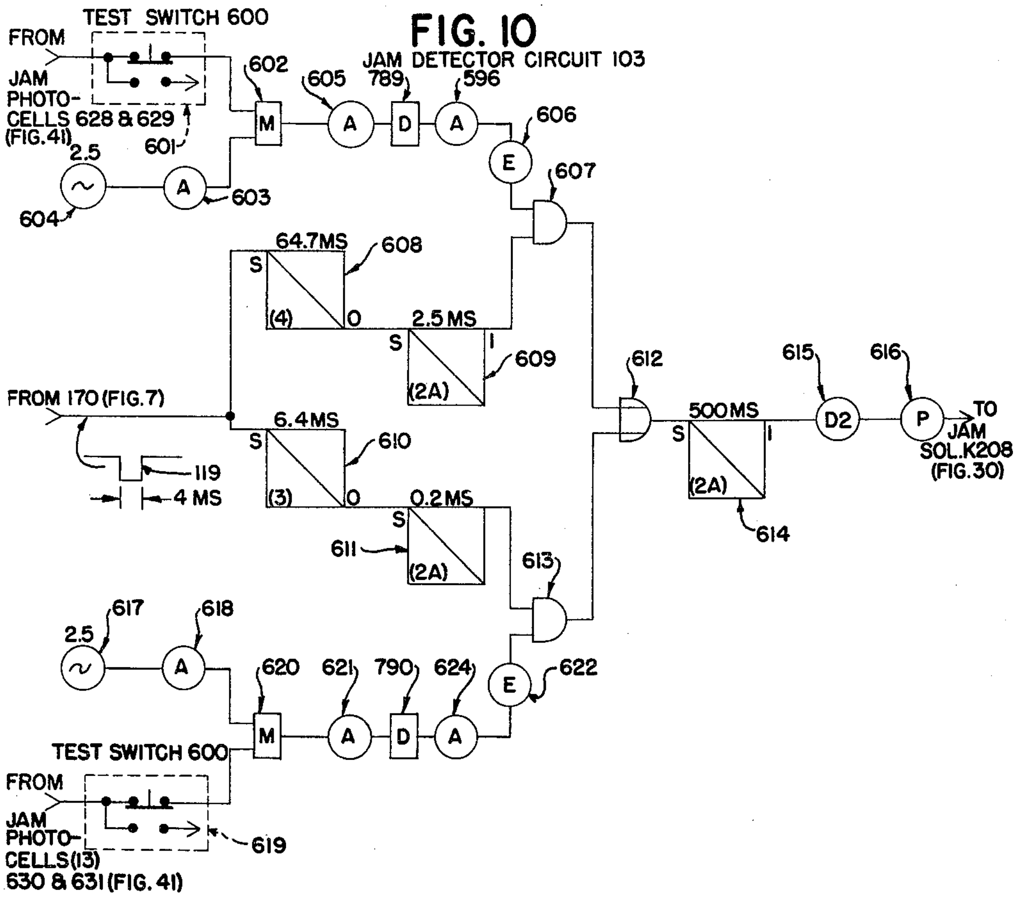
Figure 17:
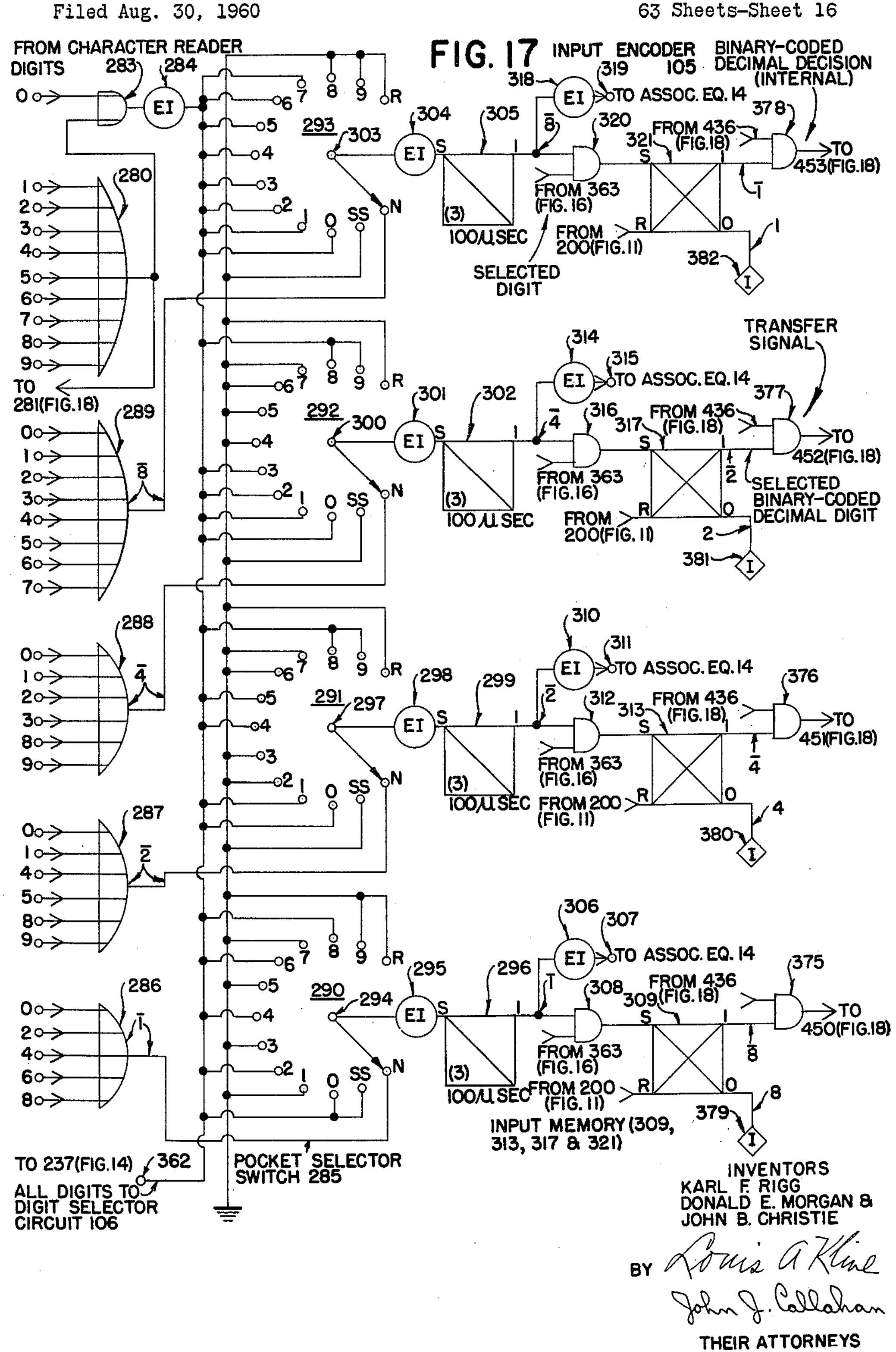
Figure 20:
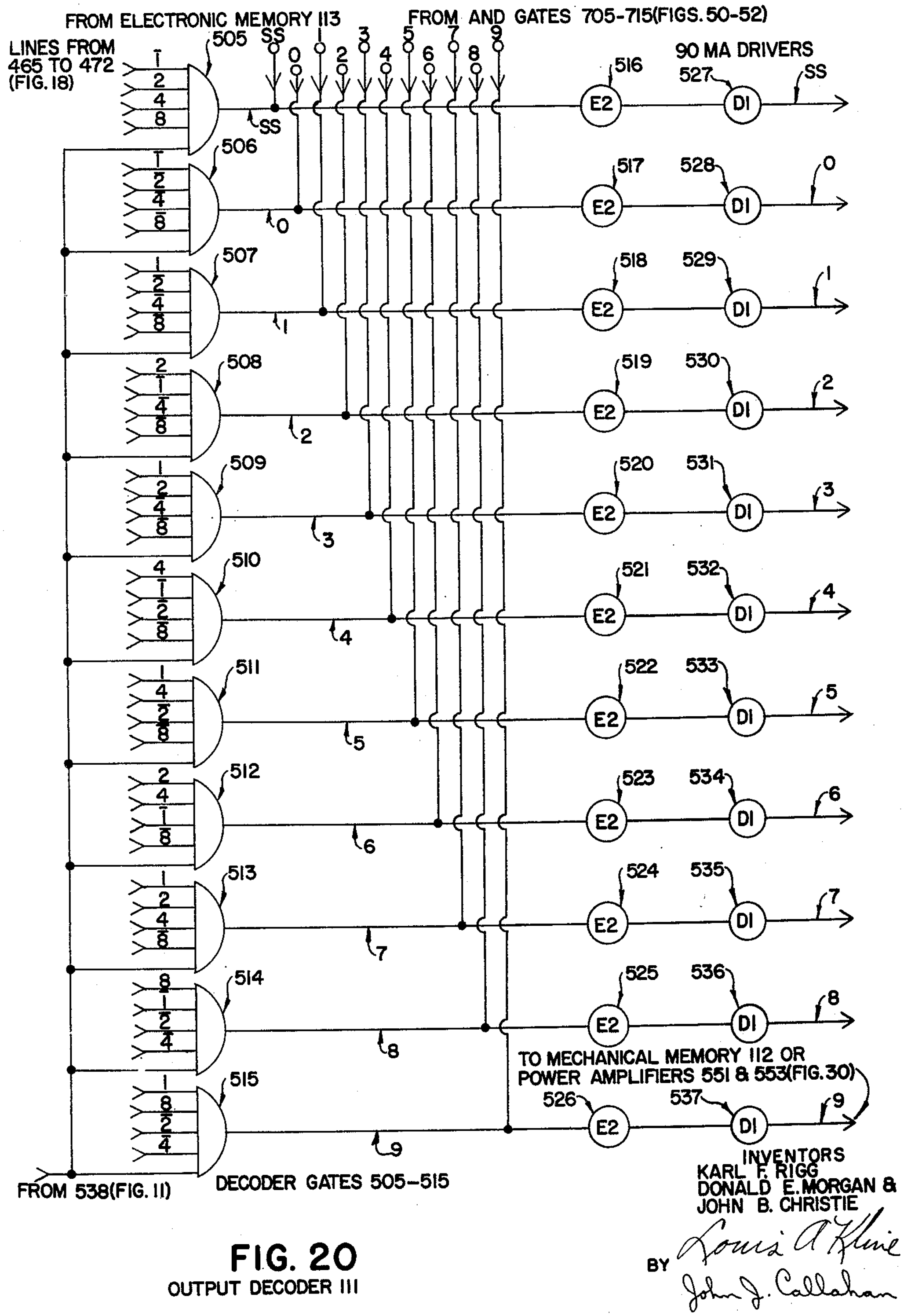
Figure 21:
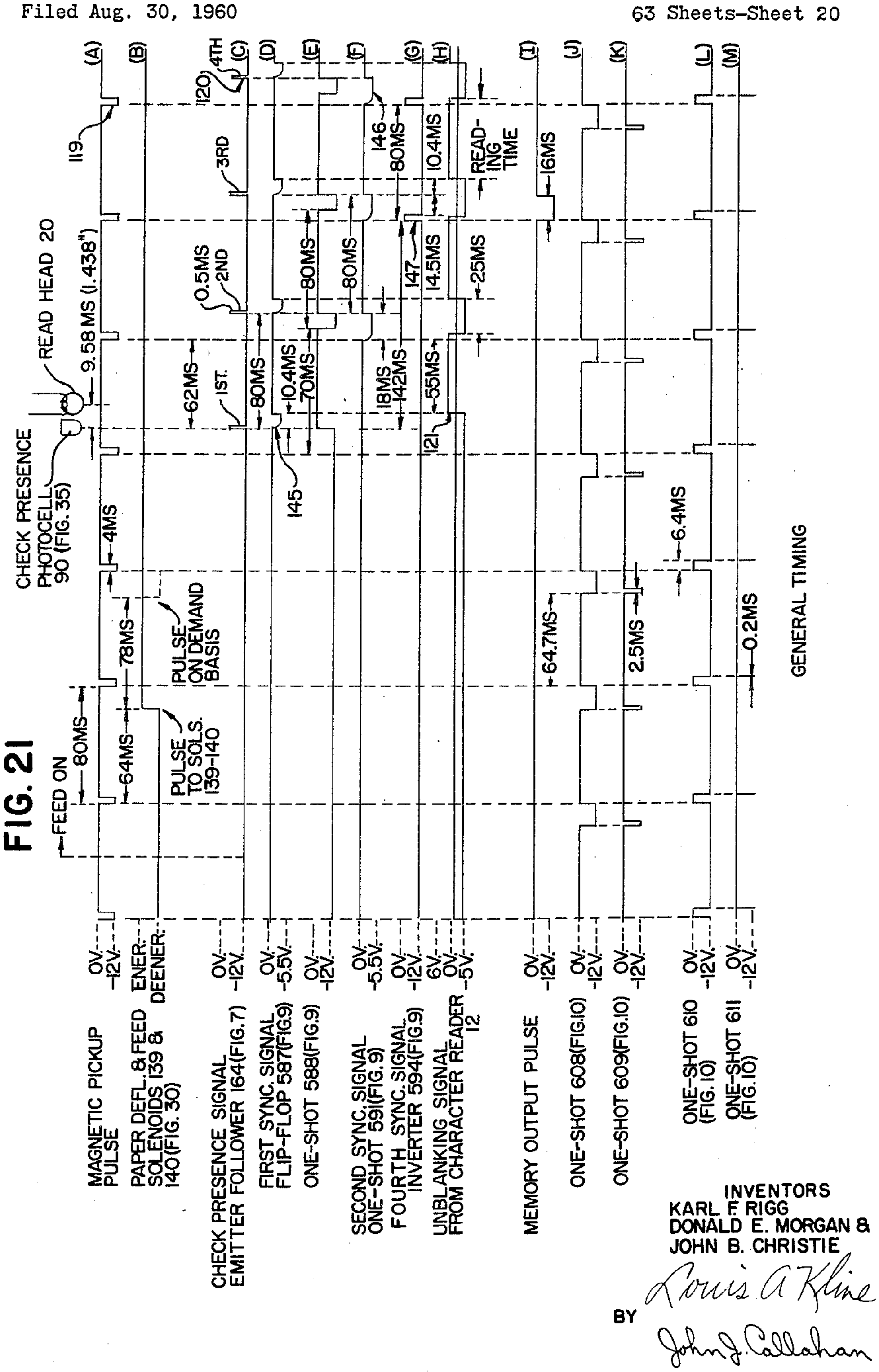
Figure 22:
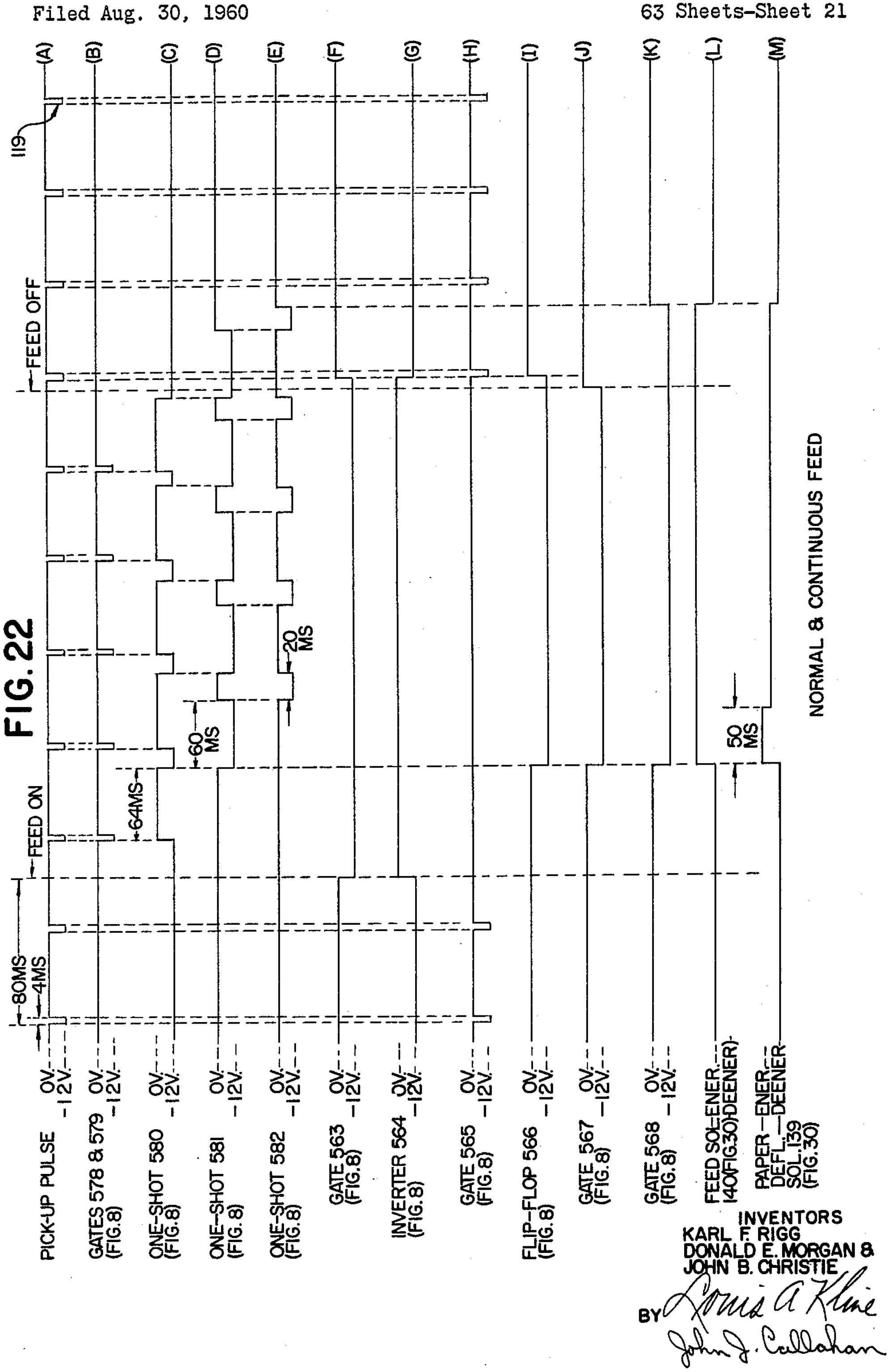
Figure 27:
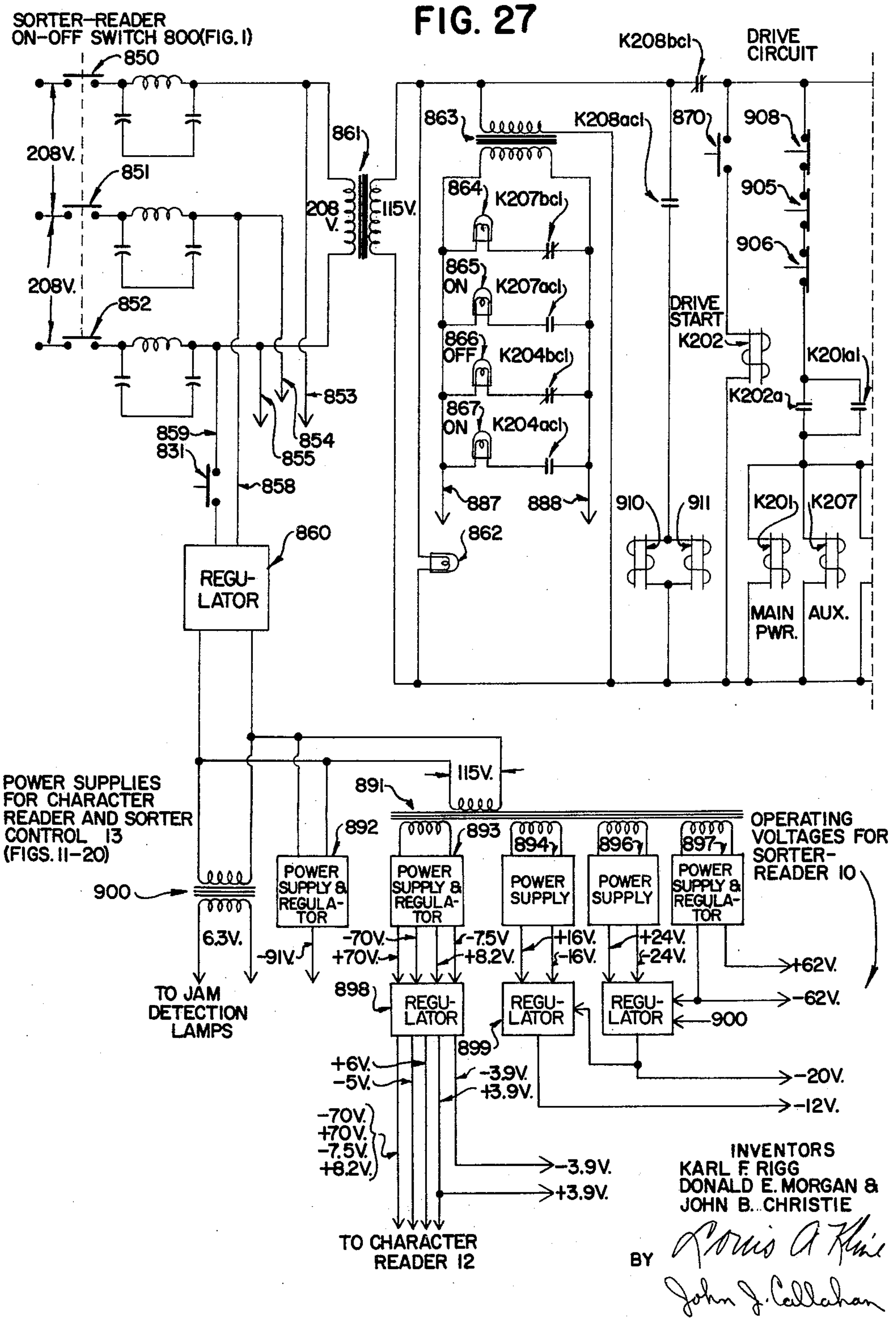
Figure 28:
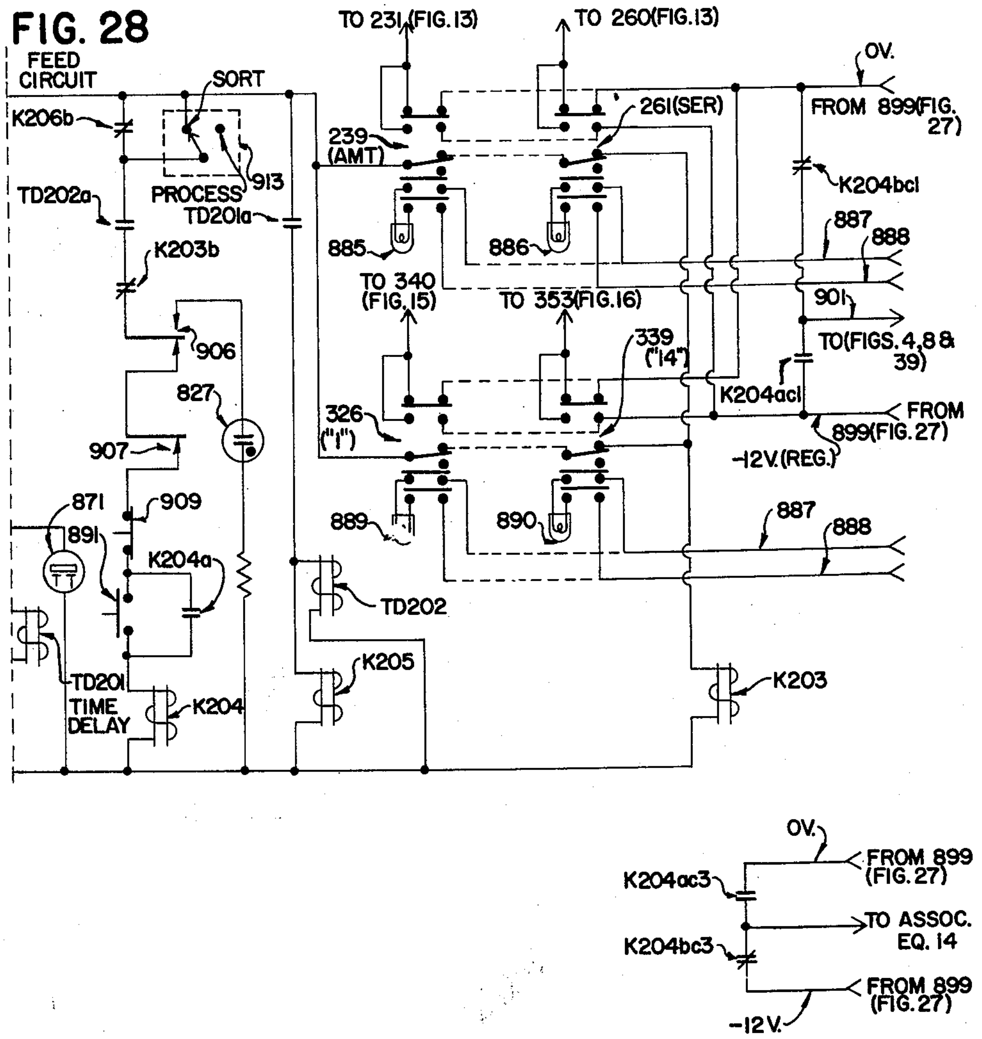
Figure 29:
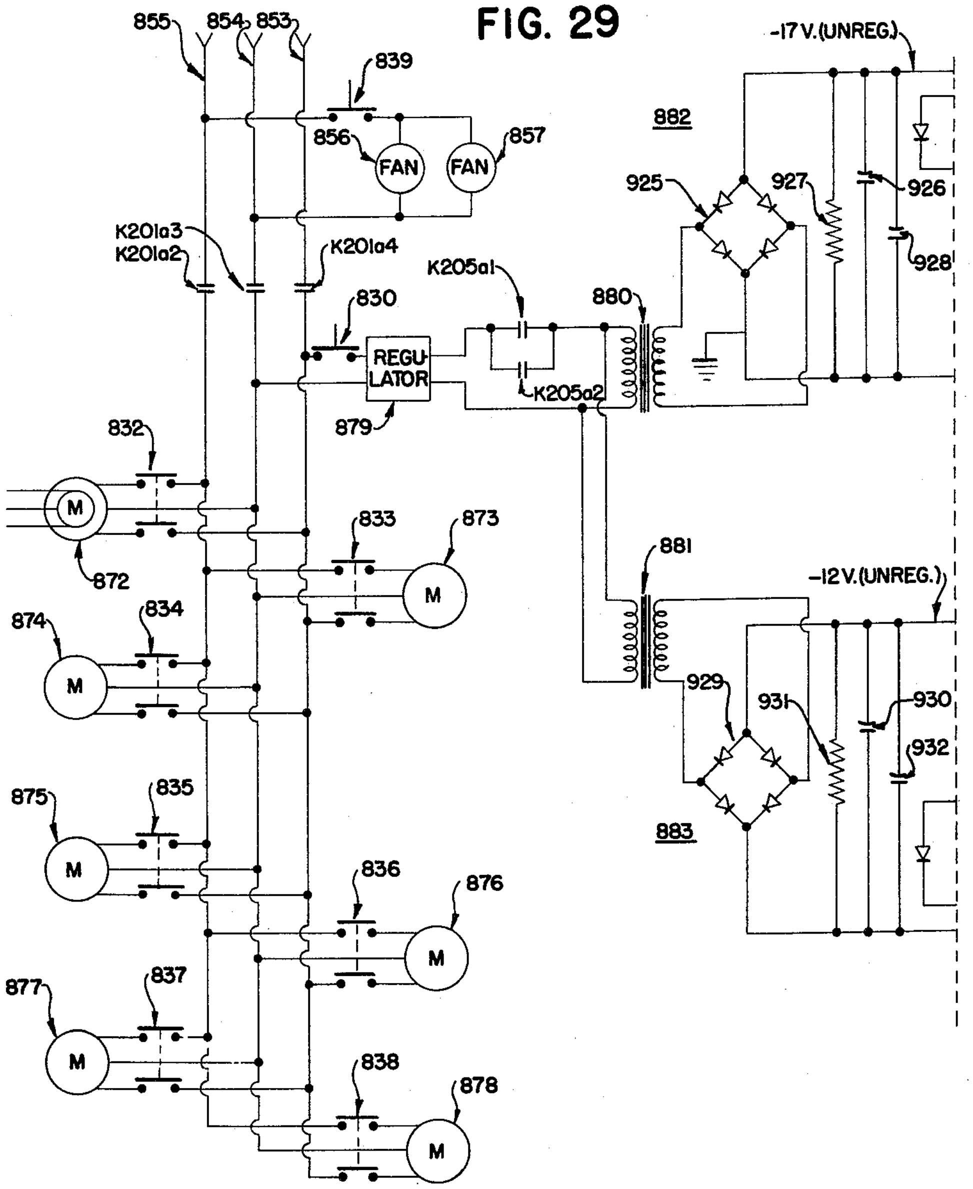
Figure 30:
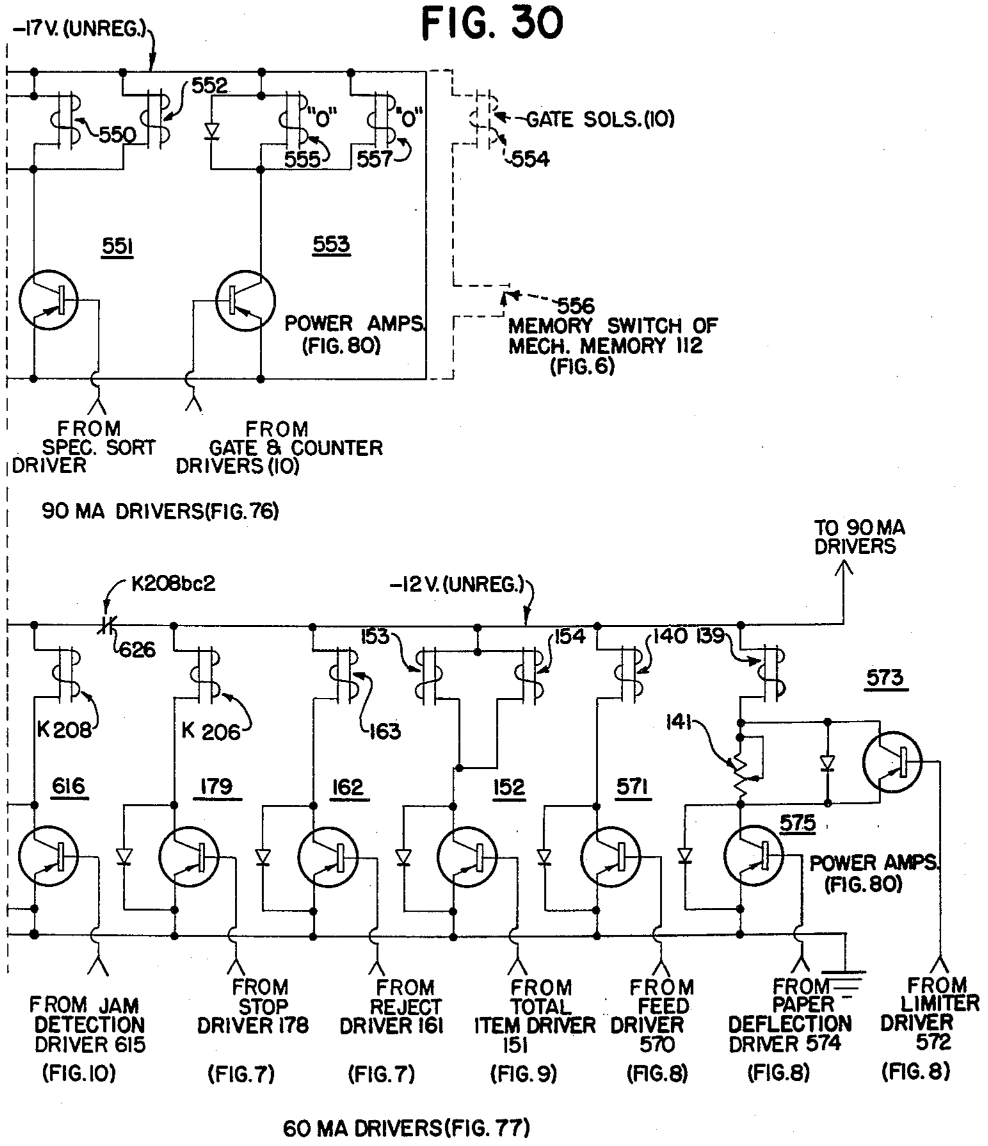
Figure 31:
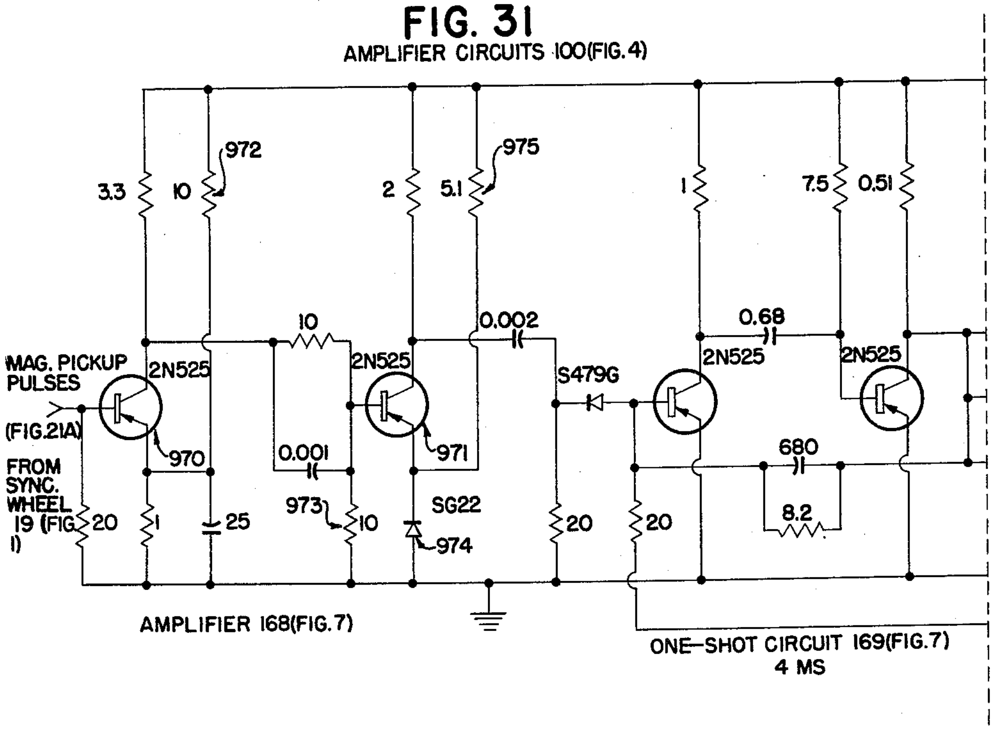
Figure 33:
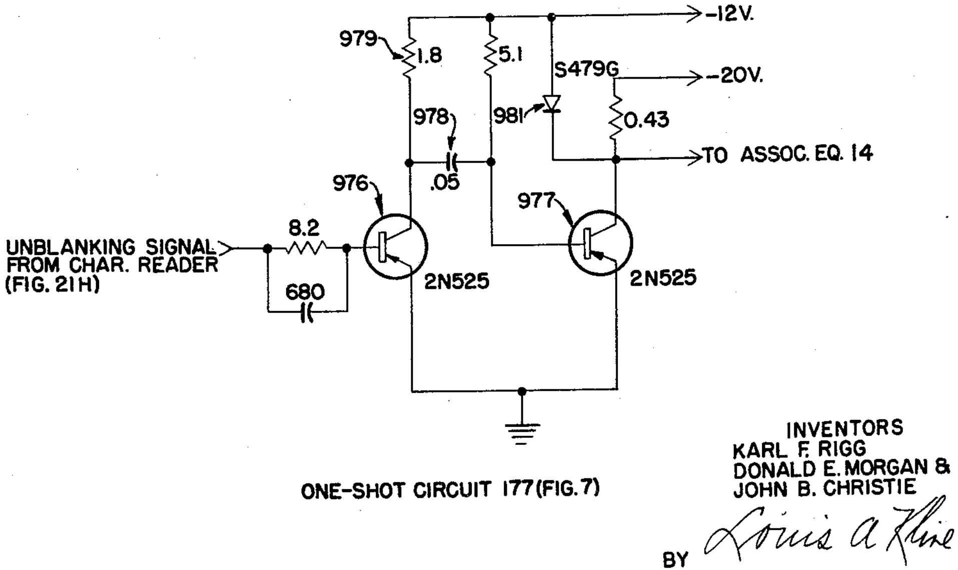
Figure 32:
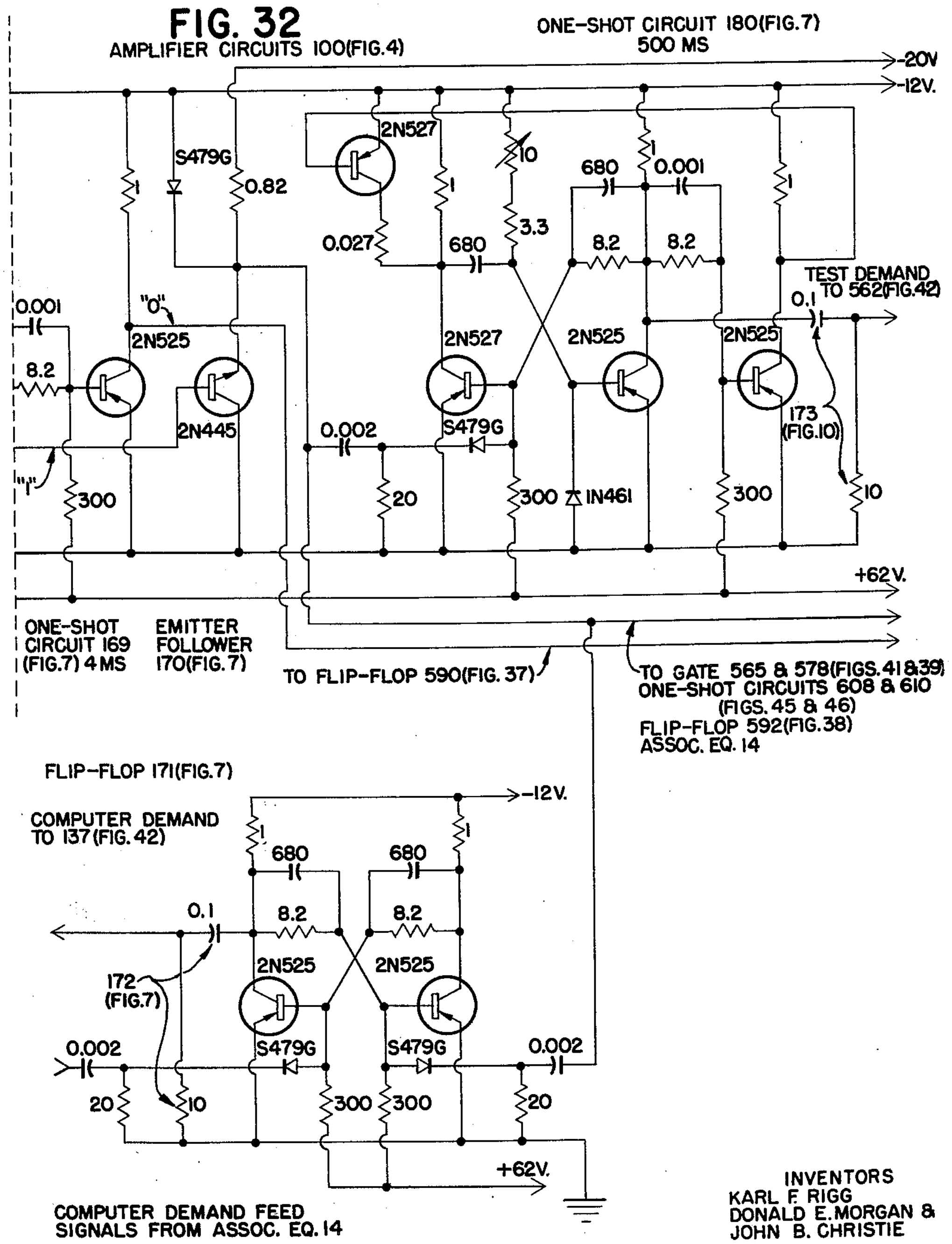
Figures 34, 35:
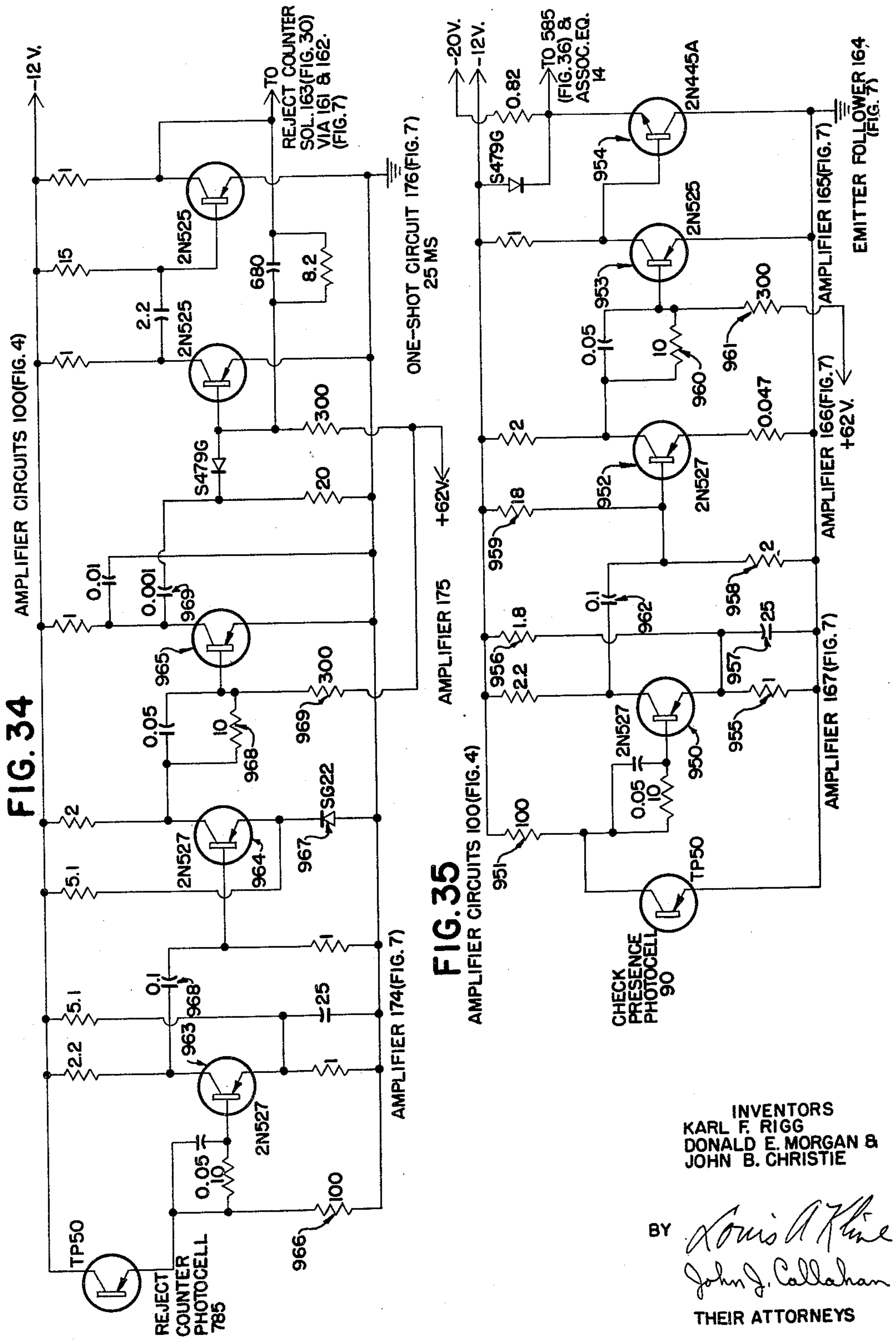
Figure 36:
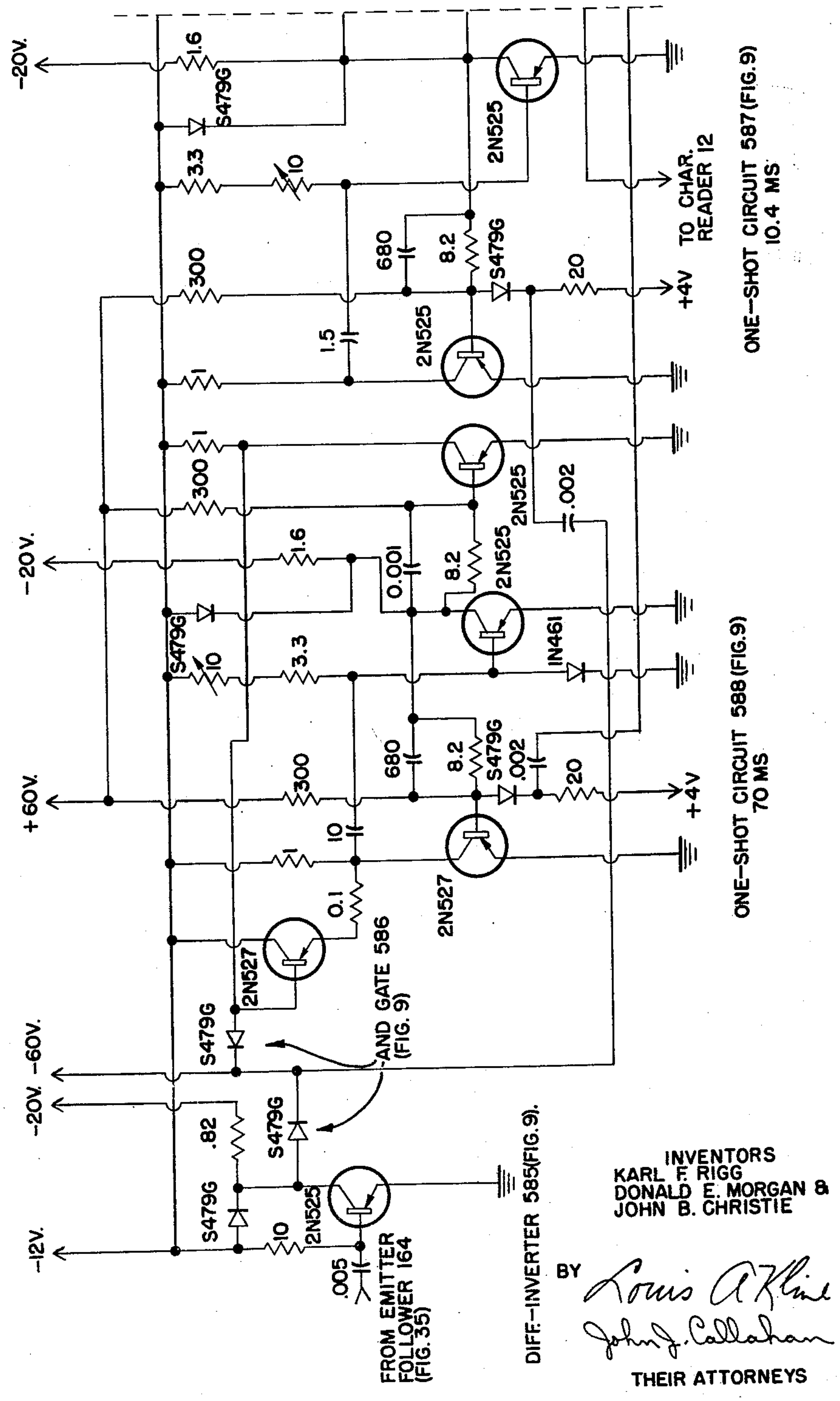
Figure 37:
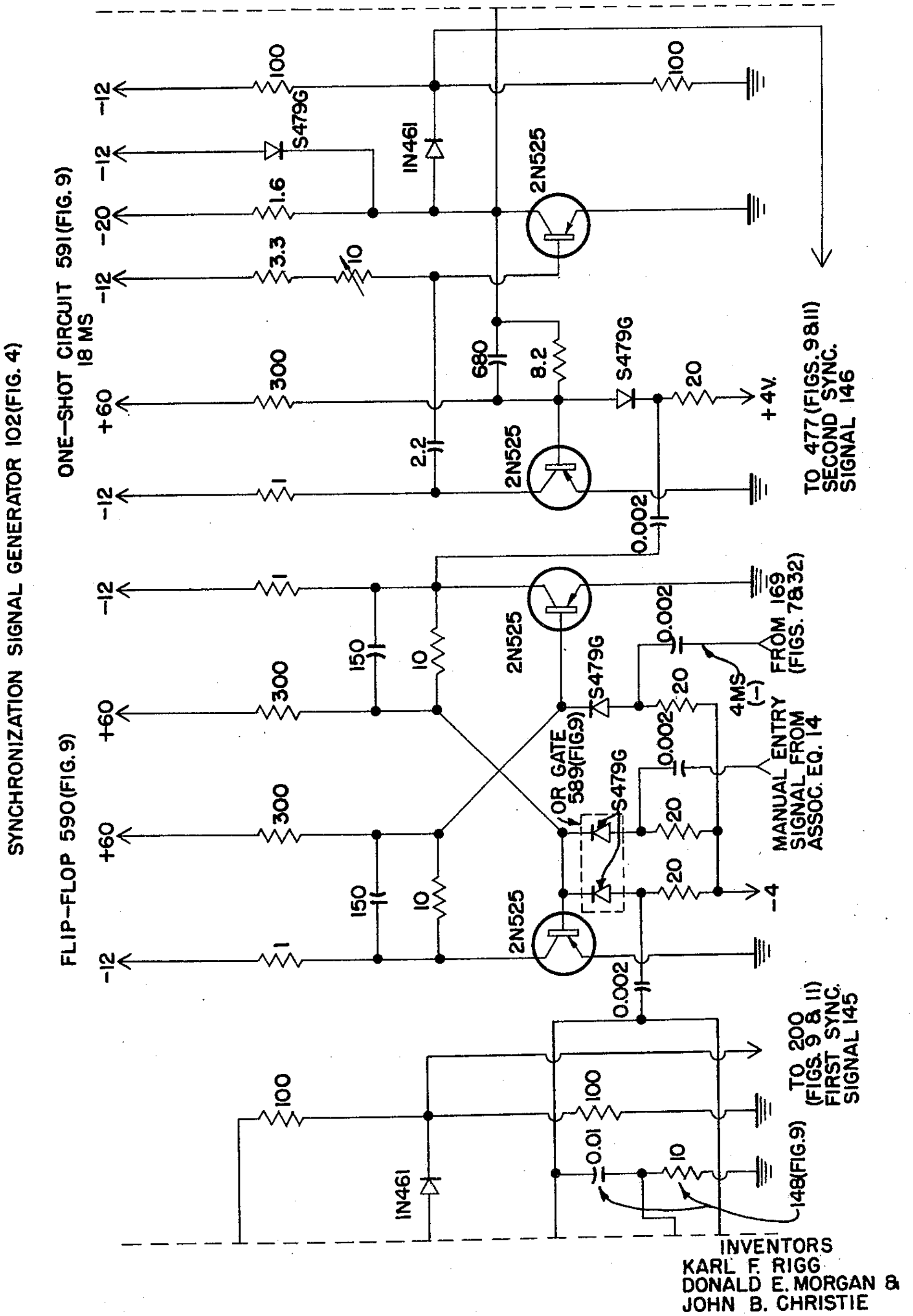
Figure 38:
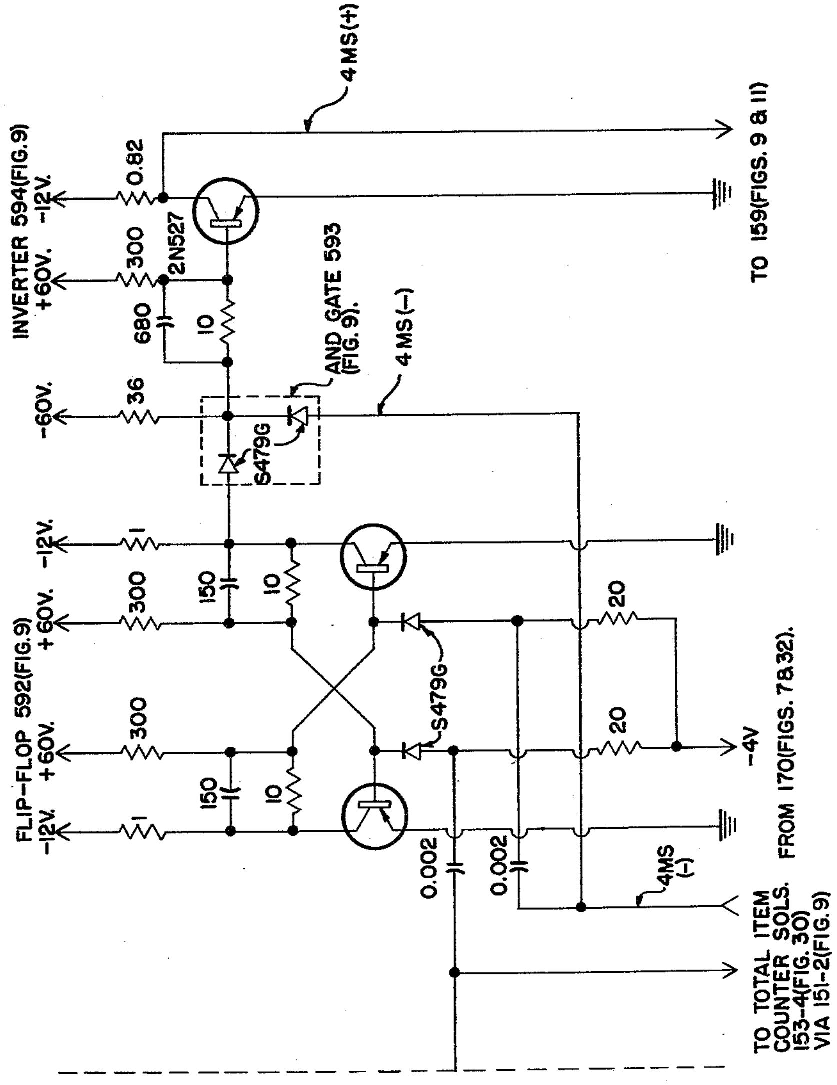
Figure 39:
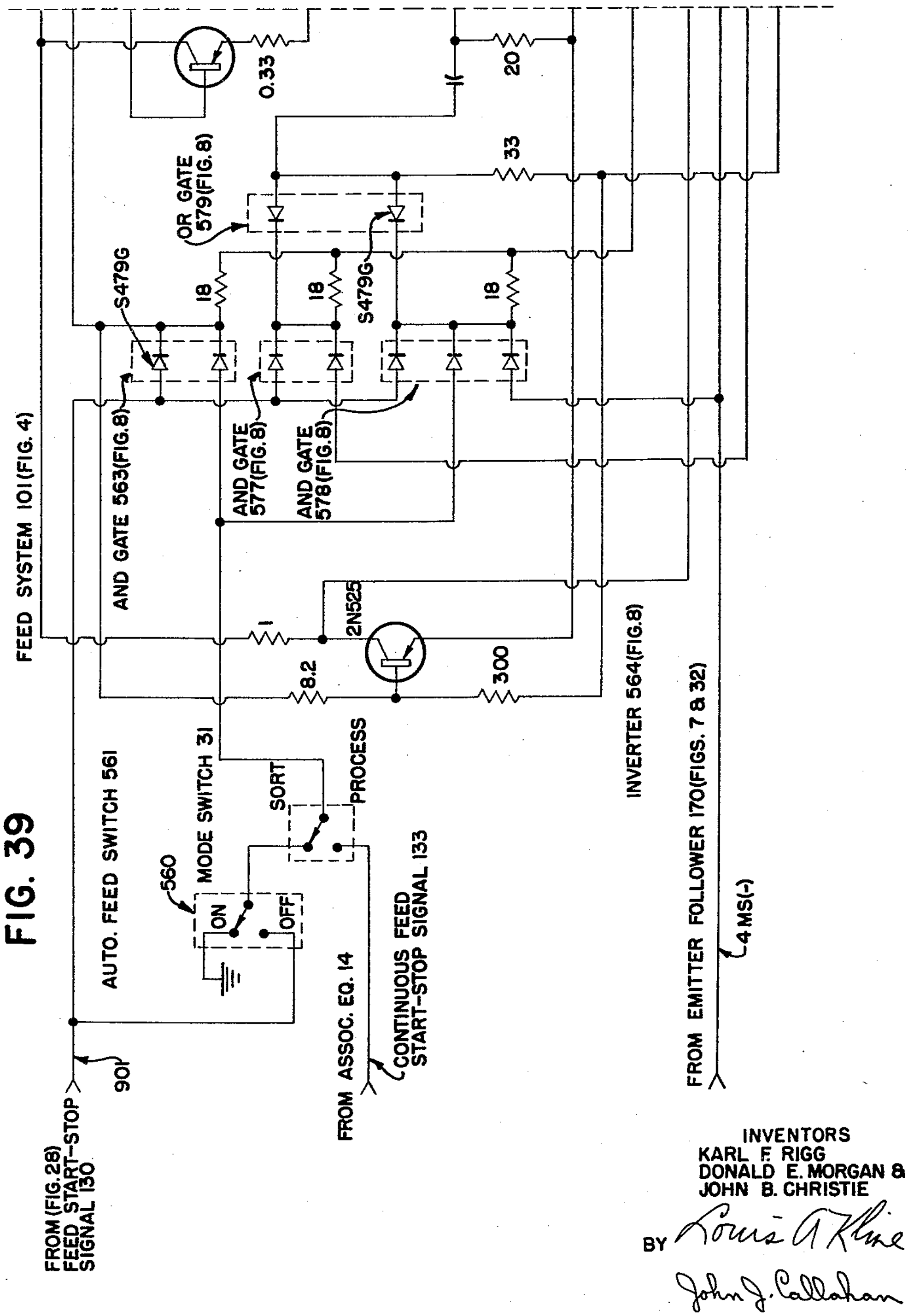
Figure 40:
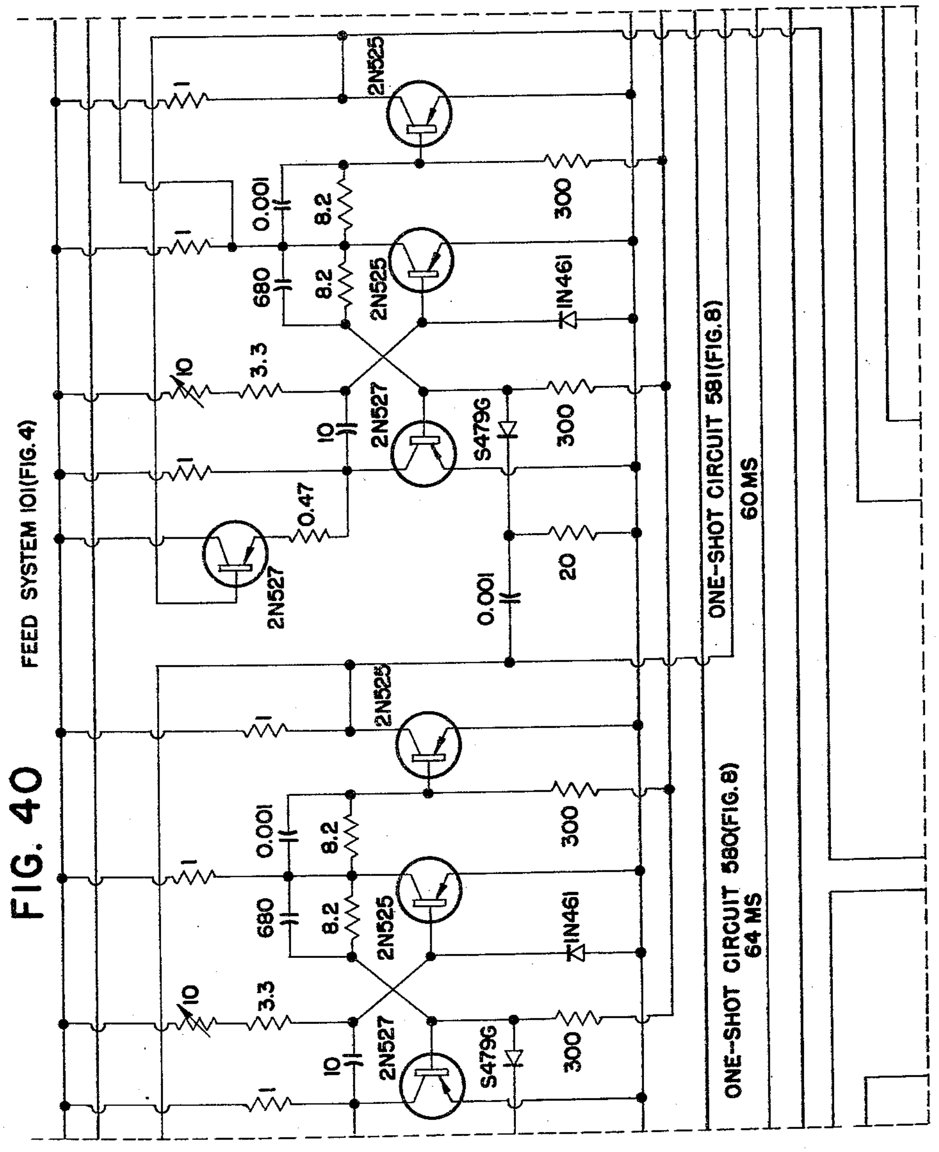
Figure 41:
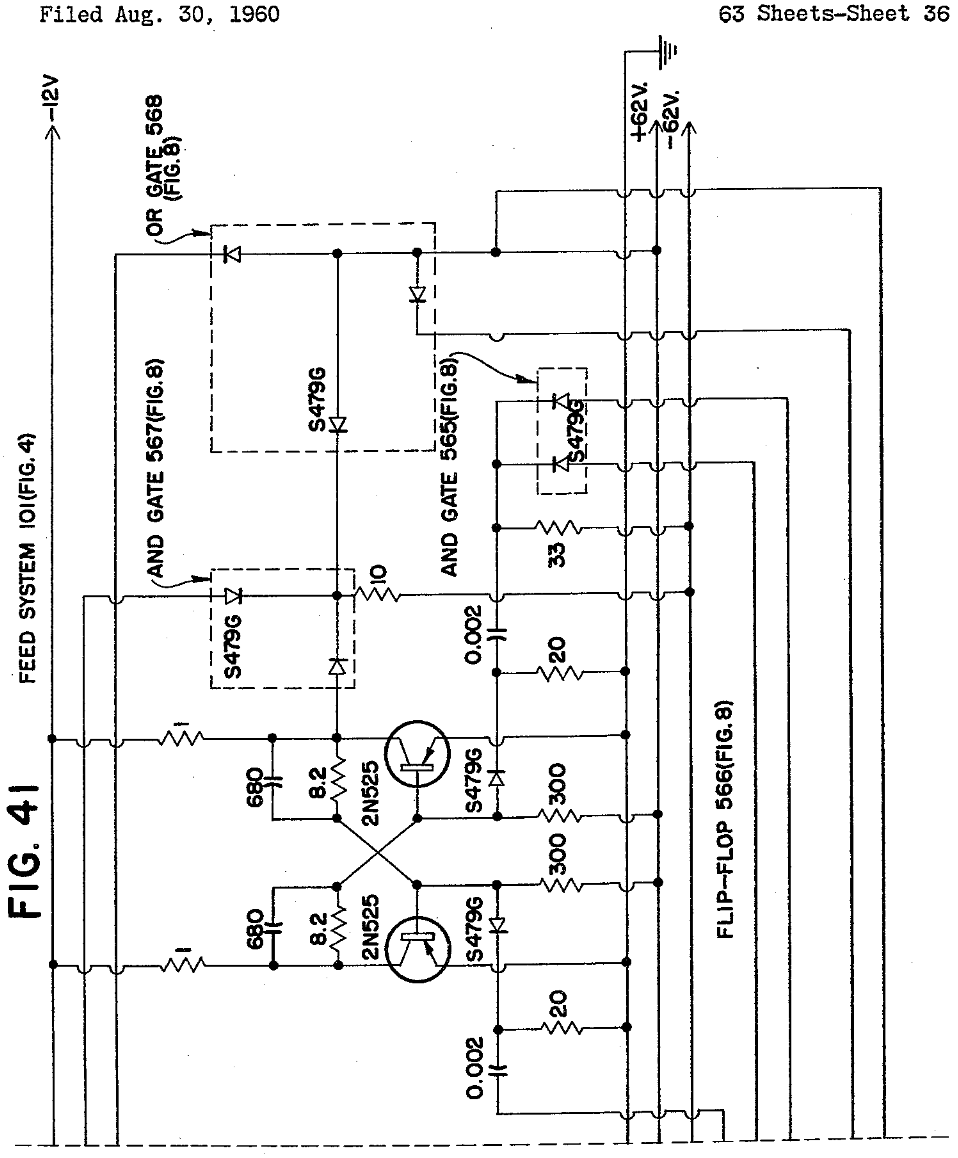
Figure 42:
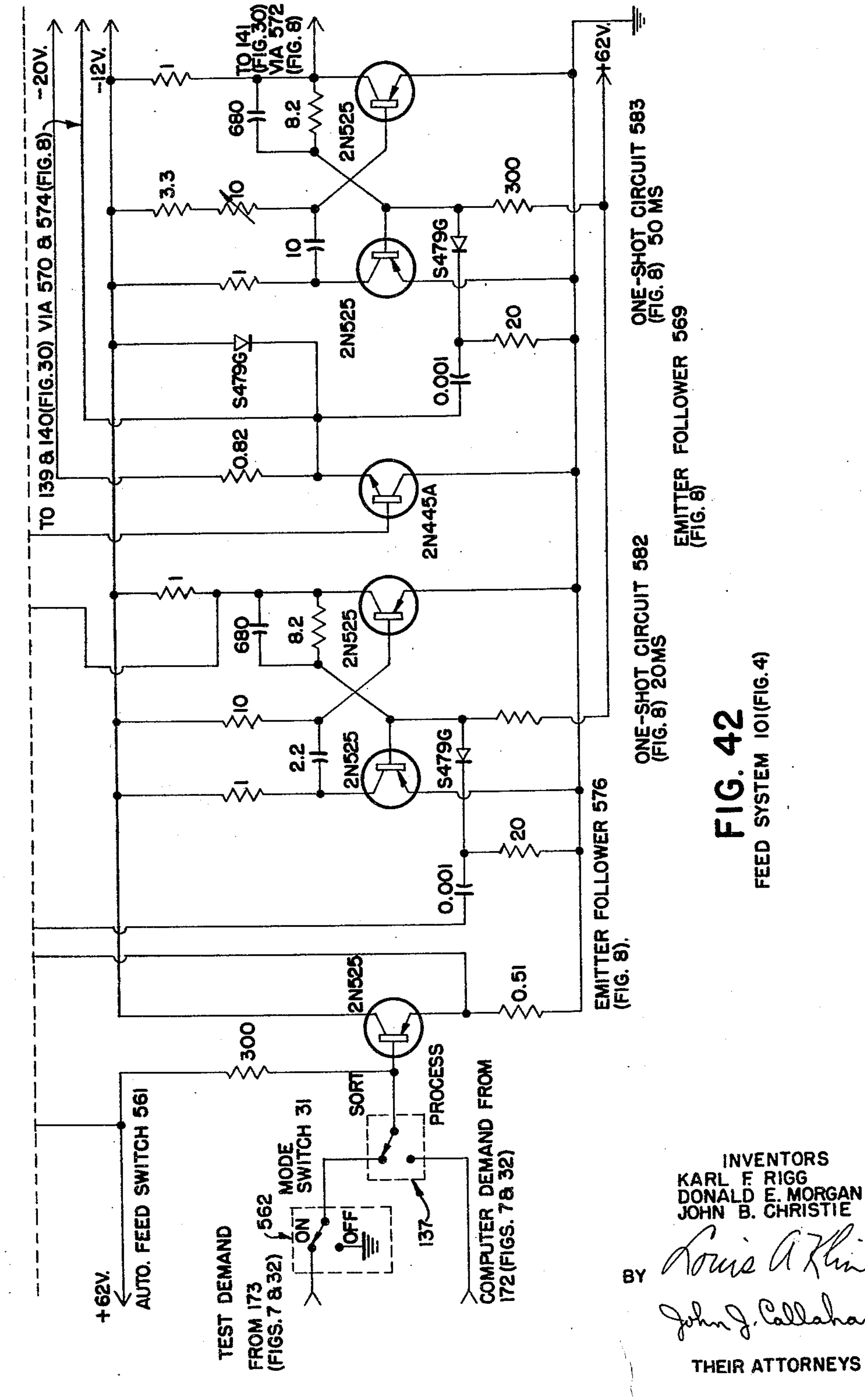
Figure 43:
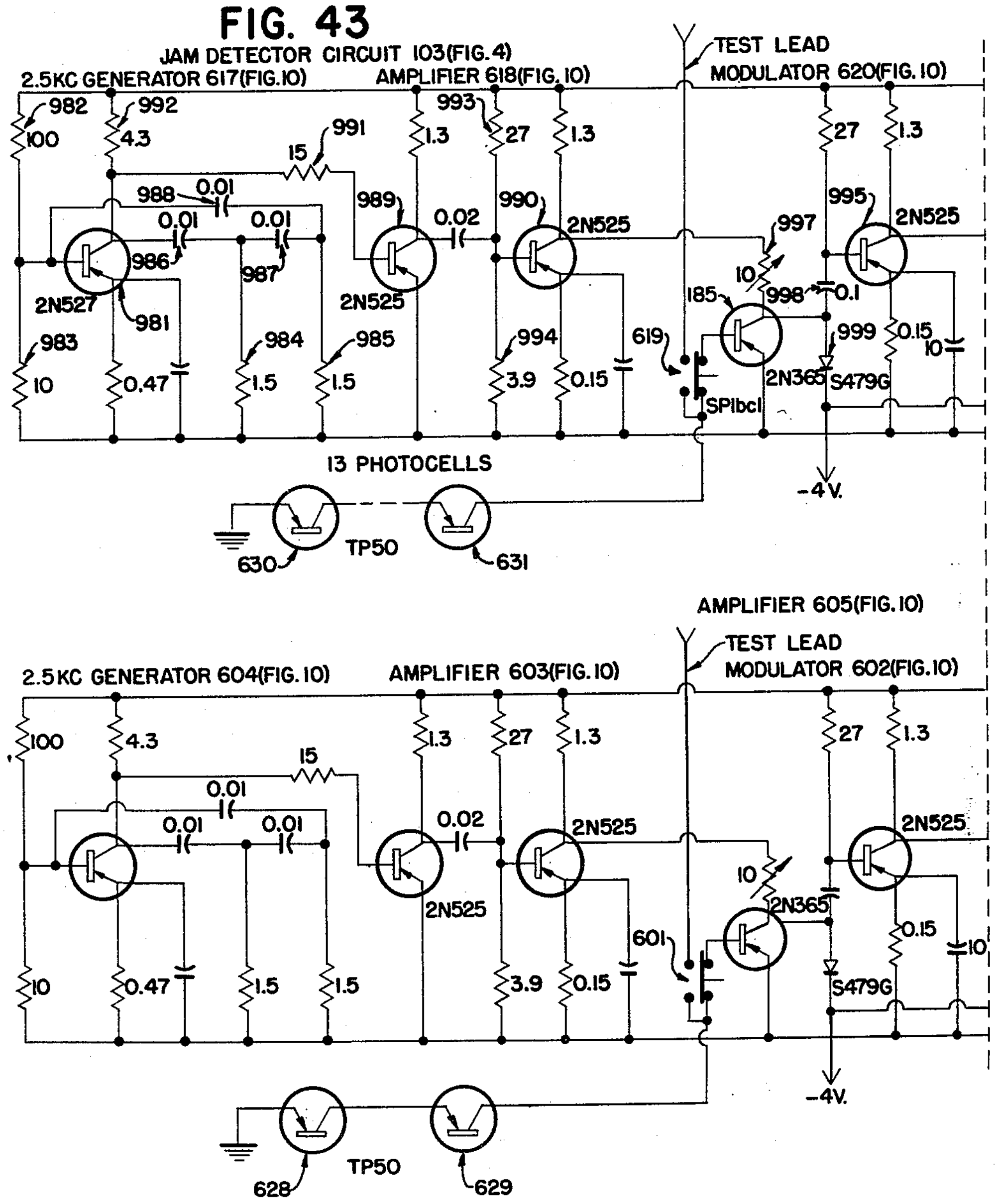
Figure 44:
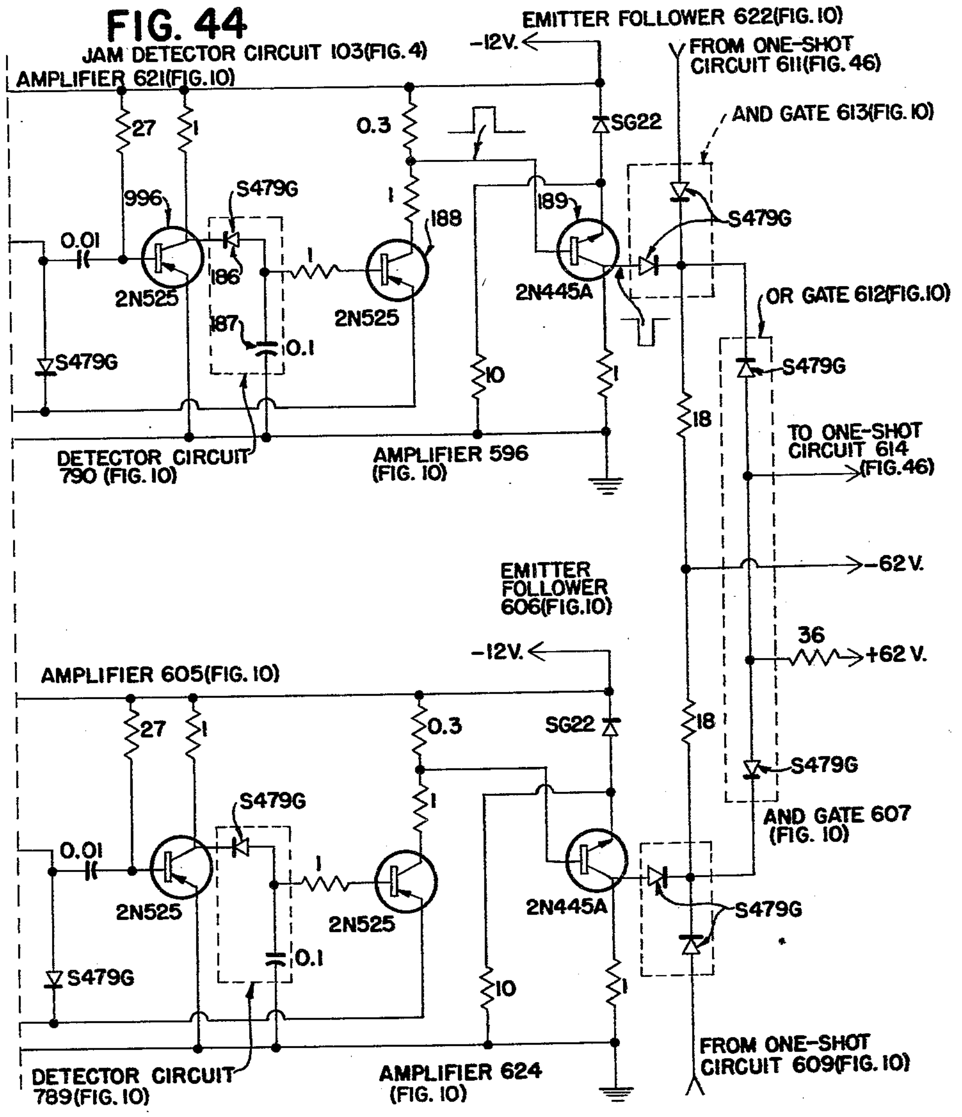
Figure 45:
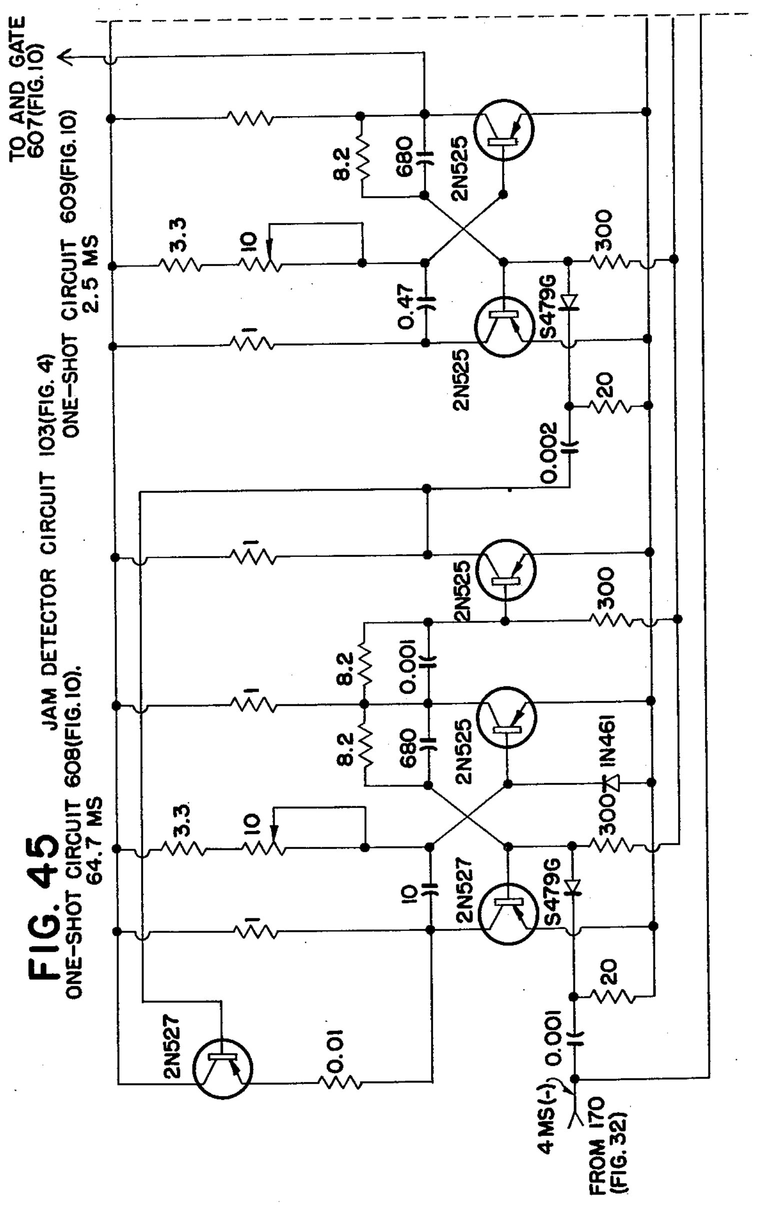
Figure 46:
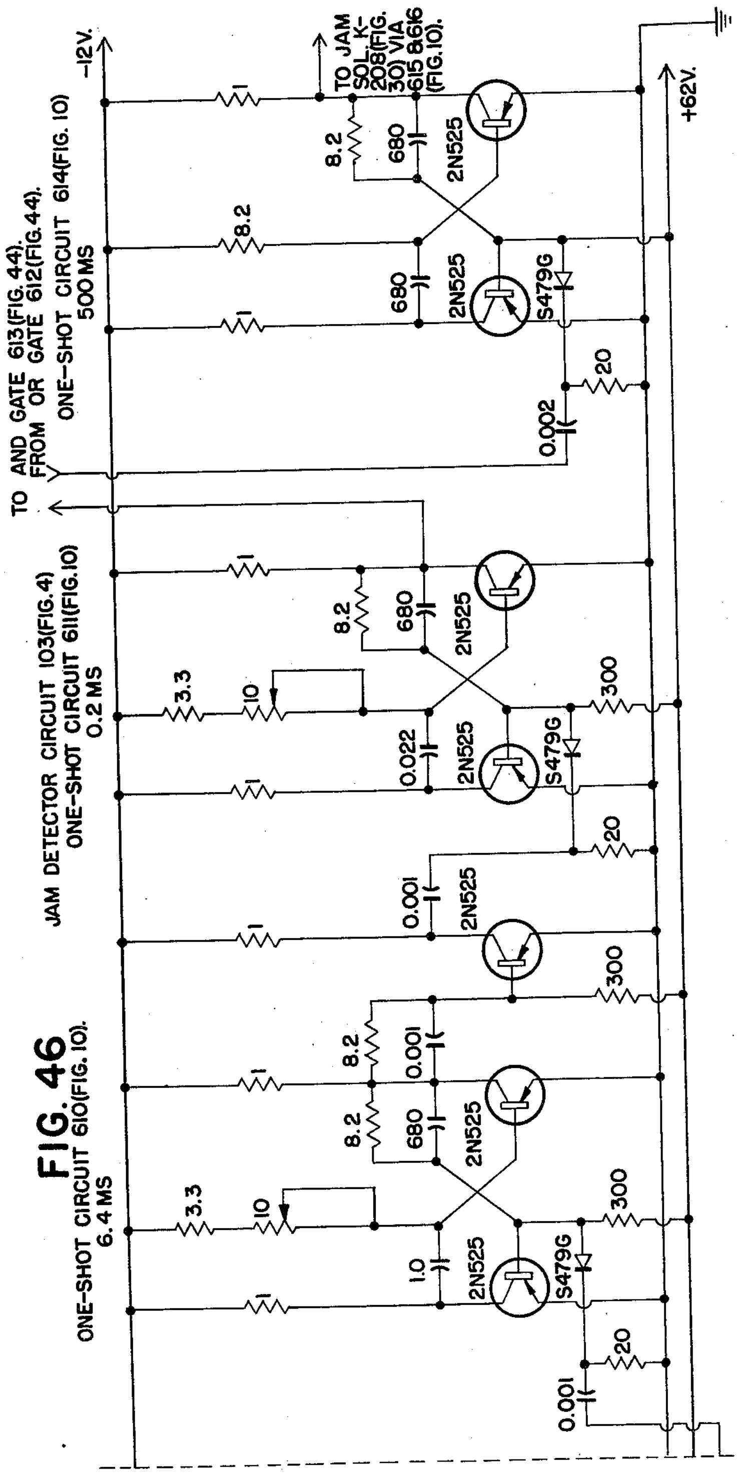
Figure 47:
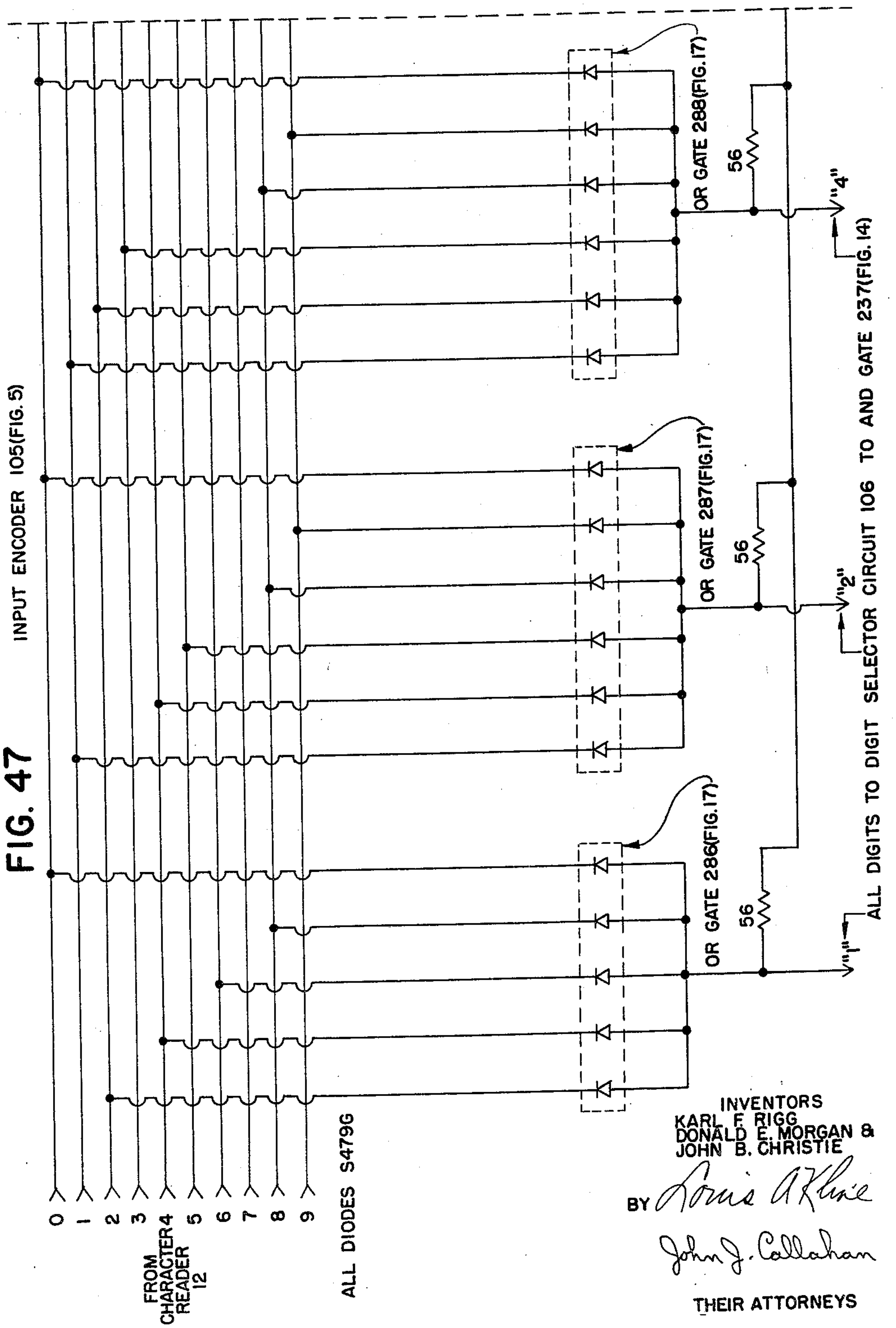
Figure 48:
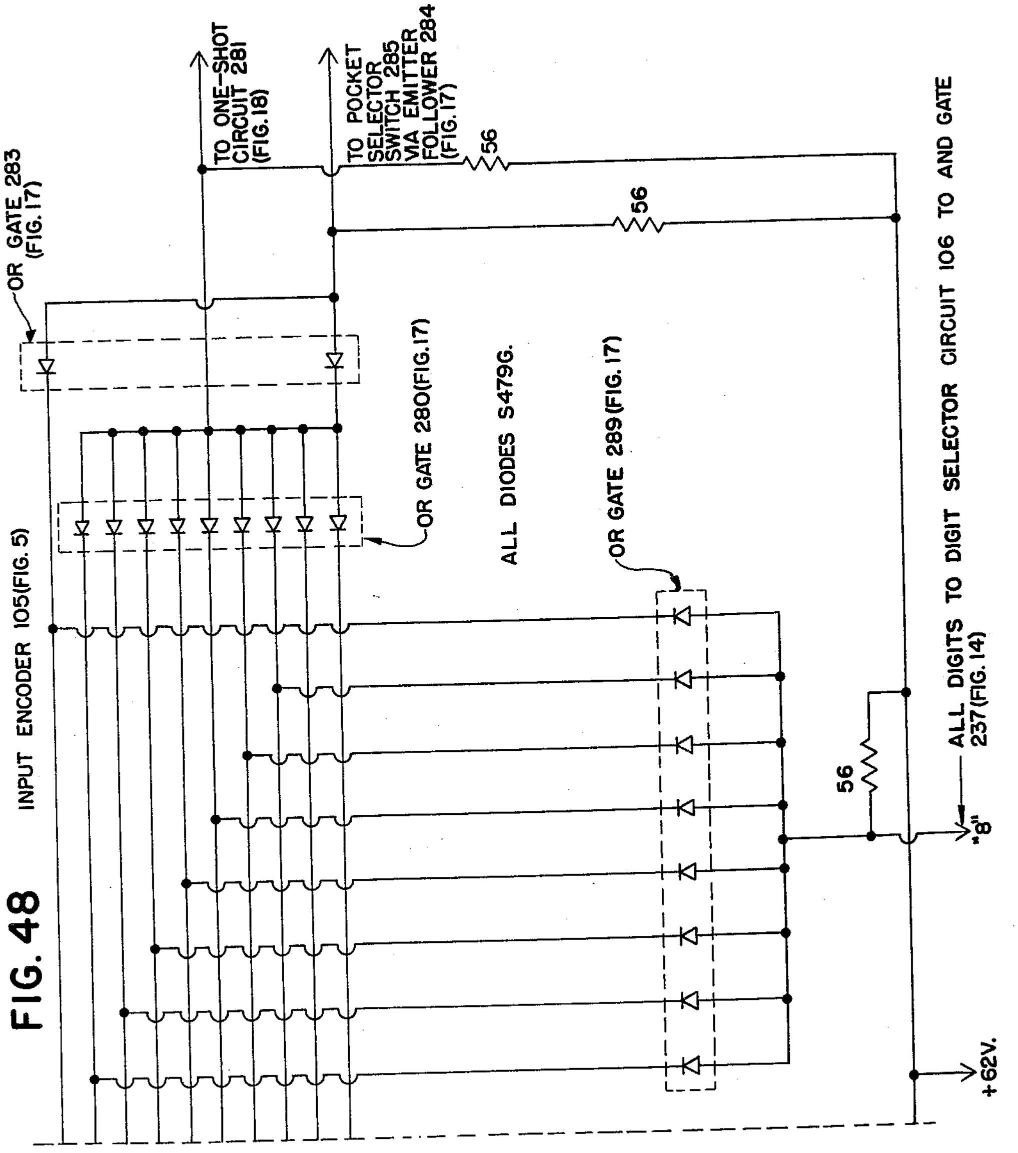
Figure 49:
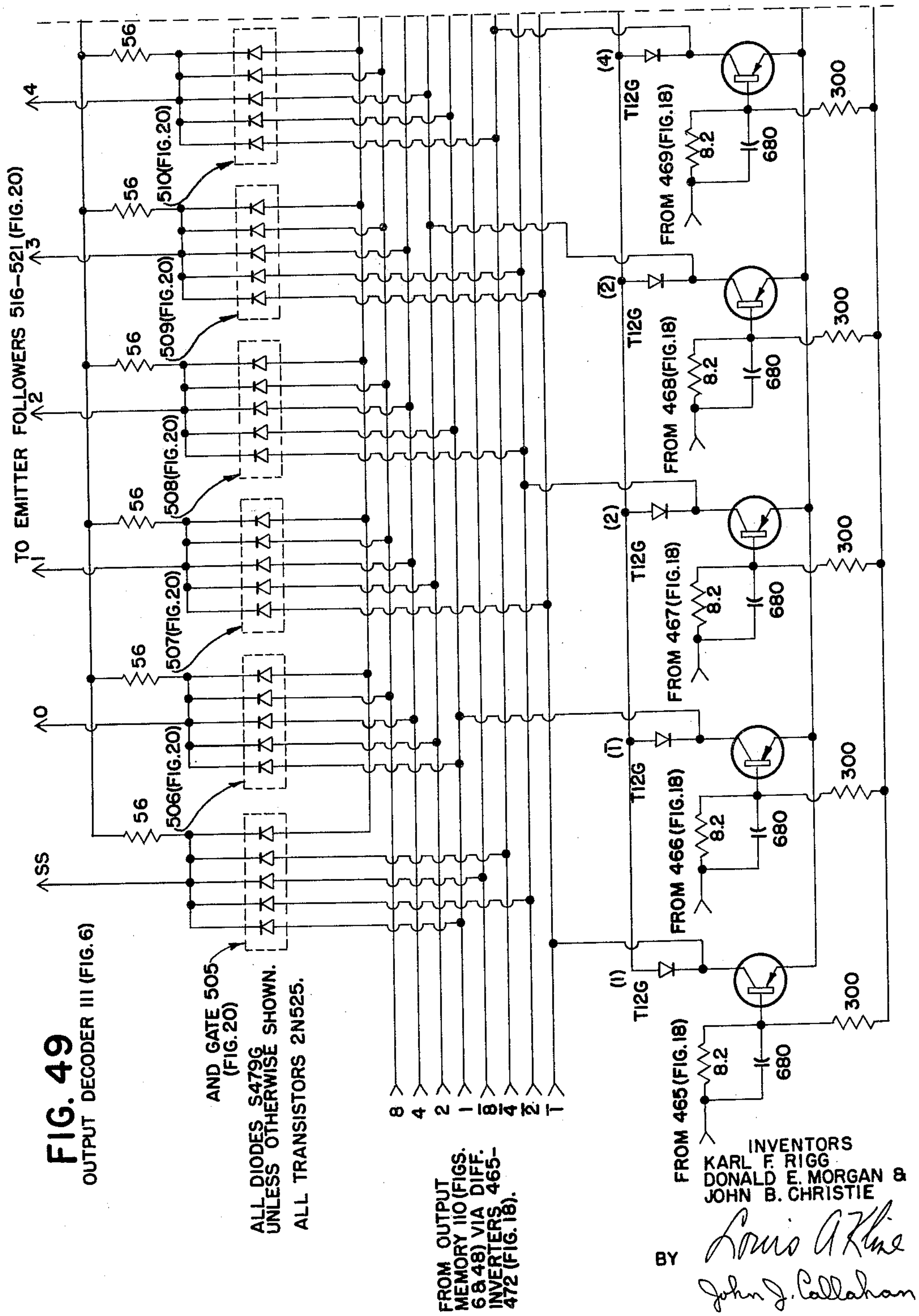
Figure 50:
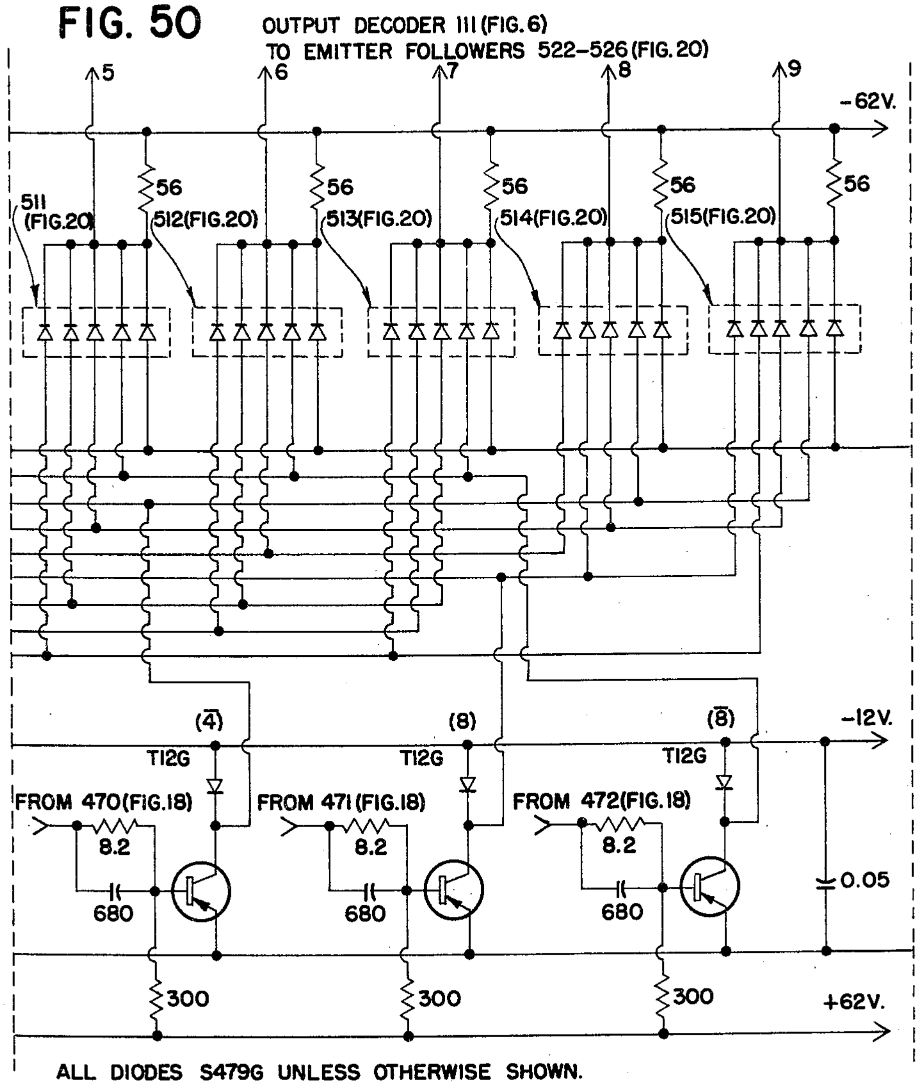
Figure 51:
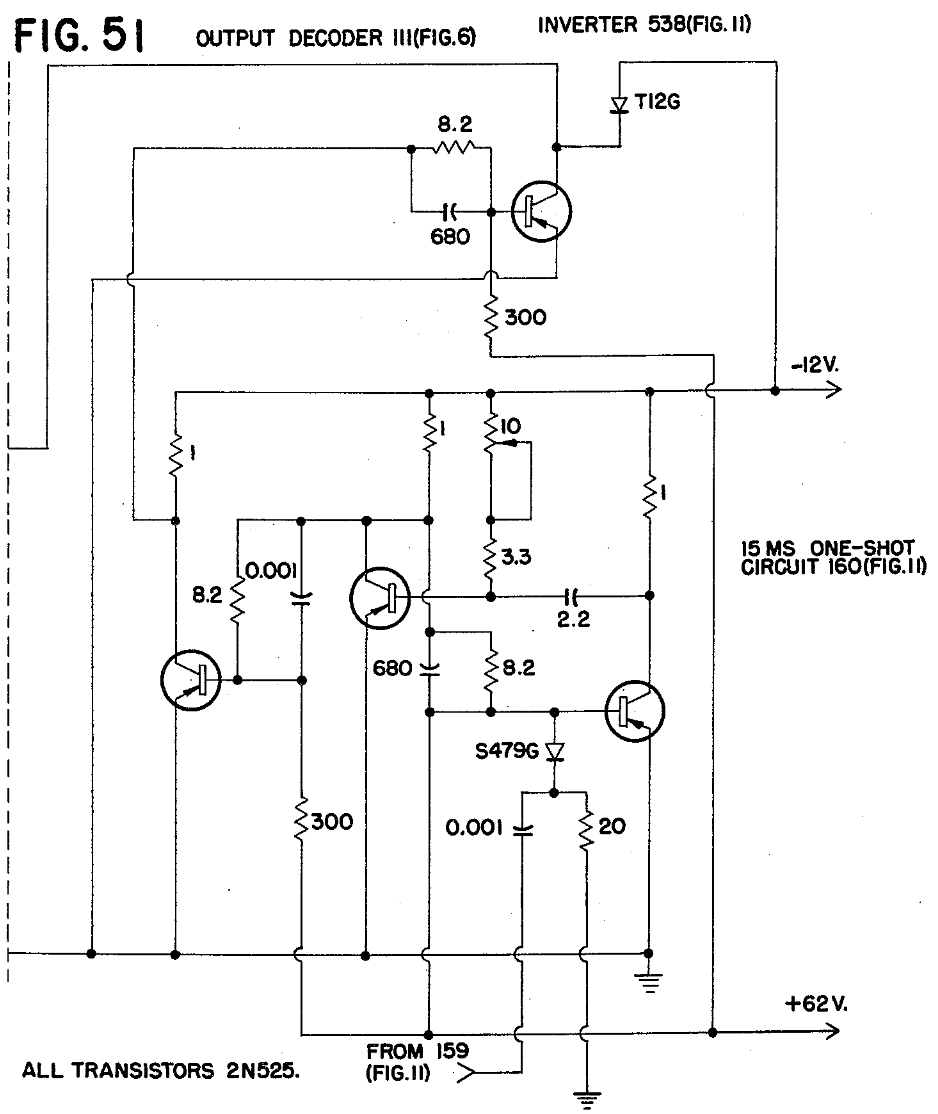
Figure 52:
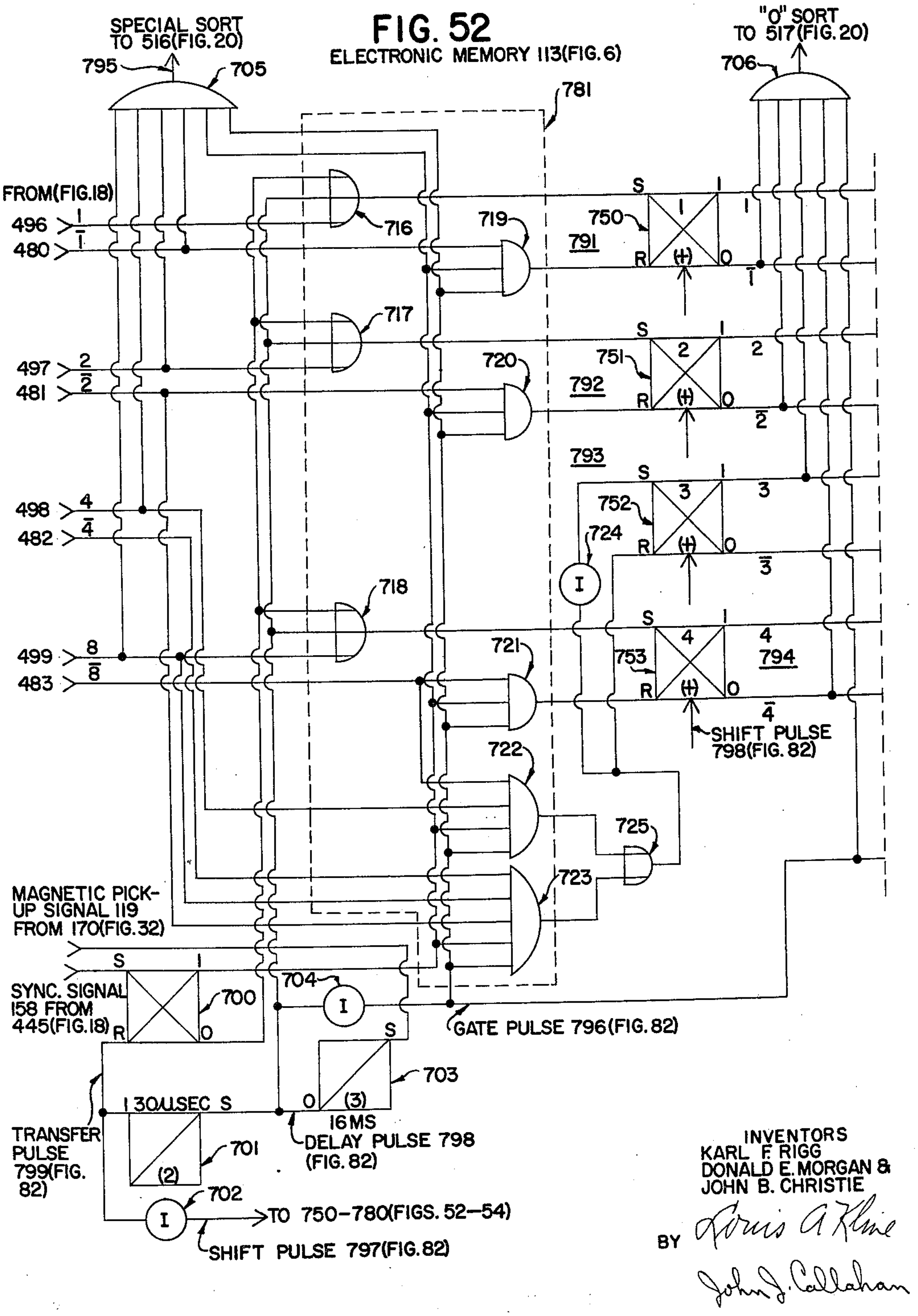
Figure 53:
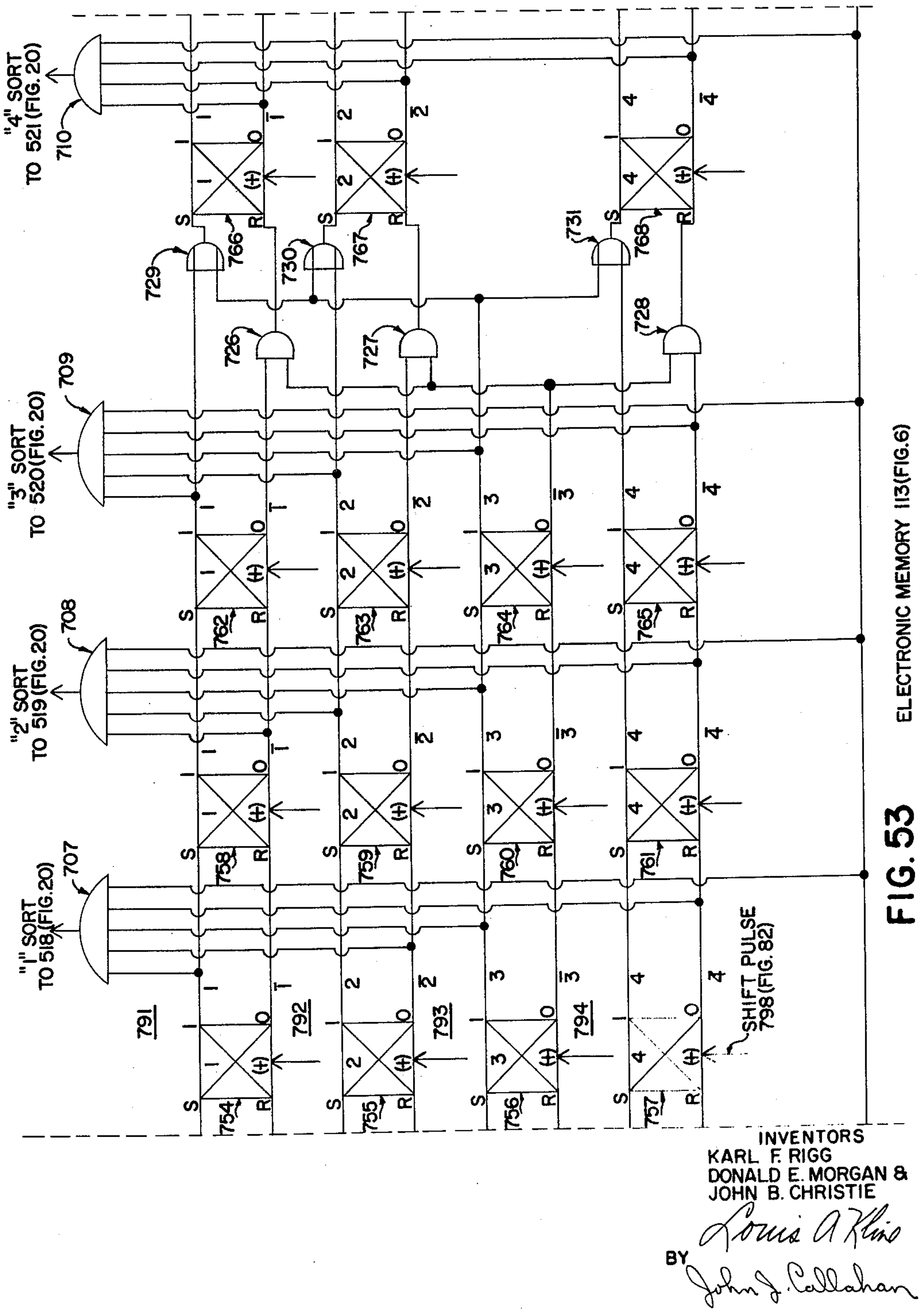
Figure 54:
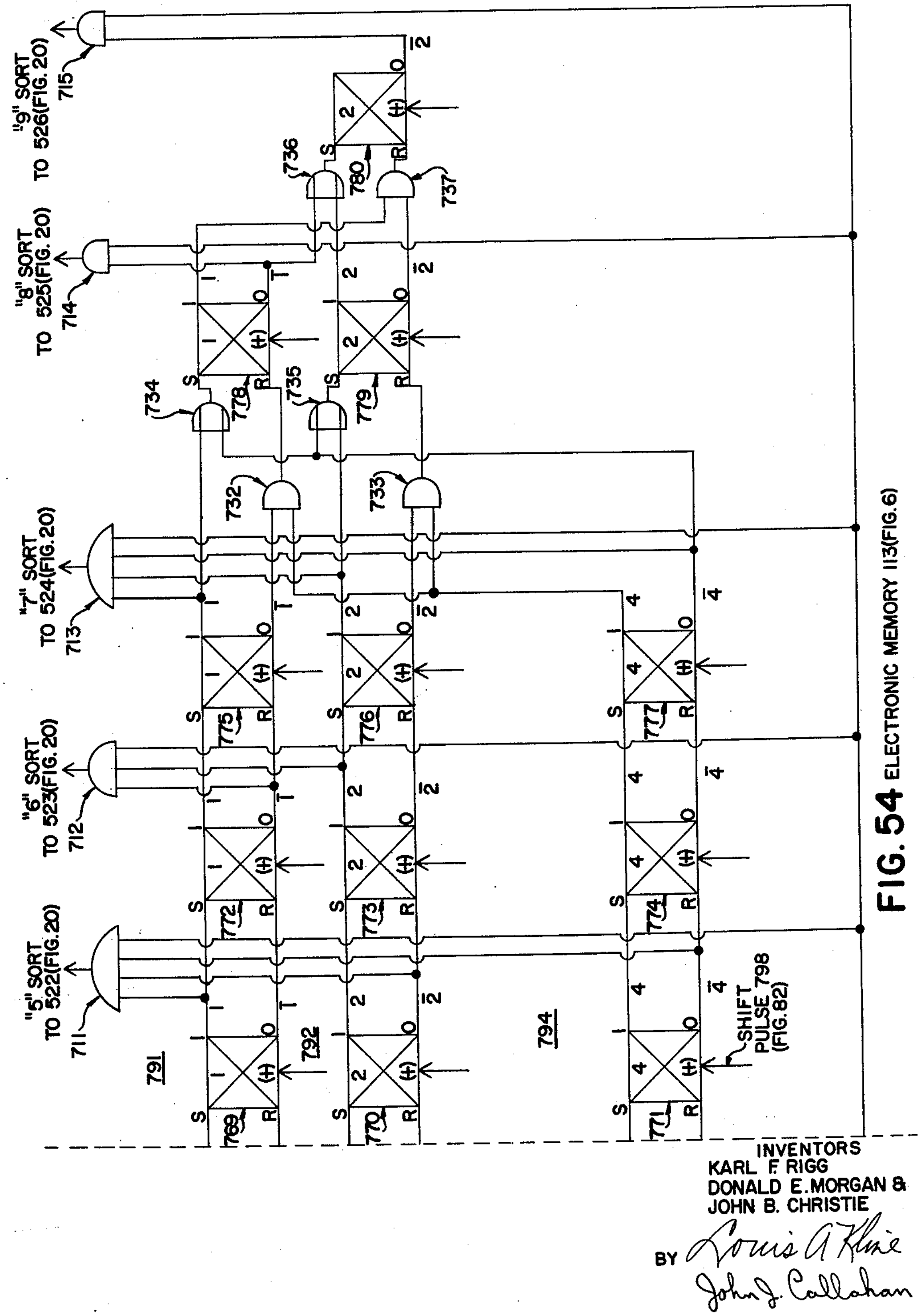
Figure 55:
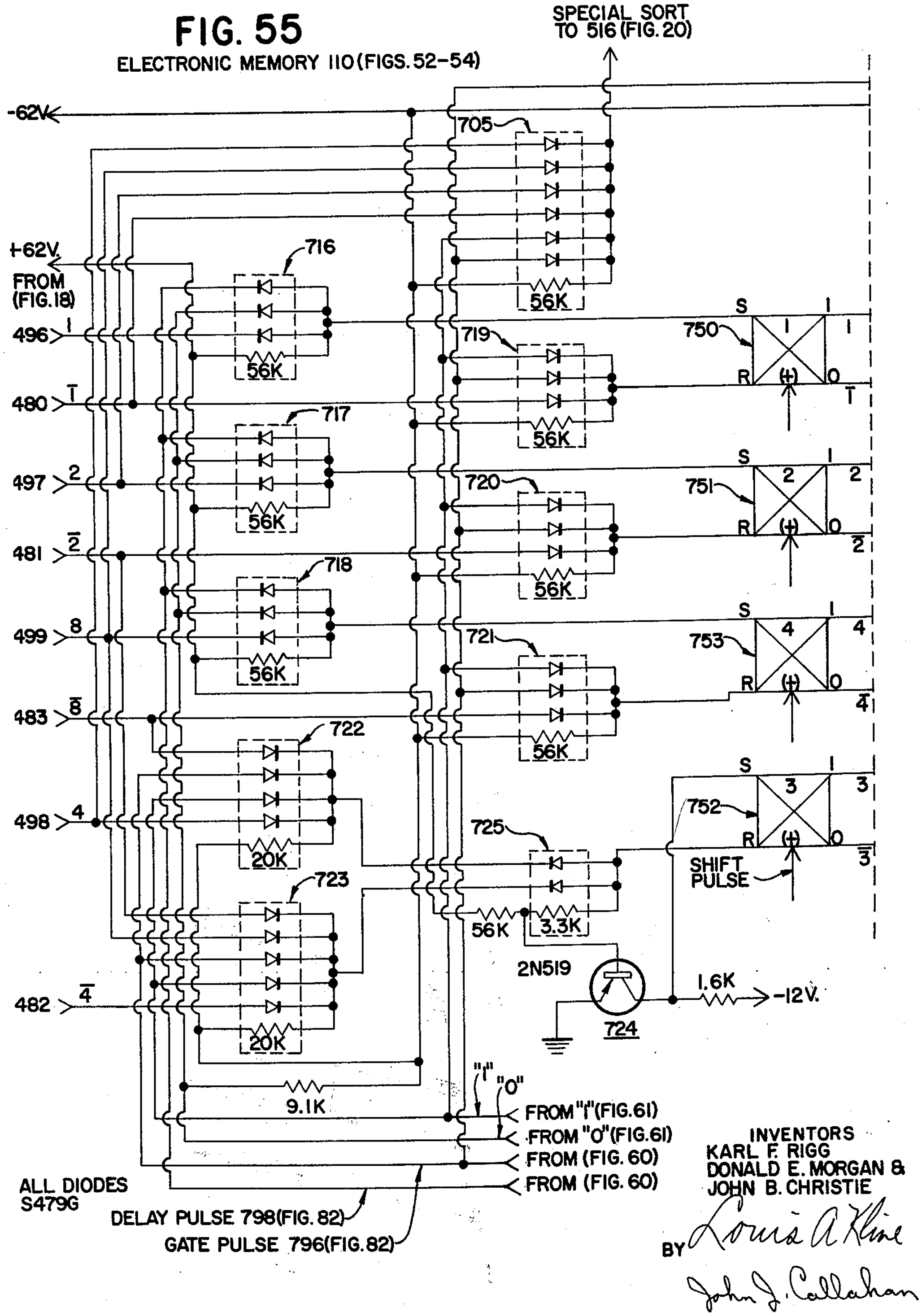
Figure 60:
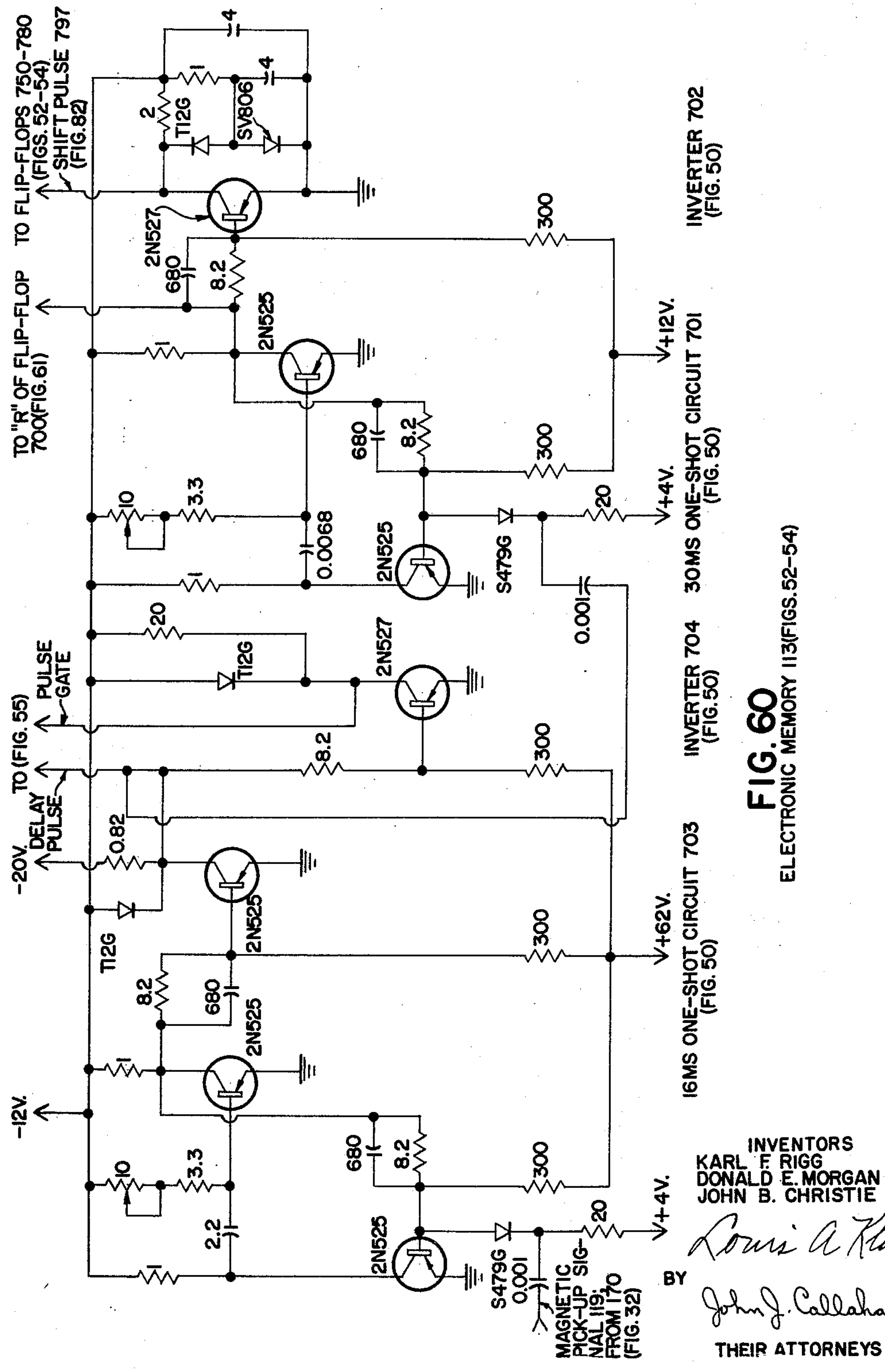
Figure 61:
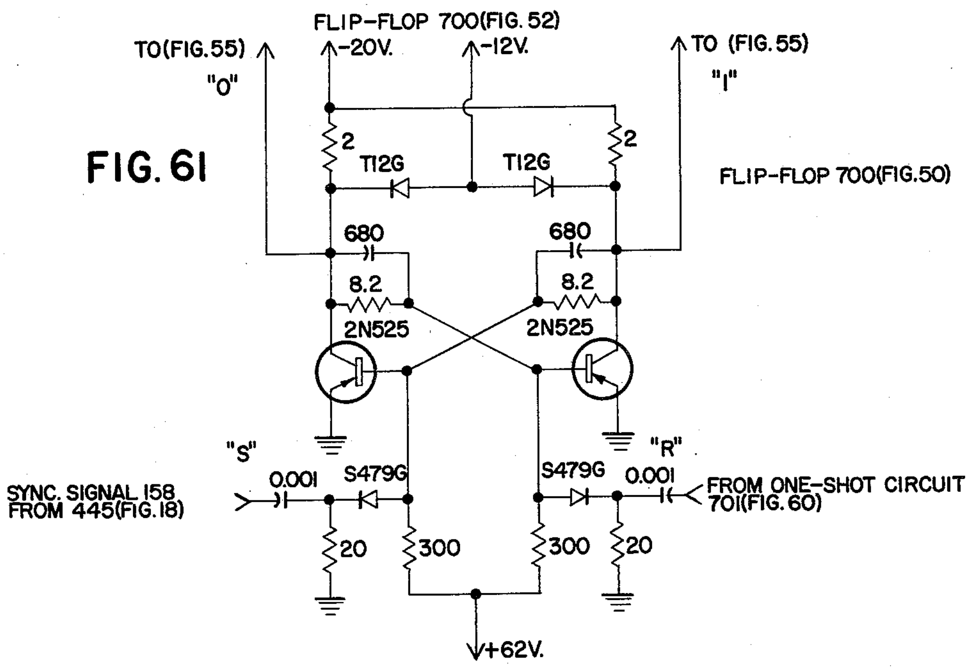
Figure 62:
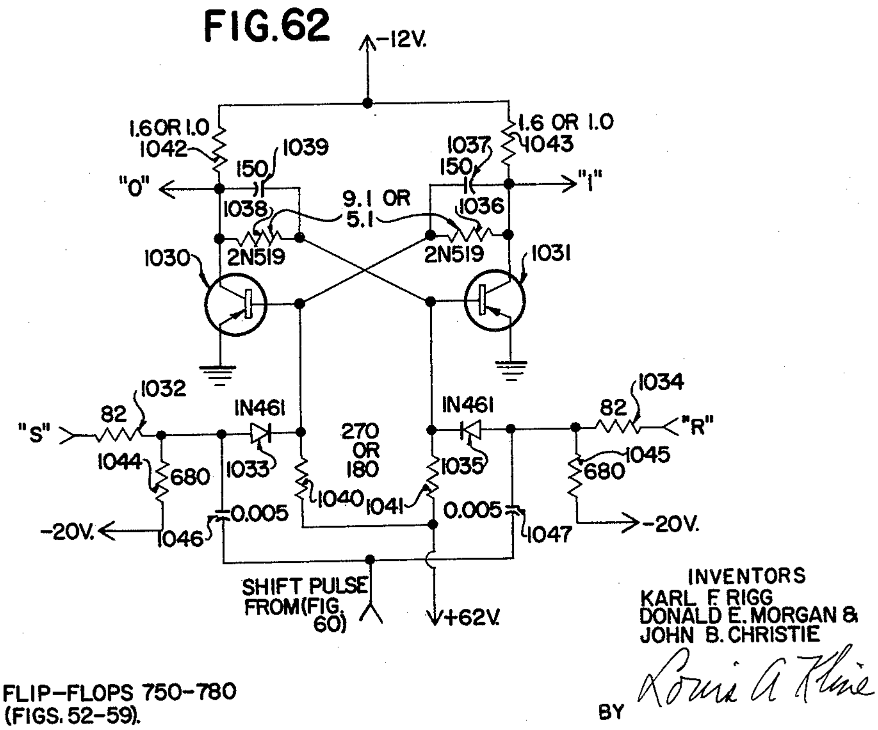
Figure 63:
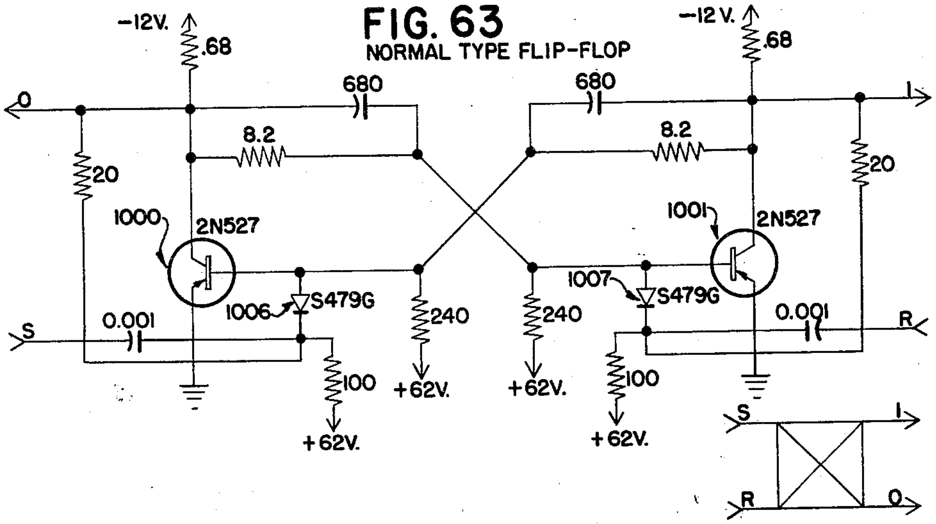
Figure 64:
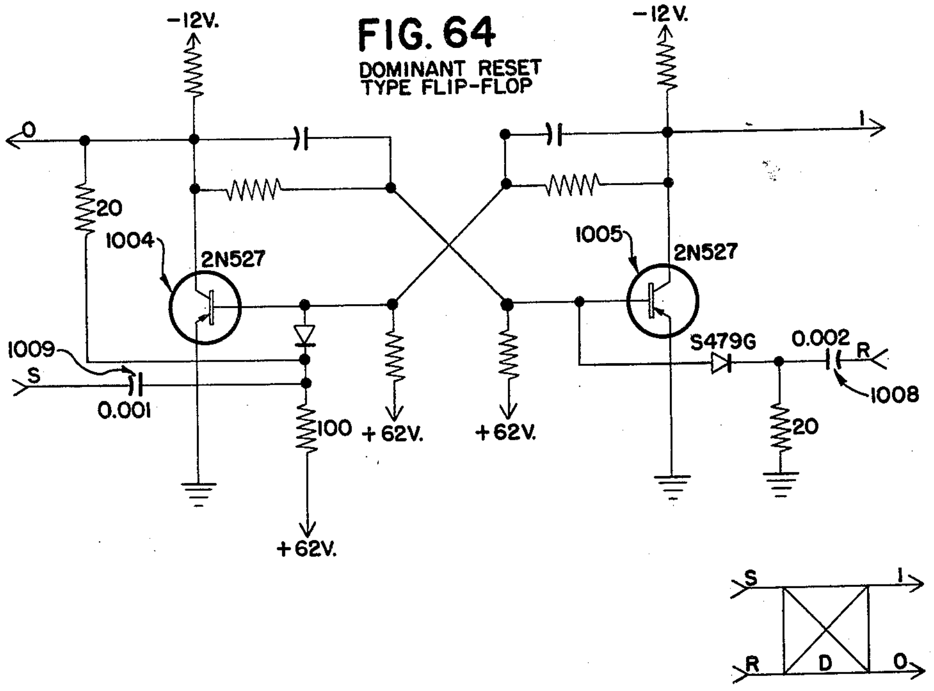
Figures 65, 66:
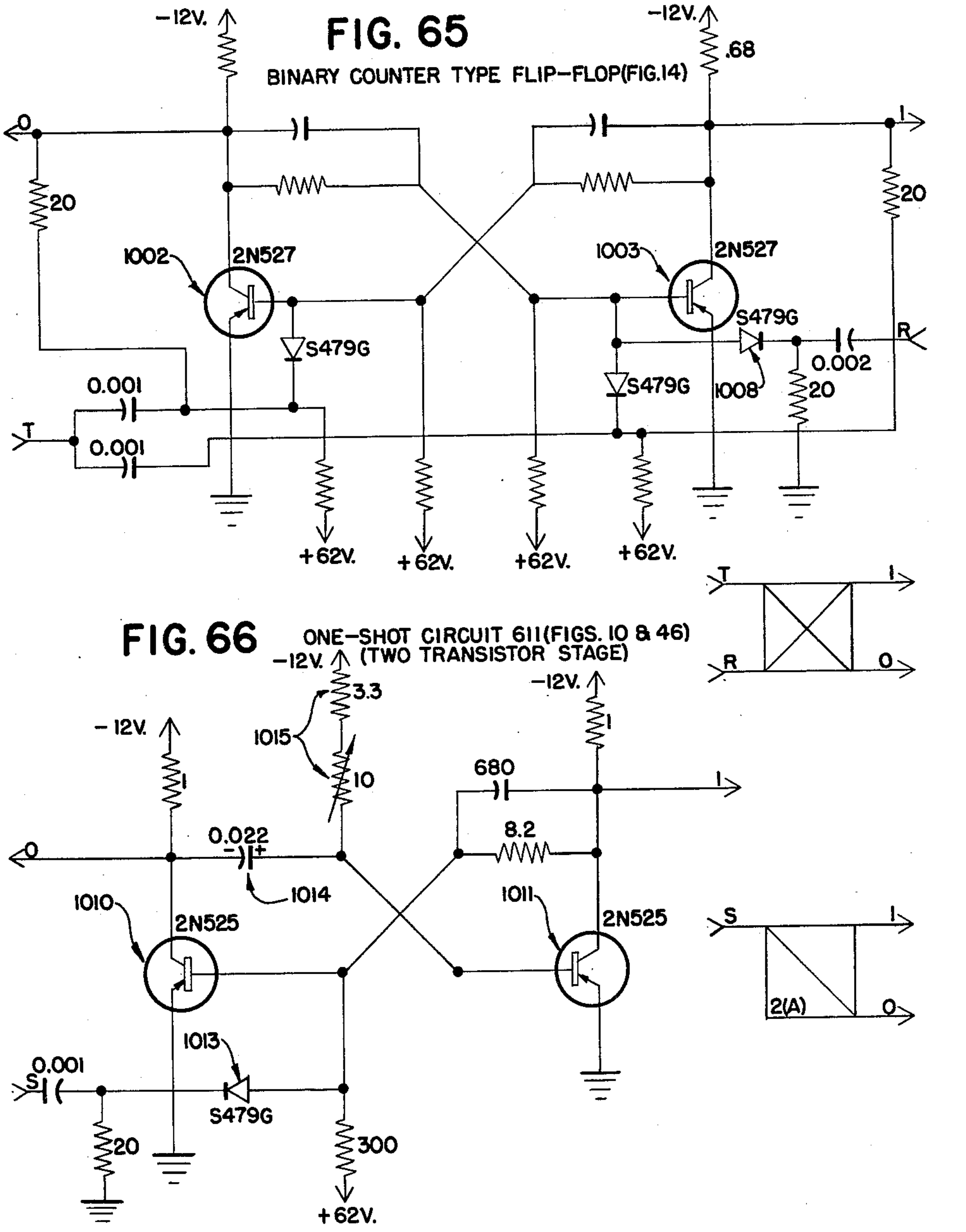
Figure 67:
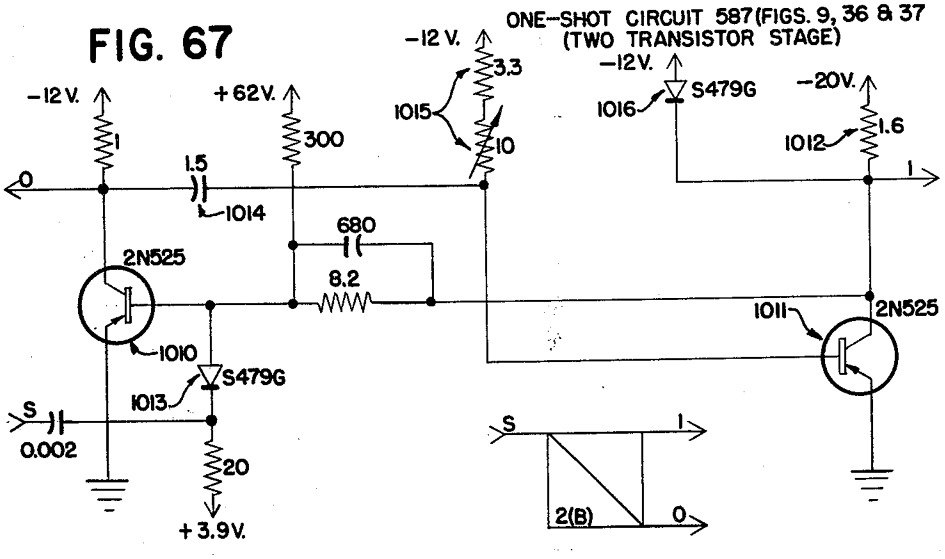
Figure 68:
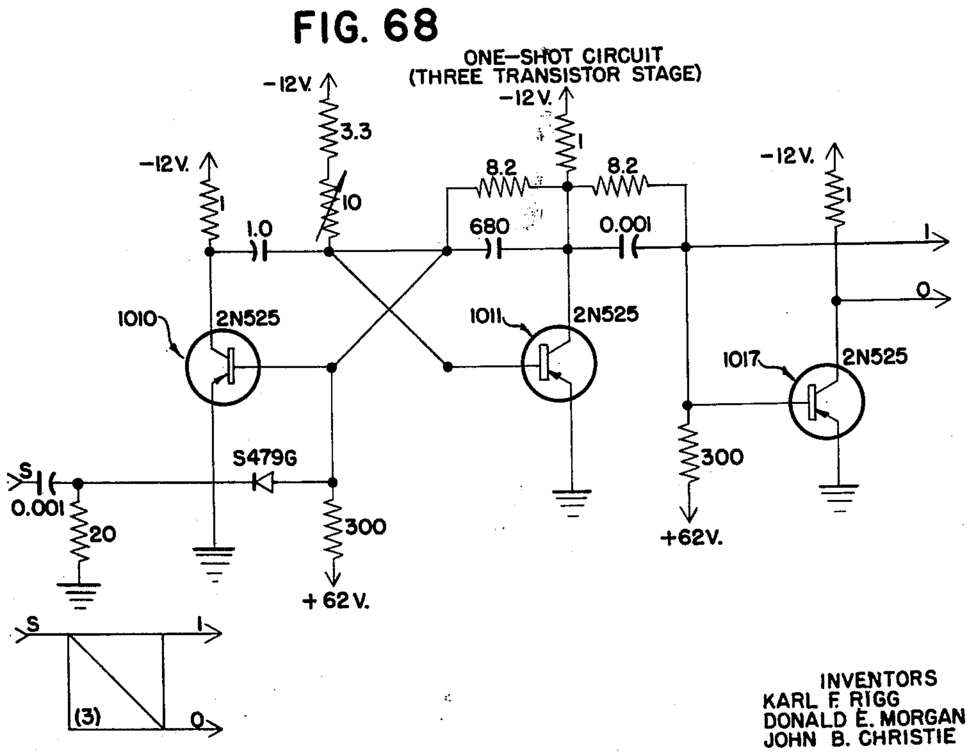
Figure 69:
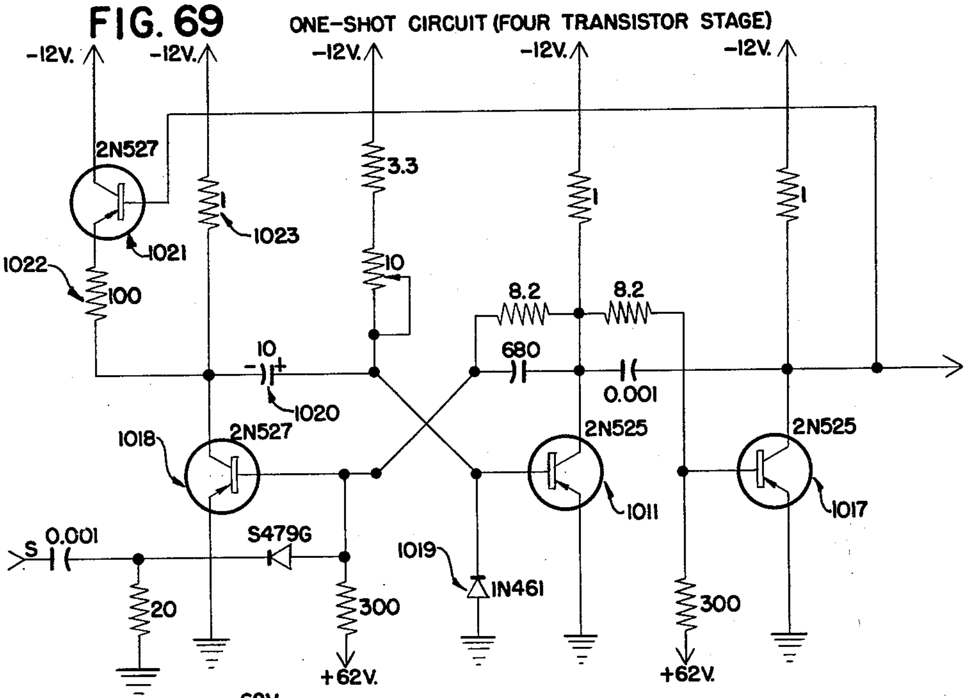
Figure 70:
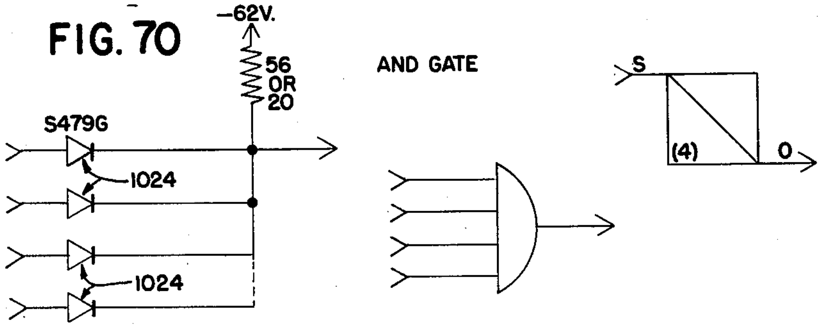
Figure 71:
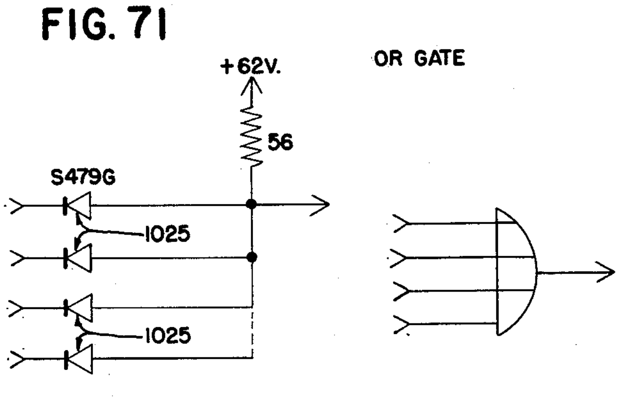
Figure 82:
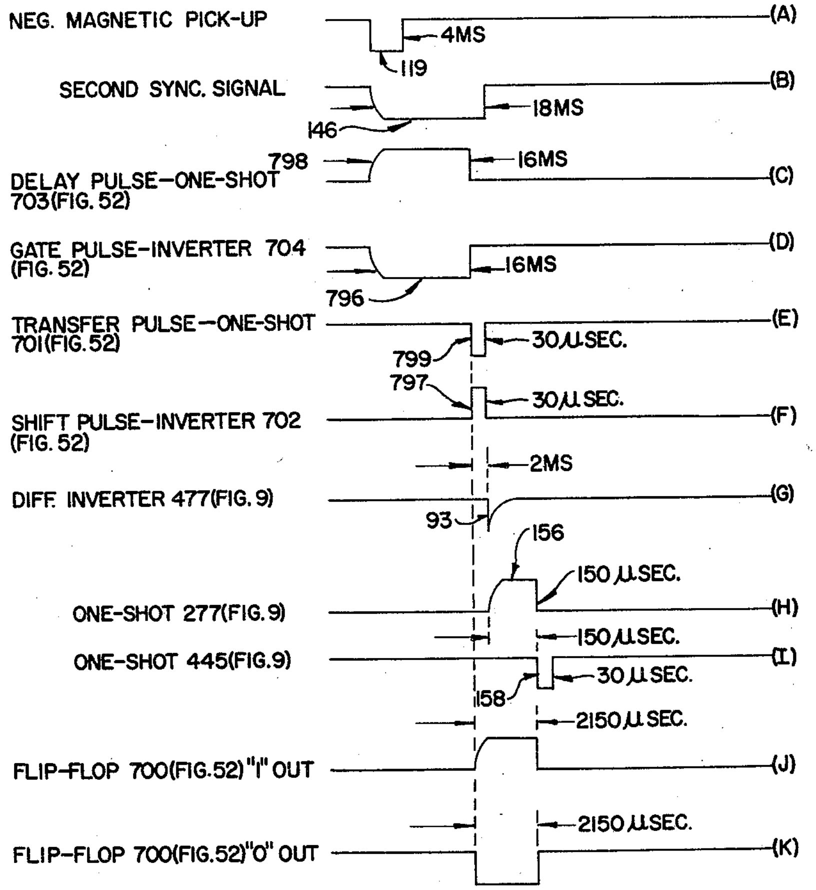

FIGURES 4 to 6 form, in combination, a block diagram of the circuits of the sorter control portion of the sorter-reader;

FIGURE 7 is a block schematic diagram of the principal elements of the amplifier circuits shown in block form in FIGURE 4;

FIGURE 8 is a block schematic diagram of the principal elements of the feed system shown in block form in FIGURE 4;

FIGURE 9 is a block schematic diagram of the principal elements of the synchronization signal generator shown in block form in FIGURE 4;

FIGURE 10 is a block schematic diagram of the principal elements of the jam detector circuit shown in block form in FIGURE 4;

FIGURES 11 to 20 inclusive form, in combination, a block schematic diagram of various other elements of the sorter control portion of the sorter-reader which are shown in block form in FIGURES 5 and 6;

FIGURES 21 to 26 inclusive are a series of timing diagrams for illustrating the timing of operations of the sorter-reader;

FIGURES 27 and 28 form, in combination, a schematic diagram, partly in block form, of some of the power supplies for the sorter-reader, various solenoids for control of the sorter-reader, and the field and digit selector switches;

FIGURES 29 and 30 form, in combination, a schematic diagram showing the manner in which various motors of the sorter-reader are energized, and showing the power supplies for various other solenoids used in the sorter-reader;

FIGURES 31 and 32, taken together, and FIGURES 33 to 35 inclusive are schematic diagrams of the amplifier circuits shown in block form in FIGURES 4 and 7;

FIGURES 36 to 38 inclusive form, in combination, a schematic diagram of the synchronization signal generator shown in block form in FIGURES 4 and 9;

FIGURES 39 to 42 inclusive form, in combination, a schematic diagram of the feed system shown in block form in FIGURES 4 and 8;

FIGURES 43 and 44, taken together, and FIGURES 45 and 46, taken together, are schematic diagrams of the jam detector circuit shown in block form in FIGURES 4 and 10;

FIGURES 47 and 48 form, in combination, a schematic diagram of the input encoder shown in block form in FIGURES 5 and 17;

FIGURES 49 to 51 inclusive form, in combination, a schematic diagram of the output decoder shown in block form in FIGURES 6 and 20;

FIGURES 52 to 54 inclusive form, in combination, a block schematic diagram of the electronic memory shown in block form in FIGURE 6;

FIGURES 55 to 59 inclusive form, in combination, a more detailed schematic diagram, partly in block form, of a part of the electronic memory shown in FIGURES 52 to 54 inclusive;

FIGURE 60 is a schematic diagram of another part of the electronic memory shown in FIGURES 52 to 54 inclusive;

FIGURES 61 and 62 are schematic diagrams of flip-flops used in the electronic memory shown in FIGURES 52 to 54 inclusive;

FIGURE 63 is the block symbol and detailed circuit diagram of the normal type of flip-flop;

FIGURE 64 is the block symbol and detailed circuit diagram of the dominant reset type of flip-flop;

FIGURE 65 is the block symbol and detailed circuit diagram of the binary counter type of flip-flop;

FIGURE 66 is the block symbol and the detailed circuit diagram of one of the two-transistor one-shot circuits;

FIGURE 67 is the block symbol and the detailed circuit diagram of another of the two-transistor one-shot circuits;

FIGURE 68 is the block symbol and the detailed circuit diagram of the three-transistor one-shot circuit;

FIGURE 69 is the block symbol and the detailed circuit diagram of the four-transistor one-shot circuit;

FIGURE 70 is the block symbol and the detailed circuit diagram of the "AND" gate;

FIGURE 71 is the block symbol and the detailed circuit diagram of the "OR" gate;

FIGURE 72 is the block symbol and the detailed circuit diagram of the indicator circuit;

FIGURE 73 is the block symbol and the detailed circuit diagram of the direct current inverter;

FIGURE 74 is the block symbol and the detailed circuit diagram of one type of alternating current inverter or differentiator inverter;

FIGURE 75 is the block symbol of another type of alternating current inverter or differentiator inverter;

FIGURE 76 is the block symbol and the detailed circuit diagram of one type of driver;

FIGURE 77 is the block symbol and the detailed circuit diagram of another type of driver;

FIGURE 78 is the block symbol and the detailed circuit diagram of one type of emitter follower;

FIGURE 79 is the block symbol and the detailed circuit diagram of another type of emitter follower;

FIGURE 80 is the block symbol and the detailed circuit diagram of the power amplifier;

FIGURE 81 is the block symbol of a positive-operating flip-flop used mainly in the electronic memory, the detailed circuit diagram being shown in FIGURE 62; and FIGURE 82 is a timing diagram for illustrating the timing of the operation of the electronic memory shown in FIGURES 52 to 54 inclusive.

Inasmuch as the following description of a physical embodiment of the present invention is of considerable length and is divided into a large number of separate sections, the various section headings have been serially numbered and are listed below in order to facilitate ready reference to the various portions of the specification.

| | Column |
|---|---|
| 1. Sorter-Reader (FIGURES 1, 3B, and 3C) | 6 |
| (1) Media or Document Sorter (FIGURES 1, 2A, and 2B) | 6 |
| (2) Documents Handled (FIGURE 3A) | 9 |
| (3) Character Reader (FIGURES 2B and 3B) | 10 |
| (4) Sorter Control (FIGURE 3B) | 11 |
| 2. Sorter Control—General Description | 12 |
| 3. Voltage Levels | 15 |
| 4. Sorter Control—Block Diagram Description (FIGURES 4, 5, and 6) | 15 |
| 5. Sorter Control—Schematic Block Diagram Description (FIGURES 7 to 20 inclusive) | 20 |
| (1) Magnetic Pickup Pulses (FIGURE 7) | 20 |
| (2) Feed System (FIGURE 8) | 21 |
| (2.1) Normal Feed | 21 |
| (2.2) Test Demand Feed | 23 |
| (2.3) Continuous Feed | 24 |
| (2.4) Computer Demand Feed | 24 |
| (3) Check Presence Signals (FIGURE 7) | 25 |
| (4) Synchronization Signals (FIGURE 9) | 25 |
| (5) Manual Entry (FIGURE 9) | 28 |
| (6) Reject Count and Jam Detection (FIGURES 7 and 10) | 28 |
| (7) Stop Feed (FIGURE 7) | 32 |
| (8) Field Selector Circuit (FIGURES 11, 12, and 13) | 32 |
| (9) Input Encoder (FIGURE 17) | 38 |
| (10) Digit Selector Circuit (FIGURES 14, 15, and 16) | 39 |
| (11) Input Memory (FIGURE 17) | 42 |
| (12) Output Memory (FIGURE 18) | 43 |
| (13) Output Decoder (FIGURE 20) | 45 |
| (14) Reject Circuit (FIGURE 19) | 46 |
| (15) Special Sort Circuit (FIGURE 18) | 49 |
| 6. Components circuits (FIGURES 63 to 80 inclusive) | 51 |
| (1) Flip-Flops, in General | 51 |
| (2) Flip-Flops, Normal Type (FIGURE 63) | 52 |
| (3) Flip-Flop, Dominant Reset Type (FIGURE 64) | 52 |
| (4) Flip-Flops (FIGURES 63 and 64), Mode of Operation | 53 |
| (5) Flip-Flop, Binary Counter Type (FIGURE 65) | 53 |
| (6) One-Shot Circuits (FIGURES 66, 67, 68, and 69) | 54 |
| (6.1) Two-Transistor One-Shot Circuits (FIGURES 66 and 67) | 54 |
| (6.2) Three-Transistor One-Shot Circuits (FIGURE 68) | 55 |
| (6.3) Four-Transistor One-Shot Circuits (FIGURE 69) | 56 |
| (7) "AND" Gate (FIGURE 70) | 56 |
| (8) "OR" Gate (FIGURE 71) | 57 |
| (9) Indicator Circuit (FIGURE 72) | 57 |
| (10) Direct Current Inverter (FIGURE 73) | 58 |
| (11) Alternating Current Inverters (FIGURES 74 and 75) | 58 |
| (12) Drivers (FIGURES 76 and 77) | 60 |
| (12.1) Driver—90-milliampere (FIGURE 76) | 60 |
| (12.2) Driver—60-milliampere (FIGURE 77) | 61 |
| (13) Emitter Followers (FIGURES 78 and 79) | 61 |
| (14) Power Amplifier (FIGURE 80) | 61 |
| 7. Control Circuits (FIGURES 27 to 30 inclusive) | 62 |
| 8. Schematic Diagrams (FIGURES 31 to 51 inclusive) | 66 |
| (1) Check Presence Signals (FIGURE 35) | 67 |
| (2) Reject Count Signals (FIGURE 34) | 68 |
| (3) Magnetic Pickup Signals (FIGURES 31 and 32) | 69 |
| (4) Unblanking Signals (FIGURE 33) | 69 |
| (5) Jam Detector Circuit (FIGURES 43 and 44) | 70 |
| 9. Electronic Memory (FIGURES 52, 53, and 54) | 72 |
| 10. Electronic Memory—Schematic Diagrams (FIGURES 55 to 62 inclusive) | 78 |
| (1) Clamp Circuits (FIGURES 56 and 53) | 78 |
| (2) Flip-Flop (FIGURE 62) | 78 |

1. *SORTER-READER*

Figure 3A:
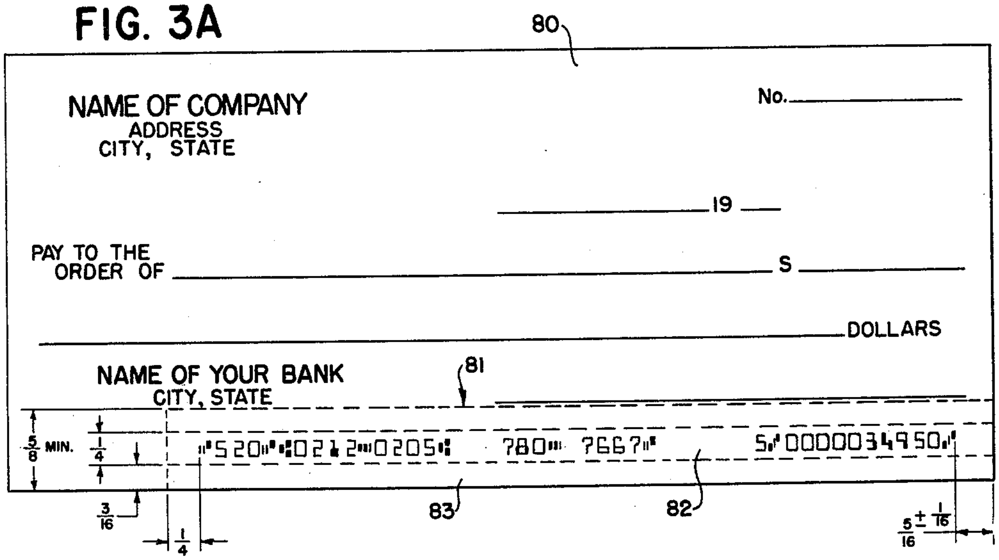
FIGURE 3A shows a bank check with control data or characters of a variety adapted to be processed or sorted by the sorter-reader.
Figure 3B:
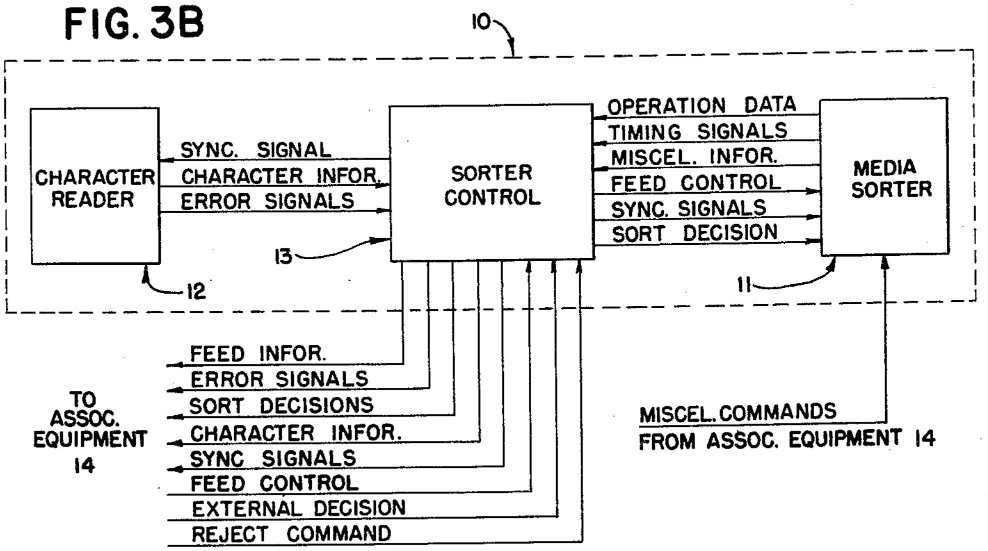
FIGURE 3B is a block diagram showing the three functional units of the sorter-reader and identifying in a general manner the various inputs and outputs of these units.
Figure 3C:
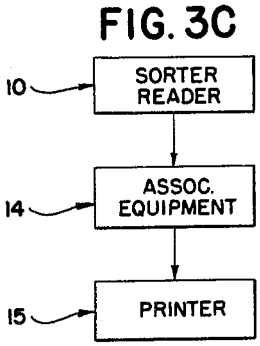
FIGURE 3C is a block diagram showing in a general manner that the sorter-reader may be utilized as part of a data processing system.

(FIGURES 1, 3B, and 3C)

The invention is embodied in the present instance, by way of illustration, in a document processing and sorting apparatus hereinafter referred to as the sorter-reader 10. The sorter-reader 10 (FIGURE 3B) comprises three functional sub-units: the media or document sorter 11, the character reader 12, and the sorter control 13. The character reader 12 and the sorter control 13 are located within the body of the media sorter 11. FIGURE 3B shows the basic functional relationship between the three sub-units of the sorter-reader 10. The inputs to and outputs from the three sub-units are identified in FIGURE 3B, and it is believed that their composition and utilization will be made clear when the sorter-reader 10 is fully described hereafter.

Referring now briefly to FIGURE 3C, the sorter-reader 10 may be utilized as a part of a data-processing system which may, for example, include associated equipment 14, such as a computer, and a printer 15. In the detailed description of the sorter-reader 10 hereafter, it is pointed out that the sorter-reader 10 may be called upon to operate in a process mode wherein the associated equipment 14 develops sorting control signals utilized by the sorter-reader 10 to control the disposition of documents to the various stackers of the media sorter 11. In this event, the sorter-reader 10 functions as an input device for the data processing system. The sorter-reader 10 may be used first to arrange the documents in a desired order, and then to supply the data which it reads from them in that desired order to the associated equipment 14. The associated equipment 14 may use the data read from the documents to modify information stored in its memory, to perform analysis work, and to provide a selected portion of this information and analysis to an output device, such as the printer 15. In various parts of the description of the sorter-reader 10 hereafter, reference is made to the fact that certain lines or certain signals are provided which are available for use with the associated equipment 14. These references are made in order to provide a clear and comprehensive disclosure of the sorter-reader 10. The sorter-reader 10 may be separated lengthwise into four physical sections or sub-assemblies. From right to left in FIG. 1, these sections are the feed section 54, the right stacker section 55, the left stacker section 56, and the finisher section 57.

(1) *Media or Document Sorter*

Figure 2A:
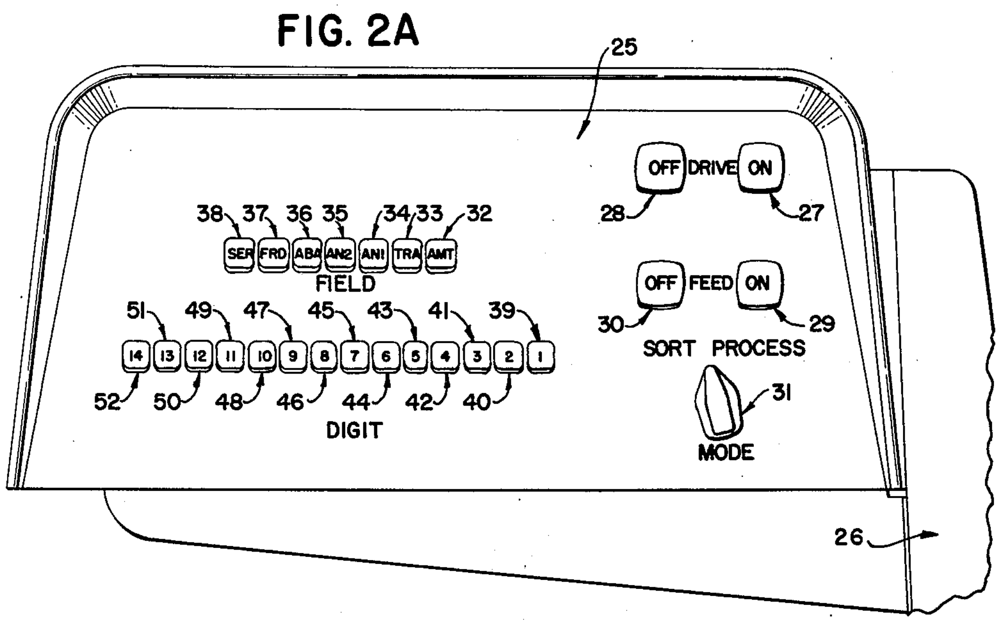
FIGURE 2A is a plan view of the control panel of the sorter-reader.
Figure 2B:
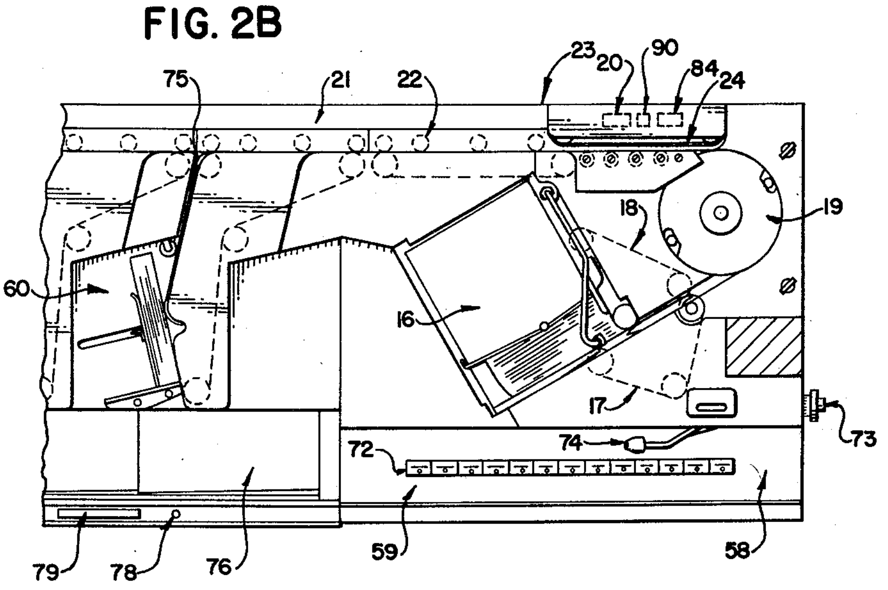
FIGURE 2B is a top plan view showing the general arrangement of the document feeding and separating means, a timing device, a conveying means, and a stacker unit with means for gating documents thereto.

(FIGURES 1, 2A, and 2B)

The media sorter 11 comprises generally a platform or magazine 16, for receiving a stack of documents or checks to be sorted, and means for feeding the documents along a pathway, past a reading device or sensing means, and thence to means for distributing the documents to their respective stackers in accordance with the data read from them.

Such means for feeding the documents to be sorted comprises a plurality of feed belts 17 and a plurality of reverse belts 18. The means for feeding the documents may be of the type shown in United States Patent No. 2,936,170, which issued to William W. Herrick and Einar W. Tangard on May 10, 1960, or it may be of the type described and claimed in a United States patent application of Joseph F. Cattorini and Donald E. Landis, filed October 12, 1959, Serial No. 846,010, for a Check Feeding Mechanism, which is assigned to the same assignee as the instant invention.

It is pointed out in United States Patent No. 2,936,170 that the documents will not be discharged from the feeding means in an exact timed relation; that is, some gain or lag will occur. Therefore the media sorter 11 is provided with a timing device or synchronizer wheel 19 such as that described in United States Patent No. 2,936,170. The timing device 19 is located between the initial feed (feed belts 17 and reverse belts 18) and the conveyor feed 21, which extends along the rear of the media sorter 11. The conveyor feed 21 consists of a number of belt and pulley arrangements, and spring-impressed roller elements 22 cooperate with the conveyor feed belts to feed the documents along a predetermined path. The timing device 19 will correct the feed of a document so that it will become synchronized with the conveyor feed 21. The lead edges of the documents will be twelve inches, or one check period, apart upon leaving the timing device 19. Upon leaving the timing device 19, the documents will enter the read area 23 on a special reader belt 24. The reader belt 24 is driven by a synchronous motor, so that all the documents will be conveyed through the read area 23 at a constant speed. This constant speed insures that the character reader 12 will properly read the characters on the document. In moving through the read area 23, the document will pass a magnetizer device 84, which will magnetize the special printing on the document. Next to the magnetizer device 84, there is located a photocell 90, which will develop a signal when a document passes before it. This signal is used to allow the character reader 12 to read the data from the documents, and it is also used to develop synchronizing signals required by the sorter-reader 10 and its associated equipment 14.

After passing the magnetizer device 84, the documents will then pass the reading device 20, which will read the data from them and send this data to the character reader 12.

The operator controls for the sorter-reader 10 are located on the media sorter 11. The media sorter 11 is provided with a control panel 25, which is mounted atop a tower 26. The control panel 25 carries the drive-on and drive-off buttons 27 and 28, respectively, the feed-on and feed-off buttons 29 and 30, respectively, the mode switch 31, the seven field selector buttons 32 to 38 inclusive, and the fourteen digit selector buttons 39 to 52 inclusive. On the front of the tower 26 there is provided an auxiliary stop bar 53, which may be used to turn off both the drive and the feed systems of the media sorter 11 in an emergency.

In front of the deck of the feed section 54 is a sloping panel 58, which displays thirteen counter dials 59. One of these counter dials is provided for each of the twelve stackers 60 to 71, inclusive, to count the number of documents fed into these stackers, and another counter dial, at 72, is provided to furnish a count of the total number of documents fed into all of the twelve stackers. On the front corner of the feed section 54 is a knob 73, for adjusting the spacing of the feed mechanism. At the front of the feed section 54, there is provided a lever 74, for adjusting the feed belts 17.

Each of the stacker sections 55 and 56 of the media sorter 11 is provided with six stackers 60 to 65, and 66 to 71, respectively. The last stacker 71 is called the reject stacker because it receives all documents not gated into the other eleven stackers. The first stacker 60 is called the special sort stacker because it is gated to receive documents which are being sorted on insignificant digits. The other ten stackers 61 to 70 inclusive are numbered "0" to "9," according to the digital value which they will accept during a decimal sorting operation. The "0" stacker 61 receives documents being sorted on significant zeros only.

After being read, the documents are conveyed along the rear of the feed section 54 to the stacker section 55. Each of the documents will be conveyed along the rear of the stacker sections 55 and 56 by means of successive arrays of belts (not shown) until it is gated into the desired one of the stackers 60 to 70. Each of the stackers 60 to 70 is provided with a gate mechanism, indicated generally at 75 (FIGURE 2B), so that a document may be directed into its associated stacker. All of the documents not gated into the stackers 60 to 70 will ultimately be sent to the reject stacker 71. In front of each of the stackers 60 to 71 there is provided an auxiliary storage pocket 76, designed to hold documents removed from the stacker by the operator. There is also provided a tray 77, containing two storage pockets, which rides on a pair of tracks above the pockets 76. The tray 77 may be moved by the operator to any point along the front of the stacker sections 55 and 56, to carry documents that the operator may wish to transport from one point to another. There is provided in front of each pocket 76 a red indicator lamp 78, which lights when its associated stacker is filled to capacity. A red auxiliary stop bar 79 is provided in front of each group of three stackers. Thus, whenever the operator may be standing along the front of the sorter-reader 10, the drive and feed systems may be stopped by depression of the stop bars 79.

Along the rear of the stacker sections 55 and 56 of the media sorter 11, there is provided a row of idler wheel assemblies (not shown) called conveyor or transport "bogies." These assemblies function to hold the documents against the conveyor belts. Each assembly is about twelve inches wide, and one assembly is provided for each of the stackers. Another of these assemblies is provided on the feed section 54. When jamming of the documents occurs, and it is detected by the jam detector arrangement of the instant invention, a latch mechanism (not shown) is automatically released, which allows the "bogies" to drop away from the conveyor belts. This action helps to prevent further jamming of the documents and permits the operator to remove the jammed documents. A "bogie" reset arm 91 is mounted on the left rear corner of each of the stacker sections 55 and 56. After the operator has corrected for a jam of the documents, these arms 91 are used to restore the latch mechanisms. The operator may then reset the "bogies" individually.

The finisher section 57 of the media sorter 11 is about seven inches in length. The sorter-reader "On-Off" switch 800 is mounted on the sloping portion of the finisher section 57. Within the finisher section 57 is mounted a control arrangement which is used for holding information concerning the sorting of the documents and for releasing the information at predetermined times, whereby the gating mechanisms may be operated in such a manner that the documents will be distributed to the stackers 60 to 70 in accordance with the data read therefrom. It will be shown clearly hereafter that the sorter-reader 10 may employ either an electromechanical or an electronic memory to accomplish this purpose, although the electronic memory of the instant invention is an improvement over former types of memories. The former type of memory forms no part of the present invention, and hence its structural features have not been included herein. A memory device is not associated with the reject stacker 71, as this stacker is not provided with a gate mechanism. All documents not gated into the other stackers 60 to 70 are collected in the reject stacker 71. The signal to control the special sort stacker 60 is not delayed, since this stacker is the first in the line, and the document is already approaching it when the sort decision is developed in the sorter control 13.

The timing device 19 in the feed section 54 of the media sorter 11 is also used to develop magnetic pickup pulses which are used as timing signals for the sorter-reader 10. A suitable rotary mechanism or disc (not shown) is provided on the shaft for the timing device 19, and this rotary mechanism rotates in synchronism with the rotation of the timing device 19. This rotary mechanism is provided with a pair of permanent magnet elements, each magnet element located 180 degrees from the other. A magnetic pickup coil or reading head (not shown), comprising a magnet and associated coil, is positioned adjacent the rotary mechanism, so that a current is generated in the coil for every revolution of the rotary mechanism. This current is utilized to develop pickup pulses in a manner to be described in detail hereafter.

Accordingly, the media sorter 11 generally comprises the mechanism which physically handles the documents. This handling involves two functions: feeding, and processing or sorting. The feeding of the documents involves detaching the documents one at a time from a stack on the platform 16 and passing them at a constant speed past the reading device 20. The frequency at which the documents are fed will depend upon the setting of the mode switch 31 by the operator, and upon instructions received from the associated equipment 14. The sorting of the documents involves passing each of the documents into one of the twelve stackers 60 to 71, as directed by the sorter control 13. The sort decision may be developed either in the sorter control 13 or in the associated equipment 14.

(2) *Documents Handled* (FIGURE 3A)

The sorter-reader 10 is capable of use for sorting a wide variety of documents, such as bank checks, for example, provided with data processing information in the form of characters or symbols, as illustrated by the check 80 shown in FIGURE 3A of the drawings. The symbols are printed on the check 80 in ink which is capable of being magnetized. The American Bankers Association, hereinafter referred to as the A.B.A., has specified that a region 81, five-eighths of an inch high and at least six inches wide, be reserved for printing of the data processing information. Otherwise, the check 80 may be printed in any desired format, subject to existing regulations. The above-mentioned region 81, called the "clear band," extends along the lower edge of the check 80, beginning at its right-hand edge.

Inside the "clear band" is an inner region 82, one-fourth of an inch high, within which the actual characters for data processing are located. This region 82 is centered vertically, so that there are three-sixteenths-of-an-inch vacant zones between it and the upper and lower boundaries of the outer region 83. The inner region 82 begins at least one-fourth of an inch from the right-hand edge of the check 80, and its length depends upon the amount of information to be printed, to satisfy the requirements of each application.

The inner region 82 may contain a maximum of seven fields of information as follows:

(1) The first field on the right of the check 80 is the Amount field. The Amount field always contains twelve characters, ten digits for the actual amount of the check, and two special symbols, one at each end of the field to mark its limits. These two boundary symbols (slant symbols) are identical. Insignificant places in the Amount field of a given check are occupied by zeros.

(2) Next to the Amount field is the Transaction Code field. Any number of places or areas may be set aside for this field, according to the specific system requirements. However, it will usually contain only three or four places. The Transaction Code field is identified only by its relationship to the Amount field, although it may be bounded on its left by another special symbol (a paragraph symbol), which marks the beginning of the next field. Unused places in the Transaction Code field on a given check are left vacant.

(3) and (4) To the left of the Transaction Code field are the Account Number fields. The Account Number field is separated from the Transaction Code field by the special symbol (paragraph symbol) mentioned previously. The account number itself may be divided into two parts by a third type of special symbol (a hyphen symbol), thus forming two account numbers. The portion to the right of the hyphen symbol is then known as the Account Number 1 field, and that to the left of the hyphen symbol as the Account Number 2 field. If there is no hyphen symbol, the entire account number is considered to be Account Number 1 field. The transaction code and the account numbers together may contain a maximum of nineteen characters. These characters may be divided among the Transaction Code field and the Account Number fields according to the needs and the preferences of the individual bank. Insignificant places in either Account Number field are left vacant.

(5) and (6) The next fields are called the A.B.A. field and the F.R.D. fields. The A.B.A. field contains the A.B.A. transit number and the check-routing symbol or transit number of the drawee bank. Each of these fields always contains four places. The two fields are separated by a hyphen symbol, and together they are bounded by a pair of symbols of a fourth kind (four-square symbols). Insignificant places are occupied by zeros. Thus, the two fields combined contain eight digits and three special symbols for a total of eleven characters.

(7) The last field is the Check Number or Serial Number field. It contains a number which is bracketed by a pair of paragraph symbols. Thus, between the routing F.R.D. field and the Serial Number field will be two adjacent special symbols, a four-square symbol and a paragraph symbol. The Serial Number field may contain any of decimal places up to a maximum of ten. Thus, the maximum number of characters in this field is twelve. Insignificant places are left vacant. The maximum number of characters in the check format is fifty-four.

The A.B.A. uses somewhat different terminology for the fields of a check. The Amount field is the same. The Transaction Code field and the Account Number fields together are referred to as the On Us field. The combined A.B.A. and F.R.D. fields are known as the Transit Number field, and the Serial Number field is referred to as the Auxiliary On Us field.

Fourteen different characters (called "strokes" 0–13) are utilized. In addition to the ten numeric (Arabic) digits (0 to 9), four special symbols are used, as heretofore described. One special symbol (Q1) marks the boundaries of the Amount field, another special symbol (Q2) marks the beginning of the Account Number fields and marks the boundaries of the Serial Number field, a third special symbol (Q3) marks the boundaries of the combined A.B.A. and F.R.D. fields, and a fourth special symbol (Q4) separates the two Account Number fields and separates the A.B.A. field from the F.R.D. field. The check 80 shows the appearance of the four special symbols, Q1 to Q4, along with the appearance of some of the ten digits. The configuration for the characters of the check 80 is known as Type E13 B.

For a detailed description of the check format and character-printing specifications, reference may be made to Bank Management Publication 147, entitled "The Common Machine Language for Mechanized Check Handling," prepared by the Bank Management Commission of the A.B.A. dated April 1959.

(3) *Character Reader* (FIGURES 2B and 3B)

The primary function of the character reader 12 is to read the magnetic printing on each document, such as the check 80 (FIGURE 3A), and to provide the information read to the sorter control 13. This reading takes place as the document begins its journey toward the stackers 60 to 71 of the media sorter 11, after its movement has been properly synchronized by the timing device 19. The operation of the character reader 12 is correlated with that of the rest of the sorter-reader 10 by a synchronizing signal developed in the sorter control 13 from the timing signals which the sorter control 13 receives from the media sorter 11. In this way, the character reader 12 is permitted to read only during the time that the magnetic printing region on each check is passing the reading device 20 (FIGURE 2B).

Figure 11:
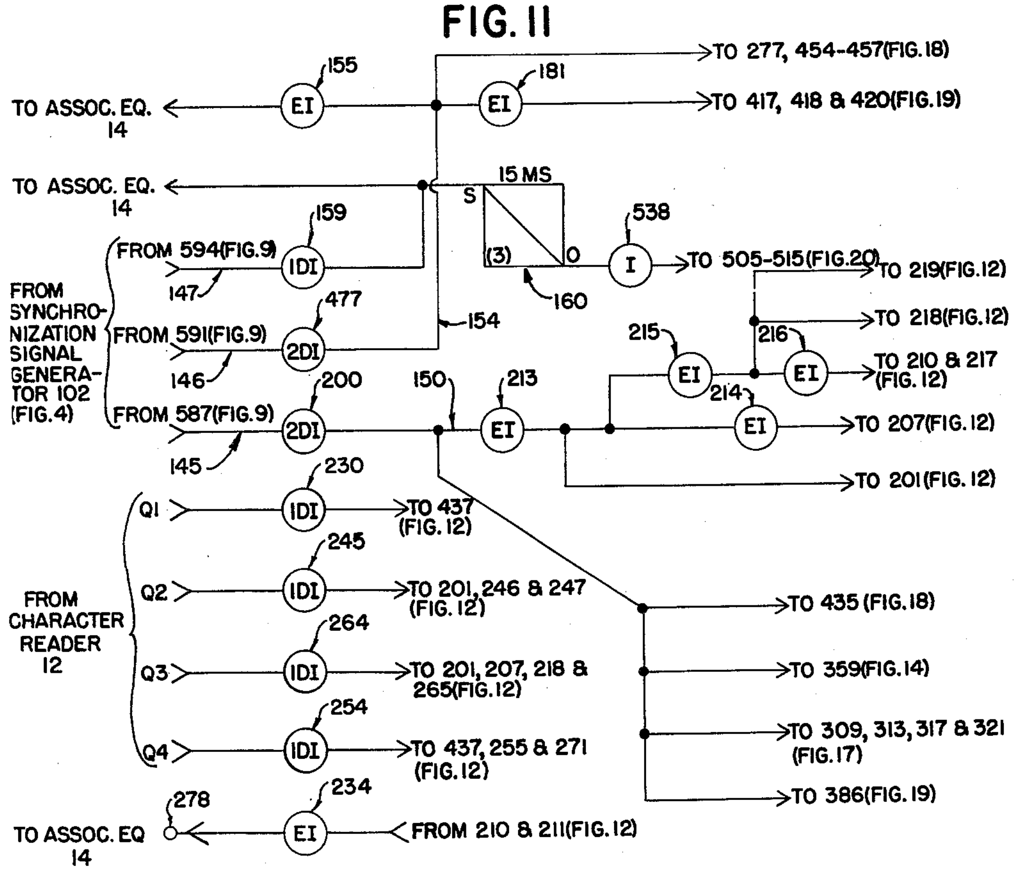

The reading process involves two phases: perception and recognition. To perceive the information on each check, the character reader 12 utilizes the magnetizer device 84 (FIGURE 2B) to generate magnetic fields in the check's magnetic ink printing as it passes by it. The reading or sensing device 20 is then used to detect the field patterns produced by each printed character in turn. These field patterns produce electronic waveshapes in the circuitry associated with the reading device 20. Both the generation and the detection of these magnetic fields proceed from right to left across the printed region (inner region 82, FIGURE 3A) of the check 80, as the right edge of the check is leading as it travels past the magnetizer device 84 and the reading device 20. To recognize the waveshapes thus produced, the character reader 12 utilizes a set of built-in waveshape patterns or correlation networks, one for each of the fourteen characters which it is designed to recognize. These waveshape patterns constitute the memory of the character reader 12. The character reader 12 operates to compare the waveshape produced by each printed character which it perceives with these fourteen waveshape patterns. that waveshape pattern which most nearly resembles the perceived waveshape causes an electronic impulse to be generated on the corresponding character line. The fourteen character lines extend to the sorter control 13 (FIGURES 11 and 17).

If any waveshape does not sufficiently resemble any of the built-in waveshape patterns, no output signal is produced for that character. If a waveshape too closely resembles more than one pattern, more than one output signal may result. The latter condition is called a "multiple read." The character reader 12 may be designed to sense a "multiple read" condition when it occurs, and to send a special signal to the sorter control 13, indicating this fact.

Inasmuch as the character reader 12 itself forms no part of the present invention, it has not been described in detail. Reference may be had to United States Patent No. 2,924,812, which issued to Philip E. Merritt and Carroll M. Steele on February 9, 1960, for a detailed description of a suitable type of character reader that may be employed for the character reader 12 in the sorter reader of the present invention. United States Patent No. 2,924,812 describes a system for recognizing or automatically reading characters printed in human language and for providing an electrical output indicative of the character read.

(4) *Sorter Control*

(FIGURE 3B)

The primary function of the sorter control 13 is the delivery to the media sorter 11 of a sort decision or sorting control signal for each check read by the character reader 12, before that check reaches the stackers 60 to 71. This sort decision is then used by the media sorter 11 to operate the gate mechanism (at 75, FIGURE 2B, for example) of the proper one of the stackers 60 to 70 at the proper time. When the sorter-reader 10 is operating in its Sort mode, described in detail hereafter, the sorter control 13 develops the sort decision. When the sorter-reader 10 is operating in its Process mode, described in detail hereafter, the associated equipment 14 (FIGURES 3B and 3C) generally develops the Sort decision. In the latter case, the sorter control 13 supplies the associated equipment 14 with the necessary information, and it transmits to the media sorter 11 the Sort decision developed.

In order to develop a Sort decision, the sorter control 13 obtains information from two sources. It obtains the information read from each check, as that information is produced by the character reader 12, and it obtains the "multiple read" information generated by the character reader 12. It also obtains information caused by the settings of field and digit selector switches at the control panel 25 of the sorter-reader 10. The field and digit selector switches are set by an operator to select the magnetic printing field (Amount field, Transaction Code field, etc.), and the characters or digits within that field, on which a sorting operation is to take place. Thus, the third digit of the Account Number 1 field (a "six" on the check 80, FIGURE 3A) might be selected by the operator. The sorter control 13 would then use the third digit in the Account Number 1 field of each check as the basis for the development of a Sort decision.

The sorter control 13 also performs several other functions. It uses the timing signals developed by the media sorter 11 to generate the control or synchronizing signals used for timing the operation of the sorter-reader 10 and the associated equipment 14. From operator control settings, in formation provided by the associated equipment 14, and the output of the jam detection circuits in the media sorter 11, the sorter control 13 develops signals that control the feeding of the checks by the media sorter 11. The sorter control 13 also translates the character information received from the character reader 12 into a form acceptable to the associated equipment 14. It then sends this information, with other information concerning the various steps in its process of developing a Sort decision, to the associated equipment 14.

2. SORTER CONTROL—GENERAL DESCRIPTION

As the information from each check is read by the character reader 12, the information in that field on the check which corresponds to the field selected by the operator is selected by the sorter control 13. The information in the selected field is then utilized by the sorter control 13 to select the digit which corresponds to the digit selected by the operator. The sorter control 13 utilizes the selected digit to make a sort decision or develop a sorting control signal for that check. Thus, if the operator has depressed the AN1 button 34 and the "3" button 41 on the control panel 25 (FIGURE 2A), and the Account Number 1 is "7667" (as shown in FIGURE 3A), then the sorter control 13 will utilize the digit "6" to make a Sort decision.

The Sort decision made by the sorter control 13 is usually a decision having decimal significance. Accordingly, each check is normally routed into one of the decimal stackers 61 to 70; that is, that one of these stackers which corresponds to the value of the digit selected for performing a sorting operation on. In the above example, the check would normally be deposited in the "6" stacker 67. If the sorter-reader 10 had been sorting on the second digit of Account Number 1 instead, the check would normally still have been deposited in the "6" stacker 67.

There are exceptions to the above normal decimal sorting of checks. The checks concerned with these exceptions are deposited either in the special sort stacker 60 or in the reject stacker 71.

The special sort stacker 60 is provided to receive checks which are sorted on insignificant digits, during a decimal sorting operation. Ordinarily, insignificant digits are not printed in the Transaction Code, Account Number, and Serial Number fields on the checks. Instead, the insignificant places are left blank, as shown in the inner region 82 of the check 80 in FIGURE 3A. However, these fields are handled in the same way as those fields in which the insignificant zeros are printed. Thus, if the fourth digit of the Account Number 2 field is selected for performing a sorting operation on, a check bearing the number "780," as shown in FIGURE 3A, will be deposited in the special sort stacker 60. If the third digit in this field is selected, the same check will be sorted into the "7" stacker 68.

Insignificant zeros are printed in the Amount, A.B.A., and F.R.D. fields, so that these fields will always contain the same number of digits. Thus, the Amount field should always contain ten digits, and the A.B.A. and F.R.D. fields should always contain four digits. If one of these fields on a given check contains more or fewer than the proper number of digits, and that field has been selected by the operator, the check will not be sorted in the normal manner; that is, decimally. If the selected field is the Amount field, the check will be rejected. If the selected field is either the A.B.A. field or the F.R.D. field, one of the following situations will develop. If the operator selects a digit higher than the fourth one, the check will be deposited in the reject stacker 71, regardless of the number of digits actually printed in that field. Thus, if the operator has selected the fifth digit in the A.B.A. field, all of the checks will be deposited in the reject stacker 71, even if they actually have five or more digits printed in that field. If the number of digits printed in the A.B.A. or F.R.D. fields on a check is equal to or greater than four, and the operator has selected one of the first four digits, decimal or special sorting of the check will follow in the normal manner. Thus, if the selected digit has a value "1" to "9" or is a significant zero, the check will be decimally sorted. If the selected digit is an insignificant zero, the check will be special sorted. If the number of digits printed in the A.B.A. or the F.R.D. fields on a check is less than four, and the operator has selected a digit actually printed, the check will be decimally sorted or special sorted in the normal manner. Thus, if only three digits are printed on a check in these fields, and the third digit has been selected, the check will be normally sorted. If the number of digits printed in the A.B.A. or F.R.D. fields on a check is less than four, and the operator has selected a digit no higher than four that is not printed on the check, then the check will be special sorted. Thus, if only three digits are printed on a check, but the operator has selected the fourth digit, a special sort of the check will result.

The reject stacker 71 is provided to receive all checks that are not deposited into the other eleven stackers 60 to 70. A check will be prevented from being deposited into the special sort stacker 60 or one of the decimal stackers 61 to 70 if any one of five kinds of errors is detected by the sorter control 13 during the reading of a check. These five kinds of errors are as follows:

(1) *Operator error.*—If the operator selects the Amount, A.B.A., or F.R.D. fields and selects a digit beyond the proper capacity of this field, all of the checks will be deposited in the reject stacker 71.

(2) *Field not present.*—If the field selected by the operator is not found on the check being read, that check will be deposited in the reject stacker 71.

(3) *Incorrect number of digits in the Amount field.*—If, when the Amount field has been selected by the operator, the number of digits found in this field on a given check is greater or less than ten, that check will be deposited in the reject stacker 71.

(4) *Multiple read in selected field.*—If, while the selected field on a given check is being read, the character reader 12 develops a "multiple read" signal, the check will be deposited in the reject stacker 71.

(5) *Noise in selected field.*—If, while the selected field on a check is being read, the character reader 12 detects an excessive noise level, the check will be deposited in the reject stacker 71. In addition to the above errors, a reject command from the associated equipment 14 will cause a check to be deposited in the reject stacker 71. Such a command will ordinarily be utilized when the sorter-reader 10 is operating in the process mode.

The sorter-reader 10 may operate in either the sort mode or the process mode. Its mode of operation is selected by means of the mode switch 31 on the control panel 25. In the sort mode, the sorter control 13 makes all sort decisions. In the process mode, either the associated equipment 14 or the sorter control 13 may make the sort decisions.

For the sort mode operation of the sorter-reader 10, the field and digit selector buttons 32 to 52 on the control panel 25 are provided to determine the field of information on the checks handled, and the digit within that field, that are to control the sorting of the checks. The information provided by actuation of these selector buttons 32 to 52 is sent to the sorter control 13 to enable it to make the sort decisions.

When the drive system of the sorter-reader 10 is turned on by the operator, the timing device 19 (FIGURE 2B) will start to rotate, causing magnetic pickup pulses to be generated. A magnetic pickup pulse will be generated each time the timing device 19 could have advanced a check. The magnetic pickup pulses are sent to the sorter control 13, where they are used in the generation of other signals; that is, the control or synchronizing signals. They are also sent to the associated equipment 14 by way of the sorter control 13. The magnetic pickup pulses are also used in the electronic memory (FIGURES 52 to 62) of the instant invention.

When the check feed system of the sorter-reader 10 is turned on, the feed signals sent to the sorter control 13 will depend upon the mode of operation and the type of document processing to be done. In the Sort mode, a feed signal is generated in the sorter-reader 10 and sent to the sorter control 13. In the sorter control 13, this feed signal is used in conjunction with the magnetic pickup pulses to generate signals used by vacuum feed and paper deflection solenoids, and for a limiting resistor associated with these solenoids. In the Process mode, any one of three signals—continuous feed, computer demand feed, or manual entry—may be sent to the sorter control 13 from the associated equipment 14. The continuous feed signal will cause the sorter-reader 10 to be affected in the same manner as does the feed signal when the sorter-reader 10 is operating in the Sort mode. The computer demand feed signal allows checks to be processed singly, as fast as the associated equipment is ready to accept the information read from them. The manual entry signal is used to generate the synchronizing signals, without the processing or feeding of the checks, for the use of the associated equipment 14.

As each check is fed, it will pass the photocell 90 (FIGURE 2B) located in the media sorter 11, and a check presence signal will be developed. This check presence signal is used in the sorter control 13 in conjunction with the magnetic pickup pulses, to generate three synchronizing signals, a transfer ready signal, and a total item count signal. The three synchronizing signals are used to synchronize the operation of the sorter-reader 10, while the total item count signal is used to actuate the total counters provided for keeping a count of the number of checks processed by the sorter-reader 10. The first synchronizing signal is used to reset the sorter control 13 so that it can process the information read from a check. The second synchronizing signal is used to clear the output memory of the sorter control 13, preparing it to receive from its input memory the sort decision for the last check read. The third synchronizing signal is used to interrogate the special sort circuit of the sorter control 13, and it is also sent to the electronic memory. A fourth synchronizing signal is developed and is used to transmit the sort decisions from the output memory of the sorter control 13 to the media sorter 11, when a mechanical memory is used to delay the effect of the sort decisions.

As each check passes the reading device 20 (FIGURE 2B), an unblanking signal from the character reader 12 allows the reading of the magnetic characters thereon. Fourteen character lines are provided to bring character information to the sorter control 13 from the character reader 12. Ten of these lines (FIGURE 17) are provided for the ten decimal digits (0 to 9), and four lines (FIGURE 11 are provided for the four special symbols (Q1 to Q4) that may be located on a check. As the character reader 12 reads each digit or symbol from a check, it sends an electrical impulse by way of the appropriate character line to the sorter control 13.

Within the sorter control 13, the special symbols (Q1 to Q4) are used to define the data fields as they are read from a check. The sorter control 13 uses the special symbol signals as they occur, but the decimal digit signals are converted to their binary-coded equivalents. For this purpose, four or eight binary digit lines are used in the sorter control 13.

As each field of information on a check is defined by use of the special symbols (Q1 to Q4), it is compared with the settings of the field selector buttons 32 to 38 and their associated switches in order to determine whether it is the field selected by the operator in which a sorting operation is to occur. Only the information from the selected field is utilized further by the sorter control 13. Within the selected field, the information concerning the digits is counted as it arrives from the character reader 12. This count is constantly compared with the settings of the digit selector buttons 39 to 52 and their associated switches (FIGURES 15 and 16) in order to determine the digital place selected by the operator on which a sorting operation is to occur. Only the information concerning the selected digit is utilized further by the sorter control 13.

If the sorter-reader 10 is conditioned to operate in the Process mode, the sort decision may be obtained from the associated equipment 14. In this case, the information concerning the digit selected by the sorter control 13 is not utilized. If the sorter-reader 10 is conditioned to operate in the Sort mode, but the check is to be deposited in the special sort stacker 60 or the reject stacker 71, the information concerning the selected digit will not be utilized. The information concerning the selected digit will therefore be used as a sort decision or sorting control signal only when the sorter control 13 is conditioned to make the sort decision and a decimal sort is permitted.

Whether the sort decision is made by the sorter control 13, or is generated externally by the associated equipment 14 and then is supplied to the sorter control 13, it is initially in binary coded decimal form within the sorter control 13. It may be made available to the associated equipment 14 in binary coded decimal form. The sort decision is decoded or translated to decimal form in the sorter control 13 before it is applied to the proper one of eleven stacker lines leading to the gate mechanisms associated with the stackers 60 to 70. A decoding network is provided in the sorter control 13 to accomplish this decoding. The resulting or stacker decision output of the decoding network is applied by way of the appropriate stacker line to the mechanical memory. The output of the mechanical memory will operate the appropriate stacker gate mechanism at the proper time, so that the check will be deposited in its associated stacker.

In accordance with the instant invention, the decoding network and the mechanical memory may be replaced with an electronic memory. The sort decision in binary-coded decimal form is applied to the electronic memory, which both decodes the sort decision and releases it at the proper time to operate a stacker gate mechanism.

3. VOLTAGE LEVELS

The two basic voltage levels which are used to represent logic conditions (True and False) in the sorter-reader 10 are −12 volts and 0 volts (ground), respectively.

4. SORTER CONTROL—BLOCK DIAGRAM DESCRIPTION (FIGURES 4 to 6)

Referring now to FIGURES 4, 5, and 6, the sorter control 13 comprises the following functional groups of circuits: the amplifier circuits 100, the feed system 101, the synchronization signal generator 102, the jam detector circuit 103, the field selector circuit 104, the input encoder 105, the digit selector circuit 106, the input memory 107, the reject circuit 108, the special sort circuit 109, the output memory 110, the output decoder 111, and the mechanical memory 112. When the electronic memory 113 is utilized, then the output decoder 111 and the mechanical memory 112 may be dispensed with.

The amplifier circuits 100 receive various input signals and shape them for use elsewhere in the sorter-reader 10 and the associated equipment 14. When the synchronizer wheel 19 in the media sorter 11 rotates, magnetic pickup pulses 117 (FIGURE 4) are generated. These magnetic pickup pulses 117, positive then negative, beginning 80 milliseconds apart, are applied to the amplifier circuits 100. In response to these magnetic pickup pulses 117, the amplifier circuits 100 develop positive and negative magnetic pickup pulses 118 and 119, respectively, each having a duration of 4 milliseconds and occurring every 80 milliseconds. The magnetic pickup pulses 118 are sent to the synchronization signal generator 102. The magnetic pickup pulses 119, also shown in FIGURES 20 to 26 inclusive, are sent to the synchronization signal generator 102, to the jam detector circuit 103, to the electronic memory 113 (FIGURE 6), to the feed system 101, and to the associated equipment 14.

As each check passes the check presence photocell 90 (FIGURES 1 and 35), a negative signal 122 is produced. The signal 122 lasts from the time that the leading edge of a check passes the photocell 90 until its trailing edge passes it. In response to each of these negative signals 122, the amplifier circuits 100 develops a positive 0.5-millisecond check presence pulse 120 (FIGURE 4) corresponding to the leading edge of the negative input signal from the photocell 90. This check presence pulse 120, also shown in FIGURES 21C and 24C, is sent to the synchronization signal generator 102 and to the associated equipment 14.

A positive 55-millisecond unblanking pulse 121 (FIGURE 21H) from the character reader 12 is also applied to the amplifier circuits 100. In response to this unblanking pulse 121, the amplifier circuits 100 develop a negative signal 123, of less than 2 milliseconds, which is sent to the associated equipment 14. This negative signal 123 coincides with the trailing edge of the unblanking pulse 121.

As each check passes a reject counter photocell 785 (FIGURE 34), situated in the reject stacker or pocket 71 (FIGURE 1), a positive signal 124 (FIGURES 4 and 7) is produced, which lasts from the time that the leading edge of a check passes the photocell 785 until its trailing edge passes it. In response to each of these positive signals 124, the amplifier circuits 100 develops a 25-millisecond negative signal 125 (FIGURES 4 and 7), which is applied via a driver 161 (FIGURE 7) and a power amplifier 162 (FIGURE 7) to the reject item counter solenoid 163 (FIGURE 30).

A negative 3-millisecond computer demand pulse 126 from the associated equipment 14 is also applied to the amplifier circuits 100. In response to the negative magnetic pickup pulses 119, a negative 500-millisecond signal 126 (FIGURE 7) is developed. This signal 127 is differentiated, and the resulting negative signal 128 is sent to the feed system 101. The signal 128 is called the test demand signal. In response to the pulse 126 and the negative magnetic pickup pulses 119, a negative signal 129 (FIGURES 4 and 7) is sent to the feed system 101. This negative signal 129 is called the computer or associated equipment demand signal.

The feed system 101 receives inputs from the media sorter 11 when the sorter-reader 10 is operating in the sort mode, or from the associated equipment 14 when the sorter-reader 10 is operating in the process mode, some by way of the amplifier circuits 100. The feed system 101 develops signals from controlling the feeding of checks from the platform 16 of the media sorter 11.

The feed start-stop signal 130 comprises a start signal 131 (−12 volts) and a stop signal 132 (0 volts). This start-stop signal 130 is applied to the feed system 101. The feed system 101 also receives the negative magnetic pickup pulse 119, the test demand signal 128, and the computer demand signal 129 from the amplifier circuits 100. In addition, a continuous feed start-stop signal 133 from the associated equipment 14 is applied to the feed system 101. The continuous feed start-stop signal 133 comprises a start signal 134 (−12 volts and a stop signal 135 (0 volts).

When the sorter-reader 10 is operating in the sort mode, as determined by sections 136 and 137 (FIGURE 8) of the mode switch 31, the feed system 101 may provide for either normal continuous feed of checks (Feed Start-Stop) or a slow feed of checks (Test Demand Feed). When the sorter-reader 10 is operating in the process mode, the feed system 101 may provide for either normal continuous feed of checks (Continuous Feed) or intermittent feed of checks (Computer Demand Feed) controlled by the associated equipment 14. The feed system 101 has three outputs. Two of these outputs control the energization of the paper deflection solenoid 139 (FIGURE 30) and the feed solenoid 140 (FIGURE 30), respectively. The third output is connected to a limiting resistor 141 (FIGURE 30).

The synchronization signal generator 102 receives the positive magnetic pickup pulses 118, the negative magnetic pickup pulses 119, and the signal 120 from the amplifier circuits 100. It also receives a negative manual entry signal 138 (−12 volts) from the associated equipment 14 when the sorter-reader 10 is operating in the process mode. It develops a first negative synchronization signal 145 (FIGURES 9 and 21D) having a duration of 10.4 milliseconds, a second negative synchronization signal 146 (FIGURES 9, 21F, and 82B) having a duration of 18 milliseconds, a third negative synchronization signal 158 (FIGURES 9 and 82I) having a duration of 30 microseconds, and a fourth positive synchronization signal 147 having a duration of 4 milliseconds (FIGURES 9, 21G, and 24K).

The synchronization signal 145 is applied to the differentiator circuit 148 (FIGURE 9) to develop a signal 149 (FIGURES 4 and 9), which is sent to the character reader 12.

The synchronization signal 145 is also applied to the differentiator inverter 200 (FIGURE 9) to develop a positive signal 150, having a duration of less than one millisecond, which is sent to the field selector circuit 104, the digit selector circuit 106, the input memory 107, the reject circuit 108, and the special sort circuit 109.

The synchronization signal 146 is applied via driver 151 (FIGURE 9) and power amplifier 152 (FIGURE 9) to the total item counter solenoids 153 and 154 (FIGURE 30). Thus, a negative signal 92 (FIGURE 4), having a duration of 18 milliseconds, is applied to the solenoids 153 and 154.

The synchronization signal 146 is also applied to a differentiator inverter 477 (FIGURE 9), and its positive output signal 93 (FIGURES 4 and 9) is sent to the reject circuit 108 (FIGURE 5) and the output memory 110 (FIGURE 6).

Figure 18:
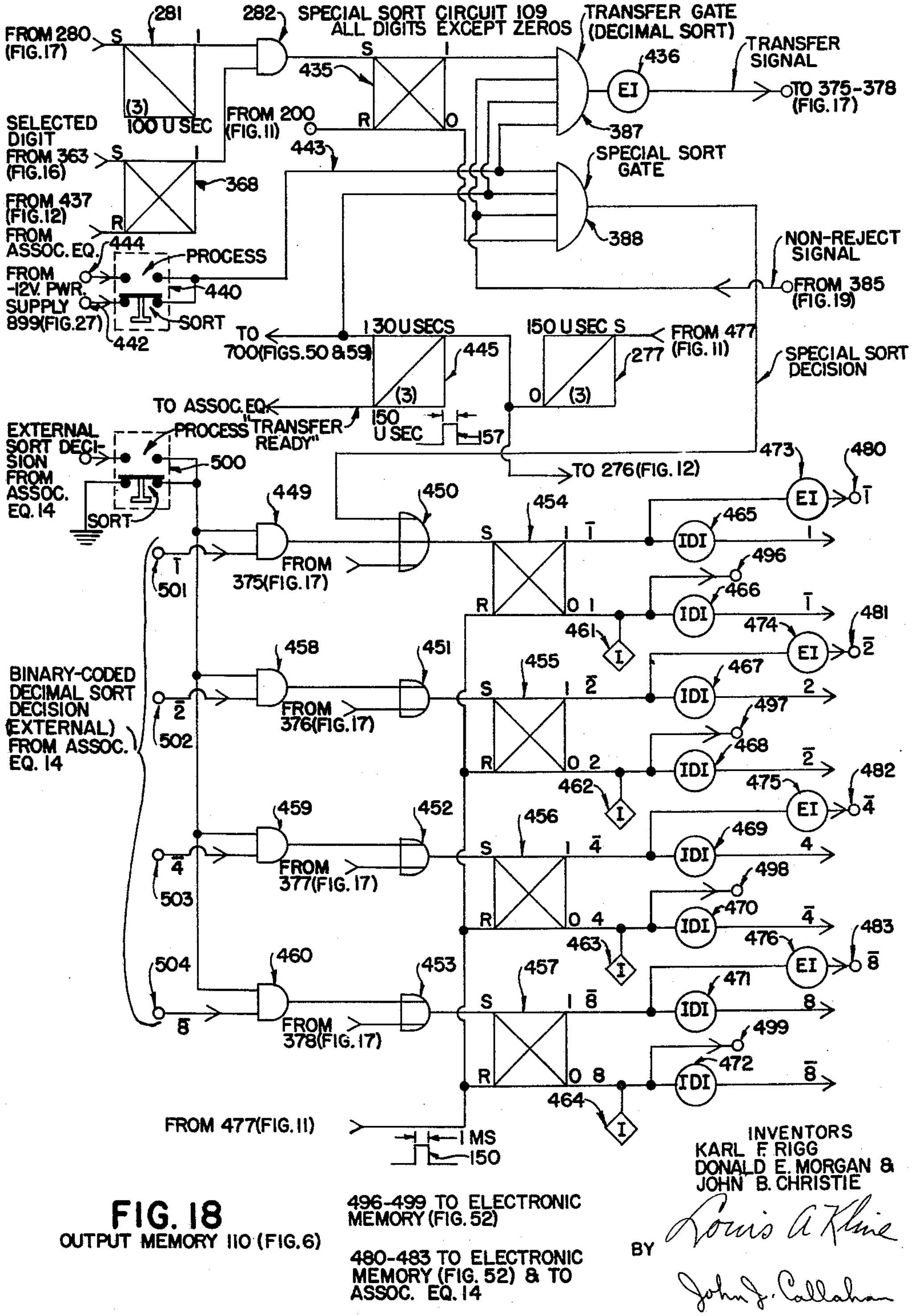

The signal 93 is also sent via emitter follower 155 (FIGURE 9) to the associated equipment 14. The signal 93 is further sent to the one-shot circuit 277 (FIGURES 9 and 18). The positive output 156 (FIGURES 4 and 9) of the one-shot circuit 277, having a duration of 150 microseconds, is sent to the field selector circuit 104 (FIGURE 5) and to the one-shot circuit 445 (FIGURES 9 and 18). The positive output 157 (FIGURES 4 and 9) of the one-shot circuit 445 is called the "Transfer Ready" signal, and it is sent to the associated equipment 14. The negative output 158 (FIGURE 4) of the one-shot circuit 445 is the third synchronization signal, and it is sent to the electronic memory 113 (FIGURE 6) and to the special sort circuit 109 (FIGURE 5).

The fourth positive synchronization signal 147 is applied via the differentiator inverter 159 (FIGURES 9 and 11) to the 15-millisecond one-shot circuit 160 (FIGURE 9). The negative output of the differentiator inverter 159 is sent to the associated equipment 14. The 15-millisecond positive output of the one-shot circuit 160 is sent to the inverter 538 (FIGURES 9 and 11). The 15-millisecond negative output 182 of the inverter 538 is sent to the output decoder 111 (FIGURE 6).

The jam detector circuit 103 receives the signal 119 from the amplifier circuits 100, and negative signals from the jam photocells 628 to 631 (FIGURE 43). The jam detector circuit 103 determines if jamming of the checks being fed and passed has occurred. When a jamming is detected, the jam detector circuit 103 sends a negative signal to the jam solenoid K208 (FIGURE 30), and the feeding and passing of checks is terminated.

Figure 13:
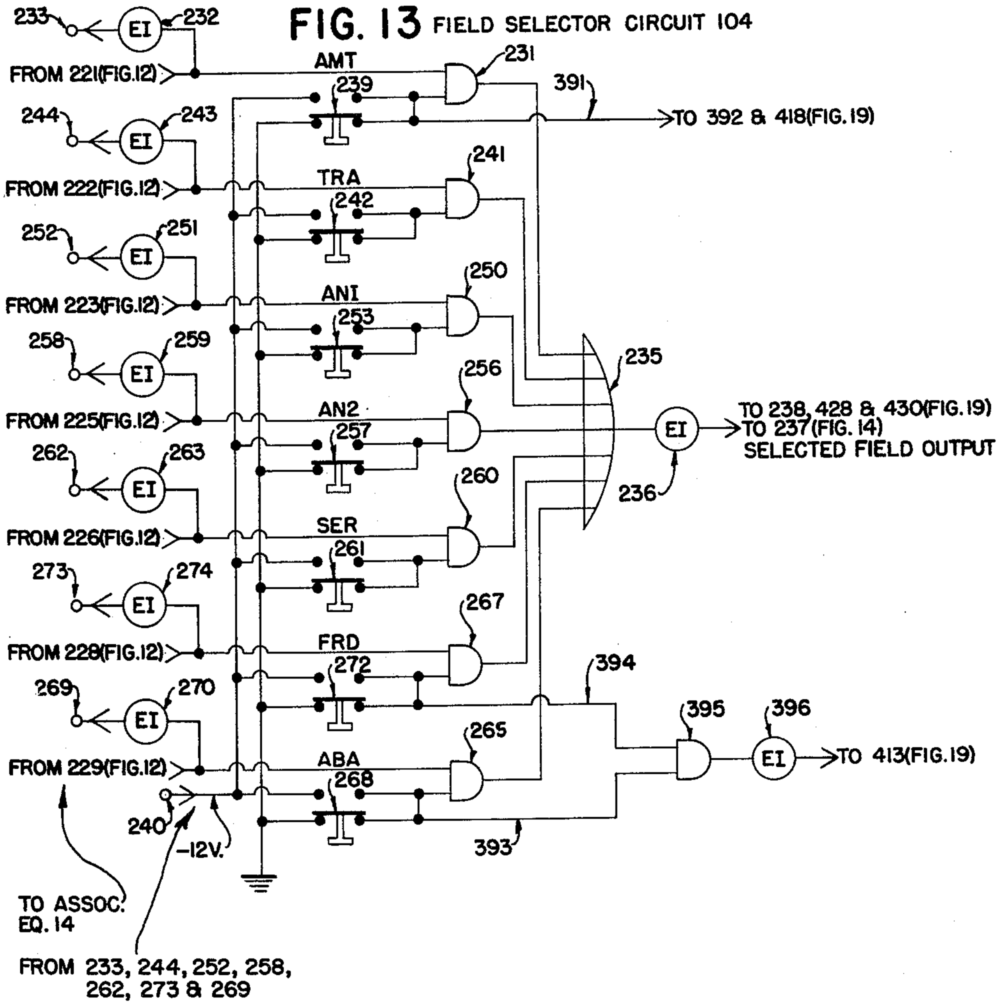

The field selector circuit 104 (FIGURE 5) is reset by the signal 150 before the reading of each check by the character reader 12. It receives the special symbol signals (Q1, Q2, Q3, and Q4) from the character reader 12 and utilizes them to define the time of reading of each field found on a check. It utilizes the information from the field selector switches 239, 242, 253, 257, 261, 268, and 272 (FIGURE 13). These field selector switches are set by an operator to select the time of reading of the field chosen for sorting checks on. The activity of the field selector circuit 104 is terminated when the signal 156 is applied to it, after the reading of a check is finished.

The input encoder 105 (FIGURE 5) functions at all times and is never reset. It translates the digit character signals received from the character reader 12 on ten decimal lines (0 to 9) to digit character signals on four binary lines ($\bar{1}$, $\bar{2}$, $\bar{4}$, and $\bar{8}$). These binary-coded decimal digit character signals are sent to the input memory 107 and to the associated equipment 14. It also sends the digit character signals, as received in their original form from the character reader 12, to the digit selector circuit 106. It also sends all decimal digit character signals, except zeroes, to the special sort circuit 109.

Figure 15:
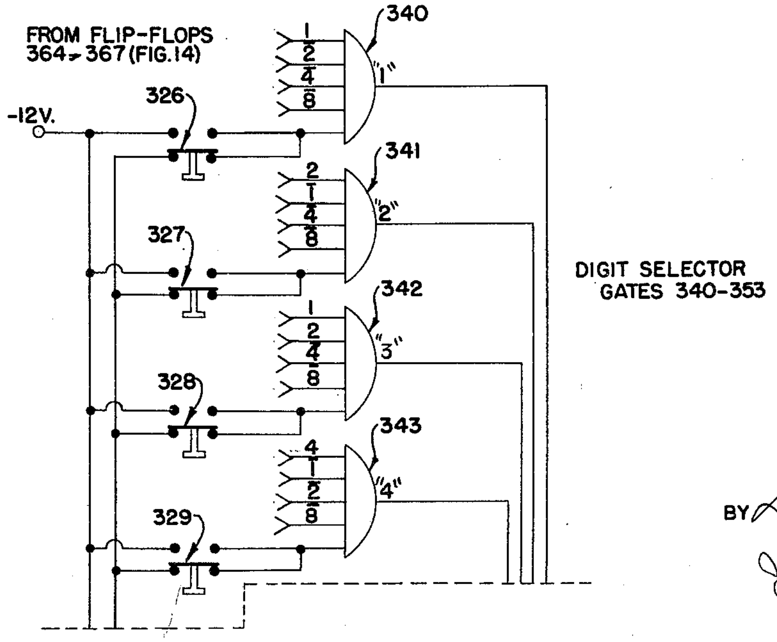
Figure 16:
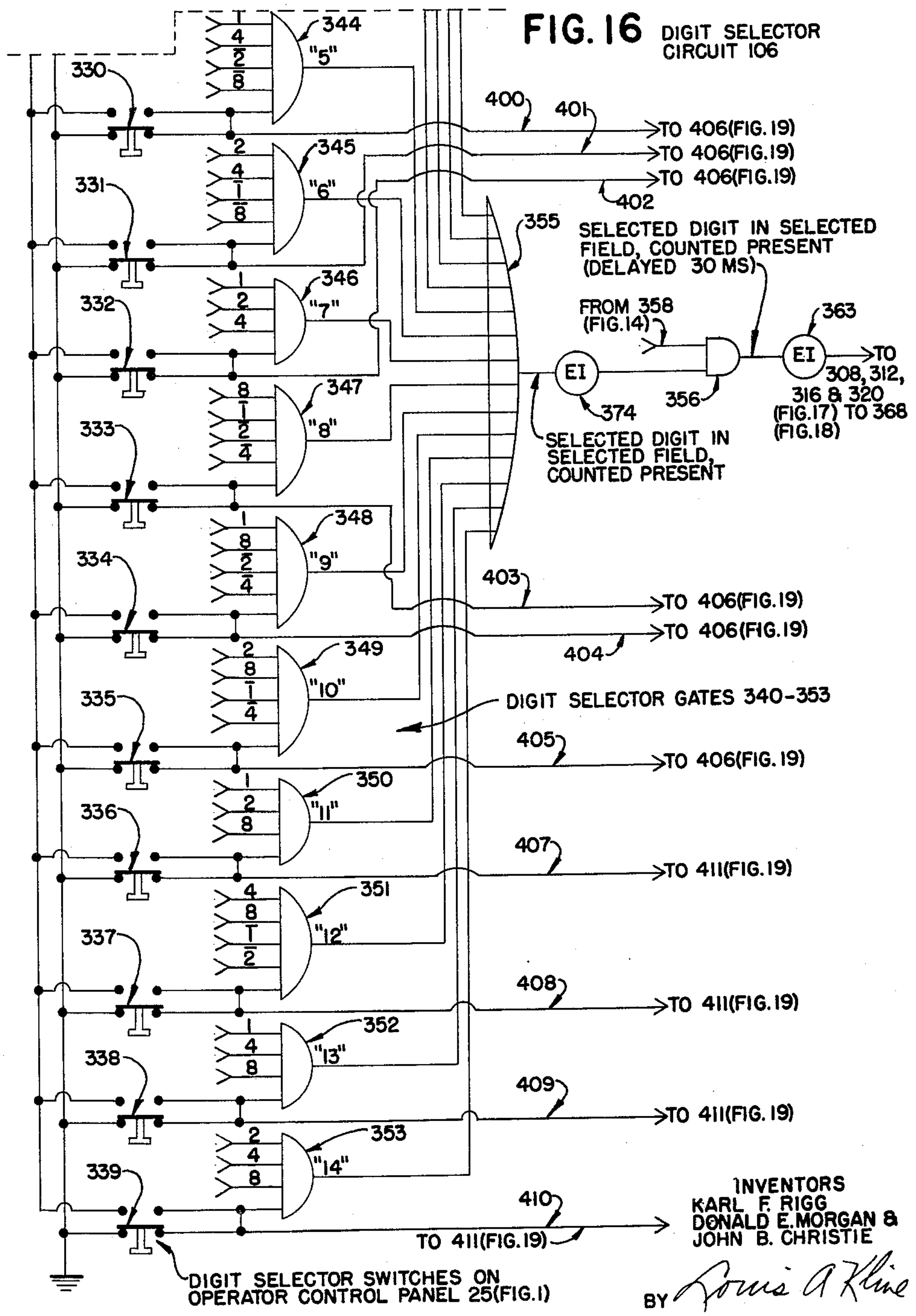

The digit selector circuit 106 (FIGURE 5) is reset by the signal 150. It receives the decimal digit character signals, except zeros, from the input encoder 105 and the selected field signal from the field selector circuit 104 to count, in effect, the characters in the selected field on each check read. It utilizes the information from the digit selector switches 326 to 339 (FIGURES 15 and 16). These digit selector switches are set by an operator to select from the decimal digit character signals of the selected field one digit character signal corresponding to the digit character of the check chosen for sorting on.

The input memory 107 is also reset by the signal 150. It retains each binary-coded digit character received from the input encoder 105 for a time long enough to determine whether it is the digit character selected for sorting on. This determination is made by the selected digit character signal received from the digit selector circuit 106. If the digit character is the selected digit, then it is transferred to its memory, where it remains until the input memory 107 is reset by the next one of the signals 150. The selected digit information is available to the output memory 110.

The reject circuit 108 is also reset by the signal 150. When the reject circuit 108 is reset, it applies a non-reject signal to the special sort circuit 109. It remains reset unless input information calls for a rejection of the check. This input information may include the digit count signal from the digit selector circuit 106, the selected field signal from the field selector circuit 104, the multiple read signal from the character reader 12, the field selector signals from the field selector switches 239, 242, 253, 257, 261, 268, and 272 (FIGURE 13), the digit selector signals from the digit selector switches 326 to 339 (FIGURES 15 and 16), and the reject command signal from the associated equipment 14. If one of the conditions—that is, Operator Error, Field Not Present, Incorrect Number of Digits in the Amount Field, Multiple Read in the Selected Field, Noise in the Selected Field—which have been described previously is detected by the reject circuit 108, then a reject signal will be developed. Then, upon the receipt of the signal 93, the non-reject signal applied to the special sort circuit 109 is terminated, and a reject signal is sent to the associated equipment 14.

The special sort circuit 109 is also reset by the signal 150. When the special sort circuit 109 is reset, it holds a special sort decision signal ready to be sent to the output memory 110. During the reading of a check, it receives all digit character signals, except zero digit character signals, from the input encoder 105. It also receives the selected digit character signal from the digit selector circuit 106, and the special symbol (Q1, Q2, Q3, and Q4) signals from the character reader 12. The special sort circuit 109 actually functions only from the time it receives the selected digit character signal until the time that it receives the next special symbol signal denoting the end of the selected field. If any digit character signals received during this time (selected digit character signal included) are not zeros, the special sort decision signal will be terminated, and the transfer signal will be developed. If all the digit character signals examined are zeros, then the special sort decision signal will be maintained. The special sort decision signal or the transfer signal is sent to the output memory 110 upon the receipt of the third synchronization signal 158 if the mode switch 31 is in its sort position, thus permitting an internal decision to be made by the sorter control 13, and if the non-reject signal from the reject circuit 108 is present. The receipt of the third synchronization signal 158 occurs after the last symbol has been read from a check.

The output memory 110 is reset by the signal 93. It receives the selected digit signal from the input memory 107, the special sort decision signal from the special sort circuit 109, or either the decimal or special sort decision signal from the associated equipment 14. Only one of these signals is permitted to pass into the memory of the output memory 110. If the check is to be rejected, then none of these signals will pass into the memory of the output memory 110. The decimal or special sort decision signal from the associated equipment 14 is applied to the output memory 110 if section 500 (FIGURE 18) of the mode switch 31 is in its process position. The information (sort decision) in the memory of the output 110 is available to the output decoder 111 or to the electronic memory 113.

The output decoder 111 functions all the time the sorter-reader 10 is operating, and it is never reset. It translates the sort decision retained in the output memory 110 from an eight binary line representation (1, $\bar{1}$, 2, $\bar{2}$, 4, $\bar{4}$, 8, and $\bar{8}$) to one of eleven stacker (pocket) lines. If the check is to be rejected, then all the eleven stacker lines will be Off (at 0 volts). Upon the receipt of the signal 182 from the synchronization signal generator 102 (FIGURE 4), the output decoder 111 will transmit the special sort stacker signal to the special sort item counter 115, which includes the solenoid 552 (FIGURE 30), and to the special sort gate solenoid 550 (FIGURE 30) via emitter follower 516 (FIGURE 20), driver 527 (FIGURE 20), and power amplifier 551 (FIGURE 30).

Upon the receipt of the signal 182, the decimal ("0" to "9") sort stacker signals will be transmitted via emitter followers 517 to 526 (FIGURE 20), respectively, to the mechanical memory 112. From the mechanical memory 112, the decimal sort stacker signals are transmitted via lines "0" to "9" (FIGURE 6) and a power amplifier, such as the power amplifier 553 (FIGURE 30) to the "0" to "9" gate counters 116 (FIGURE 6) and to the "0" to "9" gate solenoids, such as the "0" gate solenoid 554 (FIGURE 30). The counters 116 each include a counter solenoid, such as the "0" counter solenoid 555 (FIGURE 30). The mechanical memory 112 comprises ten memory switches, such as the "0" memory switch 556 (FIGURE 30).

When the electronic memory 113 is used in place of the mechanical memory 112, the special sort stacker signals and the decimal ("0" to "9") sort stacker signals will be transmitted via lines "SS" and "0" to "9" to the special sort item counter 115, to the "0" to "9" item counters 116, and to the "0" to "9" gate solenoids, such as the "0" gate solenoid 557 (FIGURE 30). The ten memory switches, such as the memory switch 556 (FIGURE 30), will not be included in the gate solenoid circuits when the electronic memory 113 is used. Of course, a power amplifier, such as the power amplifier 553 (FIGURE 30) will be provided for each of the counter and gate solenoid circuits. The electronic memory 113 also receives, as inputs, the negative magnetic pickup pulse 119 from the amplifier circuits 100 (FIGURE 4), and the third synchronization signal 158 from the synchronization signal generator 102 (FIGURE 4).

5. SORTER CONTROL—SCHEMATIC BLOCK DIAGRAM DESCRIPTION

(FIGURES 7 to 20)

(1) *Magnetic Pickup Pulses*

(FIGURE 7)

When the Drive On button 27 (FIGURE 2A) is depressed, the synchronizer wheel 19 will rotate, and the magnetic pickup pulses 117 will be developed. These pulses 117 are initially differentiated waveshapes (positive and then negative) and begin 80 milliseconds apart. They are sent to the amplifier 168 (FIGURE 7), which amplifies and clips only their negative going portions. The resulting negative outputs of the amplifier 168 are applied to the "S" input of the 4-millisecond one-short circuit 169 to cause it to be set and transferred to its unstable state. When the one-short circuit 169 is set, the positive signal 118 appears at its "0" output, and it is applied to the "R" input of the flip-flop 590 (FIGURE 9). When the one-short circuit 169 is set, a negative signal appears at its "1" output, and it is applied to the emitter follower 170. The negative signal 119 from the emitter follower 170 is applied to the "AND" gates 565 and 578 (FIGURE 8), to the "R" input of the flip-flop 592 (FIGURE 9), and to the "AND" gate 593 (FIGURE 9), to the "S" inputs of the one-short circuits 608 and 610 (FIGURE 10), and to the associated equipment 14.

The signal 119 will reset the flip-flop 171, producing a negative signal 677 (FIGURE 23C), which is applied to the differentiator circuit 172. The negative signal (Computer Demand) 129 (FIGURES 7 and 23B) from the differentiator circuit 172 is applied to section 137 (FIGURE 8) of the mode switch 31. The flip-flop 171 will remain in its reset state until the negative signal 126 (Computer Demand Feed Signal) is applied to its "S" input from the associated equipment 14. This setting of the flip-flop 171 will occur only when the sorter-reader 10 is operating in the process mode. The receipt of a signal 126 will set the flip-flop 171. The next signal 119 following the signal 126 will reset the flip-flop 171 again.

The signal 119 is also applied to the "S" input of the 500-millisecond one-shot circuit 180 to trigger it to its unstable state. Thus, a negative signal 127 having a duration of 500 milliseconds will be developed at the "1" output of the one-shot circuit 180 at this time. The first six of the signals 119, following the one which triggers the one-shot circuit 180, will have no effect on the one-shot circuit 180. However, the seventh one of the signals 119, which occurs 560 milliseconds later than the triggering signal, will again trigger the one-shot circuit 180, which will have returned to its stable state at this time. Consequently, the "1" output of the one-shot circuit will be On (−12 volts) for 500 milliseconds and Off (0 volts) for 60 milliseconds, out of every 560-millisecond period while the signals 119 are being generated. The negative output signal 127 of the one-shot circuit 180 is applied to the differentiator circuit 173, and the negative output signal 128 (Test Demand) from the differentiator circuit 173 is sent to section 562 (FIGURE 8) of the automatic feed switch 561.

(2) *Feed System*

(FIGURE 8)

There are several ways in which the feed system 101 may operate. These are defined as Normal Feed, Test Demand Feed, Continuous Feed, and Computer Demand Feed. Normal Feed and Test Demand Feed may occur when the sorter-reader 10 is operating in the sort mode, while Continuous Feed and Computer Demand Feed may occur when it is operating in the process mode.

(2.1) *Normal Feed*

Assume that the sections 136 and 137 (FIGURE 8) of the mode switch 31 are turned to their sort positions and that the sections 560 and 562 of the automatic feed switch 561 are turned to their Off positions. Under these conditions, ground potential is supplied through the section 562 of the automatic feed switch 561, the section 137 of the mode switch 31, and the emitter follower 576 to the "AND" gate 577. The "AND" gate 577 will not develop a negative output, regardless of the voltage appearing on its other input line.

With the Drive On button 27 (FIGURE 2A) depressed, the negative magnetic pickup signals 119 from the emitter follower 170 (FIGURE 7) will be applied to the "AND" gates 565 and 578. A negative voltage appears on the other input to the "AND" gate 565, since the zero voltage output of the "AND" gate 563 is inverted by the inverter 564 before being applied thereto. Consequently, a negative voltage output (FIGURE 22H) from the "AND" gate 565 is applied to the "R" input of the flip-flop 566 each time a magnetic pickup signal 119 is developed. These magnetic pickup signals 119 assure that the flip-flop 566 is reset. With the flip-flop 566 reset, a negative voltage (−12 volts) is not produced at its "1" output.

When the Feed On button 29 (FIGURE 2A) is depressed, a continuous negative voltage, the feed start signal 134 (FIGURE 4), from the −12-volt regulator 899 (FIGURE 27) is applied directly to the "AND" gates 563, 577, and 578 and, through the section 560 of the automatic feed switch 561 and the section 136 of the mode switch 31, to the "AND" gates 563 and 578. The output of the "AND" gate 563 will now be negative (−12 volts). This negative output is applied to the inverter 564, and the positive output (FIGURE 22G) thereof is applied to the "AND" gate 565, thus preventing further magnetic pickup signals 119 from passing through this "AND" gate 565.

Meanwhile, the two continuous negative voltages applied to the "AND" gate 578 allow the magnetic pickup signals 119 to pass through this "AND" gate (FIGURE 22B) and the "OR" gate 579 (FIGURE 22B) to the "S" input of the 64-millisecond one-shot circuit 580. Each magnetic pickup signal 119 will trigger the one-shot circuit 580 to its unstable state. The "0" output (FIGURE 22C) of the one-shot circuit 580 will be at 0 volts for 64 milliseconds, and then it will be at −12 volts for 16 milliseconds before another input signal will cause the cycle to be repeated. The negative output of the one-shot circuit 580 is applied to the "S" input of the flip-flop 566 to set it, and is also applied to the "S" input of the 60-millisecond one-shot circuit 581 to trigger it to its unstable state.

When the flip-flop 566 is set, its "1" output becomes negative (FIGURE 22I). Thus, both inputs to the "AND" gate 567 will be negative, and accordingly the "AND" gate 567 will produce a continuous negative output voltage (FIGURE 22J). The continuous negative output voltage of the "AND" gate 567 is sent through the "OR" gate 568 (FIGURE 22K) and the emitter follower 569 to three places. First, it is applied via the driver 570 and the power amplifier 571 to the feed solenoid 140 (FIGURE 30) to energize it (FIGURE 22L). Second, it is applied via the driver 574 and the power amplifier 575 to the paper deflection solenoid 139 (FIGURE 30) to energize it. Finally, it is applied to the "S" input of the 50-millisecond one-shot circuit 583 to trigger it to its unstable state. When triggered, the "1" output of the one-shot circuit 583 will be at a negative voltage for 50 milliseconds, and then it will be at 0 volts as long as the Feed On button 29 is depressed. The negative voltage output of the one-shot circuit 583 is applied via the driver 572 and the power amplifier 573 across the limiting resistor 141 (FIGURE 30), which is connected in the energizing circuit for the paper deflection solenoid 139 (FIGURE 30). Thus, the negative output of the flip-flop 566, through the "AND" gate 567, causes the energization of the feed solenoid 140 and the paper deflection solenoid 139, and it assures that they will remain energized for most of the duration of a normal feed operation.

When the one-shot circuit 581 is triggered by the negative output of the one-shot circuit 580, a negative voltage is developed at its "1" output (FIGURE 22D), and its "0" output will be positive (0 volts) for 60 milliseconds. The negative voltage at its "1" output is applied to the "OR" gate 568. At the end of the 60-millisecond interval, the voltage at its "0" output will be negative. This negative voltage is applied to the "S" input of the 20-millisecond one-shot circuit 582 to trigger it and cause its "1" output to be at a negative voltage. The negative voltage (FIGURE 22E) at the "1" output of the one-shot circuit 582 is applied to the "OR" gate 568. Thus, during every 80-millisecond interval, the "1" output of the one-shot circuit 581 is at a negative voltage for 60 milliseconds and at 0 volts for 20 milliseconds, while the "1" output of the one-shot circuit 582 is at a negative voltage for 20 milliseconds and at 0 volts for 60 milliseconds.

Every magnetic pickup signal 119 occurring after the Feed On button 29 has been depressed causes the one-shot circuit 580 to be triggered to its unstable state. The one-shot circuit 580 establishes a delay time, so that the feeding of each check will occur at the proper point relative to the rotation of the synchronizer wheel 19 (FIGURE 1). The first magnetic pickup signal 119, thus delayed, will set the flip-flop 566. The negative voltage developed at the "1" output of the flip-flop 566, when it is set, actually causes the checks to be fed from the platform 16 (FIGURES 1 and 3) and maintains check feeding. Each magnetic pickup signal 119, thus delayed by the one-shot circuit 580, will trigger the one-shot circuit 581 to its unstable state, causing the one-shot circuit 582 to be triggered to its unstable state. The one-shot circuits 581 and 582 together assure that the time of feeding of the checks will occur at some multiple of 80 milliseconds.

When the Feed Off button 30 (FIGURE 2A) is depressed, the negative voltage from the "AND" gate 563 (FIGURE 22F) is terminated. This will cause the negative voltage output from the "AND" gate 567 (FIGURE 22J) to be terminated. A negative voltage input will be provided for the "AND" gate 565. The negative voltage output from the "AND" gate 578 (FIGURE 22B) will also be terminated, so that no more of the magnetic pickup signals 119 can be passed by the "AND" gate 578 to trigger the one-shot circuit 580. The next magnetic pickup signal 119 will instead be passed by the "AND" gate 565 (FIGURE 22H) to the flip-flop 566 to reset it.

The last magnetic pickup signal 119, occurring before the Feed Off button 30 (FIGURE 2A) was depressed, will have triggered the one-shot circuit 580 to its unstable state. The one-shot circuit 580, in turn, will have triggered the one-shot circuit 581. The one-shot circuit 581, in turn, will have triggered the one-shot circuit 582. The one-shot circuits 580, 581, and 582 together assure that a negative signal will be applied through the "OR" gate 568 and the emitter follower 569 to energize the feed solenoid 140 (FIGURE 30) and the paper deflection solenoid 139 (FIGURE 30) long enough to properly advance the last check, regardless of the time at which the operator depressed the Feed Off button 30.

In FIGURE 22A, it is seen that five magnetic pickup signals 119 have occurred between the Feed On and the Feed Off times. The solenoids 139 and 140 were energized by the paper deflection solenoid pulse (FIGURE 22M) and the feed solenoid pulse (FIGURE 22L), respectively, for 400 milliseconds (80 milliseconds per interval x 5 intervals), thereby causing five checks to be fed. If the one-shot circuits 581 and 582 were not included in the feed system 101, the solenoids 139 and 140 would have been energized for only 336 milliseconds, which time corresponds to the time that the flip-flop 566 was in its set state. This condition would not have permitted the fifth check to be properly fed from the platform 16.

(2.2) *Test Demand Feed*

Now, assume that sections 560 and 562 of the automatic feed switch 561 are turned to their On positions. Thus, the "AND" gates 563 and 578 will have one of their inputs connected to ground potential, and so neither of them can produce a negative output. When the Drive On button 27 is depressed, the magnetic pickup signals 119 are developed. The signals 119 are applied to the "AND" gate 578, where they have no effect, and also to the "AND" gate 565. Since the inverted output of the inverter 564 is negative, the signals 119 will be passed by the "AND" gate 565 to the flip-flop 566. Thus the resetting of the flip-flop 566 is assured.

In the amplifier circuits 100, every seventh magnetic pickup signal 119 will trigger the 500-millisecond one-shot circuit 180 (FIGURE 7) to its unstable state (FIGURE 25B). The differentiated negative output signal 128 (Test Demand Feed signal) from the differentiator circuit 173 (FIGURE 7) is applied to one input of the "AND" gate 577 (FIGURE 8) via section 562 of the automatic feed switch 561, via section 137 of the mode switch 31, and via emitter follower 576. Successive signals 128 occur 560 milliseconds apart.

When the Feed On button 29 (FIGURE 2A) is depressed, the negative feed start signal 131 (FIGURE 4) is applied to the "AND" gates 563, 577, and 578. The signal 131 will have no effect on the "AND" gates 563 or 578, but the signal 131 will now permit the Test Demand Feed signals 128 to pass through the "AND" gate 577 (FIGURE 25C) and the "OR" gate 579 to trigger the one-shot circuit 580 to its unstable state. The trailing edge of the "0" output of the one-shot circuit 580 (FIGURE 25D) will set the flip-flop 566 and trigger the 60-millisecond one-shot circuit 581 to its unstable state. The "1" output of the flip-flop 566 will be negative, but it will have no effect on the "AND" gate 567 at this time, as the other input to this "AND" gate from the "AND" gate 563 is positive. The flip-flop 566 is reset by the next magnetic pickup signal 119 applied thereto via "AND" gate 565. The flip-flop 566 thus remains in its set state only 16 milliseconds each time it is set by the output of the one-shot circuit 580. The one-shot circuit 581 will trigger the one-shot circuit 582 to its unstable state, and the one-shot circuits 581 and 582 together produce a negative 80-millisecond output signal (FIGURE 25E) from the "OR" gate 568, which is used to cause energization of the paper deflection and feed solenoids 139 and 140 (FIGURE 30), respectively. FIGURES 25(F) and 25(G) show the time that the feed solenoid 140 and the paper deflection solenoid 139 are energized.

Accordingly, every seventh magnetic pickup signal 119 is a Test Demand signal, which generates a 64-millisecond delay signal, which, in turn, generates an 80-millisecond signal for energizing the paper deflection and feed solenoids 139 and 140. Thus, every 560 milliseconds, a check is fed from the platform 16.

When the Feed Off button 30 (FIGURE 2A) is depressed, any further Test Demand signals will be prevented from passing through the "AND" gate 577. The last Test Demand signal to pass through the "AND" gate 577 before the Feed Off button 30 was depressed will generate its 64-millisecond delay signal and produces its 80-millisecond output. The first magnetic pickup signal 119 after the Feed Off button 30 is depressed will pass through the "AND" gate 565 and set the flip-flop 566.

(2.3) *Continuous Feed*

Now, assume that the sections 136 and 137 of the mode switch 31 are turned to their process positions, and that the sections 560 and 562 of the automatic feed switch 561 are turned to their Off positions.

The Continuous Feed from the associated equipment 14 is essentially the same as Normal Feed, described heretofore. In Continuous Feed, the negative feed start signal 134 (FIGURE 4) is applied from the associated equipment 14 via section 136 of the mode switch 31 to the "AND" gates 563 and 578. Aside from this, the operation of the logic of FIGURE 8 is the same as in Normal Feed.

The "O" output of the flip-flop 171 (FIGURE 7) is connected via differentiator circuit 172, section 137 of the mode switch 31, and emitter follower 576 to the "AND" gate 577. However, this "O" output does not vary, since the flip-flop 171 is not set during Continuous Feed by a Computer Demand signal from the associated equipment 14. When the first magnetic pickup signal 119 resets the flip-flop 171, after the Drive On button 27 (FIGURE 2A) is depressed, its "O" output swings negative. This negative swing is differentiated in the differentiator circuit 172 to form the negative signal 129 (FIGURES 4 and 7). The signal 129 is coupled to the "AND" gate 577 but does not pass through it. After this, the "O" output of the flip-flop 171 remains stable, so that the output from the differentiator circuit 172 is positive (O volts). This positive output will not permit a negative output from the "AND" gate 577 even after the Feed On button 29 is depressed.

(2.4) *Computer Demand Feed*

For Computer Demand Feed, the sections 136 and 137 of the mode switch 31 are in to their process positions, and the sections 560 and 562 of the automatic feed switch 561 are in to their Off positions.

When the Drive On button 27 (FIGURE 2A) is depressed, the magnetic pickup signals 119 are applied to the "AND" gates 565 and 578. The signals 119 will pass through the "AND" gate 565 to reset the flip-flop 566. In the amplifier circuits 100, the signals 119 will reset the one-shot circuit 171 (FIGURE 7).

When the Feed On button 29 (FIGURE 2A) is depressed, the negative feed start signal 134 (FIGURE 4) is applied from the associated equipment 14 to the "AND" gates 563, 577, and 578.

Then, when a Computer Demand feed signal 126 arrives from the associated equipment 14, it sets the flip-flop 171 (FIGURE 7). The negative voltage at the "O" output of the flip-flop 171 is terminated. This condition will persist until the next magnetic pickup signal 119 is developed, which resets the flip-flop 171, causing the voltage appearing at its "O" output to swing negative. This negative swing is differentiated in the differentiator circuit 172, and the negative signal 129 thus produced is applied to the "AND" gate 577 (FIGURE 8). Since the other input to the "AND" gate 577 is a negative voltage, a negative voltage output is developed which is applied via the "OR" gate 579 to trigger the one-shot circuit 580 to its unstable state. The subsequent operation of the feed system 101 is identical to that described heretofore for the Test Demand Feed operation.

Therefore, each Computer Demand Feed Signal 126 sets the flip-flop 171 (FIGURE 7). The magnetic pickup signal 119 following a Computer Demand Feed Signal 126 will reset the flip-flop 171, generating a negative signal 129, which ultimately triggers the 64-millisecond one-shot circuit 580 (FIGURE 8). The one-shot circuit 580 establishes a delay, following which the other two one-shot circuits 581 and 582 generate the 80-millisecond output (FIGURES 22E and 23F), which causes the energization of the paper deflection solenoid 139 and the solenoid 140 (FIGURE 30).

The Computer Demand Feed Signals 126 do not coincide with the magnetic pickup signals 119, since they have opposite effects on the flip-flop 171 (FIGURE 7) in the amplifier circuits 100. They also occur at least 80 milliseconds apart, since only one of them can be effective between the magnetic pickup signals 119.

(3) *Check Presence Signals*

(FIGURE 7)

As each check is fed from the platform 16 (FIGURES 1 and 2B), it is passed by the feed belts 17 and the reverse belts 18 to the synchronizer wheel 19. The synchronizer wheel 19 delivers the check at the proper time to the read area transport belts, which carry it through the read area 23 (FIGURE 2B). In the read area 23, the check will first pass the check presence photocell 90 (FIGURE 35). As it does so, the negative check presence signal 122 (FIGURE 7) is produced. The signal 122 lasts from the time that the leading edge of the check passes the photocell 90 until the trailing edge passes it. The signal 122 is applied to the amplifiers 167, 166, and 165 and to the emitter follower 164 in order. The signal 122 is both amplified and differentiated, so that at the output of the emitter follower 164 there appears the 0.5-millisecond positive signal 120 (FIGURE 7), which corresponds in time to the leading edge of the signal 122. The signal 120 is sent to the differentiator inverter 585 (FIGURE 9) of the synchronization signal generator 102 (FIGURE 4) and to the associated equipment 14.

(4) *Synchronization Signals*

(FIGURE 9)

The positive signal 120 (FIGURE 24C) from the emitter follower 164 (FIGURE 7) is applied to the differentiator inverter 585 (FIGURE 9). The negative voltage appearing at the output of the differentiator inverter 585 (FIGURE 24D) is then applied to one input of the "AND" gate 586. The voltage at the other input of the "AND" gate 586 is initially negative, since it is obtained from the "0" output of the 70-millisecond one-shot circuit 588, which is initially in its stable state. Hence, the negative output of the "AND" gate 586 will trigger the 10.4-millisecond one-shot circuit 587 to its unstable state. When in its unstable state, the "1" output of the one-shot circuit 587 will swing negative for 10.4 milliseconds. This negative signal 145 (FIGURES 9 and 24E) is the first synchronization signal. The signal 145 is applied to the differentiator inverter 200, and its positive output signal 160, having a duration of approximately one millisecond, is sent to the sorter control 13 (FIGURES 11 to 20). The signal 145 is also applied to the differentiator circuit 148, and its output signal 149 is sent to the character reader 12.

The first synchronization signal 145 is also applied to the "S" input of the 70-millisecond one-shot circuit 588. The leading edge of the signal 145 causes the one-shot circuit 588 to be triggered to its unstable state. In its unstable state, the "0" output of the one-shot circuit 588 will be at 0 volts for 70 milliseconds (FIGURE 24F). This zero voltage is applied to the "AND" gate 586 to prevent it from passing an early check presence signal for the next check. Thus, there must be at least 70 milliseconds between successive check presence signals 120 and between successive first synchronization signals 145.

In the character reader 12, the first synchronization signal 145 (FIGURE 24(E) and FIGURE 21(D)) is used to develop a positive 55-millisecond unblanking signal 121 (FIGURE 21(H)). The signal 121 is used in the character reader 12 to allow it to read the magnetic ink printing from the check that will shortly begin to pass the magnetizer device 84 and the reading device 20 of the sorter-reader 10. The unblanking signal 121 is also applied to the "S" input of the one-shot circuit 177 (FIGURE 7). Only the negative trailing edge of the unblanking signal 121 will trigger the one-shot circuit 177 to its unstable state. In its unstable state, the one-shot circuit 177 produces a sharp negative signal 123 at its "1" output. The signal 123 is then available to the associated equipment 14.

The first synchronization signal 145 is used to reset or clear the field selector circuit 104, the input memory 107, the digit selector circuit 106, the special sort circuit 109, and the reject circuit 108 (FIGURE 5). This action prepares these circuits to receive information from the check about to be read.

The first synchronization signal 145 (FIGURE 24(E)) is also applied via the "OR" gate 589 to the "S" input of the flip-flop 590. The positive swing of the trailing edge of the signal 145 sets the flip-flop 590, whose initial reset state was assured by the positive magnetic pickup signals 118 (FIGURE 24(B)) applied to its "R" input from the one-shot circuit 169 (FIGURE 7). With the flip-flop 590 set, its "1" output will rise to 0 volts (FIGURE 24(G)). About 51.6 milliseconds later, the next magnetic pickup signal 118 will reset the flip-flop 590. Its "1" output will then swing negative (−12 volts), and this negative voltage will trigger the 18-millisecond one-shot circuit 591 to its unstable state. The "1" output of the one-shot circuit 591 will swing negative for 18 milliseconds after it is triggered (FIGURE 24(H)). This is the second synchronization signal 146. The signal 146 can be developed only in response to a magnetic pickup signal 118 which follows after the occurrence of a first synchronization signal 145, as determined by the state of the flip-flop 590.

The second synchronization signal 146 (FIGURE 24(H)) is applied via driver 151 and power amplifier 152 (FIGURES 9 and 30) to the total item counter solenoids 153 and 154 (FIGURE 30). Thus, it is used as an item or check count signal for all of the checks sorted by the sorter-reader 10. The second synchronization signal 146 also is applied to the differentiator inverter 477, and its output signal 93 is sent via emitter follower 155 to the associated equipment 14. The output signal 93 is also sent to the "R" input of the flip-flops 454 to 457 (FIGURE 18) of the output memory 110, and to the "AND" gates 417, 418, and 420 (FIGURE 19) of the reject circuit 108. The output signal 93 is also applied to the "S" input of the 150-microsecond one-shot circuit 277 (FIGURES 9 and 18) to trigger it to its unstable state, wherein its "0" output swings to zero volts for that time. This positive signal 156 is sent to the "AND" gate 276 (FIGURE 12) of the field selector circuit 104. The trailing edge of the signal 156 is used to trigger the 30-microsecond one-shot circuit 445 (FIGURES 9 and 18) to its unstable state. In its unstable state, the one-shot circuit 445 develops the positive signal 157 at its "0" output, and the negative signal 158 at its "1" output. The signal 158 is the third synchronization signal.

The positive signal 157, called the transfer ready signal, is sent to the associated equipment 14. The negative third synchronization signal 158 is sent to the special sort "AND" gate 388 (FIGURE 18) and to the flip-flop 700 (FIGURES 52 and 61) of the electronic memory 113.

The second synchronization signal 146 occurs at approximately the time when the reading of a check is finished. The signal 93 resets or clears the output memory 110, preparing it to receive from the input memory 107 the sort decision for the check just read. The signal 93 also interrogates the reject circuit 108 in order to determine whether the check just read is to be rejected or sorted. The signal 156 disables the field selector circuit 104. The third synchronization signal 158 interrogates the special sort circuit 109 in order to determine whether the check just read is to be decimal sorted or special sorted.

Figures 23, 24:
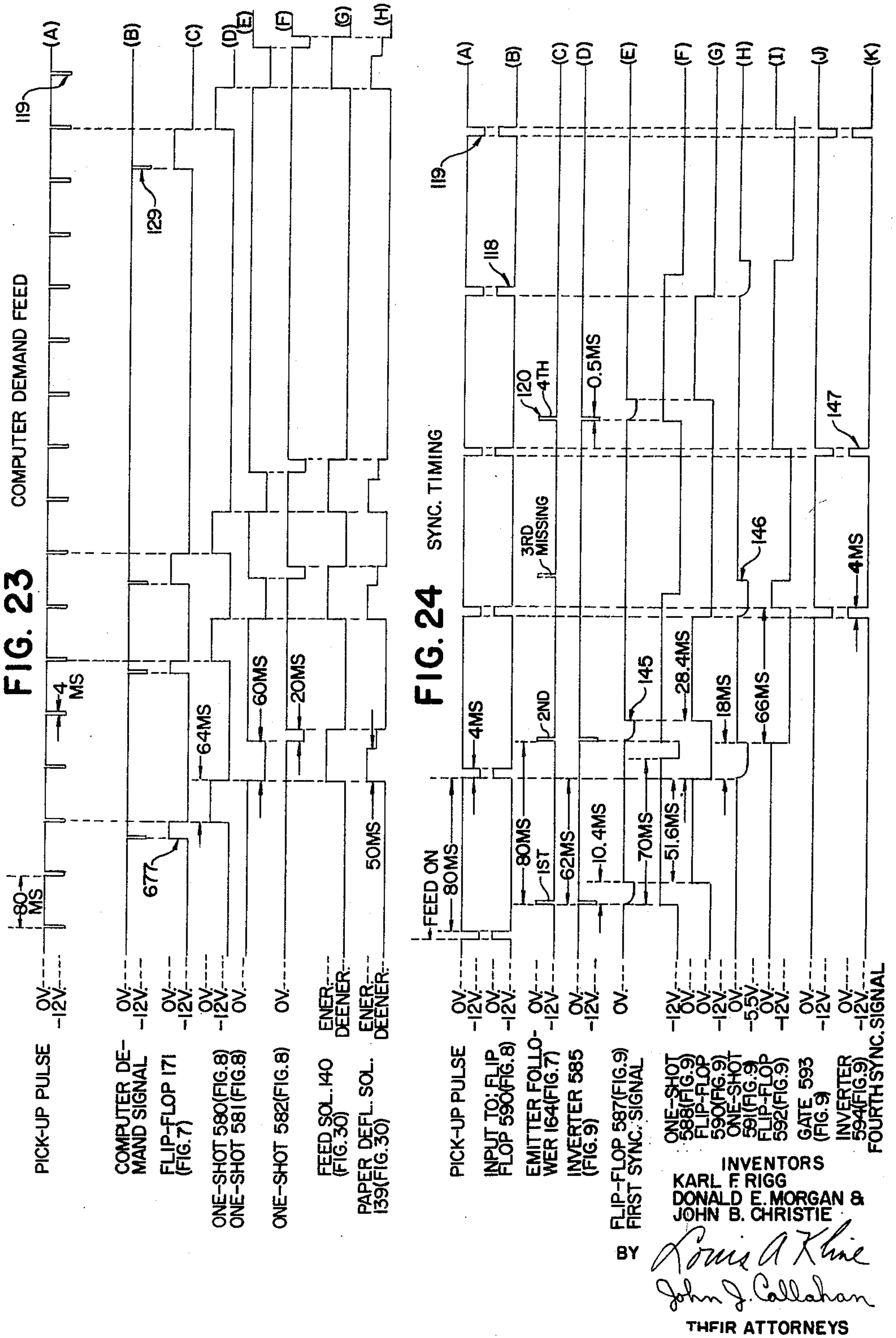
Figure 25:
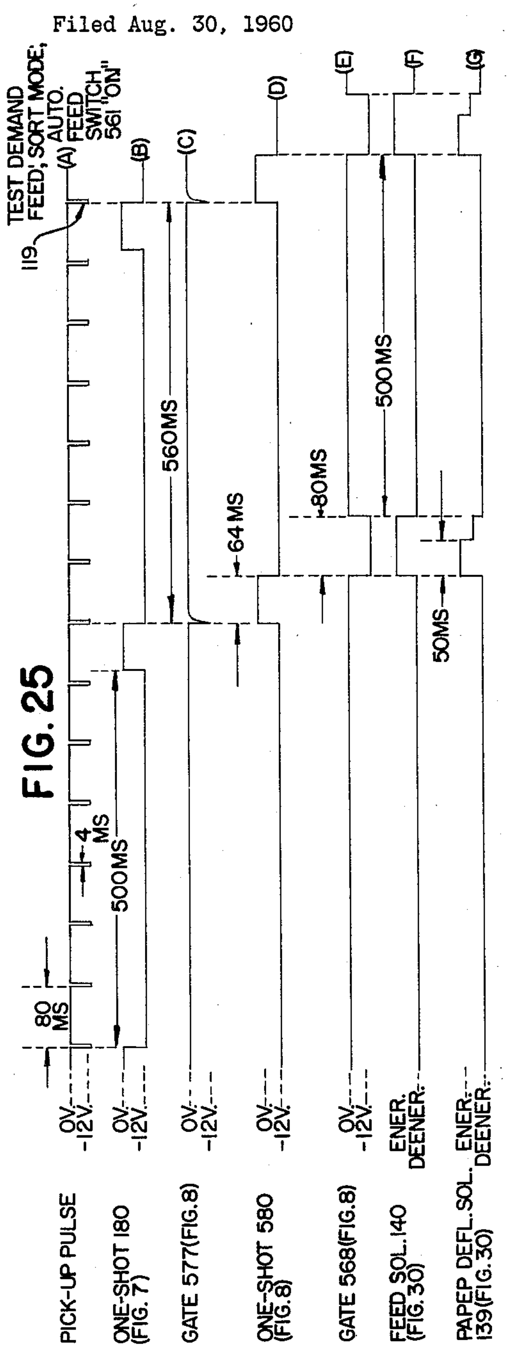
Figure 26:
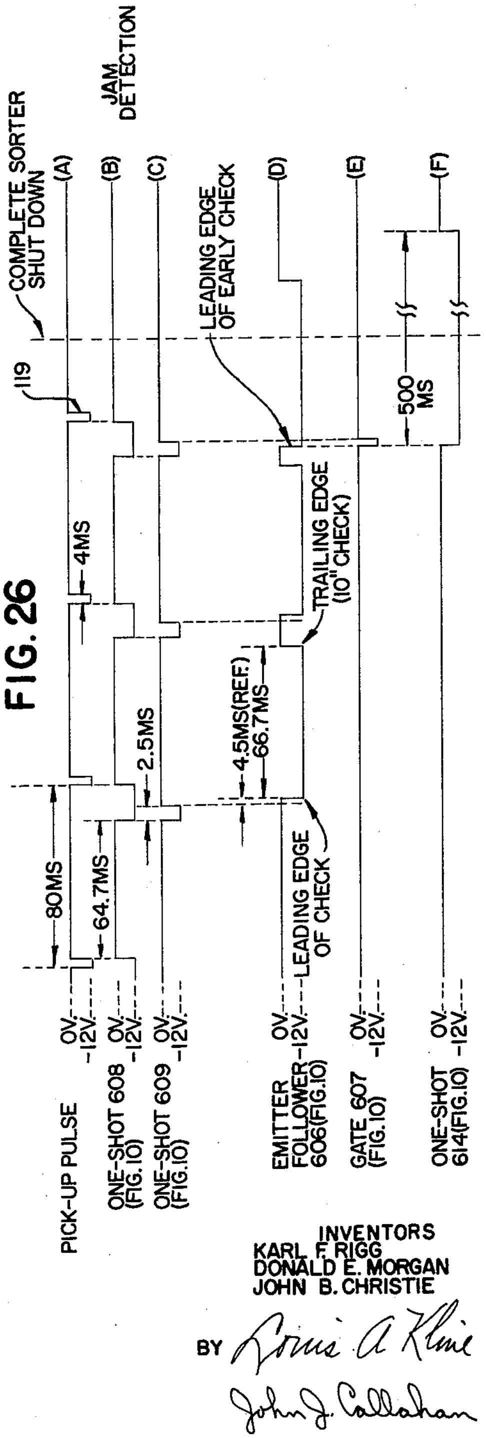

When the mechanical memory 112 (FIGURE 6) is used in conjunction with the sorter-reader 10 instead of the electronic memory 113, then it is necessary to develop the fourth synchronization signal 147 (FIGURES 9 and 24(K)). The second synchronization signal 146 is applied to the "S" input of the flip-flop 592. The positive swing of the trailing edge of the second synchronization signal 146 will set the flip-flop 592. The flip-flop 592 is reset by the positive swing of the trailing edge of the magnetic pickup signals 119 (FIGURE 7). The signals 119 are applied from the emitter follower 170 (FIGURE 7) to the "R" input of the flip-flop 592. When the flip-flop 592 is set by the second synchronization signal 146, its "0" output will swing negative to −12 volts (FIGURE 24(I)). This negative signal is applied to one input of the "AND" gate 593. Then, when the next magnetic pickup signal 119 occurs, it passes to the other input of the "AND" gate 593 and its trailing edge resets the flip-flop 592, thereby terminating its negative signal output. The negative signal output of the flip-flop 592 lasts approximately 66 milliseconds (FIGURE 24(II)).

The negative voltage output from the "AND" gate 593 (FIGURE 24(J)) is inverted by the inverter 594. The positive 4-millisecond output voltage from the inverter 594 (FIGURE 24(K)) is the fourth synchronization signal 147. The fourth synchronization signal 147 can be developed only in response to a magnetic pickup signal 119 which follows the occurrence of a second synchronization signal 146.

The fourth synchronization signal 147 is inverted by the differentiator inverter 159, and the resulting negative signal triggers the 15-millisecond one-shot circuit 160. The voltage at the "0" output of the one-shot circuit 160 will swing to 0 volts for 15 milliseconds. This positive output voltage is applied to the inverter 538. The negative output signal 182 of the inverter 538 is sent to the "AND" gates 505 to 515 (FIGURE 20) of the output decoder 111.

The negative signal output of the differentiator inverter 159 is also sent to the associated equipment 14.

The fourth synchronization signal 147 occurs before the reading of the check is finished. It is used to cause the output decoder 111 to release the sort decision signal for the previous read check to the gate solenoids, such as the special sort gate solenoid 550 or the "0" gate solenoid 554 (FIGURE 30). The soft decision signal, if special, will then cause energization of the special sort gate solenoid 550, permitting the check to enter the special sort stacker 69 (FIGURES 1 and 2B). If the sort decision is decimal, it will be sent to the mechanical memory 112, which, in turn, will release it at the proper time to sort the check into the decimal stacker corresponding to the significance of the sort decision signal.

(5) *Manual Entry*

(FIGURE 9)

An operator may sometimes desire to enter information into the sorter-reader 10 from the associated equipment 14, which may include an adding machine, without the feeding of checks. In this event, the use of the second synchronization signal 146 may be required. Consequently, a manual entry signal is sent to the synchronization signal generator 102 (FIGURE 4).

The manual entry signal passes through the "OR" gate 589 (FIGURE 9) to set the flip-flop 590. With the sorter-reader 10 turned on, though not feeding checks, the magnetic pickup signals 118 (FIGURE 7) will have reset the flip-flop 590. When the flip-flop 590 is set by the manual entry signal, its "1" output will swing to a positive voltage. Then the next magnetic pickup signal 118 will reset the flip-flop 590, causing its "1" output to swing to a negative voltage. This negative voltage will trigger the 18-millisecond one-shot circuit 591, causing the development of the second synchronization signal 146. The second synchronization signal 146 is then sent to the associated equipment 14 via the differentiator inverter 477 and the emitter follower 155, and it may be used in the associated equipment 14 to synchronize its operation with the magnetic pickup signals 118, and thus with the basic timing of the sorter-reader 10.

The second synchronization signal 146 is also sent to the total item counter solenoids 153 and 154 (FIGURE 30), which control the total item counter within the sorter-reader 10. Thus, the total item counter will register not only the number of checks fed by the sorter-reader 10, but also the number of manual entry signals supplied thereto.

The second synchronization signal 146 also is used to develop the fourth synchronization signal 147, since the magnetic pickup signals 118 and 119 are developed, but the fourth synchronization signal 146 is not utilized during a manual entry operation.

The manual entry signals will occur no more often than the magnetic pickup signals 118 occur; that is, there will be no more than one manual entry signal supplied to the sorter-reader 10 every eighty milliseconds. If this were not the case, then more frequent manual entry signals would not effect the development of the second synchronization signal 146.

(6) *Reject Count and Jam Detection*

(FIGURES 7 and 10)

If all the checks handled by the sorter-reader 10 were properly printed with the correct information, and if the sorter-reader 10 never malfunctioned, there would be no rejects. If all the checks were properly fed and passed by the sorter-reader 10, there would occur no jamming. However, the rejection of checks by the sorter-reader 10 and the jamming of checks do occur. This being the case, the sorter-reader 10 is provided with means for counting the number of checks rejected, and with means for detecting the jamming of checks when this does occur.

The rejection of a check—that is, the sorting of a check into the reject stacker 60 (FIGURES 1 and 2B)—involves the suppression of a sort decision signal for that check. The reject signal from the reject circuit 108 (FIGURE 5) is sent to the associated equipment 14, but this reject signal may be externally controlled from the associated equipment 14 and is therefore not uniquely associated with the actual passage of checks into the reject stacker.

Hence, another means for operating the reject solenoid 163 (FIGURE 30) is provided in the sorter-reader 10.

A reject counter photocell 785 (FIGURE 34) and a suitable light source are positioned adjacent to the reject stacker 60. Whenever a check passes into the reject stacker 60, it causes the photocell 785 to develop a positive signal 124 (FIGURE 7). This positive signal 124, which lasts as long as the check is passing the photocell, is sent through the amplifiers 174 and 175, which amplify and differentiate it. In the amplification and differentiation process, the signal 124 is inverted, so that its positive leading edge is represented by a negative signal. This negative signal is applied to the "S" input of the 25-millisecond one-shot circuit 176 to trigger it to its unstable state. In its unstable state, a negative voltage appears at its "1" output. This negative voltage is sent to the power amplifier 162 via the driver 161 (FIGURES 7 and 30). The power amplifier 162 will cause the reject counter solenoid 163 (FIGURE 30) to be energized, thus operating the reject counter.

The jam detector circuit 103 (FIGURE 10) operates to compare the signal outputs of the jam detector photocells 628, 629, 630, and 631 (FIGURE 43), which are positioned along the path of the check in the sorter-reader 10, with the magnetic pickup signals 119 (FIGURE 7) developed by the synchronizer wheel 19 (FIGURES 1 and 2B). If the movements of the checks, as indicated by the signal outputs of the jam detector photocells, are not properly synchronized, then a jam may occur. The detector circuit 103 detects this lack of synchronization and develops a jam signal which causes the jam solenoid K208 (FIGURE 30) of the sorter-reader 10 to be energized. The jam solenoid, upon being energized, causes both the feed and the drive systems of the sorter-reader 10 to become inactive, and it also causes the stacker "bogies" at the rear of the sorter-reader 10 to be released.

The feed section 54 (FIGURE 1) of the sorter-reader 10 is provided with three jam photocells, while each of the stacker sections 55 and 56 is provided with six jam photocells. Two of the photocells, 628 and 629 (FIGURE 43), in the feed section 54 are located along the feed path before the check presence photocell 90 (FIGURE 35); that is, to the right of the position of the check presence photocell 90 in FIGURE 1. The photocell 628 is located approximately 3.95 inches before the position of the check presence photocell 90, and the other photocell 629 is located twelve inches before the photocell 90. Since the checks, upon leaving the synchronizer wheel 19, are properly spaced with their leading edges twelve inches apart, or some multiple of that distance, then, during normal check feeding, two checks should simultaneously pass the two jam detector photocells 628 and 629. Since the checks travel along their feed path at the rate of twelve inches in eighty milliseconds, the leading edge of a given check will pass the photocell 628 approximately 26⅓ milliseconds before it passes the check presence photocell 90.

The third photocell 630 (FIGURE 43) of the feed section 54 is located fifteen inches to the left of the photocell 628, or approximately 11.05 inches to the left (FIGURE 1) of the check presence photocell 90. The nearest jam photocell in stacker section 55 is twelve inches to the left of the photocell 630, and each succeeding jam photocell of the stacker sections 55 and 56 of the sorter-reader 10 is located along the feed path twelve inches from the preceding photocell. Thus, if the checks fed and passed in the sorter-reader 10 are precisely timed, all the checks traveling along the sections 55 and 56 will pass a jam photocell simultaneously. Furthermore, the leading edge of a given check will pass the first of these photocells (the third photocell 630 of the feed section 54) approximately 73⅔ milliseconds after it passes the check presence photocell 90.

Accordingly, the sorter-reader 10 is provided with two groups of jam photocells; that is, the feed section photocells 628 and 629 (FIGURE 43) and the thirteen stacker photocells represented by the photocells 630 and 631 (FIGURE 43). The fifteen jam photocells could be connected in one group if they could all be spaced twelve inches apart, but this arrangement is not possible because of the physical arrangement of the components in the read area 23 of the sorter-reader 10. The resulting groups of jam photocells are called the two feed jam photocells 628 and 629, and the stacker jam photocells (13), represented by the photocells 630 and 631 (FIGURE 43).

It has been described previously that each of the check presence signals 120 (FIGURE 7) follows a magnetic pickup signal 119 (FIGURES 7 and 21) by eighteen milliseconds. Therefore, the signals developed by the feed jam photocells 628 and 629, indicating the passage of checks along the feed path, precede each magnetic pickup 119 by 8⅓ milliseconds (26⅓−18). In other words, these signals follow each magnetic pickup signal 119 by 71.7 milliseconds, and the signals developed by the stacker jam photocells 630 and 631 follow each magnetic pickup signal 119 by 91⅔ milliseconds (73⅔+18). In other words, these latter signals follow each magnetic pickup signal 119 by approximately 11⅔ milliseconds.

Referring briefly to FIGURES 43 and 44, in each group of jam photocells, the photocells are connected in series, and the last photocell is connected to ground potential. The first photocell 629 and 631 of each group is also connected through the sections 601 and 619, respectively, of a photocell current test switch 600 (FIGURE 10), included within the sorter-reader 10, to the two-input modulator circuits 602 and 620, respectively. The other inputs to the modulator circuits 602 and 620 are provided by the oscillators 604 and 617, respectively. Each of the oscillators 604 and 617 has a nominal 2.5-kilocycle output, which is amplified by the amplifiers 603 and 618, respectively. The outputs of the amplifiers 603 and 618, respectively, are applied to the other input of the modulator circuits 602 and 620, respectively.

When no checks are being fed and passed in the sorter-reader 10, and in the intervals between checks that are fed and passed, all of the jam photocells in the jam detector circuit 103 operate to place a ground potential voltage (0 volts) on one input of the modulator circuits 602 and 620. Thus, the output of the amplifiers 603 and 618 is prevented from passing through the modulator circuits 602 and 620, respectively. However, when a check passes between a jam photocell and its light source, the impedance of the jam photocell will increase sharply, placing a negative voltage on the other input of the modulator circuits 602 or 620. Thus, the 2.5-kilocycle signal from the oscillator 604 or 617 will be allowed to pass through the modulator circuits 602 or 620. The 2.5-kilocycle signal from the modulator circuits 602 and 620 is amplified by the amplifiers 605 and 621, respectively, and is detected by the detector circuits 789 and 790, respectively. The outputs of the detector circuits 789 and 790 are applied to the amplifiers 596 and 624, respectively. The outputs of the amplifiers 596 and 624 each comprise a positive square wave signal lasting as long as any of the checks are passing the feed or stacker jam photocells, respectively. This positive square wave signal is applied to the emitter followers 606 or 622. The negative square output signal from the emitter follower 606 is sent to the "AND" gate 607, while the negative square wave output of the emitter follower 622 is sent to the "AND" gate 613. Accordingly, the signal applied to one input of the "AND" gates 607 and 613, respectively, is negative while a check is passing any jam photocell, and positive (0 volts) at all other times. The output signals of the jam photocells are combined with a 2.5-kilocycle carrier signal because these signals tend to fluctuate considerably. The use of the 2.5-kilocycle carrier signals, which are subsequently applied to the detector circuits 789 and 790, results in the presence of a more stable potential at one input of the "AND" gates 607 and 613.

The operation of the jam detector circuit 103 is as follows. The negative magnetic pickup signals 119 from the emitter follower 170 (FIGURE 7) are used to trigger the 64.7-millisecond one-shot circuit 608 to its unstable state. In its unstable state, the "0" output of the one-shot circuit will be at a positive circuit (FIGURE 26(B)). This positive voltage is applied to the "S" input of the 2.5-millisecond one-shot circuit 609. The negative swing at the end of this positive voltage will trigger the one-shot circuit 609 to its unstable state. In its unstable state, the "1" output of the one-shot circuit 609 will be at a negative voltage (FIGURE 26(C)). This negative voltage is passed through the "AND" gate 607, which also receives the negative detected signal from the emitter follower 606 (FIGURE 26(D)). Accordingly, a 2.5-millisecond negative signal, delayed 64.7 milliseconds from the occurrence of each magnetic pickup signal 119, is applied to the "AND" gate 607. If, during the time of occurrence of this 2.5-millisecond signal, a check is passing either of the two feed section photocells 628 or 629, the 2.5-millisecond signal will coincide with the negative signal from the emitter follower 606, and the "AND" gate 607 will produce a negative output (FIGURE 26(E)). The negative output of the "AND" gate 607 is applied via the "OR" gate 612 to the "S" input of the 500-millisecond one-shot circuit 614 to trigger it to its unstable state. In its unstable state, the "1" output of the one-shot circuit 614 will be at a negative voltage (FIGURE 26(F)). This negative voltage is then applied via the driver 615 to the power amplifier 616. The power amplifier 616 will energize the jam solenoid K208 (FIGURE 30), causing the sorter-reader 10 to become inoperative.

The checks will begin passing the feed section photocells 628 and 629 approximately 71.7 milliseconds after each magnetic pickup signal 119, as previously described. The one-shot circuits 608 and 609 provide a delay of 64.7 milliseconds, and a signal width of 2.5 milliseconds, for a total of 67.2 milliseconds. Thus, a differential of 4.5 milliseconds is provided (FIGURE 26(D)). Therefore, a check may be 4.5 milliseconds early in its passage along the sorter-reader 10 and still not effect the production of a jam signal. Only when the check is early enough to overlap the 2.5-millisecond output of the one-shot circuit 609 will it effect the production of a jam signal. Of course, a check can be late. A ten-inch-wide check, for example, produces an output from the feed section photocells 628 and 629 which is 66.7 milliseconds in duration. A ten-inch-wide check may be as much as 6.3 milliseconds late before the photocell output produced thereby will overlap the succeeding 2.5-millisecond output of the out-shot circuit 609. Checks less than ten inches in width can be even later. For example, a six-inch-wide check may be as much as 33 milliseconds late without a jam signal being developed.

A similar arrangement of components is provided for the remaining thirteen jam photocells. The output of these latter photocells is applied to the modulator circuit 620 along with the output of the amplifier 618. The output of the modulator circuit 620 is amplified by the amplifier 621, detected by the detector circuit 790, further amplified by the amplifier 624, and the emitter follower 622, and then applied to the "AND" gate 613. The negative magnetic pickup signals 119 are delayed 6.4 milliseconds by the one-shot circuit 610, and the signal output from the one-shot circuit 611 is 0.2 millisecond wide. Accordingly, the output from the "AND" gate 613 will be only 0.2 millisecond wide. However, it will trigger the 500-millisecond one-shot circuit 614, which will effect the energization of the jam solenoid 625 (FIGURE 28).

The checks will begin passing the remaining thirteen jam photocells 11.7 milliseconds after each of the magnetic pickup signals 119. The one-shot circuits 610 and 611 provide a delay of 6.4 milliseconds and a signal width of 0.2 millisecond, for a total of 6.6 milliseconds. Thus, a differential of 5.1 milliseconds is provided. Therefore, a check can be 5.1 milliseconds early in passing through the stacker sections 55 and 56 of the sorter-reader 10. Since a ten-inch-wide check produces an output from the jam photocells which is 66.7 milliseconds in duration, it can be as much as 8 milliseconds late before it will overlap the succeeding 0.2-millisecond output of the one-shot circuit 611, and checks shorter in width may be later.

(7) *Stop Feed*

(FIGURE 7)

A negative signal of approximately 50 to 60 milliseconds, called the computer stop feed signal 914, (FIGURE 7) may be supplied from the associated equipment 14 via the driver 178 and the power amplifier 179 to the stop solenoid K206 (FIGURE 30) when the sorter-reader 10 is operating in the process mode and it is desired to stop the feeding of checks. The stop solenoid K206, when energized, will open the contacts K206*b* (FIGURE 28) in the feed circuit. This will cause de-energization of the feed solenoid K204, stopping the feeding of checks.

(8) *Field Selector Circuit*

(FIGURES 11 TO 13)

The first synchronization signal 145 from the 10.4-millisecond one-shot circuit 587 (FIGURE 9) is passed through the differentiator inverter 200 (FIGURES 9 and 11), through the emitter follower 213 (FIGURE 11), through the "OR" gate 201 (FIGURE 12), and through the emitter follower 202 to the reset terminal of the flip-flop 203. The flip-flop 203 will be reset, causing its "0" output to go to −12 volts. This output would normally set the flip-flop 204. However, the output of the emitter follower 202 also goes through the emitter follower 205 to the rest terminal of the flip-flop 204. The flip-flop 204 is a dominant reset type (FIGURE 64) and therefore will be reset in response to the first synchronization signal 145. The negative output of the emitter follower 205 will also be applied to the reset terminal of the flip-flop 206, and so it will also be reset in response to the first synchronization signal 145.

The first synchronization signal 145 is passed through the differentiator inverter 200 (FIGURES 9 and 11), through the emitter followers 213 and 214 (FIGURE 11), and through the "OR" gate 207 (FIGURE 12) to the reset terminal of the flip-flop 208. The flip-flop 208 is reset, causing its "0" to go to −12 volts. This output would normally set the flip-flop 209. However, the output of the differentiator inverter 200 (FIGURE 11) is applied through the emitter followers 213, 215, and 216 (FIGURE 11) to the set terminal of the one-shot circuit 210. Therefore, in response to the first synchronization signal 145, the "0" output of the one-shot circuit 210 swings to 0 volts for 200 microseconds, and then swings to −12 volts. This negative swing is applied through the emitter follower 211 to the reset terminal of the flip-flop 209 and to the reset terminal of the flip-flop 212. Thus, the flip-flops 208, 209, and 212 are reset in response to the first synchronization signal 145.

The positive output of the one-shot circuit 210 (FIGURE 12) is also applied via the emitter follower 234 (FIGURE 11) to the terminal 278, whence it is made available to the associated equipment 14.

Figure 12:
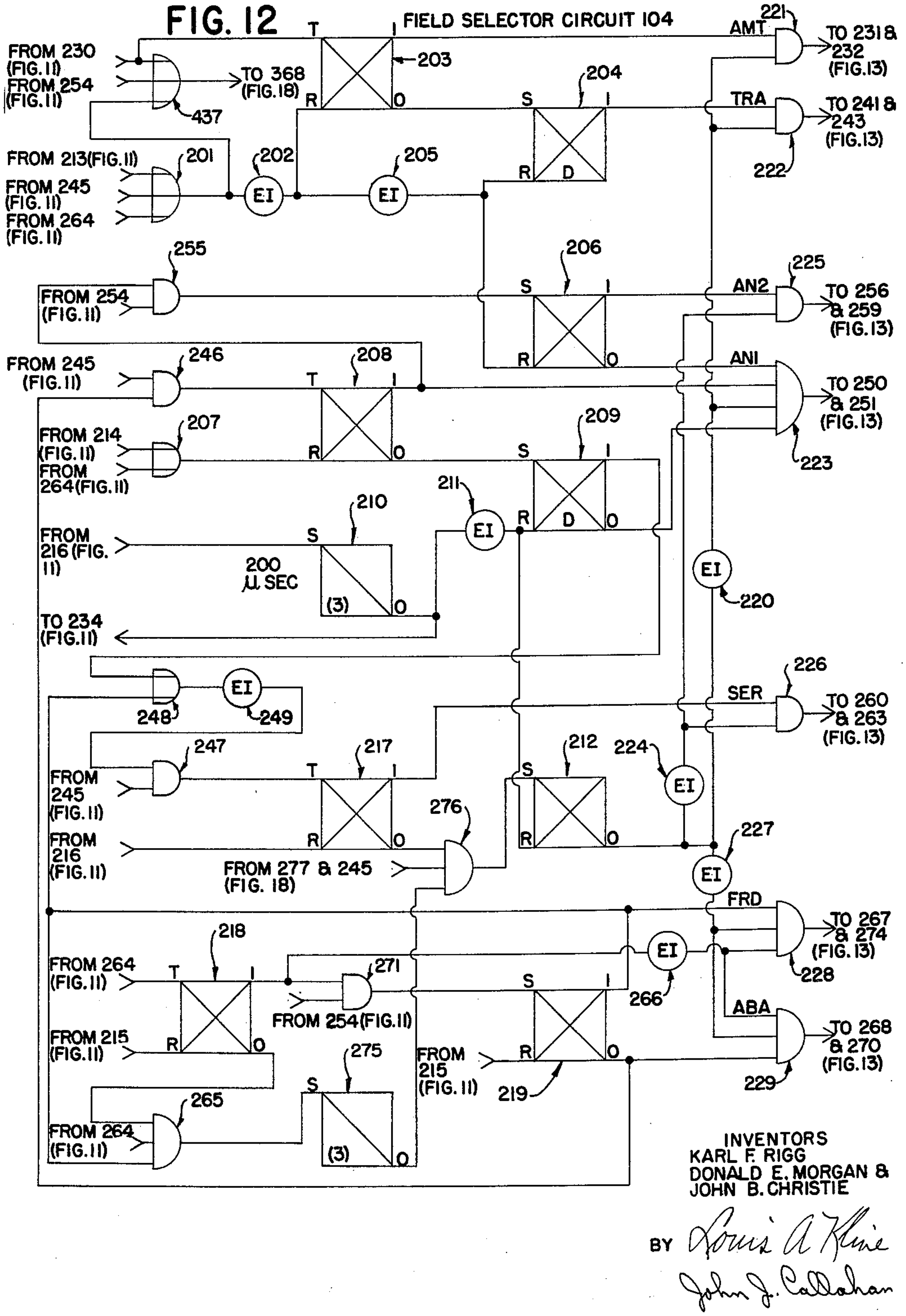

The output of the emitter follower 213 (FIGURE 11) is passed through the emitter followers 215 and 216 (FIGURE 11) to the reset terminal of the flip-flop 217 (FIGURE 12). Thus, the flip-flop 217 is reset.

The output of the emitter follower 215 (FIGURE 11) is passed to the reset terminals of the flip-flops 218 and 219 (FIGURE 12). Thus, the flip-flops 218 and 219 are reset.

The resetting of the flip-flop 212 causes its "0" output to go negative. This negative signal is applied through the emitter follower 220 to the Amount Field "AND"

gate 221, the Transaction Code Field "AND" gate 222, and the Account Number 1 Field "AND" gate 223. This negative signal is also applied through the emitter follower 224 to the Account Number 2 Field "AND" gate 225 and to the Serial Number Field "AND" gate 226. This negative signal is further applied through the emitter follower 227 to the Check Routing Symbol or FRD Number Field "AND" gate 228 and to the ABA Transit Number Field "AND" gate 229.

The first character read from the check 80 (FIGURE 3A) is the slant symbol Q1. A 20-microsecond positive pulse is developed in the character reader 12 and is applied by way of the differentiator inverter 230 (FIGURE 11) to the T input terminal of the flip-flop 203 (FIGURE 12). The flip-flop 203 is thus set. A negative signal from its "1" output terminal is sent through the "AND" gate 221 to the "AND" gate 231 (FIGURE 13). This negative signal is also sent via the emitter follower 232 (FIGURE 13) to the terminal 233, whence it is made available to the associated equipment 14. This negative signal indicates that the Amount Field on the check is being read at this time by the character reader 12.

The negative signal from the flip-flop 203 (FIGURE 12) will pass through the "AND" gate 231, through the "OR" gate 235 (FIGURE 13), and through the emitter follower 236 (FIGURE 13) to the "AND" gate 237 (FIGURE 14) in the digit selector circuit 106 and to the set terminal of the flip-flop 238 (FIGURE 19) in the reject circuit 108, only if the amount button 32 on the control panel 25 (FIGURE 2A) has been depressed by the operator. The depression of the amount button 32 will cause the Amount Field selector switch 239 (FIGURE 13) to close to connect the terminal 240 to the "AND" gate 231. A potential of −12 volts is present at the terminal 240, thus allowing the negative signal from the "AND" gate 221 (FIGURE 12) to pass to the "OR" gate 235. In this event, the negative signal from the emitter follower 236 (FIGURE 13) will indicate both that the amount field on the check 80 is being read and that the amount field is the field selected in which a sorting operation is to be performed.

The paragraph symbol Q2 is used to mark the beginning of the Account Number fields and to define the limits of the Serial Number field. Therefore, the effect of reading of the paragraph symbol Q2 upon the field selector circuit 104 will depend upon the events that have preceded its arrival. If the paragraph symbol Q2 has been preceded by Q1 symbols indicating the reading of the Amount and Transaction fields, or if no fields have been read, the paragraph symbol Q2 will make certain that the flip-flops 203, 204, and 206 are reset and that the flip-flop 208 is set (FIGURE 12). The flip-flop 219 will still be reset, and the flip-flop 217 will not be set, since the flip-flops 209 and 219 are reset. The flip-flop 212 will be set.

Therefore, in response to the first paragraph symbol Q2, the character reader 12 will develop a positive 20-microsecond pulse. This positive pulse is applied to the differentiator inverter 245 (FIGURE 11). The negative pulse output of the differentiator inverter 245 is applied through the "OR" gate 246 (FIGURE 12) to the T input of the flip-flop 208, to the "AND" gate 247 (FIGURE 12), and through the "OR" gate 201 (FIGURE 12) and the emitter follower 202 to the reset terminal of the flip-flop 203. It is also applied from the emitter follower 202 through the emitter follower 205 to the reset terminals of the flip-flops 204 and 206, respectively. Accordingly, the flip-flop 208 is set, whereby a negative voltage appears at its "1" output terminal. This negative voltage is applied to the "AND" gate 223.

With the flip-flop 206 reset, the negative voltage appearing at its "0" terminal is applied as another input to the "AND" gate 223.

Since the flip-flops 209 and 212 are reset, all the inputs to the "AND" gate 223 will be negative, and this gate will develop a negative output.

In response to the second slant symbol Q1 on the check 80, the character reader 12 will develop another positive 20-microsecond pulse. This positive pulse is applied to the differentiator inverter 230 (FIGURE 11). The negative pulse output of the differentiator inverter 230 is applied to the T input of the flip-flop 203 to reset it. With the flip-flop 203 reset, its "1" output will change to 0 volts, indicating that the amount field on the check has ended, and its "0" output will change to −12 volts.

The "0" output of the flip-flop 203 at this time will set the flip-flop 204 and produce a negative voltage at its "1" output. This negative voltage will be applied through the "AND" gate 222 (FIGURE 12), the "AND" gate 241 (FIGURE 13), the "OR" gate 235 (FIGURE 13), and the emitter follower 236 (FIGURE 13) to the "AND" gate 237 (FIGURE 14) and to the set terminal of the flip-flop 238 (FIGURE 19), if the Transaction button 33 (FIGURE 2A) on the control panel 25 has been depressed by the operator. The depression of the Transaction button 33 will cause the Transaction Field selector switch 242 (FIGURE 13) to close to connect the terminal 240 to the "AND" gate 241. The negative voltage from the "AND" gate 222 (FIGURE 12) will also be applied by way of the emitter follower 243 to the terminal 244, where it is made available to the associated equipment 14.

The absence of a second slant symbol Q1 on a check will denote the absence of the Transaction field. In this case, the flip-flop 204 (FIGURE 12) will not be set, and its "1" output will be at 0 volts. It is to be noted that the Transaction field of a check cannot properly be identified unless it has been preceded by the Amount field.

The negative voltage applied to one input of the "AND" gate 247 (FIGURE 12) from the differentiator inverter 245 (FIGURE 11) will not pass through this gate, since the other input to it is positive. This is so since the flip-flop 209 was reset in response to the first synchronization signal 145, whereby its "1" output is positive, and this positive output is applied through the "OR" gate 248 and the emitter follower 249 to the "AND" gate 247. With the flip-flop 209 reset, its "0" output is at a negative voltage. This negative voltage is applied as another input to the "AND" gate 223. Finally, since the flip-flop 212 is reset, its "0" output is at a negative voltage. This negative voltage is applied through the emitter follower 220 as a final input to the "AND" gate 223. Therefore, all inputs to the "AND" gate 223 will be negative, and a negative voltage will be applied to the "AND" gate 250 (FIGURE 13). These conditions will indicate to the field selector circuit 104 that the Account Number 1 field is being read. This negative voltage of the "AND" gate 223 will also be applied by way of emitter follower 251 (FIGURE 13) to the terminal 252, where it is made available to the associated equipment 14.

The negative voltage from the "AND" gate 223 (FIGURE 12) will be applied through the "AND" gate 250 (FIGURE 13), the "OR" gate 235 (FIGURE 13), and the emitter follower 236 (FIGURE 13) to the "AND" gate 237 (FIGURE 14) and to the set terminal of the flip-flop 238 (FIGURE 19), if the Account Number 1 button 34 (FIGURE 2A) on the control panel 25 has been depressed by the operator. The depression of the Account Number 1 button 23 will cause the Account Number 1 field selector switch 253 (FIGURE 13) to close to connect the terminal 240 to the "AND" gate 250.

Figure 19:
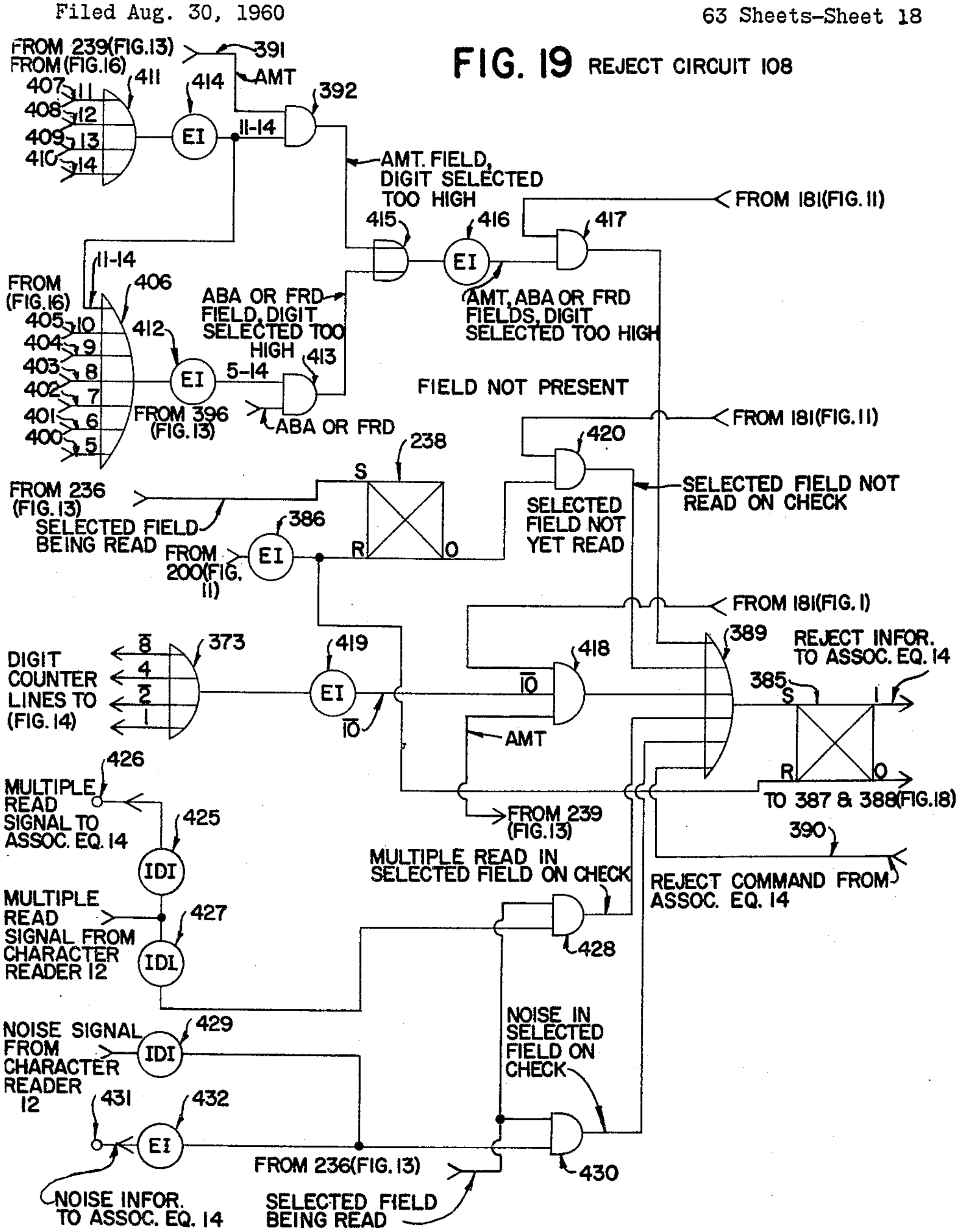

If a hyphen symbol Q4 follows this first Q2 symbol on the check, the character reader 12 will develop a positive 20-microsecond pulse. This positive pulse is applied to the differentiator inverter 254 (FIGURE 11). The negative pulse output of the differentiator inverter 254 is applied through the "AND" gate 255 (FIGURE 12) to the "S" input of the flip-flop 206. Thus, with the flip-flop 206 set, its "1" output will be at a negative voltage. This negative voltage indicates the beginning of the Account Number 2 field, and it is applied to the Amount Number 2 "AND" gate 225 along with the negative voltage output of the flip-flop 212. At the same time, the "0"

output of the flip-flop 206 will change to 0 volts. This will indicate the end of the Account Number 1 field. The negative voltage output of the "AND" gate 225 (FIGURE 12) is applied to the "AND" gate 256 (FIGURE 13), and, if the Account Number 2 field selector switch 257 (FIGURE 13) is closed, it is applied to the "AND" gate 237 (FIGURE 14) and to the flip-flop 238 (FIGURE 19). The negative voltage output of the "AND" gate 225 (FIGURE 12) is also applied to the terminal 258 (FIGURE 13) via the emitter follower 259, where it is made available to the associated equipment 14.

With the field selector circuit 104 either in the Account Number 1 field state or in the Account Number 2 field state, if a second paragraph symbol Q2 is read by the character reader 12, the negative voltage output of the differentiator inverter 245 (FIGURE 11) will assure that the flip-flops 203, 204, and 206 are set, and it will reset the flip-flop 208. With the flip-flop 208 reset, its "1" output will be 0 volts, and its "0" output will be at a negative voltage. The "0" output of the flip-flop 208 will set the flip-flop 209, causing its "1" output to be at a negative voltage. This negative voltage is applied via the "OR" gate 248, the emitter follower 249, and the "AND" gate 247 to the T input of the flip-flop 217. Thus, the flip-flop 217 will be set, and the negative voltage appearing at its "1" output will be applied to the Serial Number field "AND" gate 226. This will indicate the termination of the reading of the Account Number fields and the beginning of the reading of the Serial Number field. The negative voltage output of the "AND" gate 226 will be applied to the "AND" gate 260 (FIGURE 13), and, if the Serial Number field selector switch 261 (FIGURE 13) is closed, it is applied to the "AND" gate 237 (FIGURE 14) and to the flip-flop 238 (FIGURE 19). The negative voltage output of the "AND" gate 226 (FIGURE 12) is also applied to the terminal 262 (FIGURE 13) via the emitter follower 263, where it is made available to the associated equipment 14.

Alternately, with the field selector circuit 104 in the Amount field state, the Account Number 1 field state, or the Account Number 2 field state, if a four-square symbol Q3 follows this first Q2 symbol on the check, the character reader 12 will develop a positive 20-microsecond pulse. This positive 20-microsecond pulse is applied to the differentiator inverter 264 (FIGURE 11). The negative pulse output of the differentiator inverter 264 is applied through the "OR" gate 201 via emitter follower 202 (FIGURE 12) to the reset inputs of the flip-flops 203, 204, and 206. Thus, the flip-flops 203, 204, and 206 will be reset. The negative pulse output of the differentiator inverter 264 is also applied through the "OR" gate 207 (FIGURE 12) to the reset input of the flip-flop 208. Thus, the flip-flop 208 will be reset. The negative pulse output of the differentiator 264 is also applied to the "AND" gate 265 (FIGURE 12) and to the input of the flip-flop 218. With the flip-flop 218 set, its "1" output will be at a negative voltage. This negative voltage is applied via the emitter follower 266 to the ABA Number field "AND" gate 229. The flip-flop 212 will be reset, whereby a negative voltage appears at its "0" output. This negative voltage is applied to the "AND" gate 229 also. With the setting of the flip-flop 209, the end of the reading of the Amount field, the Account Number 1 field, or the Account Number 2 field and the beginning of the reading of the ABA field are indicated. The flip-flop 219 was reset in response to the first synchronization signal 145, and so the negative votlage appearing at its "0" terminal is applied to the "AND" gate 229. The negative voltage output of the "AND" gate 229 will be applied to the "AND" gate 267 (FIGURE 13), and, if the ABA Number field selector switch 268 is closed, it is applied to the "AND" gate 237 (FIGURE 14) and to the flip-flop 238 (FIGURE 19). The negative voltage output of the "AND" gate 229 (FIGURE 12) is also applied to the terminal 269 via the emitter follower 270, where it is made available to the associated equipment 14.

Upon the reading of the next hyphen symbol Q4 on the check, the character reader 12 will develop a positive 20-microsecond pulse. This positive pulse is applied to the differentiator inverter 254 (FIGURE 11). The negative pulse output of the differentiator inverter 254 is applied through the "AND" gate 271 (FIGURE 12) to the set input of the flip-flop 219. Thus, with the flip-flop 219 set, its "1" output will be at a negative voltage. This negative voltage indicates the beginning of the FRD field and is applied to the FRD Number field "AND" gate 228. The negative voltage output of the "AND" gate 228 (FIGURE 12) is applied to the "AND" gate 267 (FIGURE 13), and, if the FRD field selector switch 272 (FIGURE 13) is closed, it is applied to the "AND" gate 237 (FIGURE 14) and to the flip-flop 238 (FIGURE 19). The negative voltage output of the "AND" gate 228 (FIGURE 12) is also applied to the terminal 273 via the emitter follower 274, where it is made available to the associated equipment 14.

Upon the reading of the second four-square symbol Q3, the character reader 12 will develop a positive 20-microsecond pulse. This positive 20-microsecond pulse is applied to the differentiator inverter 264 (FIGURE 11). The negative pulse output of the differentiator inverter 264 is applied to the T input of the flip-flop 218. Thus, the flip-flop 218 is reset. The "1" output of the flip-flop 218 will be at 0 volts and will indicate termination of the reading of the FRD field. The "0" output of the flip-flop 218 will be at a negative voltage, and this voltage is applied via the "AND" gate 265 (FIGURE 12) to the set input of the 1.2-millisecond one-shot circuit 275 (FIGURE 12). Thus, the "0" output of the one-shot circuit 275 will be at a potential of 0 volts for 1.2 milliseconds. When its "0" output swings to a negative voltage again (assuming that the flip-flop 217 has remained reset), this negative voltage will be applied through the "AND" gate 276 to the set input of the flip-flop 212. With the flip-flop 212 set, a potential of 0 volts will be applied to all of the Field "AND" gates 221, 222, 223, 225, 226, 228, and 229, respectively, via emitter followers 220, 224, and 227. This will disable the operation of all of these "AND" gates.

However, during the time that the one-shot circuit 275 is in its unstable state, the second paragraph symbol Q2, which marks the beginning of the Serial Number field, may be read by the character reader 12. This is so since the reading of successive characters on a check begins every 0.83 millisecond. The negative pulse output of the differentiator inverter 245 (FIGURE 11), developed in response to the reading of the second paragraph symbol Q2, will not be able to set the flip-flop 208 (FIGURE 12), since it will be prevented from being applied through the "AND" gate 246. Since the flip-flop 219 (FIGURE 12) is set, its "0" output will be 0 volts, and this 0 volts potential will be applied to the "AND" gate 246. The negative pulse output of the differentiator inverter 245 (FIGURE 11) will assure that the flip-flops 203, 204, and 206 (FIGURE 12) are reset via emitter followers 202 and 205, and it will also be applied through the "AND" gate 247 (FIGURE 12) to the T input of the flip-flop 217. The "AND" gate 247 will be operative, since the flip-flop 219 is set at this time. Thus, with the flip-flop 217 set, its "1" output will be at a negative voltage, and this negative voltage is applied through the Serial Number field "AND" gate 226 to the "AND" gate 260 (FIGURE 13). When the flip-flop 217 is set, its "0" output is at 0 volts. Thus, the flip-flop 212 cannot be set by the "0" output of the one-shot circuit 275. The interval between the end of the reading of the ABA and FRD Number fields and the beginning of the reading of the Serial Number field is necessary because these fields are separated by two special symbols (Q3 and Q2) instead of one symbol. Thus, there is an interval during which no field of the check is being read, but this interval may be followed by a Serial Number field.

If the Serial Number field is present on the check being read, it is terminated by a final or third paragraph symbol Q2. In this case, the negative pulse output of the differentiator inverter 245 (FIGURE 11) will be applied through the "AND" gate 247 (FIGURE 12) to the T input of the flip-flop 217. With the flip-flop 217 reset, its "0" output will be at a negative voltage. This negative voltage will be applied through the "AND" gate 276 to the set input of the flip-flop 212, and, with the flip-flop 212 set, its "0" output will be at 0 volts. This 0 voltage is applied to all of the Field "AND" gates 221, 222, 223, 225, 226, 228, and 229, respectively. Thus, all of these "AND" gates will be disabled.

If the check being read contained no ABA Number and FRD Number fields, the one-shot circuit 275 will not be changed to its unstable state. If there is no Serial Number field on the check being read, the flip-flop 217 will not be set. If both of these conditions exist, the flip-flop 212 will not be set until the signal 156 (FIGURE 9) from the "0" output of the 150-microsecond one-shot circuit 277 (FIGURES 9 and 18) is applied to the "AND" gate 276 (FIGURE 12). The "0" output of the one-shot circuit 275 will normally be at a negative voltage but will change to 0 volts about 14.6 microseconds after the end of the unblanking pulse 121 (FIGURES 7 and 21) has terminated reading of the check. The "0" output of the one-shot circuit 275 will remain at 0 volts for 150 microseconds, and then it will change to a negative voltage. This negative voltage will be applied through the "AND" gate 276 (FIGURE 12) to the set input of the flip-flop 212. Thus, the flip-flop 212 will be set, and the Field "AND" gates 221, 222, 223, 225, 226, 228, and 229, respectively, will be disabled.

The checks need not have all the information described heretofore printed on them in order to be acceptable to the sorter-reader 10. Of course, if the field in which sorting is to be accomplished is not present on a given check, that check will be rejected. If the selected field is present, however, a wide variation of other information on the check being read is permissible. The general rules that cover the printing acceptable to the sorter-reader 10 are as follows:

(1) The Transaction Code number must be accompanied by an Amount number, but the Amount number may be printed without the Transaction Code number. In the field selector circuit 104, the Transaction field will not be recognized unless it is preceded by two Q1 symbols that define the Amount field.

(2) The Account Number 2 number must be accompanied by an Account Number 1 number, but the Account Number 1 number may occupy the entire Account Number region and thus exclude the Account Number 2 number. In the field selector circuit 104, the Q4 symbol that begins the Account Number 2 field is recognized as such only if it is preceded by the Q2 symbol that begins the Account Number 1 field.

(3) The F.R.D. Number must be accompanied by an A.B.A. Number, but the A.B.A. Number theoretically may be printed without the F.R.D. Number. In practice, both the A.B.A. and the F.R.D. Numbers are always printed on a check. In the field selector circuit 104, the Q4 symbol that begins the F.R.D. field is recognized as such only if it is preceded by a Q3 symbol that begins the combined A.B.A. and F.R.D. fields.

(4) The Serial Number must be accompanied by either an Account Number 1 number or an F.R.D. Number, but these numbers may be printed without a Serial Number. In the field selector circuit 104, the Q2 symbol that begins the Serial Number field is recognized as such only if it is preceded either by a Q2 symbol that begins the Account Number 1 field or by a Q3 symbol that ends the A.B.A. and the F.R.D. fields.

(9) *Input Encoder*

(FIGURE 17)

As the character reader 12 reads each digit from a check, it develops a 20-microsecond positive pulse on an appropriate digit line and sends this pulse to the input encoder 105 (FIGURE 17). There are ten such digit lines, one for each such decimal value, plus one line for zero. In the input encoder 105, a digit pulse is first inverted by a differentiator inverter, such as that shown in FIGURE 14. The negative digit pulse is then applied to several "OR" gates, depending on its significance. A negative digit pulse on any one of the digit lines 1 through 9 is applied through a 9-input "OR" gate 280 (FIGURE 17) to the set input of the 100-microsecond one-shot circuit 281 (FIGURE 18). The 100-microsecond negative voltage developed at the "1" output of the one-shot circuit 281 is applied to the "AND" gate 282 (FIGURE 18) in the special sort circuit 109.

Figure 14:
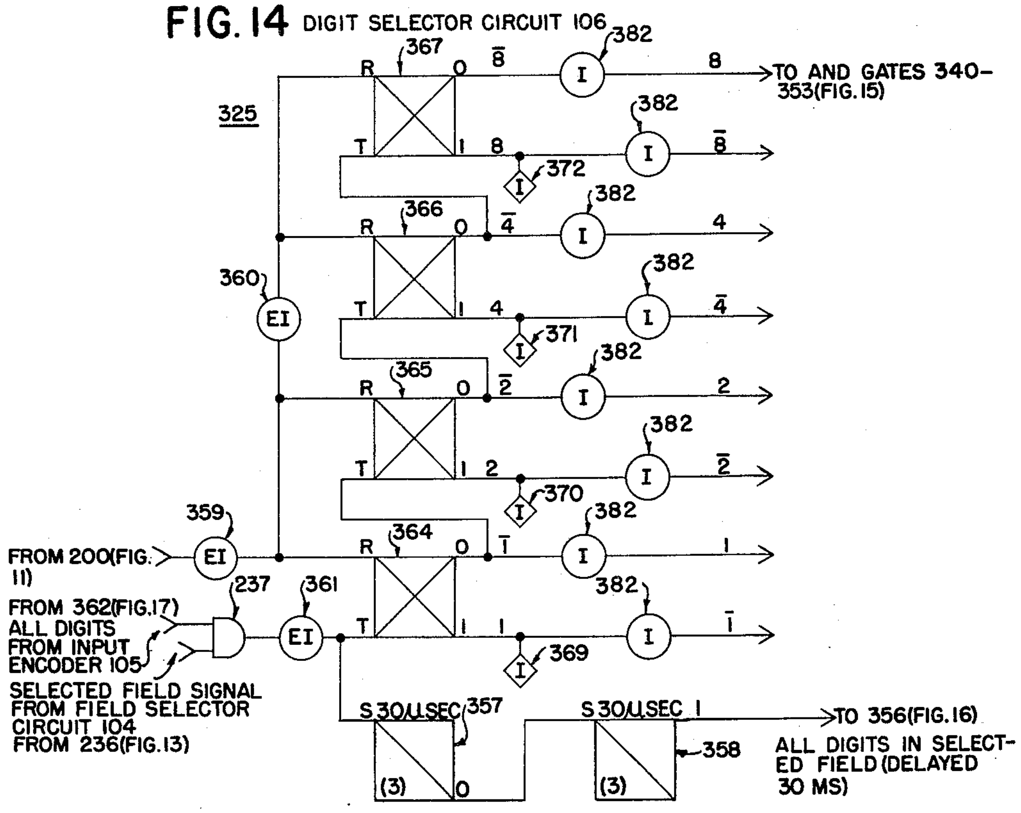

The negative digit pulse output of the "OR" gate 280 is also applied through the "OR" gate 283 (FIGURE 17) and the emitter follower 284 to the pocket selector switches 285 (FIGURE 17) and to the "AND" gate 237 in the digit selector circuit 106 (FIGURE 14).

A negative pulse on the "0" digit line is also applied through the "OR" gate 283 and the emitter follower 284 to the pocket selector switch 285 and to the "AND" gate 237 in the digit selector circuit 106 (FIGURE 14).

Thus, all digit pulses except zeros operate the one-shot circuit 281 (FIGURE 18) to develop 100-microsecond negative pulses which are applied to the "AND" gate 282 in the special sort circuit 109, and all digit pulses, including zero digit pulses, are applied to the pocket selector switch 285 and to the "AND" gate 237 in the digit selector circuit 106.

There are four other "OR" gates, 286 to 289 inclusive, in the input encoder 105. These "OR" gates and their output lines are labeled $\bar{1}$, $\bar{2}$, $\bar{4}$, and $\bar{8}$, respectively. Each digit pulse line is connected to that combination of "OR" gates which represents its value. Thus, digit line "3" is connected to the "OR" gates 288 ($\bar{4}$) and 289 ($\bar{8}$). The digit line "8" is connected to the "OR" gates 286 ($\bar{1}$), 287 ($\bar{2}$), and 288 ($\bar{4}$). Each digit pulse developed in the character reader 12 on a given digit line is thereby converted into a group of simultaneous pulses on one or more of the four binary-coded decimal lines $\bar{1}$, $\bar{2}$, $\bar{4}$, and $\bar{8}$ which form the outputs of the "OR" gates 286 to 289, inclusive.

A section 290, 291, 292, and 293 of the pocket selector switch 285 is provided for each of the output lines $\bar{1}$, $\bar{2}$, $\bar{4}$, and $\bar{8}$, respectively. The $\bar{1}$ output of the "OR" gate 286 is connected to the normal position of section 290. The $\bar{2}$ output of the "OR" gate 287 is connected to the normal position of section 291. The $\bar{4}$ output of the "OR" gate 288 is connected to the normal position of section 292, and the $\bar{8}$ output of the "OR" gate 289 is connected to the normal position of section 293. The common point 294 of section 290 is coupled via the emitter follower 295 to the set input of a 100-microsecond one-shot circuit 296. The common point 297 of section 291 is coupled via the emitter follower 298 to the set input of a 100-microsecond one-shot circuit 299. The common point 300 of section 292 is coupled via the emitter follower 301 to the set input of a 100-microsecond one-shot circuit 302. The common point 303 of section 293 is coupled via the emitter follower 304 to the set input of a 100-microsecond one-shot circuit 305.

The "1" output of the one-shot circuit 296 is coupled via the emitter follower 306 to the output terminal 307, where the signals thereat are made available to the associated equipment 14. The "1" output of the one-shot circuit 296 is also coupled via the "AND" gate 308 to the set input of the flip-flop 309.

The "1" output of the one-shot circuit 299 is coupled via the emitter follower 310 to the output terminal 311, where the signals thereat are made available to the associated equipment 14. The "1" output of the one-shot circuit 299 is also coupled via the "AND" gate 312 to the set input of the flip-flop 313.

The "1" output of the one-shot circuit 302 is coupled via the emitter follower 314 to the output terminal 315, where the signals thereat are made available to the associated equipment 14. The "1" output of the one-shot circuit 302 is also coupled via the "AND" gate 316 to the set input of the flip-flop 317.

The "1" output of the one-shot circuit 305 is coupled via the emitter follower 318 to the output terminal 319, where the signals thereat are made available to the associated equipment 14. The "1" output of the one-shot circuit 305 is also coupled via the "AND" gate 320 to the set input of the flip-flop 321.

The input memory 107 comprises the flip-flops 309, 313, 317, and 321. The "0" outputs of these flip-flops are connected to an indicator circuit 322. The indicator circuits will be energized when these flip-flops are reset.

The other positions, special sort to reject in a counterclockwise direction, of each of the sections 290 to 293, inclusive, of the pocket selector switches 285 are either connected to ground potential or connected to receive the "all digits" output of the "OR" gate 283. The four "OR" gates 286 to 289 function to translate each input digit pulse into a group of pulses, representing in binary-coded form the same decimal value. The four sections 290 to 293 of thet pocket selector switch 285 translate each input digit pulse into eleven groups of pulses, representing in binary-coded form all ten decimal digits and a special sort code ($\bar{1}$). The reject position of each of the sections of the pocket selector switches 285 is connected to ground. By means of the setting of the sections of the pocket selector switches 285, maintenance men may determine whether the values of the digits actually read from a check are to be utilized further (normal position of the sections) or whether an arbitrary value is to be selected for all digit pulses (all other positions of the sections). The latter procedure is used by maintenance personnel for testing purposes. For example, if all sections of the pocket selector switches 285 are turned to position "S," the special sort code (line $\bar{1}$) will be transmitted by the switches every time a digit pulse, on any digit line, arrives at the input encoder 105. If all sections of the pocket selector switches 285 are turned to position "5," pulses will be applied simultaneously to the one-shot circuits 299 and 305 every time a digit pulse arrives at the input encoder 105. If all sections of the pocket selector switches 285 are turned to position "R" (Reject), no output pulses will be generated by the input encoder 105, regardless of the digit pulse input thereto from the character reader 12.

(10) *Digit Selector Circuit*

(FIGURES 14 TO 16 INCLUSIVE)

The digit selector circuit 106 comprises the digit counter 325, the fourteen digit selector switches 326 to 339, inclusive, the "AND" gates 340 to 353, inclusive, the "OR" gate 355, the "AND" gate 356, the 30-microsecond one-shot circuits 357 and 358, and the emitter followers 359 to 361, inclusive, 363, and 374.

The digit counter 325 (FIGURE 14) comprises the flip-flops 364 to 367, inclusive. The flip-flop 364 counts in units of one; the flip-flop 365 counts in units of two; the flip-flop 366 counts in units of four; and the flip-flop 367 counts in units of eight. Each of the flip-flops 364 to 367, inclusive, has two outputs, "1" and "0." In each case, the "1" ouput represents the value of that binary place (N), while the "0" output represents its negation ($\bar{N}$). Thus, there are a total of eight lines (1, 2, 4, 8, $\bar{1}$, $\bar{2}$, $\bar{4}$, and $\bar{8}$) within the counter. Any decimal value from 0 to 15 can be represented by turning On (—12 volts) four of these eight lines. The following table shows the binary-coded decimal representation of the values 0 to 15, inclusive. It is to be noted that one line of each pair is always On (a pair being 1 and $\bar{1}$, 2 and $\bar{2}$, etc.).

BINARY-CODED DECIMAL REPRESENTATION OF VALUES 0 TO 1

| Decimal values | Binary lines | | | | | | | |
|---|---|---|---|---|---|---|---|---|
| | 1 | $\bar{1}$ | 2 | $\bar{2}$ | 4 | $\bar{4}$ | 8 | $\bar{8}$ |
| 0 | ---- | X | ---- | X | ---- | X | ---- | X |
| 1 | X | ---- | ---- | X | ---- | X | ---- | X |
| 2 | ---- | X | X | ---- | ---- | X | ---- | X |
| 3 | X | ---- | X | ---- | ---- | X | ---- | X |
| 4 | ---- | X | ---- | X | X | ---- | ---- | X |
| 5 | X | ---- | ---- | X | X | ---- | ---- | X |
| 6 | ---- | X | X | ---- | X | ---- | ---- | X |
| 7 | X | ---- | X | ---- | X | ---- | ---- | X |
| 8 | ---- | X | ---- | X | ---- | X | X | ---- |
| 9 | X | ---- | ---- | X | ---- | X | X | ---- |
| 10 | ---- | X | X | ---- | ---- | X | X | ---- |
| 11 | X | ---- | X | ---- | ---- | X | X | ---- |
| 12 | ---- | X | ---- | X | X | ---- | X | ---- |
| 13 | X | ---- | ---- | X | X | ---- | X | ---- |
| 14 | ---- | X | X | ---- | X | ---- | X | ---- |
| 15 | X | ---- | X | ---- | X | ---- | X | ---- |

The digit pulses to be counted by the digit counter 325 are applied from the terminal 362 (FIGURE 17) through the "AND" gate 237 (FIGURE 14) and the emitter follower 361 to the T input of the flip-flop 364. The carries to the next higher flip-flop 365 are accomplished by connecting the "0" output of the flip-flop 364 to the T input of the flip-flop 365. Three carries are required in the digit counter 325. Thus, each of the "0" outputs of the flip-flops 365 and 366, respectively, is connected to the T input of the flip-flops 366 and 367, respectively. The digit counter 325 is reset or cleared in response to the first synchronization signal 145 (FIGURE 9), which is applied simultaneously to the reset inputs of the four flip-flops 364 to 367, inclusive. Since the flip-flops 364 to 367, inclusive, are dominant reset types, the "0" output of one to the T input of the next during resetting has no effect upon the recipient flip-flop.

Each of the eight output lines of the digit counter 325 is connected to an inverter 382, which effectively reverses the condition of each pair of output lines, as shown in FIGURE 14. From the inverters 382, the digit counter output lines, which are "On" (—12 volts) for each decimal value from "1" to "14," are connected to the "AND" gates 340 to 353, inclusive (FIGURES 15 and 16), which represent these values. Thus, the digit counter output lines $\bar{1}$, $\bar{2}$, $\bar{4}$, and $\bar{8}$, which are all On for a count of "1," are connected to the "AND" gate 340. Each of the other "AND" gates 341 to 353, inclusive, except the "7" "AND" gate 346, the "11" "AND" gate 350, the "13" "AND" gate 352, and the "14" "AND" gate 353, also receives four inputs from the digit counter output lines. Each of the "AND" gates 346, 350, 352, and 353 receives only three inputs from the digit counter output lines.

The four "AND" gates 346, 350, 352, and 353 are distinguished by the fact that each of them would normally have three N inputs and one $\bar{N}$ input. The "AND" gate 346, for example, would have digit counter output lines 1, 2, 4, and $\bar{8}$ connected to its input side. However, since the count of "15" is not utilized, the N input for each of the "AND" gates 346, 350, 352, and 353 is dispensed with. This $\bar{N}$ input is required only to distinguish each count of the digit counter 325 from "15." For example, output lines 1, 2, 4, and 8 are On at the count of "15," while output lines $\bar{1}$, 2, 4, and 8 are On at the count of "14." The only difference between the two is the output of the flip-flop 364 (1 and $\bar{1}$). If the $\bar{1}$ input to the "14" "AND" gate 353 is omitted, the count of "14" can still be distinguished from any other usable count. The fact that the count of "14" cannot be distinguished from the count of "15" is immaterial, since the count of "15" is not utilized. The same thing is true of the count of "7" ($\bar{8}$ vs. 8), "11" ($\bar{4}$ vs. 4), and "13" ($\bar{2}$ vs. 2).

The digit counter 325 is provided for counting the digit characters that are printed on the check in the field selected for sorting each check as it is read. The digit counter 325 is not concerned with the value or significance of the digit characters in the selected field, but is concerned only with their presence on the check to be sorted. As the digit counter 325 counts the digit characters in the selected field, it compares its count with the outputs of the digit selector switches 326 to 339, inclusive (FIGURES 15 and 16), on the operator control panel 25 to determine which digit character has been selected by the operator for sorting the check on. When the count of the digit counter 325 reaches the selected digit character—for example, the third digit character in the selected field—the digit selector circuit 106 will send an output signal via the emitter follower 363 (FIGURE 16) to the "AND" gates 308, 312, 316, and 320 (FIGURE 17) of the input memory 107, and to the set input of the flip-flop 368 (FIGURE 18) in the special sort circuit 109.

Before the reading of each check commences, the first synchronization signal 145 (FIGURE 9) passed through the differentiator inverter 200 (FIGURE 11) and through the emitter follower 359 (FIGURE 14) to the reset input of the flip-flops 364 and 365. From the emitter follower 359, the first synchronization signal 145 is also passed through the emitter follower 360 to the reset input of the flip-flops 366 and 367. The first synchronization signal 145 causes the flip-flops 364 to 367, inclusive, to be reset or cleared. Then, the reading of the characters on the check commences. When the field selector circuit 104 determines that the selected field of the check is being read, its selected field output from the emitter follower 236 (FIGURE 13) is On (—12 volts). This selected field output voltage is applied to the "AND" gate 237 (FIGURE 14) and remains On until the termination of the reading of the selected fields. All digit characters that are read from the check produce, in the character reader 12, digit character pulses which are sent via the terminal 362 (FIGURE 17) of the input encoder 105 to the "AND" gate 237 (FIGURE 14). However, only those digit character pulses which occur during the reading of the selected field are able to pass through the "AND" gate 237 to the flip-flop 364 of the digit counter 325.

The first negative 20-microsecond digit pulse in the selected field is passed through the "AND" gate 237 to the T input of the flip-flop 364. Thus, the flip-flop 364 is set, and 0 volts appears at its "0" output. A negative output (—12 volts) appears on the output line, and this line is connected to the "1" "AND" gate 340 (FIGURE 15). At this time, the flip-flops 365 to 367, inclusive, will be still reset. Consequently, a negative voltage (—12 volts) appears on the $\bar{2}$, $\bar{4}$, and $\bar{8}$ output lines, and these lines are connected to the "1" "AND" gate 340, also. If the digit selector switch 326 has been depressed by the operator, the "1" "AND" gate 340 will produce a negative output, which is applied via the 14-input "OR" gate 355, the emitter follower 374, to the "AND" gate 356. Meanwhile, the first negative 20-microsecond digit pulse in the selected field is also applied via the "AND" gate 237 and the emitter follower 361 to the set input of the 30-microsecond one-shot circuit 357. The "0" output of the one-shot circuit 357 will swing to 0 volts for 30 microseconds, and then it returns negative. This negative swing is applied to the set input of the one-shot circuit 358. The "1" output of the one-shot circuit 358 is negative for 30 microseconds and is applied to the "AND" gate 356 (FIGURE 16). If this negative voltage output of the one-shot circuit 358 represents the selected digit for sorting thereon, and the "OR" circuit 355 has also applied a negative voltage to the "AND" gate 356, then this 30-microsecond negative voltage will pass through the "AND" gate 356 and be applied to the "AND" gates 308, 312, 316 and 320 (FIGURE 17) of the input memory 107 and to the set input of the flip-flop 368 (FIGURE 18) in the special sort circuit 109.

Thus, it is clear that each 20-microsecond digit pulse within the selected field advances the digit counter 325 and develops a negative 30-microsecond pulse, delayed 30 microseconds. This 30-microsecond delay compensates for a corresponding delay in the response of the digit counter 325. When the selected digit is reached by the digit counter 325, that 30-microsecond negative pulse is available at the output of the emitter follower 363 (FIGURE 16) and is the "selected digit" output of the digit selector circuit 106. If the digit counter 325 never reaches the selected digit before the selected field ends, there will be no "selected digit" output of the digit selector circuit 106.

The digit counter 325 is provided with four neon indicator circuits, 369 to 372, inclusive, each of which is connected, respectively, to the 1, 2, 4, and 8 output lines of the flip-flops 364 to 367, respectively. When the digit counter 325 is set to zero in response to the first synchronization signal 145, these indicator circuits will be Off. As the digit counter 325 advances, these indicator circuits will show its count at all times.

In FIGURE 14, the 1, 2, 4, and $\bar{8}$ digit counter output lines from the inverters 382 are connected to the 4-input "OR" gate 373 (FIGURE 19) in the reject circuit 108. At least one of these output lines is On (—12 volts) at all times, except when the digit counter 325 reaches the count of "10." Since the decimal "10" uses the digit counter output lines $\bar{1}$, 2, $\bar{4}$, and 8, none of the lines connected to the "OR" gate 373 (FIGURE 19) will be On at this time.

(11) *Input Memory*

(FIGURE 17)

The input memory 107 comprises the flip-flops 309, 313, 317, and 321. The input memory 107 receives each digit read from a check, in binary-coded decimal form. However, it permits to pass into its memory logic only that digit which is selected for sorting, as determined by a signal from the digit counter 325.

Before the commencement of the reading of a check, the first synchronization signal 145 (FIGURE 9) is passed through the differentiator inverter 200 (FIGURES 9 and 11) and is applied to the reset input of each of the flip-flops 309, 313, 317, and 321. Thus, with these flip-flops reset, their "0" outputs will be at a negative voltage (—12 volts). The four neon indicator circuits 379 to 382, connected, respectively, to the "0" outputs of these flip-flops, will be On, and their neon lamps will be lighted.

Each digit character that is read from a check by the character reader 12 is translated into binary-coded decimal form by the input encoder 105 and passed to the input memory 107 in this form. These 100-microsecond negative pulses are applied to the input memory "AND" gates 308, 312, 316, and 320. These negative pulses will not be passed on by the "AND" gates 308, 312, 316, and 320 unless they happen to represent the digit character selected for sorting on. In this event, the selected digit output from the emitter follower 363 (FIGURE 16), a negative 30-microsecond pulse, will be applied to the "AND" gates 308, 312, 316, and 320. This negative 30-microsecond pulse will pass through the "AND" gates 308, 312, 316, and 320, at which the negative 100-microsecond pulses are already present, to set the corresponding flip-flops 309, 313, 317, and 321 in the input memory 107. The setting of the flip-flops 309, 313, 317, and 321 will cause their "0" outputs to swing to 0 volts, extinguishing the neon lamps in the indicator circuits 379 to 382, inclusive, and it will cause a negative voltage (−12 volts) to appear at their "1" outputs. This negative voltage is applied to the transfer "AND" gates 375 to 378, inclusive.

For example, assume that the second digit character in a given field has been selected for sorting a batch of checks, and that this digit character on a given check is a "5." This "5" digit pulse from the character reader 12 is translatted by the input encoder 105 into simultaneous 100-microsecond negative pulses on output lines $\overline{2}$ and $\overline{8}$ from the one-shot circuits 299 and 305, respectively (FIGURE 17). This "5" digit pulse causes the digit selector circuit 106 (FIGURES 14, 15, and 16) to produce a 30-microsecond negative selected digit output from the emitter follower 363 (FIGURE 16), which is also applied to the input memory "AND" gates 308, 312, 316, and 320 (FIGURE 17). Hence, the 30-microsecond negative selected digit output signal will pass through the "AND" gates 312 and 320, on output lines $\overline{2}$ and $\overline{8}$, to set the flip-flops 313 and 321. This condition will produce a continuous negative voltage at the "1" outputs of the flip-flops 313 and 321, and will extinguish the neon lamps in the indicator circuits 380 and 382. The flip-flops 313 and 321 will then remain set until the development of the next first synchronization signal 145. Thus, the selected digit will remain in the input memory 107 until it is reset in response to the first synchronization signal 145 at the beginning of the reading of the next check to be sorted.

(12) *Output Memory*

(FIGURE 18)

The output memory 110 comprises the transfer "AND" gates 375 to 378, inclusive (FIGURE 17), the output memory "OR" gates 450 to 453, inclusive, the flip-flops 454 to 457, inclusive, the "AND" gates 449, and 458 to 460, inclusive, the neon indicator circuits 461 to 464, inclusive, the differentiator inverters 465 to 472, inclusive, and the emitter followers 473 to 476, inclusive.

The final sort decision is placed in the output memory 110, where it is available to either the electronic memory 113 or the output decoder 111, and to the associated equipment 14. The second synchronization signal 146 (FIGURE 9) will cause the output memory 110 to be cleared by resetting of the flip-flops 454 to 457, after the reading of a check is terminated, and then the sort decision for the check just read is transferred to it. This sort decision may be either internal (generated within the sorter-reader 10) or external (coming from the associated equipment 14). If the sort decision is internal, it may be either decimal (obtained from the input memory 107 when transferred by the transfer signal from the special sort circuit 109) or special (obtained from the special sort "AND" gate 388, FIGURE 18, in the special sort circuit 109). If a check is to be rejected, then no sort decision at all will enter the output memory 110, whether the rejection information is generated within the sorter-reader 10 or is generated in the associated equipment 14.

During the reading of a check, the selected digit signal, in binary-coded decimal form, is present at the "1" outputs of the flip-flops 309, 313, 317, and 321 (FIGURE 17) of the input memory 107. Thus, the selected digit signal is available to the transfer "AND" gates 375 to 378 (FIGURE 17) in the output memory 110. Then, after the reading of the check is terminated, the second synchronization signal 146 (FIGURE 9) is passed through the differentiator inverter 477 (FIGURE 11) to the reset inputs of the flip-flops 454 to 457 to reset them. When the flip-flops 454 to 457 are reset, a negative voltage appears at their "0" outputs on the output lines 1, 2, 4, and 8, and the neon lamps in the indicator circuits 461 to 464 are lighted.

Then, when the third synchronization signal 158 (FIGURE 9) is applied to the "AND" gates 387 and 388 (FIGURE 18) of the special sort circuit 109, a transfer signal or a special sort decision signal will be produced. If a transfer signal is produced at the output of the "AND" gate 387, it is applied via the emitter follower 436 to the "AND" gates 375 to 378 (FIGURE 17). The transfer signal will pass through those of the "AND" gates 375 to 378 whose binary input lines are On; that is, at −12 volts. The outputs of the "AND" gates 375 to 378, respectively, are connected to the 3-input "OR" gate 450, the 2-input "OR" gate 451, the 2-input "OR" gate 452, and the 2-input "OR" gate 453, respectively. Thus, the transfer signal will pass through the "OR" gates 450 to 453 to the set input of the flip-flops 454 to 457 and cause them to be set. For example, if the selected digit read from the check were a "5," then the output lines $\overline{2}$ and $\overline{8}$ of the flip-flops 317 and 309 (FIGURE 17) would be On (−12 volts). The arrival of the negative transfer signal at the "AND" gates 375 and 377 will cause a negative voltage output from these gates which will set the flip-flops 454 and 456 of the output memory 110. Of the eight output lines (1, 2, 4, 8, $\overline{1}$, $\overline{2}$, $\overline{4}$, and $\overline{8}$) of the flip-flops 454 to 457, the lines 1, $\overline{2}$, 4, and $\overline{8}$ would be On (−12 volts), and the neon lamps in the indicator circuits 462 and 464 would be extinguished.

If a special sort decision signal is produced at the output of the "AND" gate 388, the selected digit signal would not pass through the "AND" gates 375 to 378 (FIGURE 17). Instead, the negative special sort decision signal would pass through the "OR" gate 450 (FIGURE 18) and be applied to the set input of the flip-flop 454 to set it. As a result, the output lines $\overline{1}$, 2, 4, and 8 from the flip-flops 454 to 457, respectively, would be On (−12 volts). This condition is the special sort decision in binary-coded decimal form. The neon lamp of the indicator circuit 461 would be extinguished at this time.

The binary output lines $\overline{1}$, $\overline{2}$, $\overline{4}$, and $\overline{8}$ of the flip-flops 454 to 457 are connected via the emitter followers 473 to 476 to the terminals 480 to 483. The signals appearing at the terminals 480 to 483 are available to the associated equipment 14 and to the electronic memory 113. The binary output lines $\overline{1}$, $\overline{2}$, $\overline{4}$, and $\overline{8}$ are also connected via the differentiator inverters 465, 467, 469, and 471 to certain of the output decoder "AND" gates 485 to 495, inclusive (FIGURE 20), in the output decoder 111. The binary output lines 1, 2, 4, and 8 are connected to the terminals 496 to 499. The signals appearing at the terminals 496 to 499 are available to the electronic memory 113. Finally, the binary output lines 1, 2, 4, and 8 are also connected via the differentiator inverters 466, 468, 470, and 472 to certain of the output decoder "AND" gates 485 to 495, inclusive (FIGURE 20), in the output decoder 111.

If an external sort decision were to be utilized in the sorter-reader 10, the special sort circuit 109 would produce no output. In other words, neither a transfer signal nor a special sort decision signal would be developed. Instead, section 500 of the mode switch 31 would be in its process position (sort position is shown in FIGURE 18) and enable the "AND" gates 449 and 458 to 460 to pass the external binary coded decimal sort decision available at the terminals 501 to 504, inclusive, through the "OR" gates 450 to 453 to the flip-flops 454 to 457. The timing for the external sort decision applied to the terminals 501 to 504 is provided by the associated equipment 14.

The flip-flops 454 to 457 of the output memory 110 are reset—that is, cleared of the previous check's sort decision—after the reading of the current check is finished and just before the sort decision for the current check is transferred to the output memory 110. Thus, the sort decision for the last check read will remain in the output memory 110 indefinitely, until another batch of checks is read or the power for the sorter-reader is turned off.

(13) *Output Decoder*

(FIGURE 20)

The output decoder 111 comprises the "AND" gates 505 to 515, inclusive. The function of these "AND" gates is to translate the sort decision in binary coded decimal form from the flip-flops 454 to 457 (FIGURE 18) of the output memory 110 to a single decimal line form. Thus, the eight binary lines (1, 2, 4, 8, $\bar{1}$, $\bar{2}$, $\bar{4}$, and $\bar{8}$) from the output memory 110 are connected to the output decoder 111. The output decoder 111 is provided with eleven output lines, representing the eleven possible stacker decisions; that is, one each for the special sort stacker 60 and the ten (0–9) decimal stackers 61 to 70 (FIGURE 1). The output decoder 111 is required for this purpose only when the mechanical memory 112 is used to delay the sort decision pulses so that they will operate the stacker gate devices at the correct time. If the electronic memory 113 is used in the sorter-reader 10, then the output decoder 111 is not necessary. The electronic memory 113 combines the functions of decoding and delay, and each of its eleven outputs is coupled to a corresponding stacker gate solenoid, such as the solenoid 557 (FIGURE 30), via an emitter follower 516 to 526 and a 90-milliampere driver 527 to 537.

After the reading of a check has been completed and its sort decision has been placed in the output memory 110, that sort decision is available to the output decoder 111 on the output lines (1, 2, 4, 8, $\bar{1}$, $\bar{2}$, $\bar{4}$, and $\bar{8}$) of the output memory 110. The sort decision for the check appears in binary coded decimal form. For example, a decimal sort decision "5" would appear as negative signals on binary lines 1, $\bar{2}$, 4, and $\bar{8}$.

The eight output lines (1, 2, 4, 8, $\bar{1}$, $\bar{2}$, $\bar{4}$, and $\bar{8}$) of the output memory 110 are connected to the eleven "AND" gates 505 to 515 in such a manner that the four lines that are On (−12 volts) for each sort decision are connected to the "AND" gate representing that short decision. For example, the special sort "AND" gate 505 has as input lines the lines $\bar{1}$, 2, 4, and 8; and "0" "AND" gate 506 has as input lines the lines $\bar{1}$, $\bar{2}$, $\bar{4}$, and $\bar{8}$; and so on. For any given sort decision received from the output memory 110, the corresponding "AND" gate (505 to 515) will have four negative signals applied to it. This condition will persist while the check is being read.

At the termination of the reading of the check, the negative 15-millisecond signal 182 from the output of the inverter 538 (FIGURE 11) is applied to all of the "AND" gates 505 to 515. Only that one of the "AND" gates 505 to 515 which already has four input lines in the On condition will then produce a negative voltage output (−12 volts). If the special sort "AND" gate 505 produces a negative voltage output, it will be applied via the emitter follower 516, the 90-milliampere driver 527, and the power amplifier 551 (FIGURE 30) to the gate solenoids 550 and 552 for the "S" stacker 60 (FIGURE 1) and the "S" item counter; and, for example, if the "0" "AND" gate 506 produces a negative voltage output, it will be applied via the emitter follower 517, the 90-milliampere driver 528, and the power amplifier 553 (FIGURE 30) to the gate solenoid 557 for the "0" stacker 61 (FIGURE 1) and to the "0" item counter solenoid 555. Then, the signal 150, which is developed in response to the second synchronization signal 146, is applied to the reset inputs of the flip-flops 454 to 457 (FIGURE 18) to reset them and clear the input memory 107. Thus, the output memory 110 is prepared to receive the sort decision for the check just read from the input memory 107.

In the mechanical memory 112, the sort decision is delayed the correct amount and then is applied to the gate solenoid for that sort decision at the time that the check is approaching the desired one of the stackers or pockets 60 to 70 (FIGURE 1).

When the electronic memory 113 is utilized in place of the mechanical memory 112, the output decorder 111 is not utilized. The sort decisions from the electronic memory 113 are applied via the emitter followers 516 to 526, the 90-milliampere drivers 527 to 537, and the power amplifiers, such as the power amplifiers 551 and 553 (FIGURE 30), to the special sort gate solenoid 550, the "0" to "9" gate solenoids, such as the solenoid 557, and to their respective counter solenoids, such as the solenoid 555. The electronic memory 113 provides the necessary demoding and delay for the sort decision signals.

(14) *Reject Circuit*

(FIGURE 19)

The reject circuit 108 includes the flip-flop 385, and it is placed in a non-reject state when it is reset at the beginning of the reading of each check. In the non-reject state, the reject circuit 108 transmits a non-reject output (−12 volts) to the special sort circuit 109. There are six different conditions which can cause rejection of a check, as previously set forth. These conditions are called (1) Operator Error; (2) Field Not Present; (3) Incorrect Number of Digits in the Amount Field; (4) Multiple Read in the Selected Field; (5) Noise in the Selected Field; and (6) Reject Command from the associated equipment 14. If, at any time between the time of the beginning of reading of the check as indicated by the arrival of the signal 93 (FIGURE 9) at the reject circuit 108, which signal is developed in response to the first synchronization signal 145 (FIGURE 9) and the termination of reading of the check as indicated by the arrival of the signal 93 at the reject signal circuit 108, which signal is developed in response to the second synchronization signal 146 (FIGURE 9), any of the above conditions is detected, the reject circuit 108 will be transferred to its reject state. The non-reject output of the reject circuit 108 will be terminated, and a reject information signal (−12 volts) will be made available to the associated equipment 14. If none of these conditions is detected, the reject circuit 108 will remain indefinitely in its non-reject state.

Before the reading of each check commences, the first synchronization signal 145 (FIGURE 9) is passed through the differentiator inverter 200 (FIGURES 9 and 11) and through the emitter follower 386 (FIGURE 19) to the reset inputs of the flip-flops 238 and 385. Thus, these flip-flops 238 and 385 are reset. The flip-flop 385, when reset, has a negative voltage appearing at its "0" output. This negative voltage (non-reject signal) is applied to the transfer "AND" gate 387 and to the special sort "AND" gate 388 in the special sort circuit 109 (FIGURE 8). When the flip-flop 385 is set by the negative voltage output of the 6-input "OR" gate 389, a negative voltage will appear at its "1" output. This negative voltage (reject information) is available to the associated equipment 14. Since the flip-flop 385 is reset at the beginning of the reading of each check, it must be set by a negative pulse from the output of the "OR" gate 389 in order for each check to be rejected. The six inputs to the "OR" gate 389 represent the six conditions that will effect rejection of a check.

(1) *Reject command.*—A negative voltage reject command signal may be applied to the "OR" gate 389 via the line 390 from the associated equipment 14. The reject command signal is ordinarily used when the sorter-reader 10 is operating in the process mode. The reject command signal will pass through the "OR" gate 389 and set the flip-flop 385. With the flip-flop 385 set, its non-reject output will be terminated—that is, its "0" output will be at 0 volts—and a reject information signal will be developed—that is, its "1" output will be at −12 volts. The flip-flop 385 will remain set until the next one of the signals 93 (FIGURE 9) is applied to its reset input.

(2) *Operator error.*—The amount field selector switch 239 (FIGURE 13) is connected via the line 391 to the "AND" gate 392 (FIGURE 19). The A.B.A. field selector switch 268 and the F.R.D. field selector switch 272 (FIGURE 13) are connected by the lines 393 and 394, respectively, to the "AND" gate 395. The "AND" gate 395, in turn, is connncted via the emitter follower 396 to the "AND" gate 413 (FIGURE 19). The "5" digit through "10" digit selector switches 330 to 335 (FIGURE 16) are connected via the lines 400 to 405, respectively, to the "OR" gate 406 (FIGURE 19), and the "11" through "14" digit selector switches 336 to 339 (FIGURE 6) are connected via the lines 407 to 410, respectively, to the "OR" gate 411 (FIGURE 19). The negative voltage outputs of the "5" through "10" digit selector switches 330 to 335 will pass through the "OR" gate 406 and the emitter follower 412 to the "AND" gate 413. The "AND" gate 413 will receive the negative voltage output from the emitter follower 396 (FIGURE 13) if either the A.B.A. field selector switch 268 or the F.R.D. field selector switch 272 is closed. The negative voltage outputs of the "11" through "14" digit selector switches 336 to 339 will also pass through the "OR" gate 411 and the emitter follower 414 to the "AND" gate 392. The "AND" gate 392 will also receive the negative voltage output appearing on the line 391 (FIGURE 13) if the amount field selector switch 239 is closed. Consequently, the reject circuit 108 is able to determine whether the operator has selected too high a digit in either the Amount, the A.B.A., or the F.R.D. fields.

For example, there should be no more than four digits in the A.B.A. field on any check. If the operator selects the A.B.A. field in which to perform a sorting operation, and the fifth digit in this field is selected, by the closing of the "5" digit selector switch 344 (FIGURE 16), an error is being made. This error will be detected by the reject circuit 108, for the negative outputs produced by the closing of the A.B.A. field selector switch 268 and the "5" digit selector switch 344 will both be applied to the "AND" gate 413 (FIGURE 19). The negative voltage output of the "AND" gate 413 is applied via the "OR" gate 415 and the emitter follower 416 to the "AND" gate 417. Thus, this negative voltage will be present at one input to the "AND" gate 417 constantly, until the operator changes the selection made, or turns off the power to the sorter-reader 10. The same condition would occur if the operator were to close the Amount field selector switch 239 and the "12" digit selector switch 337, as the Amount field contains only ten digit characters.

When the previous condition is established—that is, a negative voltage is applied to the "AND" gate 417 from the emitter follower 416—the arrival of the signal 93 (FIGURE 9) at the "AND" gate 417 will produce a negative output which will set the flip-flop 385 via the "OR" gate 389. The reject circuit 108 will thus be transferred from its non-reject state to its reject state. This transfer will take place for each check that is read, since the signal 150 (FIGURE 9) will reset the flip-flop 385 before the beginning of reading of a check. Thus, each check will be rejected in a manner more fully described when the special sort circuit 109 is explained in detail hereinafter.

(3) *Amount field.*—When the Amount field selector switch 239 (FIGURE 13) is closed, a negative voltage is applied not only to the "AND" gate 231 (FIGURE 13) and to the "AND" gate 392 (FIGURE 19) but also to a 3-input "AND" gate 418 (FIGURE 19).

The "AND" gate 418 has another input, which is connected via the emitter follower 419 to the output of the 4-input "OR" gate 373. The 1, $\overline{2}$, 4, and $\overline{8}$ output lines from the digit counter 325 (FIGURE 14) are connected to the input side of the "OR" gate 373.

During the reading of each check, the digit counter 325 (FIGURE 14) counts the digit characters read from the field selected for sorting. Thus, at the conclusion of the reading of a check, the digit counter 325 will retain the count of the digit characters read until it is reset by the signal 150 (FIGURE 9). The signal 150 (FIGURE 9), developed in response to the first synchronization signal 145, occurs at the beginning of reading of the next check. A negative signal on one or more of the digit counter output lines 1, $\overline{2}$, 4, and $\overline{8}$ will pass through the "OR" gate 373 and the emitter follower 419 to the "AND" gate 418. A negative voltage will appear on one or more of the digit counter output lines 1, $\overline{2}$, 4, and $\overline{8}$ at the conclusion of the reading of a check, except when the digit counter 325 has been set to the count "10" ($\overline{1}$, 2, $\overline{4}$, and 8).

As long as the digit counter 325 is set to some count other than "10," a negative voltage will be present at one of the inputs of the "AND" gate 418 (FIGURE 19). If the Amount field selector switch 239 (FIGURE 13) has been closed by the operator, then a negative voltage will be present at another input of the "AND" gate 418. Then, when the signal 93 occurs (FIGURE 9), which is developed in response to the second synchronization signal 145, a negative voltage is applied to the remaining input of the "AND" gate 418. Thus, after the reading of a check, a negative voltage from the "AND" gate 418 will be applied via the "OR" gate 389 to the flip-flop 385 to set it. With the flip-flop 385 set, the check in question will be rejected in a manner to be described hereinafter.

(4) *Field missing.*—In order for a check to be rejected for a field missing therefrom, a coincidental occurrence of the signal 93 (FIGURE 9) and an error signal at the input of the "AND" gate 420 is required. The error signal comprises the negative voltage appearing at the "0" output of the flip-flop 238, which occurs when the flip-flop 238 is reset. The flip-flop 238 is initially reset by the signal 150 (FIGURE 9) before the reading of each check. In its reset state, the flip-flop 238 provides the error signal to the "AND" gate 420. The flip-flop 238 can be set only by the negative selected field output from the field selector circuit 104; that is, the output from the emitter follower 236 (FIGURE 13).

If the field selected for sorting on is not found on a given check, the selected field output will not be developed during the reading of that check. Hence, the flip-flop 238 will remain reset, and the negative voltage appearing on its "0" output will remain applied to the "AND" gate 420. Then, with the arrival of the signal 150 (FIGURE 9) at the "AND" gate 420, after the reading of that check, its negative voltage output will cause the flip-flop 385 to be set and thus will cause the check to be rejected.

If the field selected for sorting is present on the given check, the negative selected field output will set the flip-flop 238 and terminate the negative voltage appearing at its "0" output. The "AND" gate 420, lacking this negative voltage input, will not produce a negative output upon the subsequent occurrence of the signal 150 (FIGURE 9).

(5) *Multiple read.*—If, at any time during the reading of a check, the character reader 12 detects a multiple read in its character outputs, it will send a multiple read signal to the sorter control 13. This positive multiple read signal is applied to the differentiator inverter 425, and its negative output is made available to the associated equipment 14 at the terminal 426. This positive multiple read signal is also applied to the differentiator inverter 427, and the negative output thereof is applied to the "AND" gate 428.

The "AND" gate 428 is also supplied with the negative selected field output signal from the field selector circuit 104; that is, the output of the emitter follower 236 (FIG- URE 13). Consequently, only when a multiple read signal is developed within the field selected for sorting on, and that selected field is present on a given check, will there be a negative voltage at the two inputs to the "AND" gate 428. Under these circumstances, the "AND" gate 428 will produce a negative output. This negative output will be applied through the "OR" gate 389 to the flip-flop 385 to set it and cause rejection of the check in question in a manner to be described hereinafter.

(6) *Noise present.*—If, at any time during the reading of a check, the character reader 12 detects excessive noise, it will send a positive noise signal to the differentiator inverter 429 (FIGURE 19), where it is inverted. The negative noise signal from the differentiator inverter 429 is applied to the 2-input "AND" gate 430 and to the terminal 431 via the emitter follower 432. At the terminal 431, the noise signal is available to the associated equipment 14. The other input to the "AND" gate 430 is the negative selected field output signal from the field selector circuit 104; that is, the output of the emitter follower 236 (FIGURE 13). Consequently, excessive noise in the field selected for sorting on a given check will produce a negative output from the "AND" gate 430, which is applied via the "OR" gate 389 to the flip-flop 385 to set it. Thus, the check in question will be rejected in a manner to be described hereinafter.

(15) *Special Sort Circuit*

(FIGURE 18)

The special sort circuit 109 comprises the 100-microsecond one-shot circuit 281, the flip-flop 368, the transfer "AND" gate 387, the special sort "AND" gate 388, and the flip-flop 435. The special sort circuit 109 determines, during the reading of each check, whether the digit character selected for sorting a given check on is significant or insignificant. If the digit character is significant, the special sort circuit 109 enters a non-special state, in which the flip-flop 435 is set. If the digit character is insignificant, it enters a special sort state, in which the flip-flop 435 is reset.

The special sort circuit 109 then determines whether the reject circuit 108 (FIGURE 19) will permit a normal sort decision to be made; that is, whether a non-reject signal is applied to the "AND" gates 387 and 388. If the special sort circuit 109 is in its non-special state and the reject circuit 108 permits a normal sort decision to be made, it will apply, via the emitter-follower 436, either a negative transfer signal to the "AND" gates 375 to 378, inclusive (FIGURE 17), to cause the binary-coded sort decision from the input memory 107 to be transferred to the output memory 110, or the special sort circuit 109 will apply, via the "AND" gate 388, a negative special sort decision signal to the "OR" gate 450 in the output memory 110. Finally, if either the switch section 440 of the mode switch 31 is in its process position and the associated equipment 14 does not permit an external sort decision, or the reject circuit 108 does not develop a non-reject signal, then the special sort circuit 109 will not develop either a transfer signal or a special sort decision signal.

At the beginning of the reading of each check, the flip-flops 368 and 435 will be reset by the signal 150 (FIGURE 9). The signal 150 is applied to the reset input of the flip-flop 368 from the differentiator inverter 200 (FIGURE 11) via the emitter follower 213 (FIGURE 11) and the "OR" gates 201 and 437 (FIGURE 12). The signal 150 is applied to the reset input of the flip-flop 435 from the differentiator inverter 200 (FIGURE 11). The flip-flop 435, when reset, develops a negative voltage (−12 volts) at its "0" output. This negative voltage is applied to the special sort "AND" gate 388. The flip-flop 368, when reset, has 0 volts appearing at its "1" output.

As the reading of a check progresses, negative 100-microsecond pulses from the one-shot circuit 281 are applied to the "AND" gate 282. These negative pulses are produced for all digit characters of a check which are read by the character reader 12 except for zero digit characters. These negative pulses will not pass through the "AND" gate 282 until its other input receives a negative voltage signal from the flip-flop 368.

The reset state of the flip-flop 368 is temporarily assured by every special symbol (Q1, Q2, Q3, and Q4) that is read from a check. Referring now back to FIGURE 12, the negative signals for the symbols Q2 and Q3 are passed through the "OR" gates 201 and 437 to the reset input of the flip-flop 368, while the negative signals for the symbols Q1 and Q4 are passed through the "OR" gate 437 only.

The negative selected digit output from the emitter follower 363 (FIGURE 16) of the digit selector circuit 106 is applied to the set input of the flip-flop 368 to set it. The flip-flop 368 will remain in its set state until reset by the arrival of a negative signal corresponding to one of the special symbols Q1, Q2, Q3, or Q4. This negative symbol signal signifies the termination of the field of the check which was selected for sorting a check thereon. When the flip-flop 368 is set by the selected digit signal, its "1" output will be at a negative voltage (−12 volts), and this negative voltage is applied to the "AND" gate 282. Consequently, this negative voltage permits all digit character pulses from the one-shot circuit 281 to pass through the "AND" gate 282 to the set input of the flip-flop 435. The digit character pulse corresponding to the selected digit itself, unless it corresponds to zero, will also pass through the "AND" gate 282.

The first digit character pulse passed by the "AND" gate 282 (after the flip-flop 368 is set by the selected digit signal) will set the flip-flop 435. If the selected digit signal and all digit signals provided for the digit characters remaining in the selected field correspond to zeros, no signals will be applied to the set input of the flip-flop 435 to set it. However, as long as any one of these digit signals does not correspond to zero (represent a zero digit character on the check), the flip-flop 435 will be set. In this manner, the special sort circuit 109 determines whether the selected digit on the check is significant or insignificant.

When the flip-flop 435 is set, its "0" output is at 0 volts, and its "1" output is at −12 volts. Thus, the special sort output ("0") of the flip-flop 435 to the special sort "AND" gate 388 is terminated, and the non-special output ("1") of the flip-flop 435 is developed. Consequently, the non-special output of the flip-flop 435 is applied to the transfer "AND" gate 387 (decimal sort) if the digit character selected for sorting the check on is significant ("1" to "9" or a significant zero). If the digit character selected for sorting the check on is an insignificant zero, the flip-flop 435 will remain set, and its special sort output ("0") will persist.

Both of the 4-input "AND" gates 387 and 388 have their other three inputs in common. One input to the "AND" gates 387 and 388 is connected to the switch section 440 of the mode switch 31. In FIGURE 18, the switch section 440 is shown in the sort mode position. Consequently, a negative voltage (−12 volts) appearing at the terminal 442 from the power supply will be applied at all times via the line 443 to the "AND" gates 387 and 388. If the sorter-reader 10 is operating in the process mode, the switch section 440 will be in its process position, and a negative voltage (−12 volts) will appear at the terminal 444 from the associated equipment 14 and will be applied via the line 443 to the "AND" gates 387 and 388. A second input to the "AND" gates 387 and 388 is connected to the "0" output of the flip-flop 385 (FIGURE 19) in the reject circuit 108. As long as the reject circuit 108 finds no reason to reject the check being read, a non-reject signal (−12 volts) from the "0" output of the flip-flop 385 will be applied to the "AND" gates 387 and 388. When the reject circuit 108 finds reason for rejecting the check being read, it will terminate the non-reject signal. The third input to the "AND" gates 387 and 388 is the third synchronization signal 158 (FIGURE 9), which occurs after the reading of the check is finished. The third synchronization signal 158 is present at the "1" output of the 30-microsecond one-shot circuit 445 (FIGURES 9 and 18). If either, but never both, of the "AND" gates 387 and 388 has these three other inputs (−12 volts) present at the time of occurrence of the third synchronization signal 158, then a negative output (−12 volts) will be produced by either of the "AND" gates 387 or 388. Thus, if an internal sort decision is called for by reason of the fact that the switch section 440 of the mode switch 31 is in its sort position, and the check is not to be rejected, either a transfer (decimal sort) signal will be transmitted from the "AND" gate 387 to the transfer "AND" gates 375 to 378 (FIGURE 17), or a special sort decision signal will be transmitted from the "AND" gate 388 to the output memory "OR" gates 450 of the output memory 110.

6. COMPONENT CIRCUITS

(FIGURES 63 to 80)

In order to describe the invention more fully, the nature of the circuits schematically illustrated in block form, particularly in FIGURES 11 to 20, will now be described individually.

(1) *Flip-Flops, in General*

All of the flip-flops of the sorter control 13 have the same basic circuits. The flip-flop shown in FIGURE 63 will be considered first.

Each flip-flop comprises a pair of PNP (2N527) type transistors, with associated diodes, resistors, and capacitors. The circuits of the two transistors are essentially symmetrical; both have their emitters connected to ground, a 0.68K resistor is connected between the collector of each transistor and a −12-volt supply, the collector of each transistor is connected to the base of the other transistor by the parallel combination of a 680-micro-farad capacitor and an 8.2K resistor, and the base of each transistor is connected to a +62-volt supply through a 240K resistor. These symmetrical circuits tend to place a negative potential on the base of each transistor when power is applied thereto with no signal input. As soon as one of the transistors conducts, however, it raises the potential on the base of the other transistor to a positive value, which maintains the first transistor cut off. The flip-flop has an initial condition whereby, with power applied to it, one transistor is conducting and the other transistor is cut off. The flip-flop is defined as being in its set state when the transistor 1000 (left hand) is conducting.

The inputs to, and outputs from, a flip-flop are summarized as follows. The input to the set or "S" input of any flip-flop, whether of the normal type (FIGURE 63) or of the dominant reset type (FIGURE 64), is applied through a 0.001-microfarad capacitor, across a 100K resistor which is connected to a +62-volt supply, and through a diode (S479G) to the base of the transistor 1000. The input to the reset or "R" input of a normal type flip-flop (FIGURE 63) is applied through the same type of network to the base of the transistor 1001. The input to the "T" input of any binary counter type flip-flop (FIGURE 65) is applied simultaneously to the bases of the transistors 1002 and 1003 through two identical networks of the same type as that utilized to apply an input to the "S" input of any flip-flop. The input to the "R" input of any binary counter type flip-flop (FIGURE 65) or any dominant reset type flip-flop (FIGURE 64) is applied through a 0.002-microfarad capacitor, across a 20K resistor which is connected to ground, and through a diode (S479G) to the base of the transistor 1003 or 1005, respectively. The "0" output from any flip-flop is connected to the collector of the transistor 1000, 1002, or 1004, and the "1" output from any flip-flop is connected to the collector of the transistor 1001, 1003, or 1005. A 20K resistor connects the "0" and "1" outputs of a flip-flop to its "S" and "R" inputs, respectively.

In the quiescent state of a flip-flop, certain approximate potentials will be established. For example, if the transistor 1001 (FIGURE 63) is conducting, a voltage of 0 volts will appear at its collector, and a voltage of approximately −0.3 volt will appear on its base. On the cathode side of its input diode 1007, a voltage of approximately +12 volts will appear. A negative input signal will not affect the transistor 1001, as it is already conducting. A positive input signal will not affect the transistor 1001, because the diode 1007 will block any signal less negative than the −0.3-volt potential already appearing on its base. The transistor 1000 will be cut off. A voltage of approximately −12 volts will appear at the collector of the transistor 1000, while a voltage of approximately +1 volt will appear on its base. A positive input signal will not affect the transistor 1000, as it is already cut off. A negative input signal greater than the bias voltage will cause the transistor 1000 to conduct.

(2) *Flip-Flops, Normal Type*

(FIGURE 63)

Initially, the flip-flop will be in its quiescent state, with one of the transistors 1000 or 1001 conducting and the other transistor 1000 or 1001 cut off. A positive voltage (or positive voltage swing) applied to either the "S" or the "R" input of the flip-flop will have no effect, as the diodes 1006 and 1007 will block it. A negative voltage applied to the "R" input will affect the flip-flop only if the transistor 1000 is conducting and the transistor 1001 is cut off. In this latter situation, the transistor 1001 will be made to conduct, and ground potential instead of −12 volts will appear on its collector. Conversely, a negative voltage applied to the "S" input will affect the flip-flop only if the transistor 1000 is cut off and the transistor 1001 is conducting. In this situation, the conductive states of the transistors 1000 and 1001 will be reversed.

If negative voltages are applied simultaneously to both the "S" and "R" inputs of the flip-flop, the flip-flop will change its state, whatever might have been its initial state. The input to the conducting transistor of the flip-flop not only must overcome the positive voltage at its input diode 1006 or 1007, but must also neutralize the negative voltage swing at its base caused by the conduction of the other transistor in order to keep its transistor conducting.

(3) *Flip-Flop, Dominant Reset Type*

(FIGURE 64)

This flip-flop operates as a normal type flip-flop for inputs applied thereto which are separate in time. A negative voltage applied to its "S" input will reverse the states of the transistors 1004 and 1005 only if the transistor 1004 is then cut off and the transistor 1005 is conducting. A negative voltage applied to its "R" input will reverse the states of the transistors 1004 and 1005 only if the transistor 1004 is then conducting and the transistor 1005 is cut off.

If negative voltages are applied simultaneously to the "S" and the "R" inputs of the flip-flop, the voltage applied to the "R" input will always override the other voltage. The capacitor 1008 (0.002 microfarad) is larger than the capacitor 1009 (0.001 microfarad), and, taking longer to charge, it retains the negative input voltage longer. Accordingly, if negative voltages are applied simultaneously to the "S" and the "R" inputs when the flip-flop is reset (transistor 1005 conducting), the negative voltage applied to the "R" input will outlast the negative voltage applied to the "S" input. Thus, the flip-flip will remain reset.

(4) *Flip-Flops, FIGURES 63 and 64, Mode of Operation*

In order to describe a mode of operation of these flip-flops in relation to their symbolic representations, it will be first assumed that the "0" output of the flip-flop is at −12 volts (On, or True), and its "1" output is at 0 volts (Off, or False). The flip-flop is in its reset state. A positive voltage applied to either its "S" or its "R" input will not affect the state of the flip-flop at any time. A negative voltage applied to its "R" input will not affect the flip-flop at this time.

However, a negative voltage applied to the "S" input of the flip-flop will cause it to change its state. The "1" output will decrease to −12 volts, and the "0" output will rise to 0 volts. The flip-flop will remain in its set state until a negative voltage is applied to its "R" input. When the flip-flop is set, positive voltages applied to its "S" or "R" inputs will not affect it. The flip-flop will also not be affected by subsequent negative voltages applied to its "S" input.

When a negative voltage is applied to the "R" input of the flip-flop and it is in its set state, it will change its state to its reset state. In this way, the flip-flop is cycled. If negative voltages are applied to the "S" input, the "1" output will be at −12 volts, and the "0" output will be at 0 volts. The flip-flop will be in its set state. If negative voltages are applied to the "R" input, the "1" output will be at 0 volts, and the "0" output will be at −12 volts. The flip-flop will be in its reset state. The duration of the outputs of the flip-flop will depend upon the frequency of the usable input signals.

The dominant reset type flip-flop (FIGURE 64) is so designed that, if negative voltages are applied simultaneously to both the "S" and the "R" inputs, then the flip-flop either will remain in its reset state or will be changed to its reset state.

(5) *Flip-Flop, Binary Counter Type*

(FIGURE 65)

In this flip-flop, two input lines (one for each of the transistors 1002 and 1003) are joined together to form a "T" input. All of these flip-flops are of the dominant reset variety. Positive voltages applied to either the "T" or the "R" inputs of the flip-flop will not affect it.

However, a negative voltage applied to the "T" input of the flip-flop will reach both of the transistors 1002 and 1003. It will cause the transistor that was initially cut off to become conducting, and this conduction will cause the transistor that was initially conducting to become cut off. Accordingly, a negative voltage applied to the "T" input of the flip-flop will reverse the states of the transistors 1002 and 1003 and the state of the flip-flop. If the flip-flop was initially in its set state, it will be changed to its reset state, and, if it was initially in its reset state, it will be changed to its set state. A negative voltage applied to the "R" input of the flip-flop will assure that it is in its reset state (transistor 1003 conducting and transistor 1002 cut off), and, if negative voltages are applied to the "T" and the "R" inputs simultaneously, the resulting action will assure that the flip-flop is in its reset state regardless of its initial state.

It will be assumed that the flip-flop is in its reset state, wherein a negative voltage appears at its "0" output and a zero voltage appears at its "1" output. A negative voltage applied to the "R" input of the flip-flop will have no effect on it. However, a negative voltage applied to its "T" input will cause the flip-flop to change to its set state. When the flip-flop is in its set state, a negative voltage applied to its "R" input will cause it to change to its reset state. However, a second negative voltage applied to its "T" input will also cause the flip-flop to change from its set state to its reset state. Then, a third negative voltage applied to its "R" input will change the flip-flop back to its set state. Successive negative voltages applied to the "R" input will therefore cause the flip-flop to change states. A negative voltage applied to the "R" input can only reset the flip-flop, and it will take precedence over a simultaneous negative voltage applied to its "T" input. In FIGURE 14, the four binary counter type flip-flops 364 to 367 are connected so that they count, in binary decimal form, the digit signals supplied by the character reader 12. The digit signals are applied to the "T" input of the first flip-flop. The "R" inputs of the four flip-flops have a negative voltage simultaneously applied thereto whenever it is desired to reset these flip-flops and to start a counting operation again.

(6) *One-Shot Circuits*

(FIGURES 66 to 69)

All of the one-shot circuits provided in the sorter control 13 have the same basic circuit configuration, but they vary widely in the values of specific components and the use of certain other components. The basic one-shot circuit has two transistors. When it is triggered by a negative voltage of sufficient amplitude, it develops a negative output voltage of a certain time duration. The "S" input and the "1" output of the basic one-shot circuit are both normally at zero volts. The eight one-shot circuits 611 (FIGURES 10 and 46), 609 (FIGURES 10 and 45), 587 and 591 (FIGURES 9, 36, and 37), 582 and 583 (FIGURES 8 and 42), 176 (FIGURES 7 and 34) and 614 (FIGURES 10 and 46) and 169 (FIGURES 7 and 31) are two-transistor stage one-shot circuits.

(6.1) *Two-Transistor One-Shot Circuits*

(FIGURES 66 and 67)

The one-shot circuit (FIGURE 66) is identical to the one-shot circuit 611 (FIGURES 10 and 46). Each of the two-transistor one-shot circuits has two transistors 1010 and 1011, each transistor having its emitter connected to ground potential and having its collector connected through a 1K resistor to a −12 volts supply. The one-shot circuits 587 and 591 (FIGURES 9, 36, and 37, and shown also in FIGURE 67) use a 1.6K resistor 1012 for the output resistor, and this resistor 1012 is connected to a −20 volts supply.

In FIGURE 66, the input signal is applied to the base of the transistor 1010 through a resistance-capacitance network comprising a 0.001 $\mu$fd. capacitor; a 20K resistor, which is connected to ground potential; and a diode 1013. The base of the transistor 1010 is also connected to a +62 volts supply through a 300K resistor. The one-shot circuits 609 (FIGURES 10 and 45), 614 (FIGURES 10 and 46), and 587 and 591 (FIGURES 9 and 37) utilize a 0.002 $\mu$fd. input capacitor. The one-shot circuits 587 and 591 connect the 20K resistor to a +3.9 volts supply.

All of the two-transistor one-shot circuits use a 680 $\mu\mu$fd. capacitor and an 8.2K resistor in parallel to couple the collector of the transistor 1011 to the base of the transistor 1010. A capacitor 1014 couples the collector of the transistor 1010 to the base of the transistor 1011. A resistor network 1015 is provided from the base of the transistor 1011 to a −12 volts supply. The capacitor 1014 and the resistor network 1015 determine the time interval of the output signal. All of these one-shot circuits use a 3.3K resistor and a 10K potentiometer for the resistor network 1015, except the one-shot circuits 176 (FIGURE 7) and 582 (FIGURE 8). The one-shot circuits 176 and 582 use a single fixed resistor of the value of 15K and 10K, respectively. The value of the capacitor 1014 varies with the desired output signal width. For the one-shot circuits of similar outputs, the same value capacitor 1014 may be used and the difference then obtained by means of the potentiometer. Thus, the one-shot circuits 591, 582, and 176 all use a 2.2 $\mu$fd. capacitor for the capacitor 1014.

The one-shot circuits 587 and 591 (FIGURES 9, 36, and 39) are also shown in FIGURE 67. These circuits include a diode 1016 connected between the collector of the transistor 1011 and a −12 volts supply. Thus, the "1" output is clamped to −12 volts when the transistor 1011 is cut off. This arrangement is made because of the fact that a voltage of −20 volts is applied through the 1.6K resistor to the collector of the transistor 1011, instead of the normal −12 volts.

Referring now to FIG. 66, the transistor 1011 is normally conducting, since a negative voltage is present on its base. The collector of the transistor 1011 and the "1" output of the one-shot circuit are at approximately 0 volts. The transistor 1010 is cut off, since a positive voltage is present on its base. The capacitor 1014 is charged to the indicated polarity by the emitter-to-base current of the transistor 1011. A positive voltage applied to the "S" input of the one-shot circuit will be blocked by the diode 1013. A negative voltage applied to the "S" input will appear on the base of the transistor 1010, causing it to conduct. The voltage on the collector of the transistor 1010 will decrease to 0 volts, and a positive voltage will be applied to the base of the transistor 1011 because of the charge on the capacitor 1014. The transistor 1011 will be cut off, causing the voltage on the "1" output to rise to −12 volts. This negative voltage (−12 volts) is coupled back to the base of the transistor 1010 and maintains that transistor conducting after the negative input voltage is removed from the "S" input.

The one-shot circuit will remain in its unstable state until the capacitor 1014 discharges sufficiently to reduce the voltage on the base of the transistor 1011 to 0 volts. When this occurs, the transistor 1011 will conduct again, restoring the "1" output to 0 volts and causing the transistor 1010 to be cut off.

Accordingly, for an input negative voltage of sufficient amplitude, a negative voltage is produced on the "1" output of the one-shot circuit, the duration of which depends essentially on the value of the capacitor 1014 and the setting of the 10K potentiometer.

(6.2) *Three-Transistor One-Shot Circuits*

(FIGURE 68)

The three-transistor one-shot circuits comprise the basic two-transistor one-shot circuit (FIGURE 66) and an inverter circuit comprising the PNP type transistor 1017. The normal "1" output of the basic two-transistor one-shot circuit is connected to the base of the transistor 1017. The one-shot circuits 610 (FIGURES 10 and 46), 160 (FIGURES 9 and 11), 169 (FIGURES 7 and 31), 277, 281, and 445 (FIGURES 9 and 18), 210 and 275 (FIGURE 12), 357 and 358 (FIGURE 14), and 296, 299, 302, and 305 (FIGURE 17) are three-transistor one-shot circuits. The one-shot circuit 610 is identical to the one-shot circuit of FIGURE 68.

In FIGURE 68, the base of the transistor 1017 is connected to a +62 volts supply through a 300K resistor. The collector is connected to a −12 volts supply through a 1K resistor. Normally, the transistor 1017 is cut off because of the positive voltage on its base. Thus, its collector and the "0" output of the one-shot circuit are approximately at −12 volts. Thus, when the one-shot circuit is triggered to its unstable state (the transistor 1011 is cut off and the transistor 1010 is conducting), a negative voltage appears on the base of the transistor 1017, causing it to conduct. The "0" output will be at 0 volts at this time. Thus, the signal at the "0" output is always the inverse of the signal at the "1" output.

All of the three-transistor one-shot circuits except the one-shot circuits 169 (FIGURE 31) and 610 (FIGURES 46 and 68) connect the 20K input resistor to a +3.9 volts supply. The one-shot circuits 169 and 610 connect this 20K resistor to ground potential, and the one-shot circuit 169 (FIGURE 31) uses a 0.002 μfd. input capacitor, a 7.5K fixed resistor in place of the 3.3K resistor and the 10K potentiometer to provide the time constant, and a 510-ohm resistor connected between the collector of the output transistor and the −12 volts supply.

(6.3) *Four-Transistor One-Shot Circuits*

(FIGURE 69)

The four-transistor one-shot circuits 608 (FIGURES 10 and 45), 580 and 581 (FIGURES 8, 39, and 40), 588 (FIGURES 9 and 36), and 180 (FIGURES 7 and 32) are used where an output signal having a duty cycle greater than 50 percent is required. The one-shot circuit 608 is identical to the one-shot circuit of FIGURE 69.

In FIG. 69, the input transistor 1018 is a 2N527. The input and output circuits of the transistors 1018 and 1011 are similar to those of FIGURES 67 and 68, with one exception. A diode 1019 is connected between the base of the transistor 1011 and ground potential. The diode 1019 aids in the charging of the capacitor 1020 when the one-shot circuit changes from its unstable state back to its stable state. The circuit for the transistor 1017 is similar to that of FIGURE 68.

The one-shot circuits 580, 588, and 180 use a 0.002 μfd. input capacitor for the transistor 1018. The one-shot circuit 588 also connects the 20K input resistor to a +3.9 volts supply instead of to ground potential. It also uses a 1.6K resistor connected between the collector of the transistor 1011 and a −12 volts supply, and it clamps the "0" output of the one-shot circuit to a value of −12 volts.

In FIGURE 69, the fourth transistor 1021 and a 100-ohm emitter resistor 1022 are connected in parallel with the 1K collector resistor 1023 of the transistor 1018. The base of the transistor 1021 is connected to the "0" output of the one-shot circuit; that is, to the collector of the transistor 1017. The value of the resistor 1022 will vary with the different one-shot circuits.

The circuit comprising the transistor 1021 and the resistors 1022 and 1023 is provided for accelerating the charging of the timing capacitor 1020 when the one-shot circuit changes to its stable state.

Let us assume that the one-shot circuit is initially in its stable state; that is, the transistor 1011 is conducting, and the transistors 1018 and 1017 are cut off. The timing capacitor 1020 is charged in the indicated polarity. A negative voltage applied to the "S" input of the one-shot circuit will cause the transistor 1018 to conduct, which in turn will cause the transistor 1011 to be cut off. The cutting off of the transistor 1011 will cause the transistor 1017 to be cut off. The one-shot circuit will be in its unstable state at this time. The capacitor 1020 will start to discharge. When it has discharged sufficiently, the transistor 1011 will conduct, causing the cutting off of the transistors 1017 and 1018. The capacitor 1020 is now free to recharge. The one-shot circuit has returned to its stable state.

As the capacitor 1020 starts to recharge through the diode 1019 and the transistor 1011, it will place a voltage on the emitter of the transistor 1021 which is less negative than the voltage appearing on its base. Therefore, the transistor 1021 will conduct, causing the capacitor 1020 to be charged very rapidly. When the capacitor 1020 is fully charged, the voltage appearing on the emitter of the transistor 1021 is approximately equal to the voltage appearing on its base. Therefore, the transistor 1021 will be cut off. The transistor 1021 will remain cut off when the one-shot circuit is changed to its unstable state.

(7) *"AND" Gate*

(FIGURE 70)

The "AND" gate comprises a plurality of diodes 1024, each having their cathodes connected to the other. A "pull-down" resistor (56K or 20K) is connected to the junction of the diodes 1024 and to a source of negative direct current operating potential (−62 volts). A plurality of input lines are individually connected to the anode of a different one of the diodes 1024, and an output line is connected to the junction of the diodes.

In operation, if the input signal on any one or all of the input lines is at a positive potential (False), the corresponding diode in each instance is conductive, its internal impedance is reduced substantially to zero, and consequently the potential appearing on the output line is substantially equal to the input potential. However, if the input signals on all of the input lines are each at a negative potential (True), the potential appearing on the output line goes negative via the −62-volt source and the "pull-down" resistor (56K or 20K). However, the negative potential on the output line is not permitted to go more negative than the least negative potential appearing on one of the input lines. Thus, it is evident that the output of the "AND" gate is negative (or True) only when all of the inputs are negative (or True); the output is positive (or False) if any one of the input signals to the diodes 1024 is positive (or False).

A high negative potential (−62 volts) is used in the output of each "AND" gate, to diminish the rise time of the output signal. The resistance in the output of the "AND" gate may have a value of 20K or 56K, depending upon the current requirements of the next stage that the "AND" gate is coupled to. If the "AND" gate drives a transistor stage, a 56K resistor is normally used. With the use of a 56K resistor, the "AND" gate draws a current of about 1 milliampere. If the "AND" gate feeds an "OR" gate, a 20K resistor is used. With the use of a 20K resistor, the "AND" gate draws a current of about 2 milliamperes.

(8) *"OR" Gate*

(FIGURE 71)

The "OR" gate comprises a plurality of diodes 1025, each having their anodes connected together to an output line. A plurality of input lines are each individually connected to the cathode of a different one of the diodes 1025. A "pull-up" resistor (56K) is connected to the junction of the diodes 1025 and to a source of positive direct current operating potential (+62 volts).

In operation, when the input signal to each of the diodes 1025 is at zero or ground potential (False), the signal on the output line goes substantially to ground potential via the +62 volts source and the "pull-up" resistor (56K). However, if any one or more of the input signals goes to −12 volts (True), the corresponding diode is conductive, and, consequently, the signal on the output line is substantially at −12 volts (True). Therefore, it is seen that the output of the "OR" gate is negative (True) as long as any one or more of the input signals is negative (True); the output signal is positive (False) only when all of the input signals are positive (False) and at no other time.

A high positive potential (+62 volts) is used in the output of each "OR" gate, to diminish the rise time of the output signal. The resistance in the output of the "OR" gate has a value of 56K. With the use of a 56K resistor, the "OR" gate draws a current of about 1 milliampere. The output of the "OR" gate is not used to feed either a second "OR" gate or an "AND" gate, but it is used to drive a transistor stage. The inputs to the "OR" gate never come from another "OR" gate, but always come from either an "AND" gate or a transistor stage.

(9) *Indicator Circuit*

(FIGURE 72)

Twelve indicator circuits are used in the sorter control 13 to show the information contained in the input memory 107 (FIGURE 5), the digit selector circuit 106 (FIGURE 5), and the output memory 110 (FIGURE 6). The indicator circuit comprises a type NE2 neon indicator lamp and a PNP type transistor (2N398). The transistor has its emitter connected to ground potential, and its collector is connected to a source of negative direct current operating potential (−91 volts) via a 100K resistor. In parallel with this 100K collector resistor, there is provided another 100K resistor and the neon lamp, in series. A resistive voltage divider, comprising a 22K resistor and a 20K resistor, connects the input line of the indicator circuit to the base of the transistor and the base of the transistor to a source of threshold voltage (+6 volts).

In operation, when the input line is at 0 volts (Off), a potential of about +3 volts is applied to the base of the transistor. This potential keeps the transistor cut off; no collector current will flow, and the neon lamp will not be lighted. When the input line goes to −12 volts (On), a potential of about −0.3 volt is applied to the base of the transistor. The transistor will conduct heavily, placing almost −91 volts across its collector circuits. The neon lamp will light, since it will do so at a potential of approximately 72 volts. The neon lamp will remain lighted until the transistor is cut off by termination of the negative input signal.

(10) *Direct Current Inverter*

(FIGURE 73)

The direct current inverters are used to increase the power of signals used in the sorter control 13. They do not differentiate their input signals, but invert signals which vary between the two basic voltage levels, 0 volts and −12 volts, used in the sorter control 13.

The direct current inverter comprises a coupling network including a 680-microfarad capacitor and a 7.5K resistor in parallel. This coupling network applies the input signal to the base of the PNP type transistor (2N525). The base of the transistor is also connected to a source of potential (+62 volts) through a 300K resistor. The emitter of the transistor is connected to ground potential, while its collector is connected to a source of operating potential (−12 volts) by way of a T12G type diode. The output line is connected between the diode and the collector of the transistor.

When the input line is at 0 volts (False), the base of the transistor will be one or two volts positive, and the transistor will not conduct. The output line will then be clamped at −12 volts by the diode. When the inputs line swings to −12 volts (True), the base of the transistor will be about 0.3 volt negative, and the transistor will conduct. The output line will swing to 0 volts at this time. The coupling capacitor (680-microfarad) keeps the voltage across the coupling resistor (7.5K) fairly stable, and thus transmits the input voltage swing immediately to the base of the transistor.

Eight direct current inverters are used in the output decoder 111 (FIGURES 6, 49, and 50). Two other direct current inverters are used in the synchronization signal generator 102 (FIGURES 4 and 9). Eight others are used in the digit selector circuit 106 (FIGURES 5 and 14). In FIGURE 73, the input line for the inverter is shown connected through a 1.5K resistor to a source of negative potential (−12 volts). In the digit counter 325 (FIGURE 14), the 1.5K resistor is connected to −12 volts on the logic lines "1," "2," and "4." This is done because the flip-flops 364, 365, and 366, which drive the inverters, must also drive the adjacent flip-flops 365, 366, and 367.

The inverter 564 (FIGURES 8 and 39) does not use an input capacitor, and substitutes an 8.2K resistor for the 7.5 resistor in the input circuit. The collector of the transistor is connected through a 1K resistor to the −12 volts source of operating potential, and the inverter 564 does not utilize a clamping diode.

(11) *Alternating Current Inverters*

(FIGURES 74 AND 75)

The alternating current inverters or differentiator inverters have several uses in the sorter control 13. They are used to convert input signals from other components. Many of these signals will not be at the 0 volt and −12 volts logic levels used in the sorter control 13. The signals from the character reader 12, for example, will vary between −5 volts and +6 volts. The alternating current inverters will convert these signals to the proper voltage levels. Also, signals of long duration are shortened by the alternating current inverters for use in circuits in which the longer-lasting signals would be undesirable. For example, the synchronization signals, which last 10 or 20 milliseconds, are sent through differentiator inverters (FIGURE 11) before being applied to the decision logic in the sorter control 13. In this way, they are shortened to less than one millisecond before being used. Signals of variable duration, sent from the sorter control 13 to the associated equipment 14, are applied to differentiator inverters.

FIGURE 74 is the schematic diagram of the differentiator inverter used in the digit counter 325 (FIGURE 14). The differentiator inverter comprises a PNP type transistor (2N527) and includes an RC input circuit comprising a 0.02 mfd. capacitor and a 10K resistor. The 10K resistor is connected to a source of negative potential (−12 volts). The time constant of this RC input circuit is not large enough to seriously affect input signals of less than 200 microseconds' duration. Hence, such inputs as the 20-microsecond impulses from the character reader 12 will not be differentiated. However, signals of longer duration, such as the synchronization signals, which last for several milliseconds, will be affected.

The collector of the transistor is connected through a 620-ohm resistor to a source of negative potential (−20 volts). To keep the output line of the differentiator inverter at the proper voltage level, an S479G clamping diode is connected between the collector of the transistor and a source of negative potential (−12 volts.) Hence, the output line of the differentiator inverter will not go more negative than −12 volts.

Normally, with a stable input potential, the transistor will be conducting to saturation because of the negative potential present on its base. The output line will be at 0 volts. A negative voltage swing on the input line will not change this condition. It will only cause the emitter-to-base current of the transistor to charge the 0.02-microfarad input capactor rapidly, and only a slight negative voltage swing will appear at the collector of the transistor. However, a positive voltage swing on the input line will be transmitted through the 0.02-microfarad input capacitor to the base of the transistor. The transistor will be cut off if this positive voltage swing is of sufficient amplitude (about 10 volts or more). The voltage on the output line will then decrease to −12 volts. Then, as the 0.02-microfarad input capacitor charges through the 10K resistor, the potential at the base of the transistor will decrease exponentially. The transistor will begin to conduct again. Ultimately, the input voltage will decrease to a point at which the transistor will again conduct to saturation rapidly, and the voltage on the output line will again be 0 volts.

A positive input signal to the differentiator inverter of only a few microseconds' duration will not give the 0.02-microfarad input capacitor time to charge significantly before it returns negative again. Thus, the waveshapes of the output signal of the differentiator inverter will retain the time duration of the input signal.

The differentiator inverter 585 (FIGURES 9 and 36) differs from the circuit of FIGURE 74 in the use of a 0.005-microfarad input capacitor and an 820-ohm collector resistor.

Where there is excessive noise at the input of a differentiator inverter, a special network is used to eliminate noise pulses. This network comprises two 100K resistors connected in series between a source of negative potential (−12 volts) and ground potential, and a diode (1N461) in the input line to their junction. Examples of the use of this network are found in FIGURES 36 and 37. The outputs of the 10.4 millisecond one-shot circuit 587 and the 18-millisecond one-shot circuit 591 are applied through such networks before being sent to a differentiator inverter.

The two 100K resistors establish a voltage level of about −6 volts on the input line of the differentiator inverter. The 1N461 diode will block the passage to the differentiator inverter of any signals more negative than −6 volts. The normal level on the cathode side of the 1N461 diode is −12 volts. Thus, a signal six volts in amplitude or less will not be passed to the special network. Any noise pulses up to six volts in amplitude will be eliminated from the differentiator inverter. When the output of the one-shot circuit 587, for example, swings toward ground potential, however, this signal potential will be passed by the 1N461 diode to the differentiator inverter 200 (FIGURES 9 and 11).

FIGURE 75 is the symbol used for a differentiator inverter employed in the above-described special network.

(12) *Drivers*

(FIGURES 76 AND 77)

Two variations of drivers, called from their approximate current capacity of 90 milliamperes and 60 milliamperes, are used in the sorter control 13. Each of the 90-milliampere drivers is used to drive a power amplifier, such as the power amplifiers 551 and 553 (FIGURE 30). The amplifiers 551 and 553 in turn control two solenoids, one for a stacker gate device and one for a counter. Each of the 60-milliampere drivers is used to drive a power amplifier, such as the power amplifier 616 (FIGURE 30), which controls only one solenoid and thus requires less power.

(12.1) *Driver—90-Milliampere*

(FIGURE 76)

This driver comprises a PNP type transistor (2N527). It has an input line which is clamped to ground potential by a T12G diode, thus eliminating positive input signals. The input potential for the driver is normally 0 volts, with the input signals swinging negative toward −12 volts. These negative input signals are applied to a voltage divider comprising a 750-ohm resistor and a 13K resistor which is connected to +62 volts. The potential across the 13K resistor is applied to the base of the transistor.

The emitter of the transistor is connected through a 6.2K resistor to a source of positive potential (+62 volts). The output line is connected to a point between the emitter and the 6.2K resistor. The output line is clamped to ground potential through a 1N461 diode. Thus, when the transistor is not conducting, the output line is at ground potential. The collector of the transistor is connected to a source of negative potential (−12 volts, unregulated) through an 82-ohm resistor. Degenerative feedback from the collector to the base of the transistor is provided by a 0.01-microfarad capacitor.

With the input line at ground potential, the transistor will not be conductive, and the output line of the driver will be at ground potential. When the input line swings negative, the transistor will begin to conduct. The transistor effectively becomes a short circuit from its emitter to its collector, causing a slightly negative potential (approximately −0.5 volt) to appear on the output line when this output line is connected to the input line of a power amplifier (FIGURE 80). The transistor will draw current not only through the 6.2K resistor but also through a 10K resistor (FIGURE 80) in the input circuit of each of the succeeding power amplifiers, and mainly through the power amplifiers themselves.

(12.2) *Driver—60-Milliampere*

(FIGURE 77)

This driver comprises two transistors, an NPN transistor (2N445A) and a PNP transistor (2N527). The NPN transistor precedes the PNP transistor and is connected as an emitter follower. The PNP transistor stage is similar to the 90-milliampere driver, but two 270-ohm resistors are provided, connected in parallel in the collector circuit of the transistor instead of one 82-ohm resistor, and a 1.2K resistor and a 20K resistor are provided in the base circuit of the PNP transistor instead of the 750-ohm resistor and the 13K resistor. The 20K resistor is connected to a source of positive potential (+62 volts). The input line for the NPN transistor is clamped to a source of negative potential (−12 volts) through a T12G diode, and this transistor is provided with a 1.2K resistor connected between its emitter and a source of negative potential (−20 volts).

The input line to the NPN transistor is normally at ground potential. Under these conditions, the NPN transistor will conduct, causing ground potential to appear at its output. Thus, a +62 volts potential appears across the voltage divider comprising the 1.2K resistor and the 20K resistor. A positive voltage (about 1.0 volt) appearing across the 1.2K resistor is applied to the base of the PNP transistor, holding it cut off. The output line of the driver is therefore clamped to 0 volts.

When the voltage on the input line to the NPN transistor swings toward −12 volts, this transistor will be cut off. The potential applied to the base of the PNP transistor will then be about −1.0 volt. The PNP transistor will conduct, causing a slightly negative potential (approximately −0.5 volt) to appear on its output line when this output line is connected to the input line of a power amplifier (FIGURE 80). The PNP transistor will draw current through the succeeding power amplifier, as does the 90-milliampere driver.

(13) *Emitter Followers*

(FIGURES 78 AND 79)

The emitter followers used in the sorter control 13 employ NPN type transistors (2N445A) almost exclusively. The collector of the transistor is connected to ground potential, and the emitter is connected through a resistance to a source of negative potential (−20 volts). This resistance will be either a 2.2K resistor (FIGURE 78) or an 820-ohm resistor (FIGURE 79).

The voltage level on the input line of the emitter follower may be either 0 volts (False) or −12 volts (True). It cannot go more negative than −12 volts because of the S479G diode clamp connected to the negative source of potential (−12 volts). When the voltage on the input line is −12 volts, the voltage on the output line will be −12 volts. When the voltage on the input line is 0 volts, the transistor will conduct to saturation, and 0 volts appears on the output line.

A single emitter follower 576 (FIGURES 8 and 42) employs a PNP type transistor (2N525). The collector of the transistor is connected to a source of negative potential (−12 volts), the emitter is connected through a 510-ohm resistor to ground potential, and the base is connected through a 300K resistor to a source of positive (+62 volts).

(14) *Power Amplifier*

(FIGURE 80)

Eighteen power amplifiers are used in the sorter control 13. Eleven of them are used to operate the decimal and special stacker gate and counter solenoids (FIGURE 30). Thus, for example, the power amplifier 551 (FIGURE 30) controls the operation of the solenoids 550 and 552. The other seven power amplifiers are as follows: In FIGURE 30, the power amplifier 152 controls the total counter solenoids 153 and 154, the power amplifier 162 controls the reject solenoid 163, the power amplifier 179 controls the stop solenoid K206, the power amplifier 616 controls the jam solenoid K208, and the power amplifier 571 controls the feed solenoid 140. In addition, in FIGURE 30, the two power amplifier 573 and 575 control the paper deflection solenoid 139.

The power amplifiers comprise a PNP type transistor (2N277). The emitter of the transistor is connected to ground potential, and the collector is coupled to the solenoid which it is to control. Through the solenoid, the transistor is connected to either a −12 volts source of potential or a −17 volts source of potential. When a power amplifier must operate both a gate solenoid and a counter solenoid, the potential on the solenoids is equal to −17 volts; otherwise, the potential is equal to −12 volts. The input to the transistor is applied to its base, across a 10K resistor which is connected to ground potential. In every case, the input is supplied from a driver circuit (FIGURES 76 and 77). A Zener diode IRC 69–0389) is connected between the collector of the transistor and its emitter.

When the input line of the power amplifier is at about +0.5 volt, the transistor will not conduct, and its solenoid(s) will not be energized. When the input line swings to −0.5 volt, the transistor will conduct heavily. At this time, the emitter-to-collector current of the transistor will energize the solenoid(s). When the input line swings back to 0 volts, the transistor will be cut off, and the solenoid(s) will be de-energized. The Zener diode protects the transistor from the surge of voltage that follows an abrupt cutting-off of the transistor. This diode limits the voltage across the transistor to a maximum of about 30 volts.

Refering now briefly to FIGURE 30, the circuit which controls the paper deflection solenoid 139 is a special power amplifier circuit. This special circuit comprises the two power amplifiers 573 and 575, which are used in series. The amplifier 573 is connected in parallel with a 10-ohm limiting resistor 141. When the feed solenoid K204 (FIGURE 28) is not energized, both of the input lines of the amplifiers 573 and 575 will be at ground potential. The transistor of each of the amplifiers 573 and 575 will not conduct, and the paper deflection solenoid 139 will not be energized. When the feed solenoid K204 is energized, both of the input lines of the amplifiers 573 and 575 will initially swing negative. The transistor of each of the amplifiers 573 and 575 will conduct, and the surge of current thus developed will energize the paper deflection solenoid 139.

However, the input line for the amplifier 573 is connected to the output of the 50-millisecond one-shot circuit 583 (FIGURE 8) through the driver 572. Thus, after this interval, this input line returns to 0 volts, and the transistor of the amplifier 573 will be cut off. Accordingly, the 10-ohm resistor 141 is placed in series with the paper deflection solenoid 139 and the amplifier 575. The resistor 141 operates to limit current flow through the paper deflection solenoid 139. When the feed solenoid K204 is de-energized, the input line for the amplifier 575 will return to 0 volts, the transistor of the amplifier 575 will be cut off, and the paper deflection solenoid 139 will be de-energized.

FIGURE 81 shows the symbol used for the flip-flops of FIGURES 52 to 59, inclusive. The schematic diagram for these flip-flops is shown in FIGURE 62.

7. CONTROL CIRCUITS (FIGURES 27 to 30)

For normal operation of the sorter-reader 10, the maintenance personnel will have set the following controls as follows. All of the switches 830 to 839 (FIGURES 27 and 29) which are located on a service panel (not shown) in the stacker section 55 of the sorter-reader 10 will be turned On (closed). The feed belt adjustment locking lever 74 (FIGURES 1 and 2B) will be locked. The two jam release levers 91 (FIGURE 1) wil be locked with all of the "bodies" in place. The automatic feed switch 561, which is located in the stacker section 56, will be turned to Off, whereby its sections 560 and 562 (FIGURE 8) will be in their Off positions, and the sections 290 to 293 (FIGURE 17) of the pocket selector switch 285, which is located in the stacker section 56, will be turned to their normal positions.

The operator may then turn on the power to the sorter-reader 10 by operating the On-Off switch 800 (FIGURES 1 and 27). The sections 850 to 852 (FIGURE 27) of the switch 800 will close, thereby providing 208 volts, 60 cycle, 3 phase, alternating current power to the sorter-reader 10. Power will be supplied via the lines 854 and 855 and the switch 839 (FIGURE 29) to energize the fans 856 and 857. The fan 856 is located on the floor of the section 55 of the sorter-reader 10, while the fan 857 is located on the floor of the section 56. Power will also be supplied via the lines 858 and 859 (FIGURE 27) and the regulator 860 to the power supplies for the character reader 12 and the sorter control 13. Power will further be supplied to the transformer 861. The 115-volt output of the transformer 861 will light the feed area illumination lamp 862 and is available to energize the drive start solenoid K202 in the drive circuit when the "Drive On" button 27 (FIGURE 2A) on the control panel 25 is depressed. The 115-volt output of the transformer 861 is supplied to the transformer 863, and its 6-volt output will be applied to the drive off lamp 864 by way of the normally closed contacts K207*bc*1 of the auxiliary solenoid K207, and will be applied to the feed off lamp 866 by way of the normally closed contacts K204*bc*1 of the feed solenoid K204. Accordingly, the drive off lamp 864 and the feed off lamp 866 will be lighted.

When a batch of checks are desired to be sorted, the operator may effect a normal sorting operation as follows. The "Drive On" button 27 (FIGURE 2A) is depressed, causing the drive on switch 870 to close to effect energization of the drive start solenoid K202. The drive start solenoid K202 will cause the normally open contacts K202*a* to close, causing the energization of the main power solenoid K201 and the auxiliary solenoid K207. Power will also be applied to the time delay solenoid TD201 and the operating time counter 871, which is located in the stacker section 55 of the sorter-reader 10. The operating time counter 871 will indicate the number of hours that the feed drive motors 873 to 875 (FIGURE 29) have been operated. With the main power solenoid K201 energized, the normally open contacts K201*a*1 will be closed, completing a holding circuit for the solenoids K201, K207, and TD201 and the operating time counter 871. The normally open contacts K201*a*2, K201*a*3, and K201*a*4 (FIGURE 29) will also be closed, causing power to be supplied to the synchronization motor 872, located in the feed section 54 of the sorter-reader 10. The synchronization motor 872 drives the synchronizer wheel 19 (FIGURE 2B), which, in turn, controls the spacing of the checks and their speed of travel through the read area 23 of the sorter-reader 10. The closing of the contacts K201*a*2, K201*a*3, and K201*a*4 will also cause power to be supplied to the feed drive motors 873 to 875 and the vacuum-producing motors 876 to 878. The feed drive motor 873 and the vacuum-producing motor 876 are located in the feed section 54 of the sorter-reader 10, the motors 874 and 877 are located in the stacker section 55, and the motors 875 and 878 are located in the stacker section 56. With the auxiliary solenoid K207 energized, the normally open contacts K207*ac*1 will be closed, causing the drive on lamp 865 to be lighted, and the contacts K207*bc*1 will be opened, causing the drive off lamp 864 to be extinguished. The lamps 864 to 867 (FIGURE 27) are physically located under their corresponding transparent buttons 27 to 30 on the control panel 25 (FIGURE 2A).

After a time delay of approximately two seconds, the time delay solenoid TD201 will cause the normally open contacts TD201*a* to close, whereby power is supplied to the power supply solenoid K205 and the time delay solenoid TD202. With the power supply solenoid K205 energized, the normally open contacts K205a1 and K205*a*2 (FIGURE 29) will be closed, and power (115 volts, A.C.) will be supplied by way of the regulator 879 to the transformers 880 and 881 of the power supply circuits 882 and 883, respectively. After a time delay of approximately two seconds, the normally open contacts TD201*a*1 (FIGURE 28) will close, causing power to be supplied to the feed circuit.

Meanwhile, the operator may set the mode switch 31 on the control panel 25 (FIGURES 1 and 2A) to its sort position. Thus, the section 913 (FIGURE 28) of the mode switch 31 will be turned to its sort position. The desired one of the seven field selector buttons 32 to 38 is depressed. The lamp associated with the depressed button will be lighted. Thus, if the Amount field selector button 32 is depressed, the lamp 885 will be lighted via the lines 887 and 888 from the transformer 863 (FIGURE 27), and, if the Serial Number field selector button 38 is depressed, the lamp 886 will be lighted. Then, the desired one of the fourteen digit selector buttons 39 to 52 is depressed. The lamp associated with the depressed button will be lighted. Thus, if the "1" digit selector button 39 is depressed, the lamp 889 will be lighted, and, if the "14" digit selector button 52 is depressed, the lamp 890 will be lighted.

The checks to be sorted are so stacked that they face in the same direction. Then, the stack of checks is placed on the platform 16 (FIGURE 2B) and is so positioned that the magnetic printing on the checks is upright and facing the right front corner of the sorter-reader 10.

Finally, the feed on button 29 on the control panel 25 is depressed, causing the feed on switch 891 (FIGURE 28) to be closed, whereby the feed solenoid K204 is energized. With the feed solenoid K204 energized, the normally open contacts K204*a* will close to complete a holding circuit for this solenoid. Also, the normally open contacts K204*ac*1 (FIGURE 27) will close, and the normally closed contacts K204*bc*1 will open. Thus, the feed start signal 131 (FIGURE 4) will be supplied from the −12-volt regulator 899 (FIGURE 27) via the line 901 to the feed system 101 (FIGURES 4 and 8). The normally open contacts K204*ac*1 will be closed, causing the feed on lamp 867 to be lighted, and the contacts K204*bc*1 will be opened, causing the feed off lamp 866 to be extinguished. Finally, the normally open contacts K204*ac*3 are closed to cause −12 volts to be sent to the associated equipment 14. At this time, the feeding and the sorting of the checks will begin.

The field and digit interlock solenoid K203 (FIGURE 28) is provided so that the feeding of checks will not occur until one of each of the field selector switches 32 to 38 and the digit selector switches 39 to 52 is closed. Accordingly, the solenoid K203 is energized when the On-Off switch 800 is actuated. When energized, the solenoid K203 will cause the normally closed contacts K203*b* (FIGURE 28) to open, preventing the energization of the feed solenoid K204, but, when a field selector switch and a digit selector switch are closed, the solenoid K203 will be de-energized, and the contacts K203*b* will be closed.

The depression of the stop bar 53 (FIGURE 1) will cause the stop switch 905 (FIGURE 27) to be opened. The depression of any of the four stop bars 79 (FIGURE 1) will cause a switch, such as the switch 906 (FIGURE 27), to be opened. Accordingly, the actuation of the stop bars 53 and 59 will prevent the energization or cease the energization of the solenoids K201, K207, and TD201.

A stacker overload switch, such as the switch 906 (FIGURE 27) is provided for each of the twelve stackers 60 to 71 (FIGURE 1). When a stacker has been filled to its capacity with checks, the switch 906 will transfer, causing a stacker overload indicator 78 (FIGURE 1) to light. At the same time, the switch 906 will effect the de-energization of the feed solenoid K204. Accordingly, check feeding will be stopped when this event occurs.

A feed demand switch 907 (FIGURE 28) is provided in conjunction with the platform 16 (FIGURE 1) of the sorter-reader 10. The switch 907 will transfer if there are no more checks on the platform 16. Accordingly, check feeding will be interrupted when this event occurs.

The drive off switch 908 (FIGURE 27) and the feed off switch 909 (FIGURE 28) are actuated by the depression of the drive off and feed off buttons 28 and 30, respectively (FIGURE 2A).

A pair of jam solenoids 910 and 911 (FIGURE 27) are provided to release the series of holding devices, or "bogies" (not shown), which extend across the back of the sorter-reader 10, when jamming of the checks occurs. These holding devices furnish the pressure to hold the checks against the belts of the conveyor feed 21 (FIGURE 28), which convey the checks to the stackers 60 to 71 of the sorter-reader 10. With these holding devices released, the checks may be removed from the conveyor feed easily. The jam solenoids 910 and 911 will be energized upon the closing of the normally open contacts K208_ac_1, which, in turn, will be actuated when the jam solenoid K208 (FIGURE 30) is energized.

The normally closed contacts K206_b_ (FIGURE 28) will be opened when the stop solenoid K206 (FIGURE 30) is energized. Therefore, when the sorter-reader 10 is operating in the process mode (the section 913, FIGURE 28, of the mode switch 31 is in its process position), a stop feed signal from the associated squipment 14 may be utilized to de-energize the feed solenoid K204 to stop the feeding of checks.

Upon the closing of the contacts K205_a_1 and K205_a_2 (FIGURE 29) in response to the energization of the power supply solenoid K205 (FIGURE 28), a potential of 115 volts is applied to the primaries of the step-down transformers 880 and 881. Output voltages of 17 volts and 20 volts, respectively, are developed at the secondaries of the transformers 880 and 881. The 17 volts output of the transformer 880 is applied to a full-wave selenium rectifier circuit 925, whose rectified output is applied across a noise filter capacitor 926 and a bleeder resistor 927. Five filter capacitors, represented by the capacitor 928, are connected parallel with the capacitor 926. These five capacitors provide the high pulse current required by the solenoids which the power supply 882 supplies.

The 20 volts output of the transformer 881 is applied to a full-wave selenium rectifier circuit 929, whose rectified output is applied across a noise filter capacitor 930 and a bleeder resistor 931. Five filter capacitors, represented by the capacitor 932, are connected in parallel with the capacitor 930. Accordingly, a high pulse current is applied to the solenoids which the power supply 883 supplies.

The positive side of each of the power supplies 882 and 883 is connected to ground potential. Their negative side is connected to the solenoids which are energized by the power supplies. In the −17 volts power supply 882, the connection is direct and is made to all eleven stacker gate solenoids (special sort gate solenoid 550 and "0" sort gate solenoid 557, for example) and their associted counter solenoids (special sort counter solenoid 552 and "0" sort counter solenoid 555, for example). In the −12 volts power supply 883, the connection is direct to the jam solenoid K208 only. The connection to the other solenoids is made via normally closed contacts K208_bc_2 of the jam solenoid K208. Accordingly, when the jam solenoid K208 is energized, the stop solenoid K206, the reject counter solenoid 163, the total item counter solenoids 153 and 154, the feed solenoid 140, and the paper deflection solenoid 139 will be de-energized regardless of the condition of their power amplifiers 616, 179, 162, 152, 571, 575, and 573.

When the On-Off switch 800 (FIGURES 1 and 27) is actuated to its "on" position, one phase of the 208 volts input to the sorter-reader 10 is stepped down to 115 volts by the regulator 860 (FIGURE 27) and is applied directly to the −91 volts power supply and regulator 892. The 115 volts of the regulator 860 is also stepped down by a transformer 900 to 6.3 volts. The 6.3 volts output of the transformer 900 is supplied to the lamp or light source associated with each of the fifteen photocells of the jam detector circuit 103 (FIGURES 4 and 43).

The 115 volts output of the regulator 860 is also supplied to the transformer 891. The transformer 891 has four secondary windings, one for each of the power supplies 893, 894, 896, and 897.

The transformer 891 supplies a voltage to the power supply and regulator 893, which includes a full-wave rectifier. The power supply and regulator 893 supplies four voltages (+70 volts, −70 volts, −7.5 volts, and +8.2 volts) to the regulator 898. In the regulator 898, these four voltages are used to develop eight other voltages (−70 volts, +70 volts, −7.5 volts, +8.2 volts, −5 volts, +6 volts, +3.9 volts, and −3.9 volts). All of these voltages except the ones having the values of 3.9 volts are used by the character reader 12. The voltages having the values of +3.9 volts and −3.9 volts are used in the sorter control 13.

The transformer 891 supplies a voltage to the power supplies 894 and 896, each of which includes a full-wave rectifier. The power supply 894 supplies two voltages (+16 volts and −16 volts) to the regulator 899. In the regulator 899, a voltage of −12 volts is developed, which is used in the sorter control 13. The power supply 896 supplies two voltages (+24 volts and −24 volts) to the regulator 900. In the regulator 900 is developed a voltage of −20 volts, which is used in the regulator 899 and in the sorter control 13.

The transformed 891 also supplies a voltage to the power supply and regulator 897, which includes a full-wave rectifier. The power supply and regulator 897 develops two voltages (−62 volts and +62 volts). The voltage having the value of −62 volts is used in the regulator 900 and in the sorter control 13. The other voltage (+62 volts) is also used in the sorter control 13.

The checks that have been sorted are so stacked in the stackers or pockets 60 to 71 that they face the left rear corner of the sorter reader 10 (FIGURE 1). Each check that is gated into a stacker is added to the rear of those checks already there. The printed surface of a check is considered its front. Accordingly, the checks in a given stacker are stacked or arranged in the order in which they were gated into a stacker.

When the stack of checks on the platform 16 is exhausted, the switch 907 (FIGURE 28) will open to outomatically de-energize the feed solenoid K204. Also, if at any time during sorting, any of the stackers 60 to 71 is filled to capacity, the feeding of checks will be automatically stopped by reason of the operation of its associated stacker overload switch 906 (FIGURE 28). The operator will remove all or some of the checks from the filled stacker and then depress the feed on button 29 (FIGURE 2A) again, in order to commence the feeding of checks again.

8. SCHEMATIC DIAGRAMS

(FIGURES 31 to 51)

In order to provide a complete description of the various circuits of this invention, the schematic diagrams of FIGURES 31 to 51 are presented. These schematic diagrams show actual values and other identifications of the various components utilized in the various circuits, and also the operating potentials utilized.

In view of the detailed description of most of the circuits of FIGURES 31 to 51 and their operation as already presented herein with reference to the sorter control logic diagram (FIGURES 7 to 20), and the component circuits (FIGURES 63 to 81), it is not believed necessary to further describe and explain the operation of all of the circuits of FIGURES 31 to 51. Accordingly, only the circuits of FIGURES 31 to 35, 43, and 44 will now be described in further detail.

(1) *Check Presence Signals*

(FIGURE 35)

The emitter of the check presence photocell 90 (FIGURES 2B and 35) is connected to ground potential, while its collector is connected to the base or input of the transistor 950. The conductivity of the photocell 90 varies with the intensity of the light falling upon its junction. Thus, when the light falling on the photocell 90 is maximum (that is, when there is no check passing between the photocell 90 and its light source), its conductivity will be maximum. The photocell 90, acting in conjunction with the resistor 951, which is connected to a −12 volts supply, will cause a potential of approximately −4 volts to appear at the input of the amplifier 167. Alternatively, when the light falling on the photocell 90 is minimum (that is, when a check is passing between the photocell 90 and its light source), its conductivity will be minimum. The photocell 90 acting in conjunction with the resistor 951 will cause a potential of approximately −8 volts to appear at the input of the amplifier 167.

Accordingly, the input to the amplifier 167 consists of a series of negative signals, each lasting for a time equivalent to the width of the check passing the photocell 90. For example, a ten-inch check will develop a signal lasting approximately 66.7 milliseconds.

The check presence preamplifier comprises the three A.C. coupled overdriven amplifiers 165 to 167 and the emitter follower 164.

Each of the amplifiers 165 to 167 comprises a transistor 950, 952, 953, respectively, and the emitter-follower comprises a transistor 954. The transistor 950 of the amplifier 167 is self-biased to approximately −4 volts on its emitter by the network comprising the resistors 955 and 956 and the capacitor 957. When no check is passing the photocell 90, the input to the base of the transistor 950 is near −4 volts, and the transistor 950 will not conduct. The output from the collector of the transistor 950 will be at −12 volts at this time. When a check cuts off the light to the photocell 90, the input to the base of the transistor 950 will be near −5 volts, and the transistor 950 will conduct. The output from the collector of the transistor 950 will rise towards −4 volts.

The transistor 952 of the amplifier 166 normally will be conducting, for a voltage divider comprising the resistors 958 and 959 acts to place a voltage of approximately −1 volt on its base. Thus, the potential appearing on the collector of the transistor 952 normally will be near 0 volts. Hence, a potential of approximately +2 volts will normally be applied to the base of the transistor 953 because of the action of a voltage divider comprising the resistors 960 and 961. This voltage divider is connected to a +62 volts supply. The transistor 953 normally will be cut off, with the potential on its collector near −12 volts.

When the output of the transistor 950 swings from −12 volts to −4 volts, this positive swing cuts off the transistor 952. The potential at the collector of the transistor 952 decreases towards −12 volts. This action causes the transistor 953 to conduct, and the potential on its collector rises to 0 volts. However, the transistor 952 will not remain cut off for the duration of the positive input signal from the transistor 950 (the width of the check passing the photocell 90), since the capacitor 962 will differentiate this signal. The transistor 952 will remain cut off for several hundred microseconds only, and then it will begin to conduct again.

Accordingly, the output signal from the transistor 950 may be a positive pulse having a duration of 50 or 60 milliseconds, but the output signal from the transistor 952 will be a negative pulse having a duration of less than 1 millisecond. This pulse will be clipped by the action of the amplifier 166, and then further clipped by the action of the emitter follower 164. Thus, the output signal of the amplifier 165, which is applied to the emitter follower 164, will be a positive pulse, varying between −12 volts and 0 volts and having a duration of approximately 0.5 millisecond. This 0.5 millisecond pulse is used in the sorter-reader 10 to indicate that the leading edge of a check has passed the check presence photocell 90.

The emitter follower 164 has been described in detail previously. It operates to apply the positive 0.5-millisecond check presence pulse to the synchronization signal generator 102 and the associated equipment 14.

(2) *Reject Count Signals*

(FIGURE 34)

The reject count preamplifier comprises the amplifiers 174 and 175 and the 25-millisecond one-shot circuit 176. The amplifier 174 comprises the transistors 963 and 964, while the amplifier 175 comprises the transistor 965. This preamplifier is essentially the same as the check presence preamplifier, except that the last stage comprises the 25-millisecond one-shot circuit 176 instead of an emitter follower. In order to provide an output signal of the desired polarity, the reject counter photocell 785 is connected between the input line to the transistor 963 and a −12 volts supply. The emitter of the photocell 785 is connected in series with the resistor 966 and ground potential. When no check is passing the photocell 785, a potential of approximately −8 volts is present on the input line connected to the base of the transistor 963. The transistor 963 is therefore normally conducting, and a potential of approximately −4 volts appears on its collector.

The transistor 964 is normally cut off, since its base is connected to ground potential, and the diode 967 causes a small negative potential to appear on its emitter. The potential on the collector of the transistor 964 is therefore normally near −12 volts. The transistor 965 is thus normally conducting, because a voltage divider comprising the resistors 968 and 969 causes a potential of approximately +2 volts to appear on its base. The potential on the collector of the transistor 965 is therefore near 0 volts. This potential of 0 volts allows the one-shot circuit 176 to remain in its stable state.

When a check passes the photocell 785, the potential appearing on the base of the transistor 963 rises to approximately −4 volts. The transistor 963 will conduct until the ouput of the photocell 785 returns to normal. The output of the transistor 963 will go to −12 volts for this interval. This output pulse is differentiated by the capacitor 968, so that only a short negative pulse appears at the base of the transistor 964. In response to this negative pulse, the transistor 964 will conduct for a short time, causing its output to rise toward 0 volts, which will cut off the transistor 965. The output of the transistor 965 will decrease toward −12 volts for an interval of less than 1 millisecond. This output of the transistor 965 is differentiated by the capacitor 969, developing a sharp negative pulse. This negative pulse is used to trigger the 25-millisecond one-shot circuit 176 to its unstable state. The one-shot circuit 176 has been described in detail previously. It operates to supply a 25-millisecond negative signal to the driver 161 (FIGURE 7) for the reject item counter solenoid 163 (FIGURE 30).

(3) *Magnetic Pickup Signals*

(FIGURES 31 and 32)

As stated previously, a rotary mechanism or disc is associated with the timing device 19. This rotary mechanism carries two permanent magnet elements, 180 degrees apart on its surface. A reading head is mounted adjacent to the rotary mechanism. The permanent magnet elements will pass by the reading head when the rotary mechanism rotates. The reading head is essentially an inductor, connected between ground potential and the input line of the amplifier 168. When the timing device 19 rotates, the permanent magnet elements will pass adjacent to the reading head and induces a voltage therein once every 80 milliseconds. As the reading head senses changes in magnetic flux, a pulse of one polarity is induced when the leading edge of a permanent magnet element passes adjacent to the reading head, and a pulse of the opposite polarity will be induced when the trailing edge of the permanent magnet element passes adjacent to the reading head. In response to the leading edge of a permanent magnet element, a positive pulse of approximately +3 volts is delivered to the input line of the amplifier 168, while the trailing edge of a permanent magnet element delivers a negative pulse of approximately —3 volts.

The amplifier 168 comprises transistors 970 and 971. The transistor 970 is self-biased with a potential of approximately —1 volt on its emitter. Therefore the transistor 970 is normally cut off, and a potential of approximately —10.5 volts appears on its collector. A voltage divider comprising the resistors 972 and 973 causes a potential of approximately —1 volt to appear on the base of the transistor 971. The transistor 971 is therefore normally conducting, even though it is self-biased by the network comprising the diode 974 and the resistor 975. The transistor 971 will have a small negative potential appearing on its collector.

The positive swing of the magnetic pickup pulse will not affect the transistor 970, since it is cut off. However, the negative swing of the magnetic pickup pulse will cause the transistor 970 to conduct, raising the potential on its collector to approximately —1 volt. This positive swing will cut off the transistor 971, causing the potential on its collector to change to —12 volts. This negative swing will trigger the 4-millisecond one-shot circuit 169. The "1" output (negative) of the one-shot circuit 169 is applied to the 500-millisecond one-shot circuit 180, the flip-flop 171, and other circuits by way of the emitter follower 170. The "0" output of the one-shot circuit 169 is applied to the flip-flop 590 in the synchronization signal generator circuit 102. The one-shot circuits 169 and 180, the emitter follower 170, and the flip-flop 171 have been described in detail previously.

(4) *Unblanking Signals*

(FIGURE 33)

The unblanking pulse from the character reader 12 is a positive pulse having a duration of 55 milliseconds and varying from —5 volts to +6 volts (signal 121, FIGURE 21H). This unblanking pulse is applied as an input to the one-shot circuit 177. The one-shot circuit 177 comprises the transistors 976 and 977. The one-shot circuit 177 will produce a negative output signal coinciding with the trailing edge of the unblanking pulse.

Normally, the transistors 976 and 977 of the one-shot circuit 177 will be conducting, since a negative potential appears on their bases and their emitters are connected to ground potential. A potential of 0 volts normally will be present at their collectors. When the unblanking pulse is applied to the base of the transistor 976, it causes that transistor to be cut off, and the potential on its collector decreases toward —12 volts. The capacitor 978 will begin to charge through the emitter-to-base circuit of the transistor 977 and the resistor 979. The transistor 977 will remain conducting, and its output line to the associated equipment 14 will remain at a potential of 0 volts. Then, upon termination of the unblanking pulse, the potential applied to the base of the transistor 976 will decrease to —5 volts, and this transistor will commence to conduct. Upon conducting, the transistor 976 causes the capacitor 978 to discharge through the resistor 980. As a result, a positive potential is applied to the base of the transistor 977, causing it to be cut off. The potential on the output line to the associated equipment 14 will decrease to —12 volts, because of the action of the clamping diode 981. When the capacitor 978 has discharged sufficiently to allow the transistor 977 to conduct again (an interval of less than two microseconds), the potential on the output line will return gradually to 0 volts.

(5) *Jam Detector Circuit*

(FIGURES 43 and 44)

It has been described previously that the jam detector circuit 103 includes two groups of photocells; that is, the feed section photocell 628 and 629, which are connected in one circuit, and the thirteen stacker jam photocells, which are connected in another circuit and are represented by the photocells 630 and 631. As the two circuits are substantially similar, only the stacker jam photocell circuit will now be described in more detail.

The stocker jam photocell circuit comprises the phase-shift RC generator 617, the overdriven amplifier 618, the modulator circuit 620, the amplifier 621, the detector circuit 790, the amplifier 596, and the emitter follower 622.

The generator 617 comprises the transistor 981. The output of the generator 617 is essentially a continuous sine wave of 2.5 kilocycles norminal frequency. The resistors 982 and 983 provide a signal level of approximately —1 volt to the base of the transistor 981. The output, taken from the collector of the transistor 981, passes through a phase shift network, comprising the resistors 984 and 985 and the capacitors 986 to 988, before being applied back to its base. The phase shift network shifts the output of the transistor 981 so that the signal applied back to its base is 180 degrees out of phase with that obtained from its collector. Thus, a condition of oscillation in the generator 617 is sustained.

The 2.5-kilocycle output from the collector of the transistor 981 is applied to the amplifier 618. The amplifier 618 comprises the transistors 989 and 990. The transistor 989 is normally conducting, as its base is returned to a —12 volts supply through the resistors 991 and 992. The transistor 989 operates to clip the positive peaks of the output signal obtained at its collector. The transistor 990 is also normally conducting, because a potential of approximately —1.5 volts is applied to its base, which potential is controlled by the resistors 993 and 994. The transistor 990 operates to clip the negative peaks of the output signal obtained at its collector, so that square wave signals are available thereat.

The square wave signal from the collector of the transistor 990 is applied to the amplifier 621, but, first, the amplitude of this square wave signal is controlled so that its does not exceed a predetermined amplitude; that is, it is not less negative than —4 volts. Second, the amplitude of this square wave signal is controlled so that it will be minimum when all of the stacker jam photocells are receiving maximum light and hence are conducting heavily, and it will be maximum when one or more of the stacker jam photocells are receiving minimum light and hence their conductivity is sharply reduced.

The amplifier 621 comprises the transistors 995 and 996. The square wave signal from the collector of the transistor 990 is applied through an adjustable resistor 997 and a capacitor 998 to the base of the transistor 995. A diode 999 is connected between the base of the transistor 995 and a —4 volts supply. The diode 999 prevents any potential less negative than —4 volts from being applied to the base of the transistor 995.

The modulator 620 comprises the NPN type transistor 185. Its emitter is connected to a point between the resistor 997 and the capacitor 998, and its collector is connected to ground potential. The base of the transistor 620 is connected through section 619 of the test switch 600 to the collector of the photocell 631. The thirteen photocells of the stacker jam photocell circuit are connected in series (emitter to collector), and the last photocell 630 has its emitter connected to ground potential.

When all of the thirteen photocells of the stacker jam photocell circuit are receiving maximum light from their associated light sources (not shown), their conductivity will be high, and the base of the potential appearing at the base of the transistor 185 will be near ground potential. Accordingly, the transistor 185 will conduct and attempt to raise the potential on its emitter to ground potential. The potential on the emitter of the transistor 185 will not rise to ground potential because of the action of the diode 999. Nevertheless, at this time the potential on the emitter of the transistor 185 will be maintained substantially constant, so that very little of the square wave signal from the collector of the transistor 990 will be applied to the base of the transistor 995. The foregoing will be the condition that exists when no checks shut out the light falling on the jam detector photocells 630 and 631 from their associated light sources.

When one or more checks are passing the jam detector photocells 630 and 631, and consequently one or more of these photocells are receiving minimum light, the conductivity of the series of thirteen photocells is sharply reduced. This series of photocells presents a high impedance to the current flowing therethrough and from the base to the emitter of the transistor 185. As a result, a negative potential appears on the base of the transistor 185, causing its conduction to be reduced. With the conduction of the transistor 185 reduced at this time, a square wave signal of greater amplitude is applied to the base of the transistor 995.

The transistors 995 and 996 are provided to amplify the square wave signal obtained from the collector of the transistor 990. The amplified square wave signal appears at the collector of the transistor 996 and is applied to the detector circuit 790.

The detector circuit 790 comprises the diode 186 and the capacitor 187. The detector circuit 790 functions to convert the square wave signal applied to it to a stable negative potential whose amplitude is proportional to the amplitude of this square wave signal.

The amplifier 596 and the emitter follower 622 comprise the transistors 188 and 189, respectively. The negative potential developed by the detector circuit 790 is applied to the base of the transistor 188. As the emitter of the transistor 188 is connected to a —4 volts supply, only a potential more negative than —4 volts will cause the transistor 188 to conduct. Accordingly, low-amplitude signals developed when the transistor 185 is conducting heavily will not cause the transistor 188 to conduct.

The output of the transistor 188 is a positive square wave signal having a duration equal to the time that any check is cutting off light from any of the thirteen stacker jam photocells. This positive signal will cause the transistor 189 to conduct. When conducting, the transistor 189 will produce a negative square wave signal, which is applied to one input of the "AND" gate 613. The other input to the "AND" gate 613 receive the 0.2-millisecond negative signal output from the one-shot circuit 611, as described previously.

9. ELECTRONIC MEMORY

(FIGURES 52 to 54)

As pointed out previously, in accordance with the present invention, an electronic memory 113 (FIGURE 6) is provided for the sorter-reader 10 in place of the output decoder 111 and the mechanical memory 112.

The electronic memory 113 operates to delay each of a plurality of groups of input electrical signals representative of input data expressed in accordance with a predetermined code, and operates to provide an output signal for each of the groups of input electrical signals a time interval after each of the groups of input electrical signals is first received. The time interval is determined by the value of the coded input data. The electronic memory 113 performs the decoding function previously accomplished by the output decoder 111 and the delay function previously accomplished by the mechanical memory 112.

Referring now to FIGURES 52 to 54 in detail, the electronic memory 113 comprises eleven "AND" gates or coincidence circuit means 705 to 715, a delay means comprising a series of four bistable state storage devices 791 to 794, a control or timing means comprising the flip-flop 700, the 30-microsecond one-shot circuit 701, the inverter 702, the 16-millisecond one-shot circuit 703, and the inverter 704.

The series of bistable state storage devices or shift register 791 comprises nine flip-flops or shift register sections 750, 754, 758, 762, 766, 769, 772, 775, and 778. The series of bistable state storage devices or shift register 792 comprises ten flip-flops or shift register sections 751, 755, 759, 763, 767, 770, 773, 776, 779, and 780. The series of bistable state storage devices or shift register 793 comprises four flip-flops or shift register sections 752, 756, 760, and 764, and the series of bistable storage devices or shift register 794 comprises eight flip-flops or shift register sections 753, 757, 761, 765, 768, 771, 774, and 777. All of the flip-flops of the shift registers 791 to 794 are operated by positive input signals in distinction to most of the other flip-flops of the sorter-reader 10. For example, the flip-flop 750 (FIGURE 52), when in its set state, will have 0 volts appear on its "I" output and —12 volts appear on its "0" output. A positive voltage swing on the reset input of the flip-flop 750 will cause it to change to its reset state, wherein —12 volts will appear on its "1" output and 0 volts will appear on its "0" output.

The electronic memory 113 also comprises a code-changing circuit 781 for modifying the binary-coded sort decision signals received from the terminals 474, 476, 480, and 496 to 499 (FIGURE 18) of the output memory 110 before these signals are applied to the first shift register sections or flip-flops 750 to 753 of the shift registers 791 to 794, respectively. The code-changing circuit 781 also provides two negative outputs to select the special sort "AND" gate 705, so that this gate will produce a negative output if a special sort decision signal is applied to it.

The code-changing circuit 781 comprises the "OR" gates 716 to 718 and the "AND" gates 719 to 723. The "OR" gates 716 to 718 are the same type of circuit as the "OR" gate shown in FIGURE 71, which has been described previously. In operation, the "OR" gates 716 to 718 will develop a positive output (0 volts) when all of their input signals are positive. The "AND" gates 719 to 723 are the same type of circuit as the "AND" gate shown in FIG. 70, which has been described presiously. In operation, the "AND" gates 719 to 723 will develop a positive output (0 volts) if any one of their input signals is positive (0 volts).

The following table shows the output code of the output memory 110 (FIGURE 18). The "X" represents when the binary line is at —12 volts.

| | Binary lines (Flip-Flops 454 to 457, FIG. 18) | | | | | | | |
|---|---|---|---|---|---|---|---|---|
| | 1 | $\bar{1}$ | 2 | $\bar{2}$ | 4 | $\bar{4}$ | 8 | $\bar{8}$ |
| Decimal values: | | | | | | | | |
| 0 | | X | | X | | X | | X |
| 1 | X | | | X | | X | | X |
| 2 | | X | X | | | X | | X |
| 3 | X | | X | | | X | | X |
| 4 | | X | | X | X | | | X |
| 5 | X | | | X | X | | | X |
| 6 | | X | X | | X | | | X |
| 7 | X | | X | | X | | | X |
| 8 | | X | | X | | X | X | |
| 9 | X | | | X | | X | X | |
| Symbols: | | | | | | | | |
| Q1 | | X | X | | | X | X | |
| Q2 | X | | X | | | X | X | |
| Q3 | | X | | X | X | | X | |
| Q4 | X | | | X | X | | X | |
| Special Sort—SS | | X | X | | X | | X | |
| Reject—R | X | | X | | X | | X | |

The following table shows the output code of the shift registers 791 to 794, after the code of the output memory 110 is changed by the code-changing circuit 781. The "X" represents when the binary line is at −12 volts.

| | Binary lines (flip-flops of shift registers 791 to 794) | | | | | | | |
|---|---|---|---|---|---|---|---|---|
| | 1 | $\bar{1}$ | 2 | $\bar{2}$ | 3 | $\bar{3}$ | 4 | $\bar{4}$ |
| Decimal values: | | | | | | | | |
| 0 | | X | | X | X | | | X |
| 1 | X | | | X | X | | | X |
| 2 | | X | X | | X | | | X |
| 3 | X | | X | | X | | | X |
| 4 | | X | | X | | X | | X |
| 5 | X | | | X | | X | | X |
| 6 | | X | X | | | X | | X |
| 7 | X | | X | X | | X | | |
| 8 | | X | | X | | X | X | |
| 9 | X | | | X | | X | X | |
| Symbols: | | | | | | | | |
| Q1 | | X | X | | X | | X | |
| Q2 | X | | X | | X | | X | |
| Q3 | | X | | X | X | | X | |
| Q4 | X | | | X | X | | X | |
| Special Sort—SS | | X | X | | X | | X | |
| Reject—R | X | | X | | X | | X | |

The sort decision for a check is made available to the electronic memory 113 from the output terminals 480 to 483 and 496 to 499 (FIGURE 18) of the output memory 110. The sort decision is in the form of a group of electrical signals representative of data expressed in a predetermined code. In the illustrative embodiment of the invention, each group of these electrical signals comprises four signals, and a group of these electrical signals are representative of a decimal quantity expressed in a binary code, parallel by binary bit. If the sort decision in the output memory 110 is a special sort decision, then four negative electrical signals will be applied to the "AND" gate 705 as soon as that decision is made available to the output memory 110. Then, the "AND" gate 705 will develop a single negative output signal on its output line 795 when a negative signal from the "1" output of the flip-flop 700 and a negative gate signal from the inverter 704 is applied to it. This single negative output signal is then applied through the emitter follower 516 and the driver 527 (FIGURE 20) to the power amplifier 551 (FIGURE 30), which controls the gate mechanism for the special sort stacker 60 (FIGURE 1).

When the sorter-reader 10 is operating to sort successive checks, each of the sort decision signals developed for a particular check will be received, parallel by binary bit, in a similarly-ordered flip-flop of each of the shift registers 791 to 794 and will cause the "AND" gate, such as the "0" sort "AND" gate 706, associated with similarly-ordered flip-flops of the shift registers 791 to 794, in conjunction with a gate pulse 796 (FIGURE 82), to develop a single negative output. The single negative output of one of the "AND" gates 705 to 715 will control the operation of the gate mechanism associated with the desired one of the stackers 60 to 70 of the sorter-reader 10. The sort decision signals are generally advanced from one flip-flop to the succeeding flip-flop of the shift registers 791 to 794 approximately every 80 milliseconds, by a shift pulse 797 (FIGURE 82), and it is released to the output line of an appropriate one of the "AND" gates 706 to 715 by the gate pulse 796 at the proper time to cause the proper gate mechanism to open and allow the check to be deposited in the proper one of the stackers 60 to 70.

The operation of the electronic memory 113 during the sorting of a single check is as follows. It will be assumed that this check is to be sorted into the "0" stacker 61 (FIGURE 1).

The check, after being fed from the platform 16 (FIGURE 2B), will be passed under the control of the conveyor feed 21 past the check presence photocell 90 (FIGURES 2B and 35). In the amplifier circuits 100, the negative output of the check presence photocell 90 is amplified and differentiated to provide the positive check presence signal 120 (FIGURES 7 and 21(C)), having a duration of 0.5 millisecond.

The first synchronization signal 145 (FIGURES 9 and 21(D)), a negative pulse having a duration of 10.4 milliseconds, is developed. The trailing edge of the first synchronization signal 145, after differentiation, is sent to the character reader 12, where the positive unblanking signal 121 (FIGURE 21(H)), having a duration of 55 milliseconds, is developed. This unblanking signal 121 fixes the actual time of the reading of the magnetic ink characters from the check.

About 62 milliseconds after the start of the check presence signal 120 and about 2 milliseconds before the end of the unblanking signal 121, a positive magnetic pickup signal 118 (FIGURE 7), having a duration of 4 milliseconds, is developed in the amplifier circuits 100. The magnetic pickup signal 118, having been preceded by a first synchronization signal 145, is sent to the synchronization signal generator 102, where, in conjunction with the first synchronization signal 145, the negative second synchronization signal 146 (FIGURES 9 and 82(B)), having a duration of 18 milliseconds, is developed. The negative magnetic pickup signal 119 (FIGURES 7 and 82(A)), having a duration of 4 milliseconds, is also developed in the synchronization signal generator 102.

In the synchronization signal generator 102, the second synchronization signal 146 is used to develop the third synchronization signal 158 (FIGURES 9 and 82(I)). The third synchronization signal 158 is a negative pulse having a duration of 30 microseconds and delayed 150 microseconds from the time of starting of the second synchronization signal 146.

The negative magnetic pickup signal 119 from the emitter follower 170 (FIGURE 32) is applied to the set input of the one-shot circuit 703. In response to the negative magnetic pickup signal 119, the one-shot circuit 703 will develop a positive delay signal 798 (FIGURE 82(C)), having a duration of 16 milliseconds. This delay signal 798 is applied to the "OR" gates 716 to 718 and to the inverter 704. The negative output of the inverter 704 is called the gate signal 796 (FIGURE 82(D)) and is applied to the "AND" gates 705 to 715 and to the "AND" gates 719 to 723. The delay and the gate signals 798 and 796 both start at the time of the magnetic pickup signal 119 and end about 2 milliseconds before the end or trailing positive-going edge of the second synchronization pulse 146. The trailing edge of the second synchronization signal 146, after differentiation and inversion, is used to clear or reset the output memory 110.

If the sort decision for the previous check was a special sort decision and the check was deposited in the special sort stacker 60 (FIGURE 1), then that special sort decision would have been passed directly to the special sort "AND" gate 705 upon the occurrence of the delay and gate signals 798 and 796, respectively. For a special sort decision, the output memory 110 would have developed a negative voltage (—12 volts) on each of its $\bar{1}$, 2, 4, and 8 binary output lines. These four negative voltages would have been applied to the special sort "AND" gate 705. The negative voltage (—12 volts) on its $\bar{1}$ binary output line would have been applied to the "AND" gate 719. The "AND" gate 719 would not have developed a positive output. The positive voltage (0 volts) on its "1" binary output line would have been applied to the "OR" gate 716. The positive delay signal 798 from the "0" output of the one-shot circuit 703, and the positive output from the "0" output of the flip-flop 700, would also have been applied to the "OR" gate 716. Accordingly, the "OR" gate 716 would have developed a positive output which would have been applied to the set input of the flip-flop 750. The flip-flop 750 would have been set at the time of the shift pulse 797 (FIGURE 82(F)), developing a negative voltage at its "0" output or $\bar{1}$ binary output line.

The negative voltage on the 2 binary output line of the output memory 110 would have been applied to the "OR" gate 717. The "OR" gate 717 would not have developed a positive output to cause setting of the flip-flop 751 of the shift register 792. The positive voltage on its $\bar{2}$ binary output line would have been applied to the "AND" gates 720 and 723. The "AND" gate 720 would have developed a positive output, which, in turn, would have been applied to the reset input of the flip-flop 751. The flip-flop 751 would have been either transferred to its reset state or caused to remain in its reset state at the time of the shift pulse 797. The "AND" gate 723 would have developed a positive output, which would have been applied to the "OR" gate 725. The negative voltage on the 4 binary output line of the output memory 110 would have been applied to the "AND" gate 722. The positive voltage on its $\bar{4}$ binary output line would have been applied to the "AND" gate 723. The "AND" gate 723, as stated previously, would have developed a positive output, which would have been applied to the "OR" gate 725. The negative voltage on the 8 binary output line of the output memory 110 would have been applied to the "OR" gate 718. Hence, the "OR" gate 718 would not have developed a positive output to cause setting of the flip-flop 753 of the shift register 794. This negative voltage would have also been applied to the "AND" gate 723. The positive voltage appearing on its $\bar{8}$ binary output line would have been applied to the "AND" gates 721 and 722. The "AND" gate 721 would have developed a positive output, which, in turn, would have been applied to the reset input of the flip-flop 753. The flip-flop 753 would either have been transferred to its reset state or remain in its reset state at the time of the shift pulse 797. The "AND" gate 722 would have developed a positive output, which, in turn, would have been applied to the "OR" gate 725. Thus, the "OR" gate 725 would have developed a positive output, which in turn, would have been applied to the reset input of the flip-flop 752. The flip-flop 752 would either have been transferred to its reset state or remain in its reset state at the time of the shift pulse 757. The positive output of the "OR" gate 725 would have also been applied to the inverter 724. The negative output of the inverter 724 would have been applied to the set input of the flip-flop 752. The flip-flop 752 would not have been set by the negative output. Accordingly, the flip-flop 750 of the shift register 791 would have been set, and the flip-flops 751 to 753 of the shift registers 792 to 794, respectively, would have been reset at the time of the shift pulse 797. Thus, the flip-flops 750 to 753 will each be in correct states indicative of the fact that a special sort decision has been transferred from the output memory 110 thereto.

The flip-flop 700 would have been in its set state when the sorter-reader 10 is first turned on. The third synchronization signal 158 (FIGURES 9 and 82(I)) would have been developed for a check previous to the one for which the above special sorting decision was developed. This third synchronization signal would have caused the flip-flop 700 to be set, thereby developing a positive output on its "0" output and a negative output on its "1" output. Accordingly, the code-changing circuit 781 would have been conditioned to pass the special sort decision signals to the flip-flops 750 to 753 of the shift registers 791 to 794, respectively.

The positive delay signal 798 from the one-shot circuit 703 is also applied to the set input of the one-shot circuit 701. In response to the trailing edge of this positive delay signal, the one-shot circuit 703 will develop a negative transfer signal 799 (FIGURE 82(E)), having a duration of 30 microseconds.

The negative transfer signal 799 is applied to the inverter 702. The positive output of the inverter 702 is called the shift pulse 797 (FIGURE 82(F)), which has a duration of 30 microseconds. This shift pulse 797 is applied to all of the flip-flops of the shift registers 791 to 794. Thus, the special sort decision developed for the prior check will be transferred to the flip-flops 750 to 753 at the time of the shift pulse 797, and a sort decision present in the flip-flops 750 to 753 will be advanced to the flip-flops 754 to 757 of the shift registers 791 to 794, respectively. A sort decision present in the flip-flops 754 to 757 will be advanced to the flip-flops 758 to 761, and a sort decision present in the flip-flops 758 to 761 will be advanced to the flip-flops 762 to 765. Only sort decisions denoting that a check is to be sorted into the "4" to "9" stackers 65 to 70 will be advanced by a shift pulse 797 to the flip-flops 766 to 768 by reason of the "AND" gates 726 to 728 and the "OR" gates 729 to 731. Only sort decisions denoting that a check is to be sorted into the "8" or "9" stackers 69 and 70 will be advanced by a shift pulse 797 to the flip-flops 778 and 779 by reason of the "AND" gates 732 and 733 and the "OR" gates 734 and 735. Finally, only a sort decision denoting that a check is to be sorted into the "9" stacker 70 will be transferred from the flip-flops 778 and 779 to the flip-flop 780 by reason of the "OR" gate 736 and the "AND" gate 737.

The negative transfer signal 799 is also applied to the reset input of the flip-flop 700, causing it to be reset. In its reset state, the flip-flop 700 develops a negative output on its "0" output and a positive output on its "1" output. The negative output is applied to the "OR" gates 716 to 718, and the positive output is applied to the "AND" gates 719 to 723. Accordingly, the special sort decision in the output memory 110 is prevented from being further translated to the flip-flops 750 to 753 of the shift registers 791 to 794, respectively.

The second synchronization signal 146 (FIGURES 9 and 82(B)) is applied to the differentiator inverter 477 (FIGURE 9). The positive output signal 93 from the differentiator inverter 477 is applied to the flip-flops 454 to 457 (FIGURE 18) of the output memory 110. The negative trailing edge of the signal 93 (FIGURE 82(G)) resets the flip-flops 454 to 457 (FIGURE 18) and clears the output memory 110 of the special sort decision for the previous check.

The positive output signal 93 (FIGURES 9 and 82(G)) from the differentiator inverter 477 (FIGURE 9) is also applied to the 150-microsecond one-shot circuit 277. The one-shot circuit 277 develops a positive delay signal 156 (FIGURES 9 and 82(H)), which is sent to the field selector circuit 104 (FIGURE 5). The trailing edge of this positive delay signal disables the field selector circuit 104. The positive delay signal 156 is also applied to the 30-microsecond one-shot circuit 445 (FIGURE 9). The one-shot circuit 445 develops the third synchronization signal 158 (FIGURES 9 and 82(I)).

The third synchronization signal 158 (FIGURE 82(I)), developed for the current check, is sent to the special sort circuit 109 (FIGURE 6), where either a transfer signal or a special sort signal is developed. The transfer signal or the special sort signal is sent to the output memory 110 to cause the sort decision for the current check to be placed in the output memory 110. In the example chosen to describe the operation of the electronic memory 113, the sort decision for the current check is a "0." Accordingly, the flip-flops 454 to 457 (FIGURE 18) of the output memory 110 will all be in their set state after the "0" sort decision is transferred to them.

The third synchronization signal 158 (FIGURE 82(I)), developed for the current check, is also applied to the set input of the flip-flop 700, causing it to be transferred to its set state. The positive output appearing on its "0" output is applied to the "OR" gates 716 to 718. The "OR" gates 716 to 718 are thereby conditioned so that the "0" sort decision may be subsequently transferred by way of the code-changing network 781 to the flip-flops 750 to 753 of the shift registers 791 to 794, respectively.

Upon the arrival of the next magnetic pickup signal 119 (FIGURE 82(A)), after the next check is fed and the magnetic characters thereon are read, the delay and gate signals 798 and 796, the transfer signal 789, and the shift pulse 797 will again be developed. The "0" sort decision will be transferred to the flip-flops 750 to 753 of the shift registers 791 to 794, respectively, in response to the shift pulse 797, just after the special sort decision is advanced to the flip-flops 754 to 757.

The manner in which the "0" sort decision is transferred to the flip-flops 750 to 753 of the shift registers 791 to 794, respectively, is as follows. When the output memory 110 holds a "0" sort decision, a negative voltage (—12 volts) appears on its $\bar{1}$, $\bar{2}$, $\bar{4}$, and $\bar{8}$ binary output lines. The negative voltage on its $\bar{1}$ binary output line is applied to the "AND" gate 719. The "AND" gate 719 will not produce a positive output. The positive voltage (0 volts) on its 1 binary output line is applied to the "OR" gate 716. The positive delay signal 798 and the positive output from the "0" output of the flip-flop 700 are also applied to the "OR" gate 716. Accordingly, the "OR" gate 716 develops a positive output, which is used to set the flip-flop 750 at the time of the shift pulse 757. The negative voltage on the $\bar{2}$ binary output line of the output memory 110 is applied to the "AND" gate 720. The "AND" gate 720 will not produce a positive output. The positive voltage on the 2 binary output line is applied to the "OR" gate 717. The positive delay signal 798 and the positive output from the "0" output of the flip-flop 700 are also applied to the "OR" gate 717. Accordingly, the "OR" gate 717 develops a positive output, which is used to set the flip-flop 751 at the time of the shift pulse 757. The negative voltage on the $\bar{4}$ binary output line of the output memory 110 is applied to the "AND" gate 723. The "AND" gate 723 will not produce a positive output. The positive voltage on the 4 binary output line is applied to the "AND" gate 722. The "AND" gate 722 develops a positive output, which is applied to the "OR" gate 725. The negative voltage on the $\bar{8}$ binary output line of the output memory 110 is applied to the "AND" gate 721. The "AND" gate 721 will not produce a positive output. The positive voltage on the 8 binary output line is applied to the "OR" gate 718. The positive delay signal 798 and the positive ouput of the flip-flop 700 are also applied to the "OR" gate 718. The "OR" gate 718 develops a positive output that is used to set the flip-flop 753 at the time of the shift pulse 757. The positive voltage on the 8 binary output line is also applied to the "AND" gate 723. Accordingly, the "OR" gate 725, having two positive inputs, develops a positive output, which is used to reset the flip-flop 752 at the time of the shift pulse 757.

As a result of the foregoing, the flip-flops 750, 751, and 753 will be in their set state, and the flip-flop 752 will be in its reset state. This denotes that the "0" sort decision is present in the flip-flops 750 to 753 an interval equal to approximately 80 milliseconds minus 150 microseconds after that "0" sort decision was first transferred to the output memory 110 from the input memory 107. The special sort decision is present in the flip-flops 754 to 757 after an interval equal to approximately twice that interval.

As the flip-flops 750, 751, and 753 are in their set state, the negative voltage on each of their $\bar{1}$, $\bar{2}$, and $\bar{4}$ binary output lines is applied to the "0" sort "AND" gate 706. As the flip-flop 752 is in its reset state, the negative voltage on its 3 binary output line is applied to the "0" sort "AND" gate 706. Then, upon occurrence of the negative gate signal 796, which is also applied to the "0" sort "AND" gate 706, the "AND" gate 706 will develop a negative voltage output to control the gate mechanism for the "0" sort stacker 61 (FIGURE 1).

10. ELECTRONIC MEMORY—SCHEMATIC DIAGRAMS (FIGURES 55 to 62)

In order to provide a complete description of the electronic memory of this invention, the schematic diagrams of FIGURES 55 to 62 are presented. These schematic diagrams show actual values and other identifications of the various components utilized in the electronic memory, and also the operating potentials utilized.

In view of the detailed description of the electronic memory and its manner of operation which has already been presented with relation to FIGS. 52 to 54, it is not believed necessary to describe in detail all the circuits of FIGURES 55 to 62. Accordingly, only the clamp circuits shown in FIGURES 56 and 58, and the flip-flop of FIGURE 62, which is utilized in the series 791 to 794 of the bistable state storage devices or shift registers of the electronic memory, will now be described.

(1) *Clamp Circuit*

Figure 56:
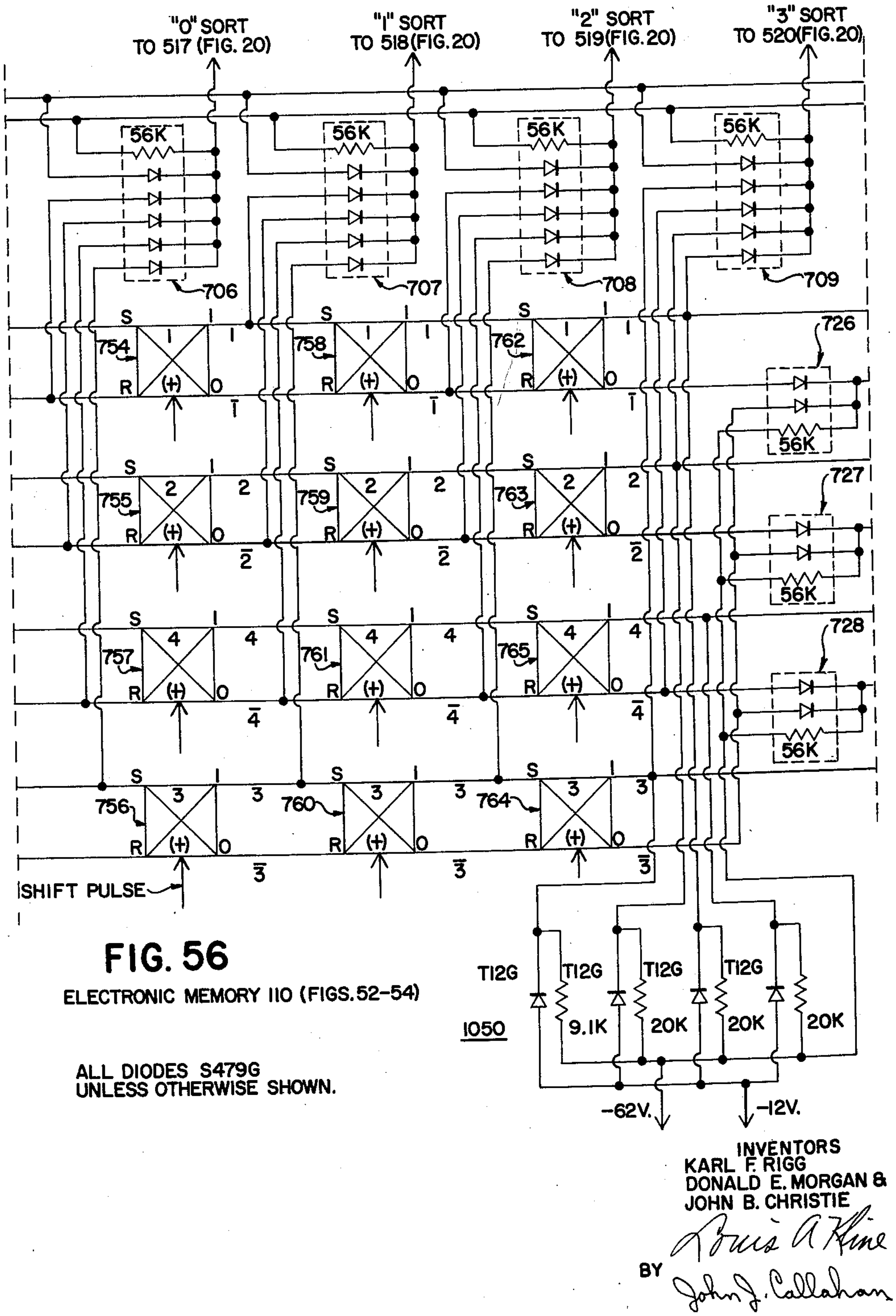
Figure 57:
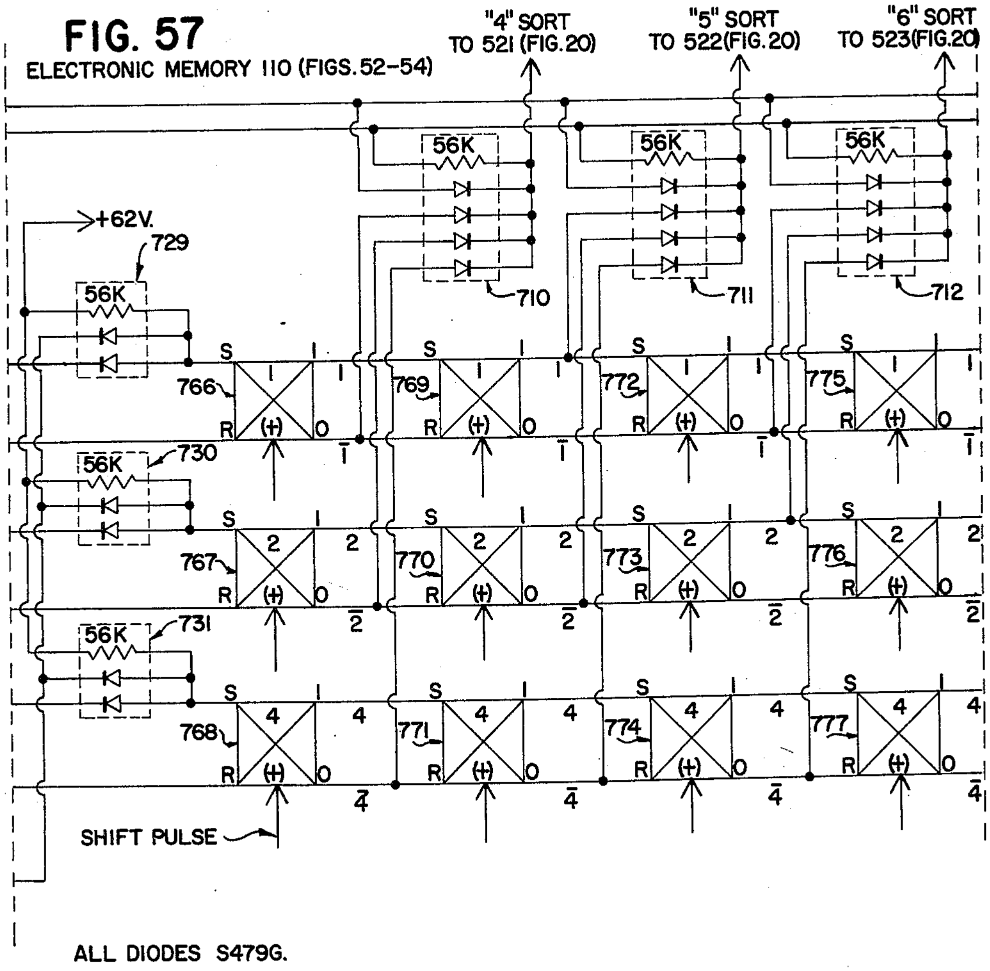
Figure 58:
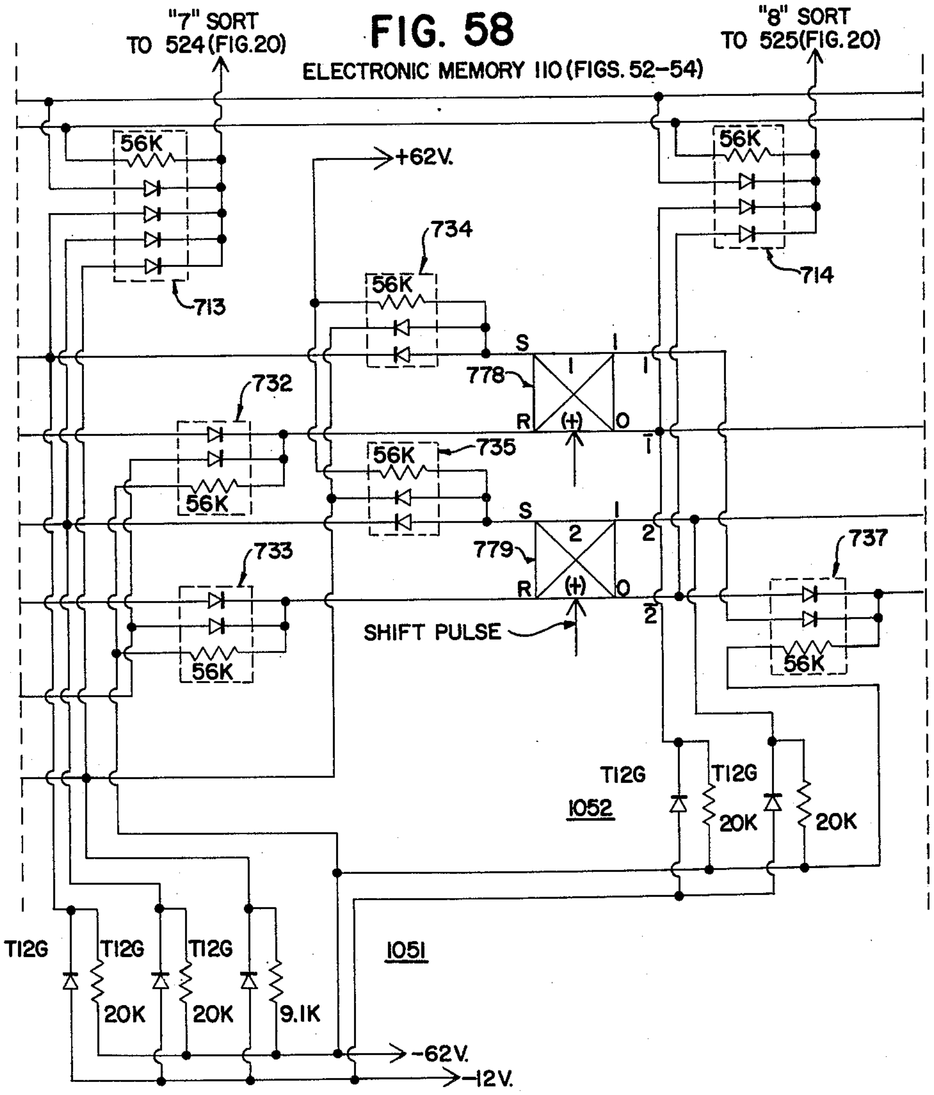
Figure 59:
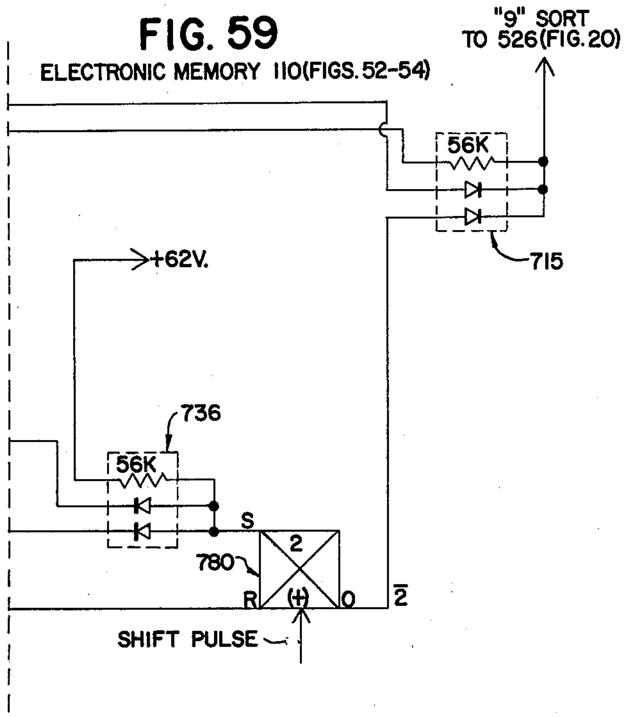

(FIGURES 56 and 58)

The electronic memory 110 is provided with three groups, 1050 (FIGURE 56), 1051, and 1052 (FIGURE 58), of clamp circuits. Each of the clamp circuits comprises a diode and a resistor. The group 1050 (FIGURE 56) includes four clamp circuits. One of these clamp circuits is connected to the 3 binary output line of the flip-flop 764 and assures that the potential applied to the "OR" gates 729 to 731 will not decrease below —12 volts.

The second, third, and fourth clamp circuits are connected, respectively, to the 2 binary output line of the flip-flop 763, to the 1 binary output line of the flip-flop 762, and to the 4 binary output line of the flip-flop 765. The group 1051 (FIGURE 58) includes three clamp circuits. One of these clamp circuits is connected to the 1 binary output line of the flip-flop 775, the second is connected to the 2 binary output line of the flip-flop 776, and the third is connected to the $\bar{4}$ binary output line of the flip-flop 777. The group 1052 (FIGURE 58) includes two clamp circuits. The first clamp circuit is connected to the $\bar{1}$ binary output line of the flip-flop 778, and the second is connected to the 2 binary output line of the flip-flop 779. Accordingly, the clamp circuits assure that the potentials applied to the "OR" gates 729 to 731 and 734 to 736 will not be less than —12 volts.

(2) *Flip-Flop*

(FIGURE 62)

Each of the flip-flops 750 to 781 is composed of the circuit shown in FIGURE 62. This circuit comprises two grounded emitter transistors, 1030 and 1031, having an "S" input connected through a resistor 1032 and a diode 1033 to the base of the transistor 1030, an "R" input connected through a resistor 1034 and a diode 1035 to the base of the transistor 1031, a "0" output connected to the collector of the transistor 1030, and a "1" output connected to the collector of the transistor 1031. The base of the transistor 1030 is connected to the collector of the transistor 1031 through parallel-connected resistor 1036 and capacitor 1037, whereas the base of the transistor 1031 is connected to the collector of the transistor 1030 through parallel-connected resistor 1038 and capacitor 1039. The base of each of the transistors 1030 and 1031 is connected to a source of positive unidirectional operating potential (+62 volts) through resistors 1040 and 1041, respectively, whereas the collector of each is connected to a source of negative unidirectional operating potential (—12 volts) through resistors 1042 and 1043, respectively.

The diodes 1033 and 1034 are poled to conduct current in a conventional sense toward the bases of the transistors 1030 and 1031, respectively. The plate of each of the diodes 1033 and 1034 is connected to a source of negative unidirectional potential (—20 volts) through resistors 1044 and 1045, respectively. The shift pulse 797 (FIGURE 82(F)) is applied to the plate of each of the diodes 1033 and 1034 through capacitors 1046 and 1047, respectively.

The "S" and "R" inputs of the circuit of FIGURE 62 will normally be connected to the "1" output or 1 binary output line and the "0" output or 0 binary line, respectively, of the preceding flip-flop of a shift register, and the "1" or "0" outputs will be connected to the "S" and "R" inputs, respectively, of the succeeding flip-flop of a shift register.

In order to describe a mode of operation, it will first be assumed that the transistor 1030 is conducting and that the transistor 1031 is cut off. The flip-flop when in this state is defined as being in its reset state. The diodes 1033 and 1035 will be biased in the reverse direction through the resistors 1044 and 1045, respectively, each of which is connected to a —20 volts potential source. When the "S" input of the flip-flop is at 0 volts—that is, a 0 volts potential at the "1" output of the preceding flip-flop in the shift register is sensed—the non-conductive status of the diode 1033 will not be changed, and, when the "R" input of the flip-flop is at —12 volts—that is, a —12 volts potential at the "0" output of the preceding flip-flop is sensed—the non-conductive status of the diode 1035 will not be changed, but, when the positive shift pulse 797 (FIGURE 82(F)) is applied through the capacitor 1046 to the diode 1033, it will be rendered conductive. The positive voltage pulse appearing across the resistor 1040, upon the conduction of the diode 1033, will be applied to the base of the transistor 1030, causing it to be cut off. When the transistor 1030 is caused to be cut off, the transistor 1031 is caused to be conductive. Accordingly, the flip-flop will have been transferred to its set state. In its set state, the flip-flop presents a —12 volts potential at its "0" output and a 0 volts potential at its "1" output. When the flip-flop was in its reset state, the positive shift pulse 797 applied to the diode 1035 will have no effect on the conduction state of the transistor 1031, since the transistor 1031 is already non-conducting.

When the flip-flop is in its set state, the transistor 1030 is cut off, and the transistor 1031 is conducting. The diodes 1033 and 1035 will be biased in the reverse direction as before. When the "R" input of the flip-flop is at 0 volts—that is, a 0 volts potential at the "0" output of the preceding flip-flop in the shift register is sensed—the non-conductive status of the diode 1035 will not be changed. However, when the positive shift pulse 787 is applied through the capacitor 1047 to the diode 1035, it will be rendered conductive. The positive voltage pulse appearing across the resistor 1041, upon the conduction of the diode 1035, will be applied to the base of the transistor 1031, causing it to be cut off. When the transistor 1031 is caused to be cut off, the transistor 1030 is caused to be conductive. Accordingly, the flip-flop will have been transferred to its reset state. In its reset state, the flip-flop presents a —12 volts potential at its "1" output and a 0 volts potential at its "0" output.

Accordingly, the flip-flop of FIGURE 62 comprises a potential sensing and pulse routing network made up of two pulse-gating circuits, each receiving the shift pulses 787, sensing the potential at its "S" or "R" input, and either passing or not passing a received shift pulse 787 through the diodes 1033 and 1035 to the circuits of the bases of the transistors 1030 and 1031, respectively. The first gating circuit comprises the diode 1033, the resistors 1032 and 1040, and the capacitor 1046. The second gating circuit comprises the diode 1035, the resistors 1034 and 1041, and the capacitor 1047. While each gating circuit may be considered as a separate component, two such gating circuits combined operate in complemental conjugation, as previously described, since they sense complementing potentials, to provide the desired pulse routing action of the shift pulses 787. The "1" and "0" outputs of a preceding flip-flop will be present at the "S" and "R" inputs of a succeeding flip-flop while the shifting or advance operation of a shift register is taking place.

While particular embodiments of the invention have been shown and described in detail, it will be obvious to those skilled in the art that various changes and modifications may be made therein without departing from the invention, and it is, therefore, aimed to cover all such changes and modifications as fall within the true spirit and scope of the invention.

What is claimed is:

1. In a document sorting apparatus for sorting documents having data recorded thereon, document sorting control means including reading and gating devices, and means for developing sorting control signals for each of said documents read by said reading device, said sorting control signals being representative of selected data recorded on said documents; document conveying means for moving said documents relative to said reading and gating devices; feeding means for feeding said documents in sequence to said conveying means; timing signal generating means for developing an electrical timing signal each time that one of said documents is fed to said conveying means; a first storage means for storing sorting control signals developed for each of said documents read by said reading device; a second storage means for storing sorting control signals read out of said first storage means; transfer means operable to read storting control signals out of said first storage means to said second storage means; means for developing a first synchronization signal occurring prior to reading of each of said documents by said reading device comprising means located at a predetermined point between said feeding means and said reading device for developing a document presence signal for each document moved adjacent thereto, and a one-shot circuit having a stable state and an unstable state, said one-shot circuit being changed to its unstable state in response to each of said document presence signals to develop said first synchronization signals; means for applying each of said first synchronization signals to said first storage means to clear it of sorting control signals developed for the next preceding one of said documents read by said reading device, said transfer means having been operated previously to cause sorting control signals developed for the next preceding one of said documents to be read out of said first storage means to said second storage means; means for developing a second synchronization signal occurring just prior to termination of reading of each of said documents by said reading device comprising a flip-flop circuit having two stable states and a one-shot circuit having a stable state and an unstable state, said flip-flop circuit being changed to one of its stable states in response to said first synchronization signals and being changed to the other of its stable states in response to said electrical timing signals, said one-shot circuit being changed to its unstable state when said flip-flop circuit is changed to said other of its stable states to develop said second synchronization signals; means for developing a third synchronization signal occurring just subsequent to each of said second synchronization signals comprising a first and a second one-shot circuit each having a stable state and an unstable state, said first one-shot circuit being changed to its unstable state in response to said second synchronization signals, said second one-shot circuit being changed to its unstable state to develop said third synchronization signals when said first one-shot circuit returns to its stable state; means for applying each of said second synchronization signals to said second storage means to clear it of sorting control signals developed for the next preceding one of said documents read by said reading device; and transfer signal generating means responsive to each of said third synchronization signals for developing a transfer signal for the sorting control signals stored in said first storage means; said transfer means being responsive to each of said transfer signals to cause sorting control signals stored in said first storage means to be read out to said second storage means.

2. In a document sorting apparatus for sorting documents having data recorded thereon, document sorting control means including reading and gating devices, and means for developing sorting control signals for each of said documents read by said reading device, said sorting control signals being representative of selected data recorded on said documents; document conveying means for moving said documents relative to said reading and gating devices; feeding means for feeding said documents in sequence to said conveying means; timing signal generating means for developing an electrical timing signal each time that one of said documents is fed to said conveying means; a first storage means for storing sorting control signals developed for each of said documents read by said reading device; a second storage means for storing sorting control signals read out of said first storage means; transfer means operable to read sorting control signals out of said first storage means to said second storage means; means located at a predetermined point between said feeding means and said reading device for developing a document presence signal for each document moved adjacent thereto; means responsive to each of said document presence signals for developing a first synchronization signal commencing at the time of occurrence of one of said document presence signals and terminating when said one of said documents is adjacent to said reading device comprising photosensitive means located at a predetermined point between said feeding means and said reading device for developing a document presence signal for each document moved adjacent thereto, and a one-shot circuit having a stable state and an unstable state, said one-shot circuit being changed to its unstable state in response to each of said document presence signals to develop said first synchronization signals; means responsive to each of said first synchronization signals for developing a first control signal commencing at the time one of said documents is adjacent to said reading device; means for applying each of said first control signals to said first storage means to clear it of sorting control signals developed for the next preceding one of said documents read by said reading device, said transfer means having previously been operated to cause sorting control signals developed for the next preceding one of said documents to be read out of said first storage means to said second storage means; means responsive to each of said first synchronization signals and said electrical timing signals for developing a second synchronization signal commencing at the time of occurrence of one of said electrical timing signals and terminating at the time of occurrence of one of said document presence signals comprising a flip-flop circuit having two stable states and a one-shot circuit having a stable state and an unstable state, said flip-flop circuit being changed to one of its stable states in response to said first synchronization signals and being changed to the other of its stable states in response to said electrical timing signals, said one-shot circuit being changed to its unstable state when said flip-flop circuit is changed to said other of its stable states to develop said second synchronization signals; means responsive to each of said second synchronization signals for developing a second control signal commencing at the time of termination of one of said first synchronization signals; means for applying each of said second control signals to said second storage means to clear it of sorting control signals developed for the next preceding one of said documents read by said reading device; means responsive to each of said second control signals for developing a third synchronization signal commencing just after one of said second control signals and terminating before the termination of one of said first synchronization signals comprising a first and a second one-shot circuit each having a stable state and an unstable state, said first one-shot circuit being changed to its unstable state in response to said second synchronization signals, said second one-shot circuit being changed to its unstable state to develop said third synchronization signals when said first one-shot circuit returns to its stable state; and transfer signal generating means responsive to each of said third synchronization signals for developing a transfer signal for the sorting control signals stored in said first storage means; said transfer means being responsive to each of said transfer signals to cause sorting control signals stored in said first storage means to be read out to said second storage means.

3. In a document sorting apparatus for sorting documents having data recorded thereon, document sorting control means including reading and gating devices, and means for developing sorting control signals for each of said documents read by said reading device, said sorting control signals being representative of selected data recorded on said documents; document conveying means for moving said documents relative to said reading and gating devices; feeding means for feeding said documents in sequence to said conveying means; timing signal generating means for developing an electrical timing signal each time that one of said documents is fed to said conveying means; a first storage means for storing sorting control signals developed for each of said documents read by said reading device; a second storage means for storing sorting control signals read out of said first storage means; transfer means operable to read sorting control signals out of said first storage means to said second storage means; means for developing a first synchronization signal occurring prior to reading of each of said documents by said reading device comprising means located at a predetermined distance between said feeding means and said reading device for developing a document presence signal for each document moved adjacent thereto, a first and a second one-shot circuit each having a stable state and an unstable state, and an AND gate operable to pass said document presence signals to said first one-shot circuit when said second one-shot circuit is in its stable state, said first one-shot circuit being changed to its unstable state in response to each of said document presence signals passed thereto by said AND gate to develop said first synchronization signals, said second one-shot circuit being changed to its unstable state in response to each of said first synchronization signals, said AND gate being rendered inoperable by said second one-shot circuit when said second one-shot circuit is in its unstable state thereby ensuring that only a single first synchronization signal is developed for each of said documents; means for applying each of said first synchronization signals to said first storage means to clear it of sorting control signals developed for the next preceding one of said documents read by said reading device, said transfer means having previously been operated to cause sorting control signals developed for the next preceding one of said documents to be read out of said first storage means to said second storage means; means responsive to said electrical timing signal and said first synchronization signal for developing a second synchronization signal occurring just prior to termination of reading of each of said documents by said reading device; means for developing a third synchronization signal occurring just subsequent to each of said second synchronization signals; means for applying each of said second synchronization signals to said second storage means to clear it of sorting control signals developed for the next preceding one of said documents read by said reading device; and transfer signal generating means responsive to each of said third synchronization signals for developing a transfer signal for the sorting control signals stored in said first storage means; said transfer means being responsive to each of said transfer signals to cause sorting control signals stored in said first storage means to be read out to said second storage means.

4. In a document sorting apparatus for sorting documents having data recorded thereon, feeding means to feed documents in sequence; document sorting control means including reading and gating devices, and means for developing sorting control signals for each of said documents read by said reading device, said sorting control signals being representative of selected data recorded on said documents; document conveying means for moving said documents relative to said reading and gating devices; a timing device between said sequence feeding means and said conveying means to cause said documents to pass to said conveying means at a precise timed relation; timing signal generating means associated with said timing device for developing an electrical timing signal each time that said timing device passes one of said documents to said conveying means; a first storage means for storing sorting control signals developed for each of said documents read by said reading device; a second storage means for storing sorting control signals read out of said first storage means; transfer means operable to read sorting control signals out of said first storage means to said second storage means; means for developing a first synchronization signal occurring prior to reading of each of said documents by said reading device comprising photosensitive means located at a predetermined distance between said feeding means and said reading device for developing a document presence signal for each document moved adjacent thereto, a first and a second one-shot circuit each having a stable state and an unstable state, and an AND gate operable to pass said document presence signals to said first one-shot circuit when said second one-shot circuit is in its stable state, said first one-shot circuit being changed to its unstable state in response to each of said document presence signals passed thereto by said AND gate to develop said first synchronization signals, said second one-shot circuit being changed to its unstable state in response to each of said first synchronization signals, said AND gate being rendered inoperable by said second one-shot circuit when said second one-shot circuit is in its unstable state thereby ensuring that only a single first synchronization signal is developed for each of said documents; means for applying each of said first synchronization signals to said first storage means to clear it of sorting control signals developed for the next preceding one of said documents read by said reading device, said transfer means having previously been operated to cause sorting control signals developed for the next preceding one of said documents to be read out of said first storage means to said second storage means; means for developing a second synchronization signal occurring just prior to termination of reading of each of said documents by said reading device comprising a flip-flop circuit having two stable states and a one-shot circuit having a stable state and an unstable state, said flip-flop circuit being changed to one of its stable states in response to said first synchronization signals and being changed to the other of its stable states in response to said electrical timing signals, said one-shot circuit being changed to its unstable state when said flip-flop circuit is changed to said other of its stable states to develop said second synchronization signals; means for developing a third synchronization signal occurring just subsequent to each of said second synchronization signals comprising a first and a second one-shot circuit each having a stable state and an unstable state, said first one-shot circuit being changed to its unstable state in response to said second synchronization signals, said second one-shot circuit being changed to its unstable state to develop said third synchronization signals when said first one-shot circuit returns to its stable state; means for applying each of said second synchronization signals to said second storage means to clear it of sorting control signals developed for the next preceding one of said documents read by said reading device; and transfer signal generating means responsive to each of said third synchronization signals for developing a transfer signal for the sorting control signals stored in said first storage means; said transfer means being responsive to each of said transfer signals to cause sorting control signals stored in said first storage means to be read out to said second storage means.

5. In a document sorting apparatus for sorting documents having data recorded thereon, document sorting control means including reading and gating devices, and means for developing sorting control signals for each of said documents read by said reading device, said sorting control signals being representative of selected data recorded on said documents; document conveying means for moving said documents relative to said reading and gating devices; feeding means for feeding said documents in sequence to said conveying means; timing signal generating means for developing an electrical timing signal each time that one of said documents is fed to said conveying means; a first storage means for storing sorting control signals developed for each of said documents read by said reading device; a second storage means for storing sorting control signals read out of said first storage means; transfer means operable to read sorting control signals out of said first storage means to said second storage means; means for developing a first synchronization signal occurring prior to reading of each of said documents by said reading device; means for applying each of said first synchronization signals to said first storage means to clear it of sorting control signals developed for the next preceding one of said documents read by said reading device, said transfer means having previously been operated to cause sorting control signals developed for the next preceding one of said documents to be read out of said first storage means to said second storage means; means for developing a second synchronization signal occurring just prior to termination of reading of each of said documents by said reading device; means for developing a third synchronization signal occurring just subsequent to each of said second synchronization signals; means for applying each of said second synchronization signals to said second storage means to clear it of sorting control signals developed for the next preceding one of said documents read by said reading device; transfer signal generating means responsive to each of said third synchronization signals for developing a transfer signal for the sorting control signals stored in said first storage means; said transfer means being responsive to each of said transfer signals to cause sorting control signals stored in said first storage means to be read out to said second storage means; control means responsive to each of said electrical timing signals for developing a gating signal occurring before the time of occurrence of each of said third synchronization signals; a plurality of gating circuit means; a delay means having a plurality of input circuits for receiving the sorting control signals stored in said second storage means and having a plurality of output circuits, with each one of said plurality of output circuits being coupled to a different one of said plurality of gating circuit means in accordance with a preselected code pattern whereby a different one of said gating means will be conditioned for subsequent operation in response to a different one of said sorting control signals; means for applying each of said gating signals to all of said plurality of gating circuit means whereby a gating circuit means previously conditioned for operation is rendered operative; and an output means coupled to each of said gating circuit means for providing an output signal for control of a predetermined one of said gate devices upon its associated gating circuit means being rendered operative.

6. In a document sorting apparatus for sorting documents having data recorded thereon, document sorting control means including reading and gating devices, and means for developing sorting control signals for each of said documents read by said reading device, said sorting control signals being representative of selected data recorded on said documents; document conveying means for moving said documents relative to said reading and gating devices; feeding means for feeding said documents in sequence to said conveying means; timing signal generating means for developing an electrical timing signal each time that one of said documents is fed to said conveying means; a first storage means for storing sorting control signals developed for each of said documents read by said reading device; a second storage means for storing sorting control signals read out of said first storage means; transfer means operable to read sorting control signals out of said first storage means to said second storage means; means for developing a first synchronization signal occurring prior to reading of each of said documents by said reading device; means for applying each of said first synchronization signals to said first storage means to clear it of sorting control signals developed for the next preceding one of said documents read by said reading device, said transfer means having previously been operated to cause sorting control signals developed for the next preceding one of said documents to be read out of said first storage means to said second storage means; means for developing a second synchronization signal occurring just prior to termination of reading of each of said documents by said reading device; means for developing a third synchronization signal occurring just subsequent to each of said second synchronization signals; means for applying each of said second synchronization signals to said second storage means to clear it of sorting control signals developed for the next preceding one of said documents read by said reading device; transfer signal generating means responsive to each of said third synchronization signals for developing a transfer signal for the sorting control signals stored in said first storage means; said transfer means being responsive to each of said transfer signals to cause sorting control signals stored in said first storage means to be read out to said second storage means; control means responsive to each of said electrical timing signals for developing a gating signal occurring before the time of occurrence of each of said third synchronization signals; a plurality of gating circuit means; a delay means comprising a plurality of series of bistable state storage devices, each of said bistable state storage devices having input and output circuits, with the input circuits of the first bistable state storage device in each series being provided for receiving the sorting control signals stored in said second storage means, with one of said output circuits of each of said bistable state storage devices being coupled to one of said plurality of gating circuit means in accordance with a preselected code pattern whereby a different one of said gating circuit means will be conditioned for subsequent operation in response to a different one of said sorting control signals; means for applying each of said gating signals to all of said plurality of gating circuit means whereby a gating circuit means previously conditioned for operation is rendered operative; and an output means coupled to each of said gating circuit means for providing an output signal for control of a predetermined one of said gate devices upon its associated gating circuit means being rendered operative.

7. In a document sorting apparatus for sorting documents having data recorded thereon, document sorting control means including reading and gating devices, and means for developing sorting control signals for each of said documents read by said reading device, said sorting control signals being representative of selected data recorded on said documents; document conveying means for moving said documents relative to said reading and gating devices; feeding means for feeding said documents in sequence to said conveying means; timing signal generating means for developing an electrical timing signal each time that one of said documents is fed to said conveying means; a first storage means for storing sorting control signals developed for each of said documents read by said reading device; a second storage means for storing sorting control signals read out of said first storage means; transfer means operable to read sorting control signals out of said first storage means to said second storage means; means for developing a first synchronization signal occurring prior to reading of each of said documents by said reading device; means for applying each of said first synchronization signals to said first storage means to clear it of sorting control signals developed for the next preceding one of said documents read by said reading device, said transfer means having previously been operated to cause sorting control signals developed for the next preceding one of said documents to be read out of said first storage means to said second storage means; means for developing a second synchronization signal occurring just prior to termination of reading of each of said documents by said reading device; means for developing a third synchronization signal occurring just subsequent to each of said second synchronization signals; means for applying each of said second synchronization signals to said second storage means to clear it of sorting control signals developed for the next preceding one of said documents read by said reading device; transfer signal generating means responsive to each of said third synchronization signals for developing a transfer signal for the sorting control signals stored in said first storage means; said transfer means being responsive to each of said transfer signals to cause sorting control signals stored in said first storage means to be read out to said second storage means; control means responsive to each of said electrical timing signals for developing a gating signal occurring before the time of occurrence of each said third synchronization signals, and for developing a shift signal occurring a predetermined time after each of said gating signals; a plurality of gating circuit means; a delay means comprising a plurality of series of bistable state storage devices, each of said bistable state storage devices having input and output circuits, with the input circuits of the first bistable state storage device in each series being provided for receiving the sorting control signals stored in said second storage means, with one of said output circuits of each of said bistable state storage devices being coupled to one of said plurality of gating circuit means in accordance with a preselected code pattern whereby a different one of said gating circuit means will be conditioned for subsequent operation in response to a different one of said sorting control signals; means for applying each of said shift signals to all of said bistable state storage devices to cause sorting control signals previously stored in said delay means to be shifted progressively along each of said series of bistable state storage devices; means for applying each of said gating signals to all of said plurality of gating circuit means whereby a gating circuit means previously conditioned for operation is rendered operative; and an output means coupled to each of said gating circuit means for providing an output signal for control of a predetermined one of said gate devices upon its associated gating circuit means being rendered operative.

8. In a document sorting apparatus for sorting documents having data recorded thereon, document sorting control means including reading and gating devices, and means for developing sorting control signals for each of said documents read by said reading device, said sorting control signals being representative of selected data recorded on said documents; document conveying means for moving said documents relative to said reading and gating devices; feeding means for feeding said documents in sequence to said conveying means; timing signal generating means for developing an electrical timing signal each time that one of said documents is fed to said conveying means; a first storage means for storing sorting control signals developed for each of said documents read by said reading device; a second storage means for storing sorting control signals read out of said first storage means; transfer means operable to read sorting control signals out of said first storage means to said second storage means; means for developing a first synchronization signal occurring prior to reading of each of said documents by said reading device; means for applying each of said first synchronization signals to said first storage means to clear it of sorting control signals developed for the next preceding one of said documents read by said reading device, said transfer means having previously been operated to cause sorting control signals developed for the next preceding one of said documents to be read out of said first storage means to said second storage means; means for developing a second synchronization signal occurring just prior to termination of reading of each of said documents by said reading device; means for developing a third synchronization signal occurring just subsequent to each of said second synchronization signals; means for applying each of said second synchronization signals to said second storage means to clear it of sorting control signals developed for the next preceding one of said documents read by said reading device; transfer signal generating means responsive to each of said third synchronization signals for developing a transfer signal for the sorting control signals stored in said first storage means; said transfer means being responsive to each of said transfer signals to cause sorting signals stored in said first storage means to be read out to said second storage means; control means responsive to each of said electrical timing signals for developing a gating signal occurring before the time of occurrence of each of said third synchronization signals, and for developing a shift signal occurring a predetermined time after each of said gating signals; a plurality of gating circuit means; a delay means comprising a plurality of series of bistable state storage devices, each of said bistable state storage devices having input and output circuits, with the input circuits of the first bistable state storage device in each series being provided for receiving the sorting control signals stored in said second storage means, with one of said output circuits of each of said bistable state storage devices being coupled to one of said plurality of gating circuit means in accordance with a preselected code pattern whereby a different one of said gating circuit means will be conditioned for subsequent operation in response to a different one of said sorting control signals; means for applying each of said shift signals to all of said bistable state storage devices to cause sorting control signals stored in said second storage means to be stored in the first bistable state storage device of each of said series, and to cause sorting control signals previously stored in said delay means to be shifted progressively along each of said series of bistable state storage devices; means for applying each of said gating signals to all of said plurality of gating circuit means whereby a gating circuit means previously conditioned for operation is rendered operative; and an output means coupled to each of said gating circuit means for providing an output signal for control of a predetermined one of said gate devices upon its associated gating circuit means being rendered operative.

9. In a document sorting apparatus for sorting documents having data recorded thereon, document sorting control means including reading and gating devices, and means for developing sorting control signals for each of said documents read by said reading device, said sorting control signals being representative of selected data recorded on said documents; document conveying means for moving said documents relative to said reading and gating devices; feeding means for feeding said documents in sequence to said conveying means; timing signal generating means for developing an electrical timing signal each time that one of said documents is fed to said conveying means; a first storage means for storing sorting control signals developed for each of said documents read by said reading device; a second storage means for storing sorting control signals read out of said first storage means; transfer means operable to read sorting control signals out of said first storage means to said second storage means; means for developing a first synchronization signal occurring prior to reading of each of said documents by said reading device; means for applying each of said first synchronization signals to said first storage means to clear it of sorting control signals developed for the next preceding one of said documents read by said reading device, said transfer means having previously been operated to cause sorting control signals developed for the next preceding one of said documents to be read out of said first storage means to said second storage means; means for developing a second synchronization signal occurring just prior to termination of reading of each of said documents by said reading device; means for developing a third synchronization signal occurring just subsequent to each of said second synchronization signals; means for applying each of said second synchronization signals to said second storage means to clear it of sorting control signals developed for the next preceding one of said documents read by said reading device; transfer signal generating means responsive to each of said third synchronization signals for developing a transfer signal for the sorting control signals stored in said first storage means; said transfer means being responsive to each of said transfer signals to cause sorting signals stored in said first storage means to be read out to said second storage means; control means responsive to each of said electrical timing signals for developing a gating signal occurring before the time of occurrence of each of said third synchronization signals, and for developing a shift signal occurring a predetermined time after each of said gating signals; a plurality of gating circuit means; a delay means comprising a plurality of series of bistable state storage devices, each of said bistable state storage devices having input and output circuits, with the input circuits of the first bistable state storage device in each series being provided for receiving the sorting control signals stored in said second storage means, with one of said output circuits of each of said bistable state storage devices being coupled to one of said plurality of gating circuit means in accordance with a preselected code pattern whereby a different one of said gating circuit means will be conditioned for subsequent operation in response to a different one of said sorting control signals; means responsive to each of said gating signals for making sorting control signals stored in said second storage means available to said input circuits of the first bistable state storage device in each series of bistable state storage devices of said delay means; means for applying each of said shift signals to all of said bistable state storage devices to cause sorting control signals stored in said second storage means to be stored in the first bistable state storage device of each of said series, and to cause sorting control signals previously stored in said delay means to be shifted progressively along each of said series of bistable state storage devices; means for applying each of said gating signals to all of said plurality of gating circuit means whereby a gating circuit means previously conditioned for operation is rendered operative; and an output means coupled to each of said gating circuit means for providing an output signal for control of a predetermined one of said gate devices upon its associated gating circuit means being rendered operative.

10. In a document sorting apparatus for sorting documents having data recorded thereon, document sorting control means including reading and gating devices, and means for developing sorting control signals for each of said documents read by said reading device, said sorting control signals being representative of selected data recorded on said documents and being expressed in accordance with a predetermined binary code, parallel by binary bit; document conveying means for moving said documents relative to said reading and gating devices; feeding means for feeding said documents in sequence to said conveying means; timing signal generating means for developing an electrical timing signal each time that one of said documents is fed to said conveying means; a first storage means for storing sorting control signals, parallel by binary bit, developed for each of said documents read by said reading device; a second storage means for storing sorting control signals, parallel by binary bit, read out of said first storage means; transfer means operable to read sorting control signals out of said first storage means to said second storage means; means for developing a first synchronization signal occurring prior to reading of each of said documents by said reading device; means for applying each of said first synchronization signals to said first storage means to clear it of sorting control signals developed for the next preceding one of said documents read by said reading device, said transfer means having previously been operated to cause sorting control signals developed for the next preceding one of said documents to be read out of said first storage means to said second storage means; means for developing a second synchronization signal occurring just prior to termination of reading of each of said documents by said reading device; means for developing a third synchronization signal occurring just subsequent to each said second synchronization signals; means for applying each of said second synchronization signals to said second storage means to clear it of sorting control signals developed for the next preceding one of said documents read by said reading device; transfer signal generating means responsive to each of said third synchronization signals for developing a transfer signal for the sorting control signals stored in said first storage means; said transfer means being responsive to each of said transfer signals to cause sorting control signals stored in said first storage means to be read out to said second storage means; control means responsive to each of said electrical timing signals for developing a gating signal occurring before the time of occurrence of each of said third synchronization signals; a plurality of gating circuit means; a delay means comprising a plurality of series of bistable state storage devices, each of said bistable state storage devices having input and output circuits, with the input circuits of the first bistable state storage device in each series being provided for receiving the sorting control signals stored in said second storage means, parallel by binary bit, with one of said output circuits of each of said bistable state storage devices being coupled to one of said plurality of gating circuit means in accordance with a preselected code pattern whereby a different one of said gating circuit means will be conditioned for subsequent operation in response to a different one of said sorting control signals; means for applying each of said shift signals to all of said bistable state storage devices to cause sorting control signals stored in said second storage means to be stored in the first bistable state storage device of each of said series, and to cause sorting control signals previously stored in said delay means to be shifted progressively along each of said series of bistable state storage devices; means for applying each of said gating signals to all of said plurality of gating circuit means whereby a gating circuit means previously conditioned for operation is rendered operative; and output means coupled to each of said gating circuit means for providing an output signal for control of a predetermined one of said gate devices upon its associated gating circuit means being rendered operative.

11. In sorting apparatus operable with substantially opaque documents, the combination of conveying means defining a path of travel for said documents; feeding means for feeding said documents to said conveying means; timing means associated with said feeding means for developing timing signals occurring in synchronism with operation of said feeding means; and control means for developing a control output to effect control of said feeding means when a document is improperly located along said path of travel during the occurrence of one of said timing signals, said control means comprising a control circuit including a plurality of photosensitive devices, each positioned at a predetermined point adjacent to said path of travel, means for applying light to each of said photosensitive devices, said control circuit developing an output when a document is adjacent to one of said photosensitive devices and said document prevents light from being applied thereto, a source of oscillatory potential, means coupled to said source of oscillatory potential and controlled by the output of said control circuit for developing an output signal, and a gating circuit means for receiving said timing signals and said output signal, said gating circuit means being operable when one of said timing signals and said output signal are received simultaneously to develop said control output to effect control of said feeding means.

12. In sorting apparatus operable with substantially opaque documents, the combination of conveying means defining a path of travel for said documents; feeding means for feeding said documents in sequence to said conveying means; timing means associated with said feeding means for developing a timing signal each time one of said documents is fed to said conveying means; and control means for developing a control output to effect control of said feeding means when a document is improperly located along said path of travel during the occurrence of one of said timing signals, said control means comprising a control circuit including a plurality of photosensitive devices, each positioned at a predetermined point adjacent to said path of travel, means for applying light to each of said photosensitive devices, said control circuit developing an output when a document is adjacent to one of said photosensitive devices and said document prevents light from being applied thereto, a source of oscillatory potential, means coupled to said source of oscillatory potential and controlled by the output of said control circuit for developing an output signal, and a gating circuit means for receiving said timing signals and said output signal, said gating circuit means being operable when one of said timing signals and said output signal are received simultaneously to develop said control output to effect control of said feeding means.

13. In sorting apparatus operable with substantially opaque documents, the combination of conveying means defining a path of travel for said documents; feeding means for feeding said documents in sequence; a timing device between said sequence feeding means and said conveying means to cause said documents to pass to said conveying means at a precise timed relation; timing signal generating means associated with said timing device for developing a timing signal each time that said timing device passes one of said documents to said conveying means; and control means for developing a control output to effect control of said feeding means when a document is improperly located along said path of travel during the occurrence of one of said timing signals, said control means comprising a control circuit including a plurality of photosensitive devices, each positioned at a predetermined point adjacent to said path of travel, means for applying light to each of said photosensitive devices, said control circuit developing an output when a document is adjacent to one of said photosensitive devices and said control circuit developing an output when a document is adjacent to one of said photosensitive devices and said document prevents light from being applied thereto, a source of oscillatory potential, means coupled to said source of oscillatory potential and controlled by the output of said control circuit for deveéloping an output signal, and a gating circuit means for receiving said timing signals and said output signal, said gating circuit means being operable when one of said timing signals and said output signal are received simultaneously to develop said control output to effect control of said feeding means.

14. In sorting apparatus operable with substantially opaque documents, the combination of conveying means defining a path of travel for said documents; feeding means for feeding said documents in sequence to said conveying means; timing means associated with said feeding means for developing a timing signal each time one of said documents is fed to said conveying means; means responsive to each of said timing signals for developing a further timing signal commencing a predetermined time interval after a corresponding one of said timing signals and having a predetermined time duration; and control means for developing a control output to effect control of said feeding means when a document is improperly located along said path of travel during the occurrence of one of said timing signals, said control means comprising a control circuit including a plurality of photosensitive devices, each positioned at a predetermined point adjacent to said path of travel, means for applying light to each of said photosensitive devices, said control circuit developing an output when a document is adjacent to one of said photosensitive devices and said document prevents light from being applied thereto, a source of oscillatory potential, means coupled to said source of oscillatory potential and controlled by the output of said control circuit for developing an output signal, and a gating circuit means for receiving said timing signal and said output signal, said gating circuit means being operable when one of said timing signals and said output signal are received simultaneously to develop said control output to effect control of said feeding means.

15. In sorting apparatus operable with substantially opaque documents, the combination of conveying means defining a path of travel for said documents; feeding means for feeding said documents to said conveying means; timing means associated with said feeding means for developing timing signals occurring in synchronism with operation of said feeding means; and control means for developing a control output to effect control of said feeding means when a document is improperly located along said path of travel during the occurrence of one of said timing signals, said control means comprising a control circuit including a plurality of photosensitive devices, each positioned at a predetermined point adjacent to said path of travel, means for applying light to each of said photosensitive devices, said control circuit developing an output when a document is adjacent to one of said photosensitive devices and said document prevents light from being applied thereto from said light-applying means, an electrical oscillation generator, a modulator circuit coupled to said oscillation generator and controlled by said output of said control circuit for developing an effective oscillatory output when a document is adjacent to one of said photosensitive devices of said control circuit, a detector circuit means for receiving the oscillatory output of said modulator circuit and for developing an output signal having a duration substantially equal to the time interval any one of said documents is adjacent to one of said photosensitive devices, and a gating circuit means for receiving said timing signals and said output signal, said gating circuit means being operable when one of said timing signals and one of said output signals are received simultaneously to develop said control output to effect control of said feeding means.

16. In sorting apparatus operable with substantially opaque documents, the combination of conveying means defining a path of travel for said documents; feeding means for feeding said documents in sequence; a timing device between said sequence feeding means and said conveying means to cause said documents to pass to said conveying means at a precise timed relation; timing signal generating means associated with said timing device for developing a timing signal each time that said timing device passes one of said documents to said conveying means; and control means for developing a control output to effect control of said feeding means when a document is improperly located along said path of travel during the occurrence of one of said timing signals, said control means comprising a control circuit including a plurality of photosensitive devices, each positioned at a predetermined point adjacent to said path of travel, means for applying light to each of said photosensitive devices, said control circuit developing an output when a document is adjacent to one of said photosensitive devices and said document prevents light from being applied thereto from said light-applying means, an electrical oscillation generator, a modulator circuit coupled to said oscillation generator and controlled by said output of said control circuit for developing an effective oscillatory output when a document is adjacent to one of said photosensitive devices of said control circuit, a detector circuit means for receiving the oscillatory output of said modulator circuit and for developing an output signal having a duration substantially equal to the time interval any one of said documents is adjacent to one of said photosensitive devices, and a gating circuit means for receiving said timing signals and said output signal, said gating circuit means being operable when one of said timing signals and one of said output signals are received simultaneously to develop said control output to effect control of said feeding means.

17. In sorting apparatus operable with substantially opaque documents, the combination of conveying means defining a path of travel for said documents; feeding means for feeding said documents in sequence; a timing device between said sequence feeding means and said conveying means to cause said documents to pass to said conveying means at a pecise timed relation; timing signal generating means associated with said timing device for developing a timing signal each time that said timing device passes one of said documents to said conveying means; means responsive to each of said timing signals for developing a further timing signal commencing a predetermined time interval after a corresponding one of said timing signals and having a predetermined time duration; and control means for developing a control output to effect control of said feeding means when a document is improperly located along said path of travel during the occurrence of one of said further timing signals, said control means comprising a control circuit including a plurality of photosensitive devices, each positioned at a predetermined point adjacent to said path of travel; means for applying light to each of said photosensitive devices; said control circuit developing an output when a document is adjacent to one of said photosensitive devices and said document prevents light from being applied thereto from said light-applying means; an electrical oscillation generator; a modulator circuit coupled to said oscillation generator and controlled by said output of said control circuit for developing an effective oscillatory output when a document is adjacent to one of said photosensitive devices of said control circuit; a detector circuit means for receiving the oscillatory output of said modulator circuit and for developing a direct current output potential proportional to the amplitude of said oscillatory output; means responsive to said direct current output potential for developing an output signal having a duration substantially equal to the time interval any one of said documents is adjacent to one of said photosensitive devices; and a gating circuit means for receiving said timing signals and said output signal; said gating circuit means being operable when one of said further timing signals and one of said output signals are received simultaneously to develop said control output to effect control of said feeding means.

18. In a system for delaying each of a plurality of groups of input electrical signals representative of input data expressed in accordance with a predetermined code, and for providing an output signal for each of said groups of input electrical signals a time interval after each of said groups is first received, said time interval being determined by the value of said coded input data, the combination comprising a plurality of gating circuit means; a delay means having a plurality of input circuits for receiving any one of said groups of input electrical signals representative of input data expressed in accordance with a predetermined code, said delay means having a plurality of output circuits, with each one of said output circuits being coupled to a different one of said plurality of gating circuit means in accordance with a preselected code pattern whereby a different one of said gating circuit means will be conditioned for subsequent operation in response to a different one of said groups of input electical signals; control means for developing a gating signal at predetermined times and for applying said gating signals to all of said plurality of gating circuit means whereby a gating circuit means previously conditioned for operation is rendered operative; and an output means coupled to each of said gating circuit means for providing an output signal upon its associated gating circuit means being rendered operative.

19. In a system for delaying each of a plurality of groups of input electrical signals representative of input data expressed in accordance with a predetermined binary code, parallel by binary bit, and for providing a single output signal for each of said groups of input electrical signals a time interval after each of said groups is first received, said time interval being determined by the value of said binary coded input data, the combination comprising a plurality of gating circuit means; a delay means having a plurality of input circuits for receiving any one of said groups of input electrical signals representative of input data expressed in accordance with a predetermined binary code, parallel by binary bit, said delay means having a plurality of output circuits, with each one of said output circuits being coupled to a different one of said plurality of gating circuit means in accordance with a preselected code pattern whereby a different one of said gating circuit means will be conditioned for subsequent operation in response to a different one of said groups of input electrical signals; control means for developing a gating signal at predetermined times and for applying said gating signals to all of said plurality of gating circuit means whereby a gating circuit means previously conditioned for operation is rendered operative; and an output means coupled to each of said gating circuit means for providing a single output signal upon its associated gating circuit means being rendered operative.

20. In a system for delaying each of a plurality of groups of input electrical signals representative of input data expressed in accordance with a predetermined binary code, parallel by binary bit, and for providing a single output signal for each of said groups of input electrical signals a time interval after each of said groups is first received, said time interval being determined by the value of said binary coded input data, the combination comprising a plurality of gating circuit means; a delay means having a plurality of input circuits for receiving any one of said groups of input electrical signals representative of input data expressed in accordance with a predetermined binary code, parallel by binary bit, said delay means having a series of plural output circuits, with one output circuit of each of said plural output circuits of said series being coupled to a different one of said plurality of gating circuit means in accordance with a preselected code pattern whereby a different one of said gating circuit means will be conditioned for subsequent operation in response to a different one of said groups of input electrical signals; control means for developing a gating signal at predetermined times and for applying said gating signals to all of said plurality of gating circuit means whereby a gating circuit means previously conditioned for operation is rendered operative; and an output means coupled to each of said gating circuit means for providing a single output signal upon its associated gating circuit means being rendered operative.

21. In a system for delaying each of a plurality of groups of input electrical signals representative of input data expressed in accordance with a predetermined binary code, parallel by binary bit, and for providing a single output signal for each of said groups of input electrical signals a time interval after each of said groups is first received, said time interval being determined by the value of said binary coded input data, the combination comprising a source of electrical timing signals; control means responsive to each of said electrical timing signals for developing a gating signal occurring a predetermined time interval after each of said electrical timing signals and for developing a shift signal occurring a predetermined time interval after each of said gating signals; a plurality of gating circuit means; a delay means comprising a plurality of series of bistable state storage devices, each of said bistable state storage devices having input and output circuits, with the input circuits of the first bistable state storage device in each series being provided for receiving any one of said groups of input electrical signals representative of input data expressed in a binary code, parallel by binary bit, with one of said output circuits of each of said bistable state storage devices being coupled to one of said plurality of gating circuit means in accordance with a preselected code pattern whereby a different one of said gating circuit means will be conditioned for subsequent operation in response to a different one of said groups of input electrical signals; means for applying each of said shift signals to all of said bistable state storage devices to cause each of said groups of input electrical signals previously stored in said delay means to be shifted progressively along each of said series of bistable state storage devices; means for applying each of said gating signals to all of said plurality of gating circuit means whereby a gating circuit means previously conditioned for operation is rendered operative; and an output means coupled to all of said gating circuit means for providing a single output signal upon its associated gating circuit means being rendered operative.

22. In a system for delaying each of a plurality of groups of input electrical signals representative of input data expressed in accordance with a predetermined binary code, parallel by binary bit, and for providing a single output signal for each of said groups of input electrical signals a time interval after each of said groups of input electrical signals is first received in a storage device, said time interval being determined by the value of said binary coded input data and electrical timing signals, the combination comprising a source of electrical timing signals; control means responsive to each of said electrical timing signals for developing a gating signal occurring a predetermined time interval after each of said electrical timing signals and for developing a shift signal occurring a predetermined time interval after each of said gating signals; a plurality of gating circuit means; a delay means comprising a plurality of series of bistable state storage devices, each of said bistable state storage devices having input and output circuits, with the input circuits of the first bistable state storage device in each series being provided for receiving information relative to any one of said groups of input electrical signals, with one of said output circuits of each of said bistable state storage devices being coupled to one of said gating circuit means in accordance with a preselected code pattern whereby a different one of said gating circuit means will be conditioned for subsequent operation in response to information relative to a different one of said groups of input electrical signals; means for applying each of said shift signals to all of said bistable state storage devices to cause information relative to a group of said input electrical signals stored in said storage means to be stored in the first bistable state storage device of each of said series, and to cause information relative to groups of input electrical signals previously stored in said delay means to be shifted progressively along each of said series of bistable state storage devices; means for applying each of said gating signals to all of said plurality of gating circuit means whereby a gating circuit means previously conditioned for operation is rendered operative; and an output means coupled to all of said gating circuit means for providing a single output signal upon its associated gating circuit means being rendered operative.

23. In a system for delaying each of a plurality of groups of input electrical signals representative of input data expressed in accordance with a predetermined binary code, parallel by binary bit, and for providing a single output signal for each of said groups of input electrical signals a time interval after each of said groups of input electrical signals is first received in a storage device, said time interval being determined by the value of said binary coded input data and electrical timing signals, the combination comprising a source of electrical timing signals; control means responsive to each of said electrical timing signals for developing a gating signal occurring a predetermined time interval after each of said electrical timing signals and for developing a shift signal occurring a predetermined time interval after each of said gating signals; a plurality of gating circuit means; a code modifying and gating network for receiving any one of said groups of input electrical signals from said storage means and operable to develop groups of electrical signals representative of said input data expressed in accordance with a predetermined binary code different from said first-mentioned binary code, parallel by binary bit; a delay means comprising a plurality of series of bistable state storage devices, each of said bistable state storage devices having input and output circuits, with the input circuits of the first bistable state storage device in each series being provided for receiving any one of said groups of electrical signals from said code modifying and gating network, with one of said output circuits of each of said bistable state storage devices being coupled to one of said gating circuit means in accordance with a preselected code pattern determined by said different binary code whereby a different one of said gating circuit means will be conditioned for subsequent operation in response to a different one of said groups of electrical signals received from said code modifying and gating network; means for applying each of said gating signals to said code modifying and gating network and to all of said bistable state storage devices whereby said code modifying and gating network is caused to be operated and a gating circuit means previously conditioned for operation is rendered operative; means for applying each of said shift signals to all of said bistable state storage devices to cause a group of electrical signals developed by said code modifying and gating network to be stored in the first bistable state storage device of each of said series, and to cause each of said groups of electrical signals previously developed by said code modifying and gating network to be shifted progressively along each of said series of bistable state storage devices; and an output means coupled to all of said gating circuit means for providing a single output signal upon its associated gating circuit means being rendered operative.

24. In a system for delaying each of a plurality of input electrical signals and for providing an output signal for each signal a time interval after it is first received,
said time interval being determined by the value of said input data, the combination comprising
a plurality of gating circuit means;
a delay means having a plurality of input circuits for receiving any one of said input electrical signals representative of input data and having a plurality of output circuits each one being coupled to a different one of said gating circuits in accordance with a predetermined pattern,
whereby a different one of said gating circuit means will be conditioned for subsequent operation in response to a different one of said input electrical signals;
control means for developing a gating signal at predetermined times and for applying said gating signals to all of said gating circuit means,
whereby a gating circuit means previously conditioned for operation is rendered operative;
and an output means coupled to each of said gating circuit means for providing an output signal upon its associated gating circuit means being rendered operative.

References Cited in the file of this patent

UNITED STATES PATENTS 2,918,662 Cox ------------------ Dec. 8, 1959

FOREIGN PATENTS 682,303 Great Britain ------------ Nov. 5, 1952

UNITED STATES PATENT OFFICE
CERTIFICATE OF CORRECTION

Patent No. 3,067,874 December 11, 1962

Karl F. Rigg et al.

It is hereby certified that error appears in the above numbered patent requiring correction and that the said Letters Patent should read as corrected below.

Column 10, line 31, after "any" insert -- number --; column 12, line 23, for "in formation" read -- information --; column 16, line 35, for "develops" read -- develop --; column 20, lines 46, 48, 51 and 57, for "one-short", each occurrence, read -- one-shot --; column 25, line 22, after "the", second occurrence, insert -- feed --; column 27, line 43, for "(II)" read -- (I) --; line 68, for "soft" read -- sort --; column 29, line 23, after "The" insert -- jam --; column 30, line 58, after "square" insert -- wave --; column 31, line 2, for "circuit", second occurrence, read -- voltage --; column 32, line 35, for "rest" read -- reset --; column 35, line 68, for "votlage" read -- voltage --; column 39, line 30, for "thet" read -- the --; column 40, in the heading to the table, line 2, for "1" read -- 15 --; column 41, line 41, for "fields" read -- field --; column 43, line 9, for "translatted" read -- translated --; column 45, line 41, for "short" read -- sort --; column 46, line 4, for "decorder" read -- decoder --; line 13, for "demoding" read -- decoding --; column 47, line 9, for "conncted" read -- connected --; column 54, lines 4 and 5, for "precdence" read -- precedence --; column 58, line 67, for "7.5" read -- 7.5K --; column 61, line 64, after the syllable "tive" insert -- potential --; column 62, line 5, for "amplifier" read -- amplifiers --; column 63, line 2, for "bodies" read -- bogies --; column 64, line 12, for "TD201al" read -- TD202al --; line 51, after "cause" insert -- a --; column 65, lines 66 and 67, for "associted" read -- associated --; column 66, line 41, for "transformed" read -- transformer --; lines 57 and 58, for "outomatically" read -- automatically --; column 69, line 14, for "induces" read -- induce --; line 27, after "comprises" insert -- the --; column 70, line 36, for "norminal" read -- nominal --; line 63, for "its" read -- it --; column 80, line 48, for "storting" read -- sorting --; column 89, line 43, after "each" insert -- of --; column 90, line 5, after "and" insert -- an --; column 91, line 14, for "develeoping" read -- developing --; line 46, for "signal", first occurrence, read -- signals --; column 92, line 53, for "pecise" read -- precise --.

Signed and sealed this 25th day of June 1963.

(SEAL)
Attest:

ERNEST W. SWIDER
Attesting Officer

DAVID L. LADD
Commissioner of Patents